(12) United States Patent
Kubo et al.

(10) Patent No.: US 6,924,876 B2
(45) Date of Patent: Aug. 2, 2005

(54) LIQUID CRYSTAL DISPLAY DEVICE

(75) Inventors: Masumi Kubo, Ikoma (JP); Akihiro Yamamoto, Yamatokoortyama (JP); Takashi Ochi, Tenri (JP); Kazuhiro Maekawa, Matsudo (JP); Shohgo Fujioka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 158 days.

(21) Appl. No.: 09/790,802

(22) Filed: Feb. 23, 2001

(65) Prior Publication Data
US 2001/0024257 A1 Sep. 27, 2001

(30) Foreign Application Priority Data

| Feb. 25, 2000 | (JP) | 2000-049495 |
| May 30, 2000 | (JP) | 2000-161240 |
| May 31, 2000 | (JP) | 2000-161588 |
| Feb. 15, 2001 | (JP) | 2001-038556 |

(51) Int. Cl.$^7$ ............................................. G02F 1/13
(52) U.S. Cl. .................. 349/193; 349/129; 349/130
(58) Field of Search ................ 349/193, 129, 349/130, 113, 114

(56) References Cited

U.S. PATENT DOCUMENTS

| 4,437,731 A | * | 3/1984 | Sudo et al. ................ 349/131 |
| 5,408,345 A | | 4/1995 | Mitsui et al. |
| 5,414,547 A | * | 5/1995 | Matsuo et al. ............... 349/44 |
| 5,608,556 A | | 3/1997 | Koma |
| 5,666,179 A | | 9/1997 | Koma |
| 5,699,137 A | | 12/1997 | Kishimoto |
| 5,745,197 A | * | 4/1998 | Leung et al. ................ 349/77 |
| 5,771,084 A | * | 6/1998 | Fujimori et al. ........... 349/153 |
| 6,169,593 B1 | | 1/2001 | Kanaya et al. |
| 6,256,082 B1 | | 7/2001 | Suzuki et al. |
| 6,384,889 B1 | | 5/2002 | Miyachi et al. |

FOREIGN PATENT DOCUMENTS

| JP | 6-75238 A | 3/1994 |
| JP | 06-258649 | 9/1994 |
| JP | 6-301036 A | 10/1994 |
| JP | 07-013164 | 1/1995 |
| JP | 07-234400 | 9/1995 |
| JP | 07-311383 | 11/1995 |
| JP | 09-211445 | 8/1997 |
| JP | 10-301114 A | 11/1998 |

OTHER PUBLICATIONS

Japanese Office Action mailed Jun. 30, 2004 (w/English Translation).
Notice of Reasons for Rejection and partial translation thereof mailed on Oct. 15, 2003 in corresponding Taiwanese application No. 09221040150.
Korean Office Action and translation thereof mailed Jan. 30, 2004 in corresponding Korean Application No. 10-2001-0009631.

* cited by examiner

Primary Examiner—Tarifur R. Chowdhury
Assistant Examiner—David Y. Chung
(74) Attorney, Agent, or Firm—Nixon & Vanderhye P.C.

(57) ABSTRACT

The present invention provides a liquid crystal display device having a high display quality. The liquid crystal display device displays an image by applying a voltage by a first electrode and a second electrode across a liquid crystal layer which takes a vertical alignment in the absence of an applied voltage. The first electrode includes a lower conductive layer, a dielectric layer covering at least a portion of the lower conductive layer, and an upper conductive layer provided on one side of the dielectric layer which is closer to the liquid crystal layer. The upper conductive layer includes a first opening, and the lower conductive layer is provided so as to oppose at least a portion of the first opening via the dielectric layer.

33 Claims, 74 Drawing Sheets

FIG. 22A
FIG. 22B
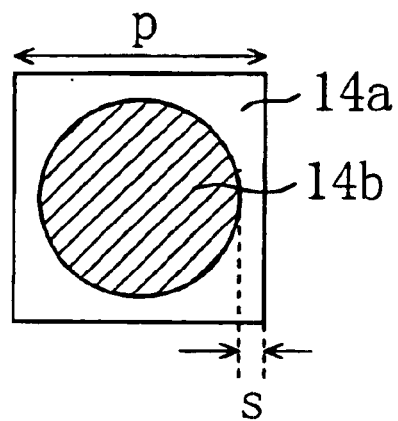
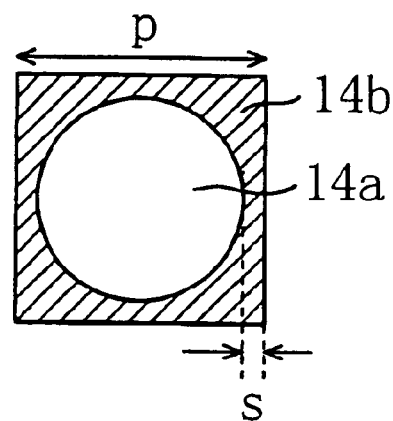
FIG. 22C
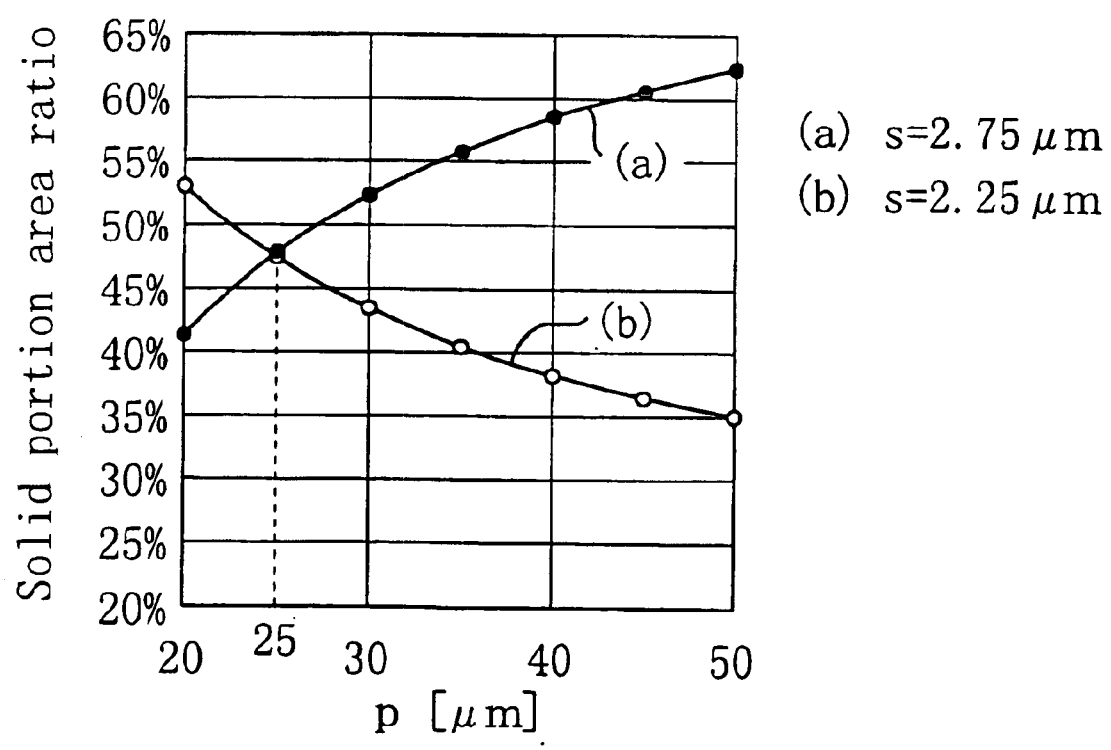
(a) s=2.75 μm
(b) s=2.25 μm

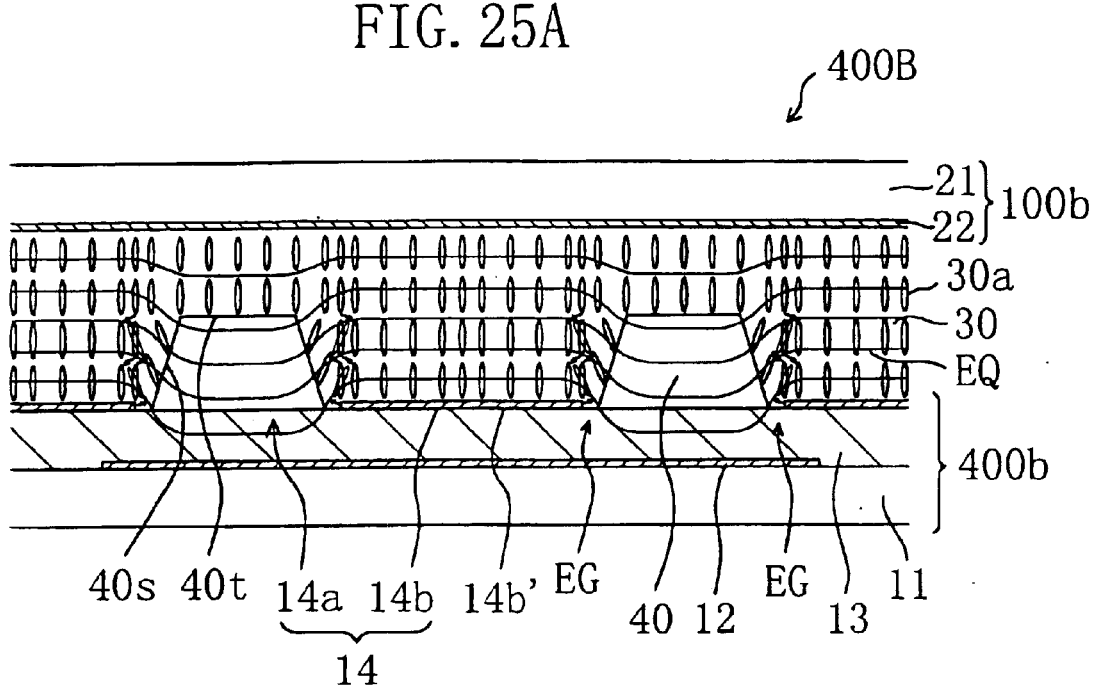
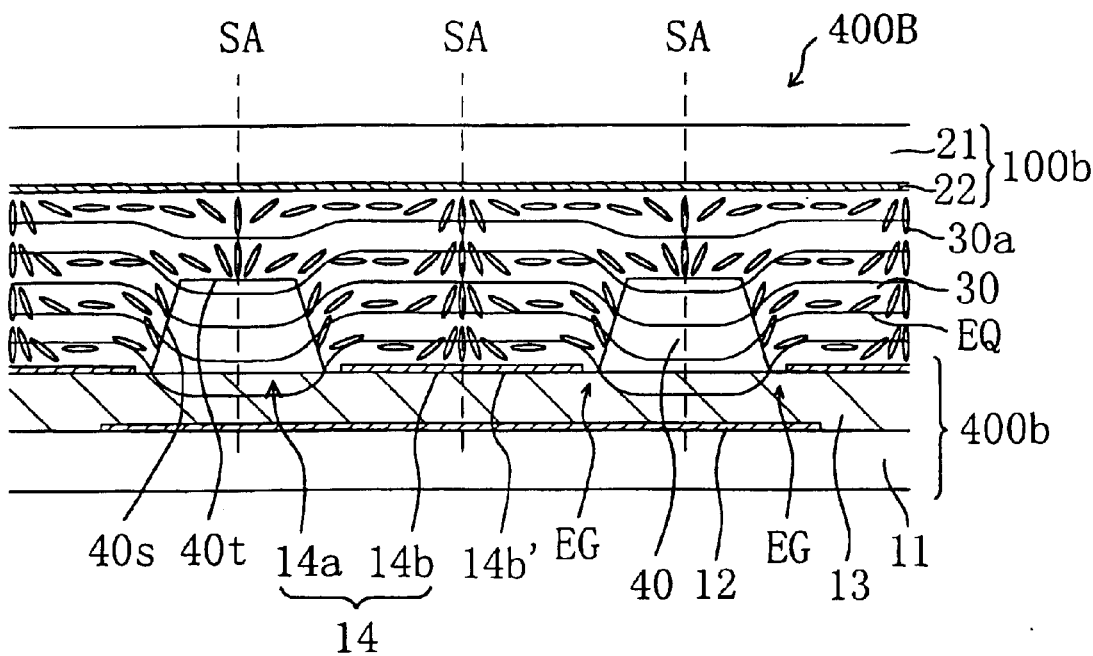

FIG. 28A
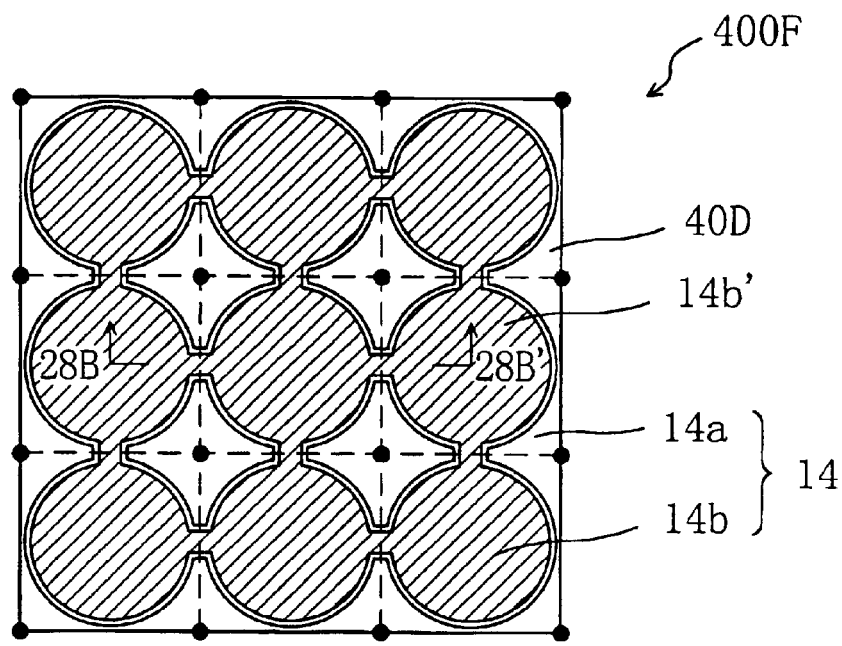
FIG. 28B
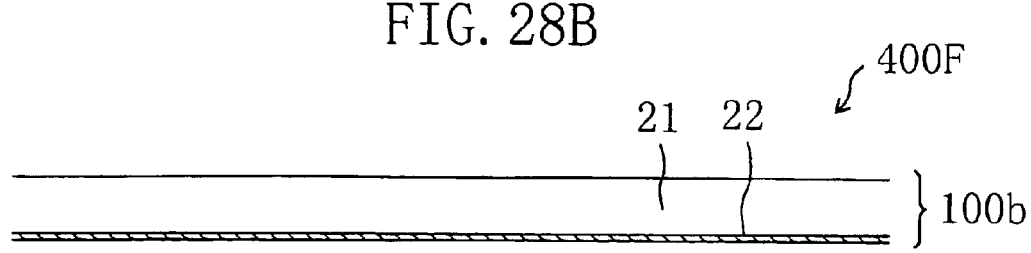
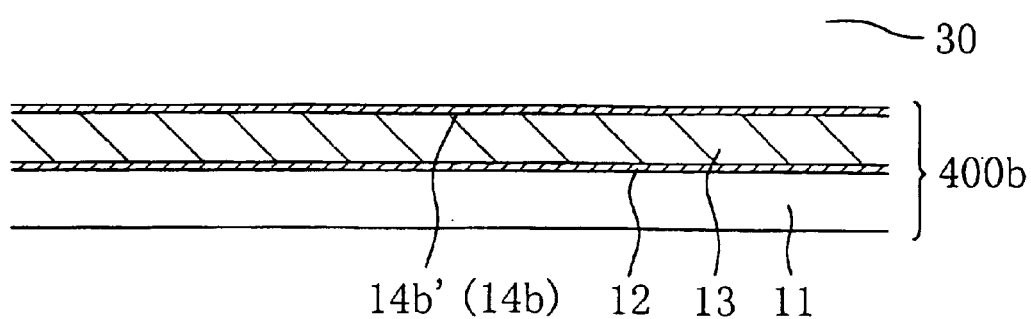

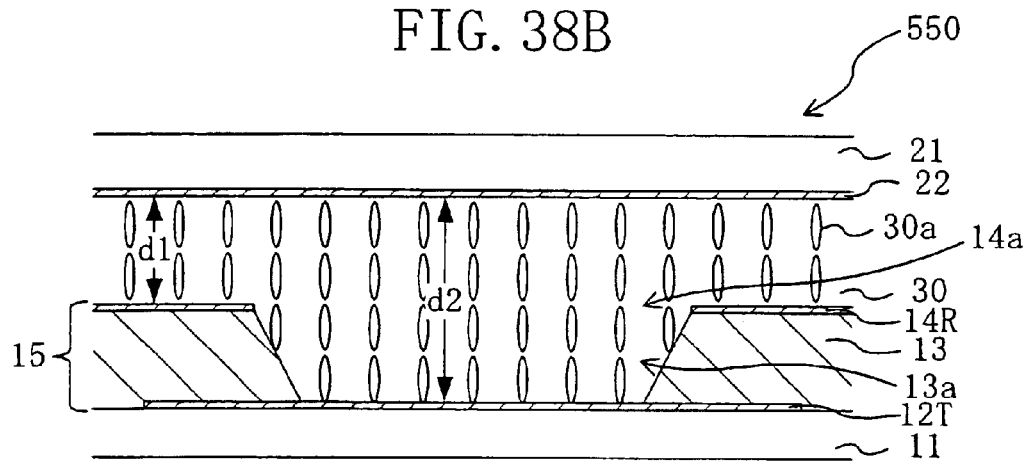
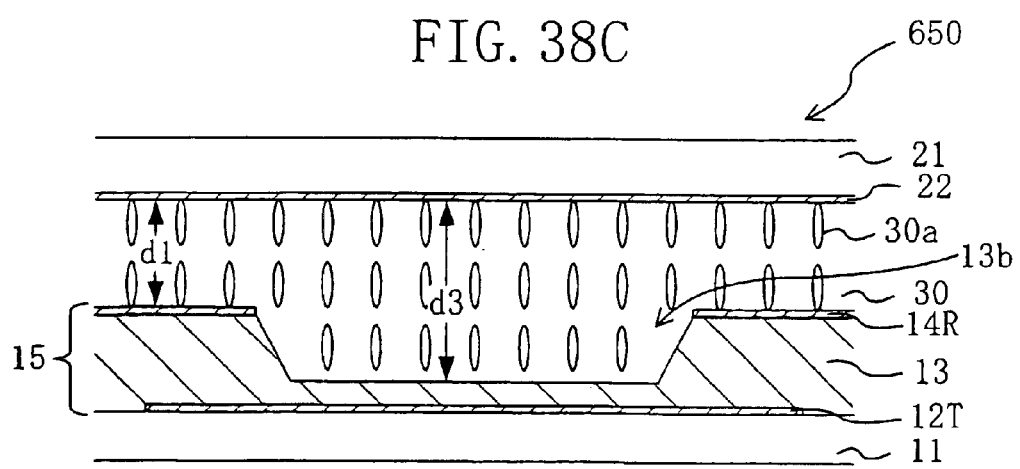

110 111 108 112  101           119

114   115 102
  113

107                117a 103              103a

104

110 111 108 112  101  109

110 111 108 115  101  109
114 112g 112

107           107a
110 111 108 115  101  109
114 112g 112

107        102
110 111 108 115  101  109
114 112g 112

107        102
110 111 108 115  101  103  109
114 112g 112

107        102
110 111 108 115  101  103  104  109
114 112g 112

LIQUID CRYSTAL DISPLAY DEVICE

BACKGROUND OF THE INVENTION

The present invention relates to a liquid crystal display device. More specifically, the present invention relates to a liquid crystal display device having a wide viewing angle characteristic and capable of performing a high quality display.

In recent years, liquid crystal display devices, which are thin and light in weight, are used for personal computers and PDA (personal digital assistance) devices. However, conventional twist nematic (TN) type and super twist nematic (STN) type liquid crystal display devices have a narrow viewing angle. Various technical developments have been undertaken to solve the problem.

A typical technique for improving the viewing angle characteristic of a TN or STN type liquid crystal display device is to add an optical compensation plate thereto. Another approach is to employ a transverse electric field mode in which a horizontal electric field with respect to the substrate plane is applied across the liquid crystal layer. Transverse electric field mode liquid crystal display devices have been attracting public attention and are mass-produced in recent years. Still another technique is to employ a DAP (deformation of vertical aligned phase) mode in which a nematic liquid crystal material having a negative dielectric anisotropy is used as a liquid crystal material and a vertical alignment film is used as an alignment film. This is a type of ECB (electrically controlled birefringence) mode, in which the transmittance is controlled by using the birefringence of liquid crystal molecules.

While the transverse electric field mode is an effective approach to improve the viewing angle, the production process thereof imposes a significantly lower production margin than that of a normal TN type device, whereby it is difficult to realize stable production of the device. This is because the display brightness or the contrast ratio is significantly influenced by variations in the gap between the substrates or a shift in the direction of the transmission axis (polarization axis) of a polarizing plate (polarizer) with respect to the orientation axis of the liquid crystal molecules. It requires further technical developments to be able to precisely control these factors and thus to realize stable production of the device.

In order to realize a uniform display without display non-uniformity with a DAP mode liquid crystal display device, an alignment control is necessary. An alignment control can be provided by, for example, subjecting the surface of an alignment film to an alignment treatment by rubbing. However, when a vertical alignment film is subjected to a rubbing treatment, rubbing streaks are likely to appear in the displayed image, and it is not suitable for mass-production.

Another approach proposed in the art for performing an alignment control without a rubbing treatment is to form a slit (opening) in an electrode so as to produce an inclined electric field and to control the orientation direction of the liquid crystal molecules by the inclined electric field (e.g., Japanese Laid-Open Patent Publication No. 6-301036). However, a study by the present inventors has shown that this approach has the following problems.

With a slit (opening) in an electrode for producing an inclined electric field, a sufficient voltage cannot be applied across the liquid crystal layer in regions corresponding to the slits in the electrode, whereby the orientation of the liquid crystal molecules of the liquid crystal layer in the regions corresponding to the slits cannot be sufficiently controlled, thereby resulting in loss of transmittance in the presence of an applied voltage.

SUMMARY OF THE INVENTION

In view of the above-mentioned conventional problems, the present invention has been devised for the purpose of realizing a liquid crystal display device having a high display quality and a method for producing the same.

A liquid crystal display device of the present invention includes: a first substrate, a second substrate, and a liquid crystal layer provided between the first substrate and the second substrate; and a plurality of picture element regions each defined by a first electrode provided on one side of the first substrate which is closer to the liquid crystal layer and a second electrode provided on the second substrate so as to oppose the first electrode via the liquid crystal layer, wherein: the liquid crystal layer in each of the plurality of picture element regions takes a vertical alignment in the absence of an applied voltage between the first electrode and the second electrode, and changes its orientation according to a voltage applied between the first electrode and the second electrode; the first electrode includes a lower conductive layer, a dielectric layer covering at least a portion of the lower conductive layer, and an upper conductive layer provided on one side of the dielectric layer which is closer to the liquid crystal layer; and the upper conductive layer includes at least one first opening, and the lower conductive layer is provided so as to oppose at least a portion of the at least one first opening via the dielectric layer. Thus, the above-described object is achieved. The upper conductive layer including the first opening functions to produce an inclined electric field at the edge portion of the first opening so as to orient the liquid crystal molecules into a radially-inclined orientation (or radially-inclined alignment). Since an electric field from the lower conductive layer is applied to a region opposing the first opening, the orientation of the liquid crystal molecules located above the first opening is stabilized.

Preferably, the lower conductive layer is provided in a region including a region opposing the at least one first opening via the dielectric layer. Thus, the electric field can effectively act upon the liquid crystal layer above the first opening.

The at least one first opening may have a square shape or a circular shape.

Preferably, the at least one first opening of the upper conductive layer includes a plurality of first openings. With a structure having a plurality of first opening, it is possible to achieve a stable radially-inclined orientation across the entire picture element region. Moreover, it is possible to suppress the decrease in the response speed.

Preferably, the plurality of first openings of the upper conductive layer are regularly arranged. Particularly, it is preferred that the plurality of first openings are arranged so as to have rotational symmetry.

The dielectric layer may include a depressed portion or an opening in the at least one first opening. With a structure where the dielectric layer includes a depressed portion or an opening, it is possible to suppress the voltage drop due to the dielectric layer. Moreover, it is possible to adjust the thickness of the liquid crystal layer.

The lower conductive layer may include a second opening in a region opposing the first opening. The second opening functions to stabilize the center of the radially-inclined orientation of the liquid crystal layer in the first opening.

One of the upper conductive layer and the lower conductive layer may be a transparent conductive layer, with the other one of the upper conductive layer and the lower conductive layer being a reflective conductive layer. Particularly, with a structure where the upper conductive layer is a reflective electrode and the lower conductive layer is a transparent electrode, it is possible to optimize each of the display characteristics in the transmission mode and the display characteristics in the reflection mode.

Preferably, the at least one first opening of the upper conductive layer includes a plurality of first opening; and a plurality of liquid crystal domains are formed in response to a voltage applied between the first electrode and the second electrode, each of the plurality of liquid crystal domains being formed in the liquid crystal layer corresponding to respective one of the first openings provided in the first electrode, and having a radially-inclined orientation.

The second substrate may further include an orientation-regulating structure in a region corresponding to at least one of the plurality of liquid crystal domains, the orientation-regulating structure exerting an orientation-regulating force for orienting liquid crystal molecules in the at least one liquid crystal domain into a radially-inclined orientation at least in the presence of an applied voltage.

Preferably, the orientation-regulating structure is provided in a region corresponding to a region in the vicinity of a center of the at least one liquid crystal domain.

Preferably, in the at least one liquid crystal domain, a direction of orientation regulation by the orientation-regulating structure coincides with a direction of the radially-inclined orientation.

The orientation-regulating structure may exert an orientation-regulating force for orienting the liquid crystal molecules into a radially-inclined orientation even in the absence of an applied voltage.

The orientation-regulating structure may be a protrusion protruding from the second substrate into the liquid crystal layer.

The orientation-regulating structure may include a surface having a horizontal alignment power provided on one side of the second substrate which is closer to the liquid crystal layer.

The orientation-regulating structure may exert an orientation-regulating force for orienting the liquid crystal molecules into a radially-inclined orientation only in the presence of an applied voltage.

The orientation-regulating structure may include an opening provided in the second electrode.

The liquid crystal display device may further include a pair of polarizing plates provided so as to oppose each other via the liquid crystal layer, wherein the pair of polarizing plates are arranged in a crossed-Nicols state.

Preferably, the liquid crystal display device further includes a pair of quarter-wave plates provided so as to oppose each other via the liquid crystal layer, wherein each of the pair of quarter-wave plates is provided between the liquid crystal layer and a respective one of the pair of polarizing plates.

More preferably, the liquid crystal display device further includes a pair of half-wave plates provided so as to oppose each other via the liquid crystal layer, wherein each of the pair of half-wave plates is provided between a respective one of the pair of polarizing plates and are a respective one of the pair of quarter-wave plates.

Preferably, slow axes of the pair of quarter-wave plates are arranged so as to be perpendicular to each other.

Preferably, slow axes of the pair of half-wave plates are arranged so as to be perpendicular to each other.

Preferably, the liquid crystal layer in each of the plurality of picture element regions takes a spiral orientation in response to a voltage applied between the first electrode and the second electrode.

More preferably, the liquid crystal layer in each of the plurality of picture element regions includes a minute region which takes a twist orientation along the liquid crystal layer in response to the voltage applied between the first electrode and the second electrode.

The first substrate may further include an active element for each of the plurality of picture element regions; and the first electrode may be a picture element electrode which is provided for each of the plurality of picture element regions and is switched by the active element, and the second electrode may be at least one counter electrode opposing the plurality of picture element regions. Typically, the counter electrode is a single electrode.

Another liquid crystal display device of the present invention includes: a first substrate, a second substrate, and a liquid crystal layer provided between the first substrate and the second substrate; and a plurality of picture element regions each defined by a first electrode provided on one side of the first substrate which is closer to the liquid crystal layer and a second electrode provided on the second substrate so as to oppose the first electrode via the liquid crystal layer, wherein: the first electrode includes a lower conductive layer, a dielectric layer covering at least a portion of the lower conductive layer, and an upper conductive layer provided on one side of the dielectric layer which is closer to the liquid crystal layer; and in each of the plurality of picture element regions, the upper conductive layer includes a plurality of openings and a solid portion, the liquid crystal layer taking a vertical alignment in the absence of an applied voltage between the first electrode and the second electrode, a plurality of liquid crystal domains being formed in the plurality of openings or in the solid portion by inclined electric fields produced at respective edge portions of the plurality of openings of the upper conductive layer in response to a voltage applied between the first electrode and the second electrode, each of the plurality of liquid crystal domains taking a radially-inclined orientation, and an orientation of each of the plurality of liquid crystal domains changing according to the applied voltage, thereby producing a display.

Preferably, at least some of the plurality of openings have substantially the same shape and substantially the same size, and format least one unit lattice arranged so as to have rotational symmetry.

Preferably, a shape of each of the at least some of the plurality of openings has rotational symmetry.

Each of the at least some of the plurality of openings may have a generally circular shape.

The solid portion may include a plurality of unit solid portions each of which is substantially surrounded by the at least one opening, and each of the plurality of unit solid portions may have a generally circular shape.

Preferably, in each of the plurality of picture element regions, a total area of the plurality of openings of the first electrode is smaller than an area of the solid portion of the first electrode.

The liquid crystal display device may further include a protrusion within each of the plurality of openings, the protrusion having the same cross-sectional shape in a plane of the first substrate as that of the plurality of openings, a side surface of the protrusion having an orientation-regulating force of the same direction with respect to liquid crystal molecules of the liquid crystal layer as a direction of orientation regulation by the inclined electric field.

The first substrate may further include an active element provided for each of the plurality of picture element regions; and the first electrode may be a picture element electrode which is provided for each of the plurality of picture element regions and is switched by the active element, and the second electrode may be at least one counter electrode opposing the plurality of picture element regions. Typically, the counter electrode is a single electrode.

Another liquid crystal display device of the present invention includes: a first substrate, a second substrate, and a liquid crystal layer provided between the first substrate and the second substrate; and a plurality of picture element regions each defined by a first electrode provided on one side of the first substrate which is closer to the liquid crystal layer and a second electrode provided on the second substrate so as to oppose the first electrode via the liquid crystal layer, wherein: in each of the plurality of picture element regions, the liquid crystal layer takes a vertical alignment in the absence of an applied voltage between the first electrode and the second electrode, and changes its orientation according to a voltage applied between the first electrode and the second electrode; the first electrode includes a lower conductive layer, a first dielectric layer including a first opening, a second dielectric layer provided on the lower conductive layer and the first dielectric layer, and an upper conductive layer provided on one side of the second dielectric layer which is closer to the liquid crystal layer; and the upper conductive layer includes at least one conductive layer opening, the lower conductive layer being provided so as to oppose at least a portion of the at least one conductive layer opening via the second dielectric layer, the first opening being provided so as to correspond to the conductive layer opening, and a height of a surface of the second dielectric layer being smaller in the conductive layer opening than in a region where the upper conductive layer is provided.

The first dielectric layer may be provided on the lower conductive layer, and the first opening may be formed so as to expose a portion of the lower conductive layer.

The first dielectric layer may be provided under the lower conductive layer, and the lower conductive layer may be provided so as to cover the first opening.

The first substrate may further include a third dielectric layer under the lower conductive layer, and the third dielectric layer may include a second opening in a region corresponding to the conductive layer opening.

The first substrate may further include a thin film transistor, and the third dielectric layer may also function as a gate insulating film of the thin film transistor.

A method of the present invention is a method for producing a liquid crystal display device, the liquid crystal display device including a first substrate, a second substrate, a liquid crystal layer provided between the first substrate and the second substrate, and a plurality of picture element regions each defined by a first electrode provided on one side of the first substrate which is closer to the liquid crystal layer and a second electrode provided on the second substrate so as to oppose the first electrode via the liquid crystal layer, wherein: the first electrode includes a lower conductive layer, a first dielectric layer including a first opening, a second dielectric layer provided on the lower conductive layer and the first dielectric layer, and an upper conductive layer provided on one side of the second dielectric layer which is closer to the liquid crystal layer; and the upper conductive layer includes at least one conductive layer opening, the lower conductive layer being provided so as to oppose at least a portion of the at least one conductive layer opening via the second dielectric layer, the step of providing the first electrode including the steps of: providing a lower conductive layer on a substrate; providing a first dielectric layer including a first opening on the substrate; providing a second dielectric layer on the lower conductive layer and the first dielectric layer, wherein a height of the second dielectric layer is greater in a region corresponding to the first opening than in other regions; and providing an upper conductive layer including a conductive layer opening on the second dielectric layer in the region corresponding to the first opening.

The first dielectric layer may be provided on the lower conductive layer so that the lower conductive layer is exposed through the first opening.

The lower conductive layer may be provided on the first dielectric layer so as to cover at least the first opening of the first dielectric layer.

The method may further include, before the step of providing the lower conductive layer, the step of providing a third dielectric layer including a second opening on the substrate.

The method may further include the step of providing a thin film transistor on the substrate, wherein the third dielectric layer is provided so as to also function as a gate insulating film of the thin film transistor.

Another method of the present invention is a method for producing a liquid crystal display device, the liquid crystal display device including a first substrate, a second substrate, a liquid crystal layer provided between the first substrate and the second substrate, and a plurality of picture element regions each defined by a first electrode provided on one side of the first substrate which is closer to the liquid crystal layer and a second electrode provided on the second substrate so as to oppose the first electrode via the liquid crystal layer, wherein: the first electrode includes a lower conductive layer, a dielectric layer covering at least a portion of the lower conductive layer, and an upper conductive layer provided on one side of the dielectric layer which is closer to the liquid crystal layer; and the upper conductive layer includes at least one conductive layer opening, and the lower conductive layer is provided so as to oppose at least a portion of the at least one conductive layer opening via the dielectric layer, the step of providing the first electrode including the steps of: providing a lower conductive layer on a substrate; providing a dielectric film on the lower conductive layer; providing an upper conductive layer including a conductive layer opening on the dielectric film; and partially removing a dielectric film in the conductive layer opening using the upper conductive layer as a mask so as to provide a dielectric layer, wherein a height of a surface of the dielectric layer is smaller in a region corresponding to the conductive layer opening than in other regions.

BRIEF DESCRIPTION OF THE DRAWINGS

Each of FIG. 1A to FIG. 1C is a cross-sectional view schematically illustrating a picture element region of a liquid crystal display device 100 according to one embodiment of the present invention.

Each of FIG. 2A

Figure 3A:
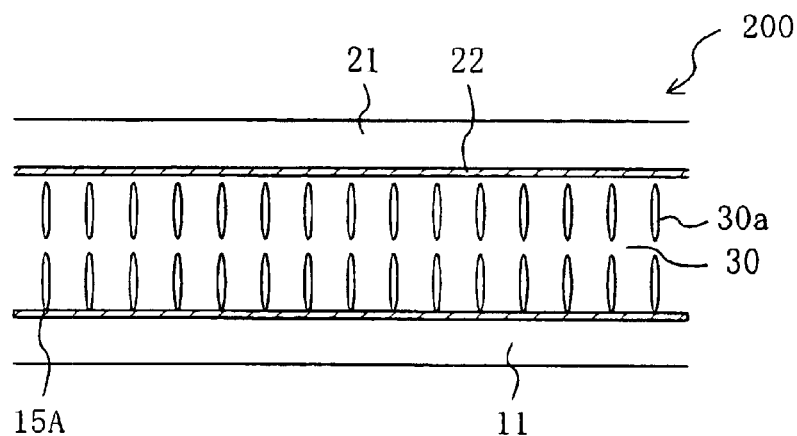
Figure 3B:
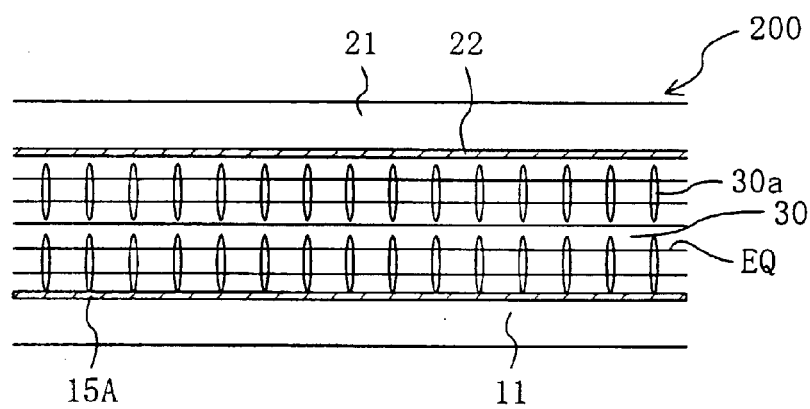
Figure 3C:
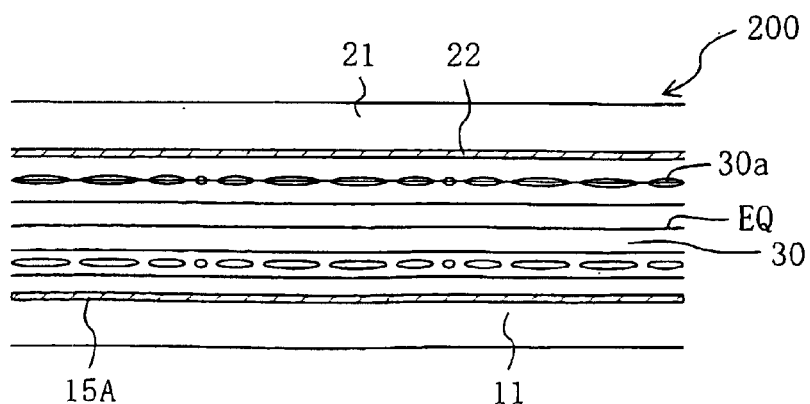

Each of FIG. 3A to FIG. 3C is a cross-sectional view schematically illustrating a picture element region of a conventional liquid crystal display device 200.

Figure 4A:
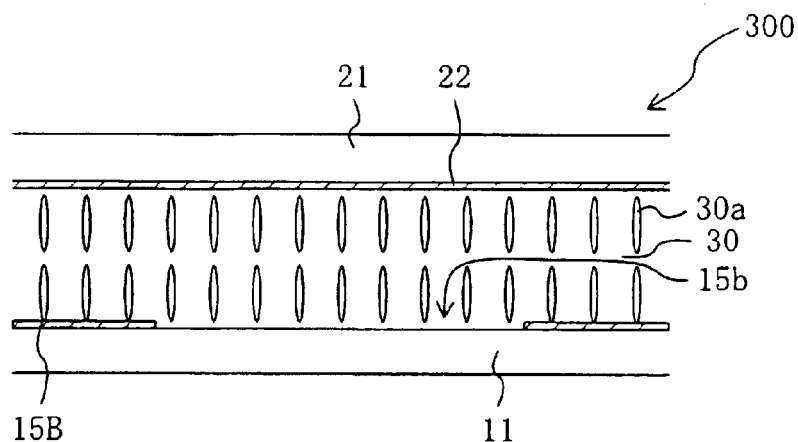
Figure 4B:
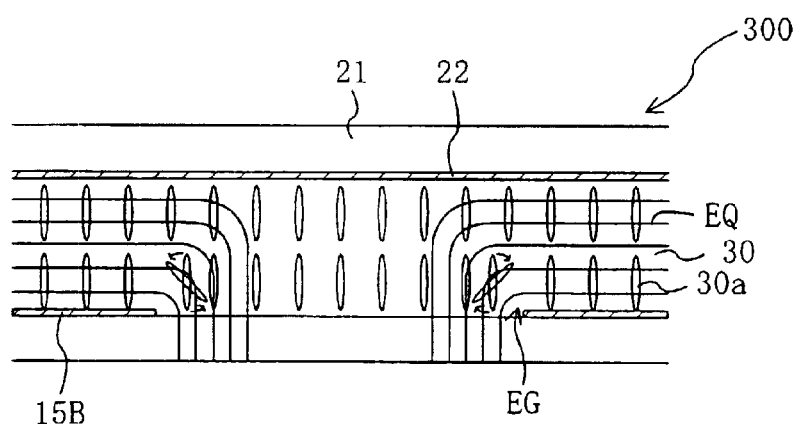
Figure 4C:
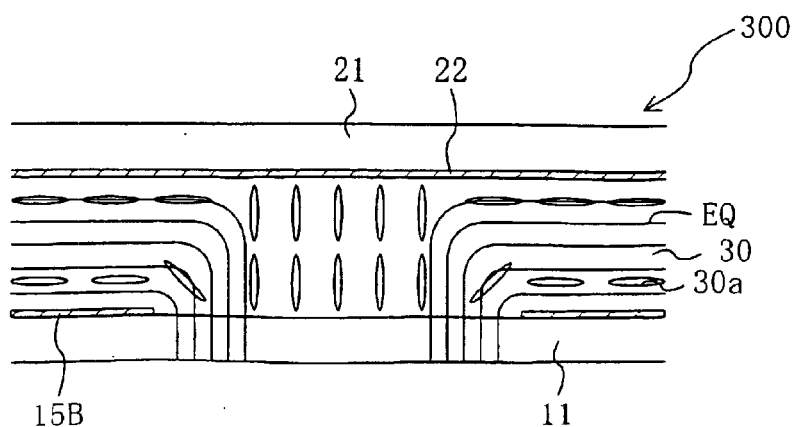

Each of FIG. 4A to FIG. 4C is a cross-sectional view schematically illustrating a picture element region of a liquid crystal display device 300 for comparison.

FIG. 5A to FIG. 5D schematically illustrate the relationship between an electric force line and an orientation of a liquid crystal molecule.

Figure 6A:
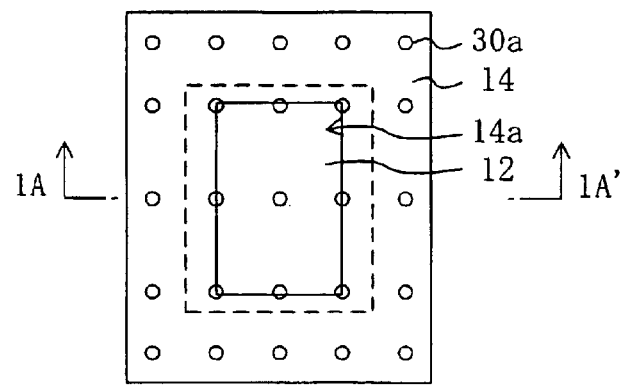
Figure 6B:
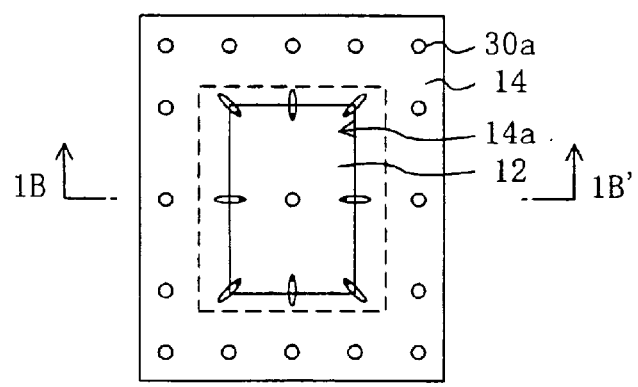
Figure 6C:
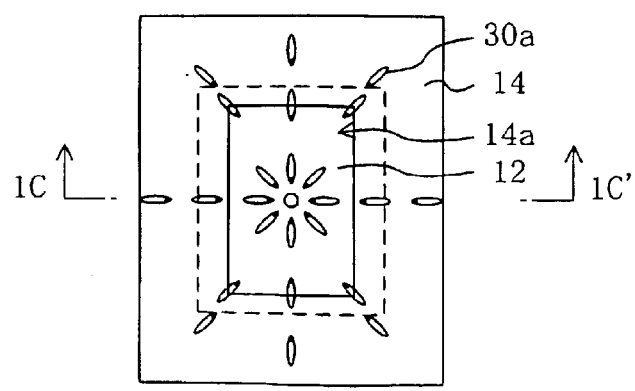

FIG. 6A to FIG. 6C schematically illustrate an orientation of liquid crystal molecules in a liquid crystal display device according to one embodiment of the present invention as viewed from the substrate normal direction.

Figure 7A:
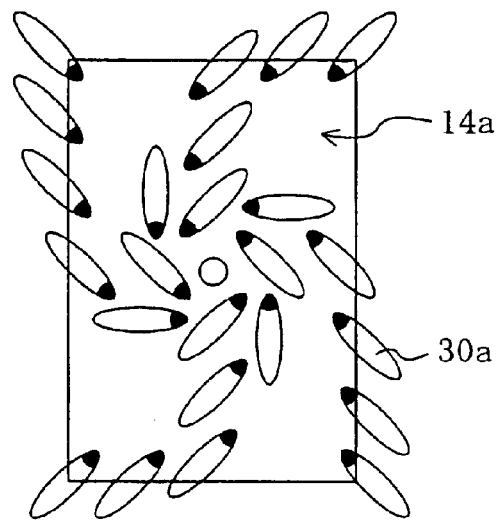
Figure 7B:
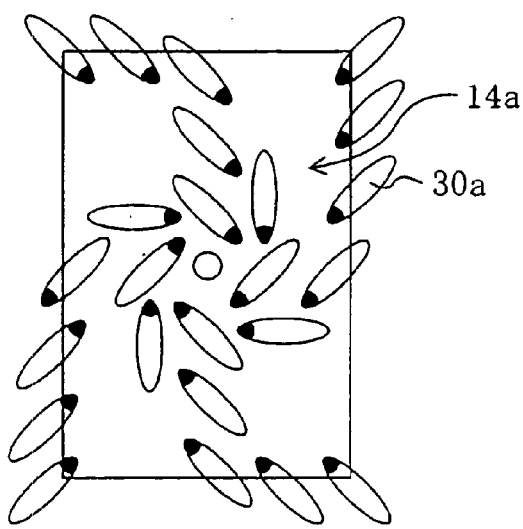

FIG. 7A and FIG. 7B schematically illustrate exemplary radially-inclined orientations of liquid crystal molecules having spiral patterns.

Figure 8A:
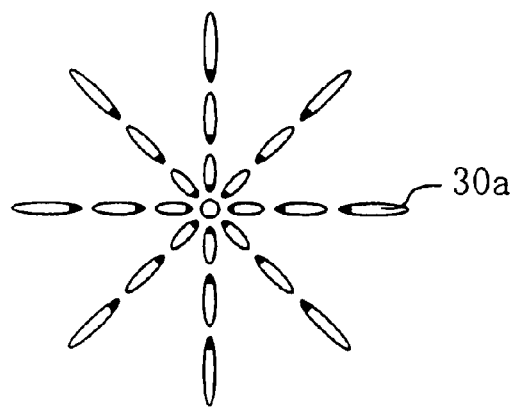
Figure 8B:
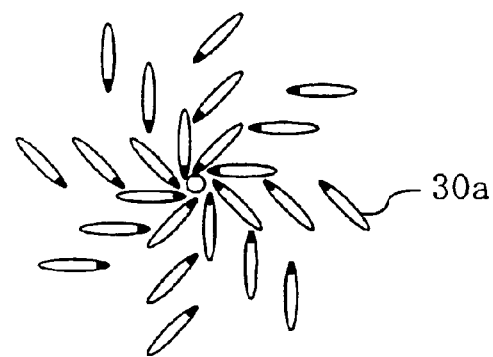
Figure 8C:
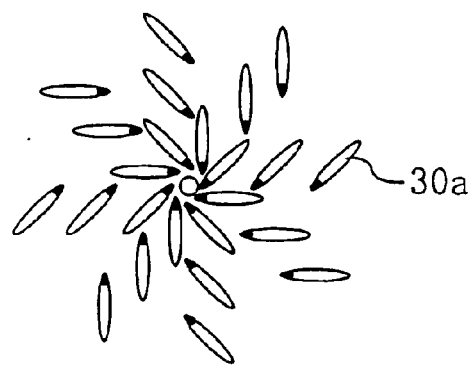

FIG. 8A to FIG. 8C schematically illustrate exemplary radially-inclined orientations of liquid crystal molecules.

Figure 9A:
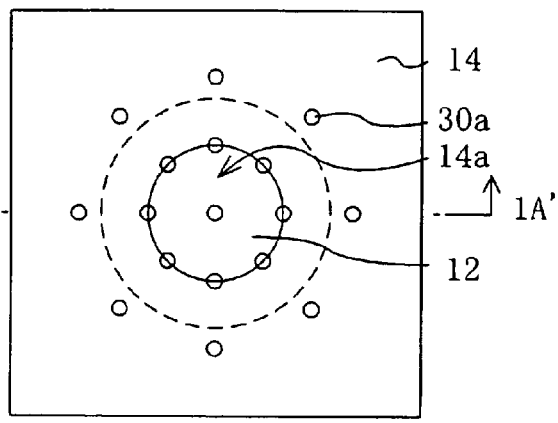
Figure 9B:
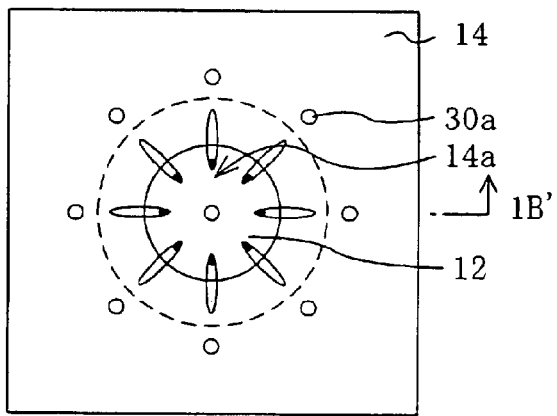
Figure 9C:
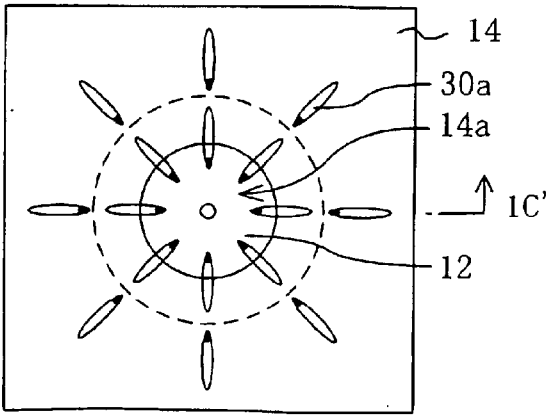

FIG. 9A to FIG. 9C schematically illustrate an orientation of liquid crystal molecules in a liquid crystal display device according to one embodiment of the present invention as viewed from the substrate normal direction.

Figure 10A:
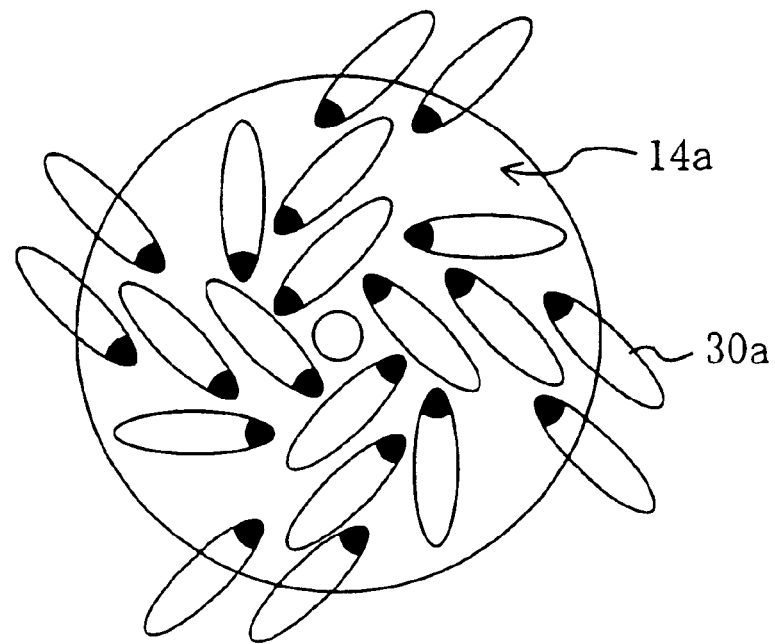
Figure 10B:
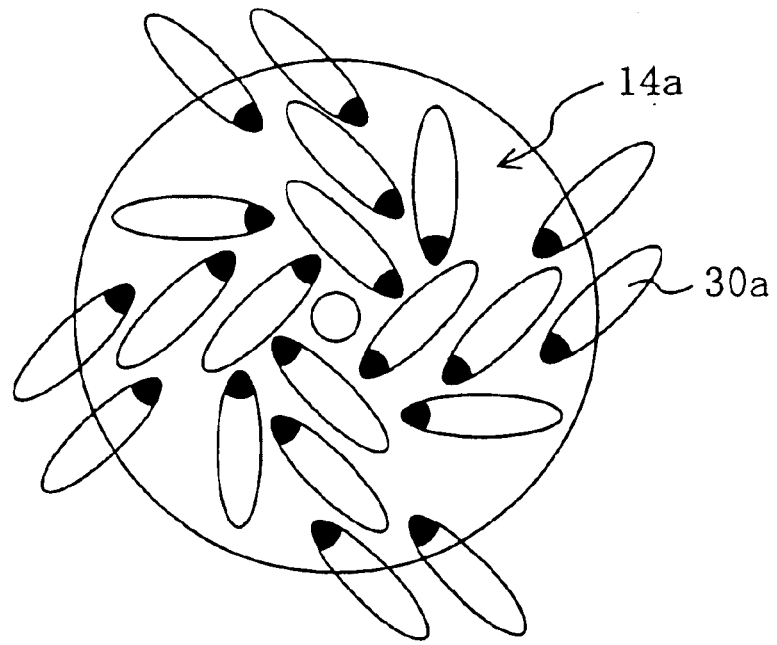

FIG. 10A and FIG. 10B schematically illustrate exemplary radially-inclined orientations of liquid crystal molecules.

Figure 11A:
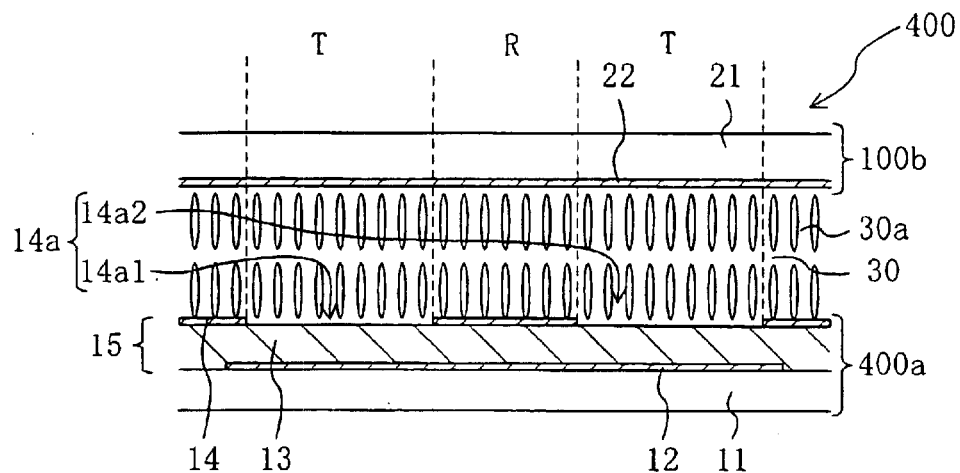
Figure 11B:
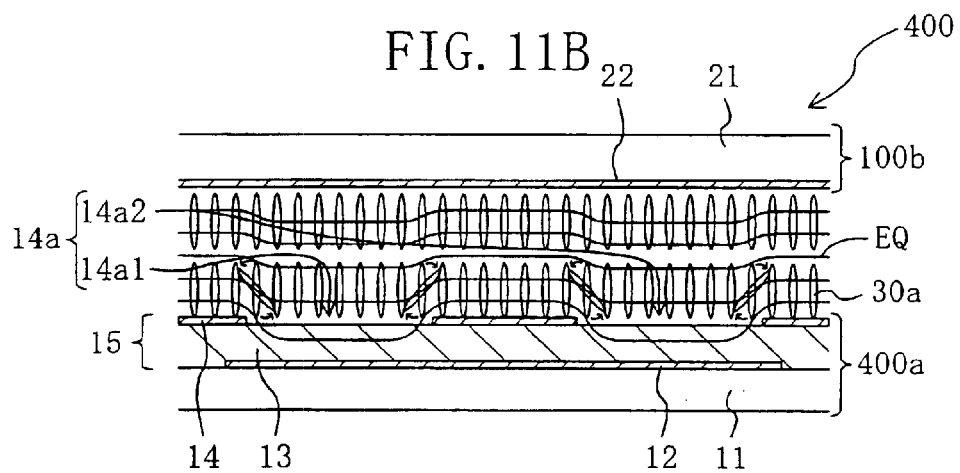
Figure 11C:
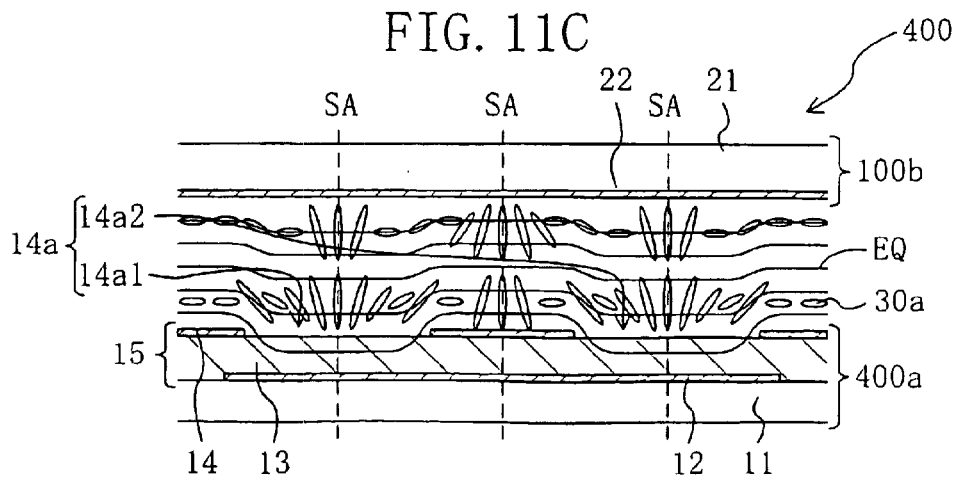

FIG. 11A to FIG. 11c are cross-sectional views illustrating a picture element region of a liquid crystal display device 400 according to one embodiment of the present invention.

Figure 12A:
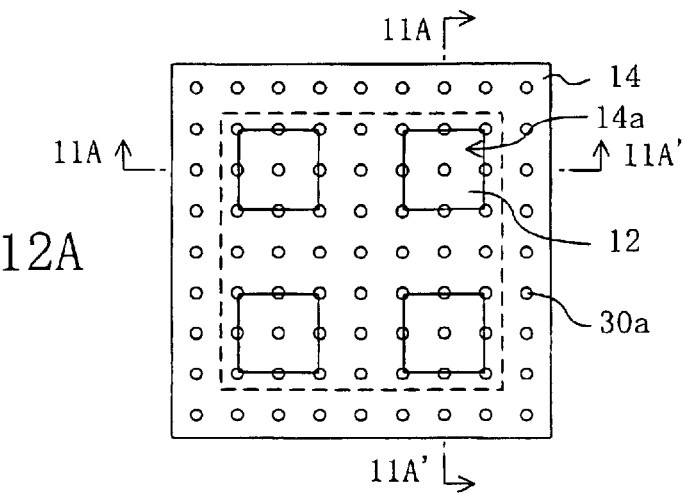
Figure 12B:
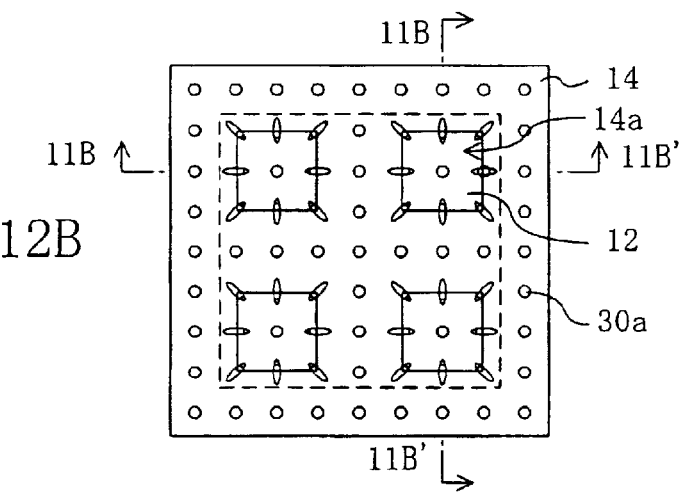
Figure 12C:
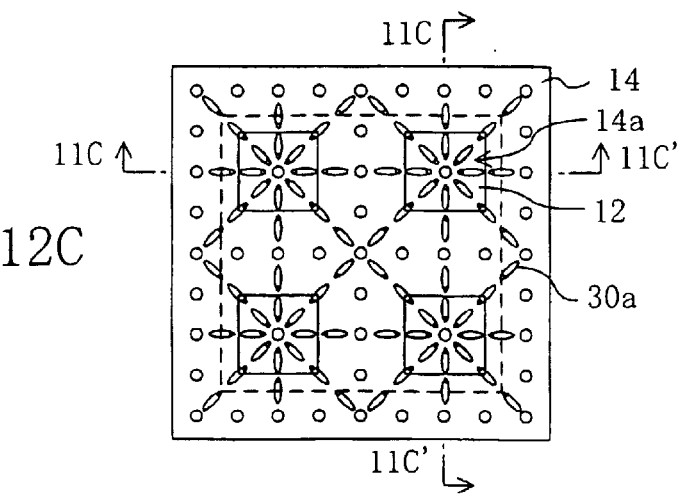

FIG. 12A to FIG. 12C schematically illustrate the relationship between an arrangement of a plurality of square openings and an orientation of liquid crystal molecules.

Figure 13A:
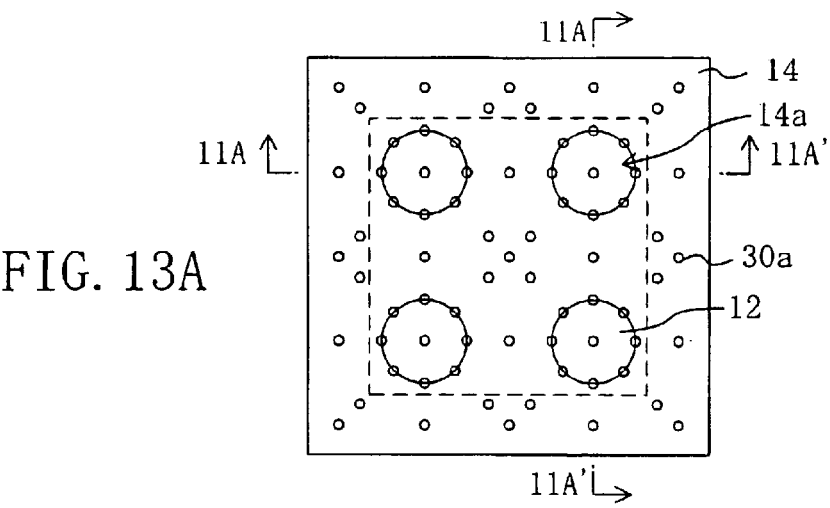
Figure 13B:
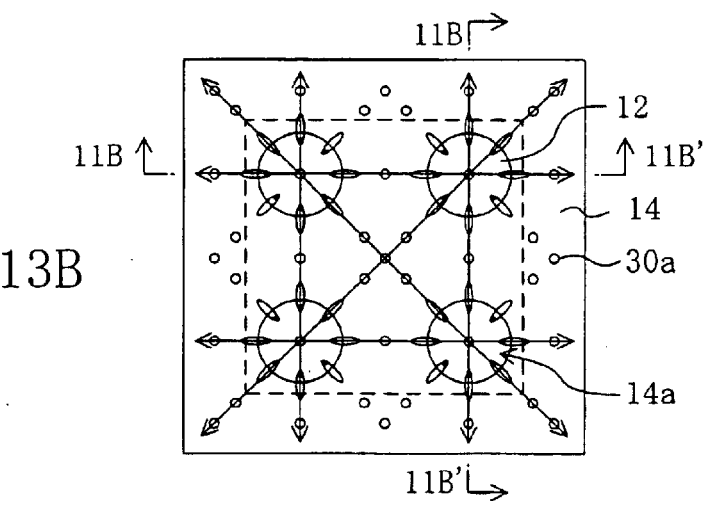
Figure 13C:
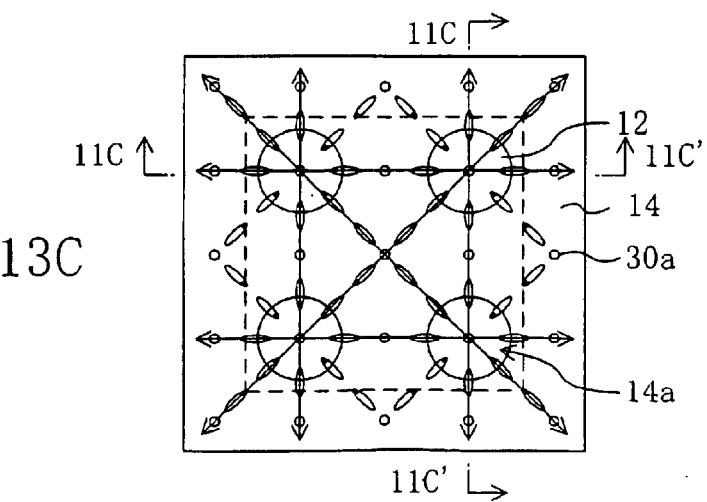

FIG. 13A to FIG. 13C schematically illustrate the relationship between an arrangement of a plurality of circular openings and an orientation of liquid crystal molecules.

Figure 14:
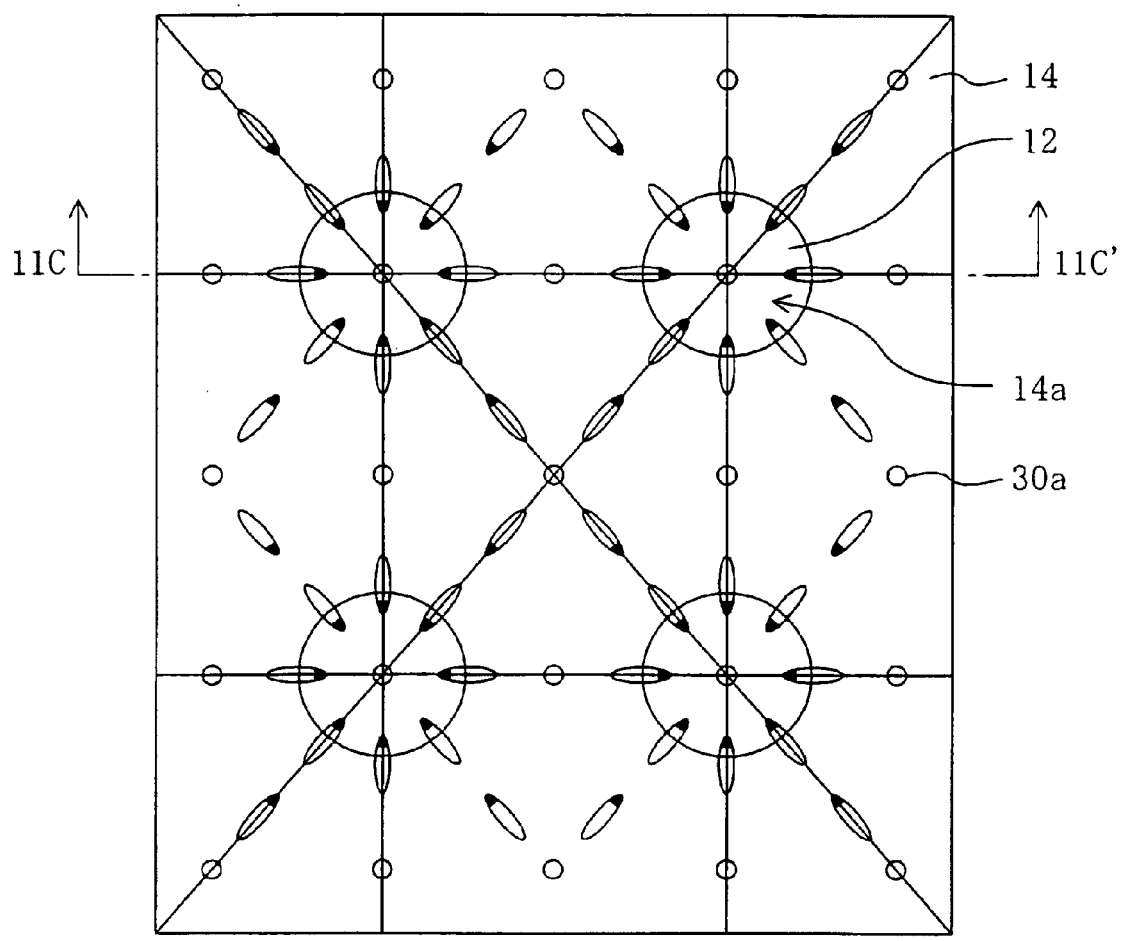

FIG. 14 schematically illustrates the relationship between another arrangement of a plurality of circular openings and an orientation of liquid crystal molecules.

Figure 15A:
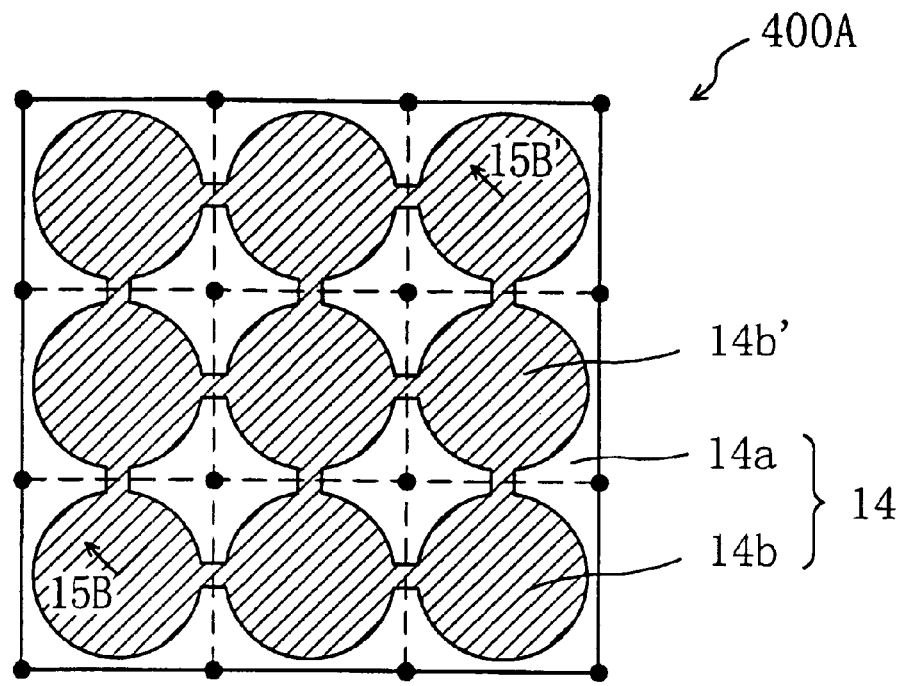
Figure 15B:
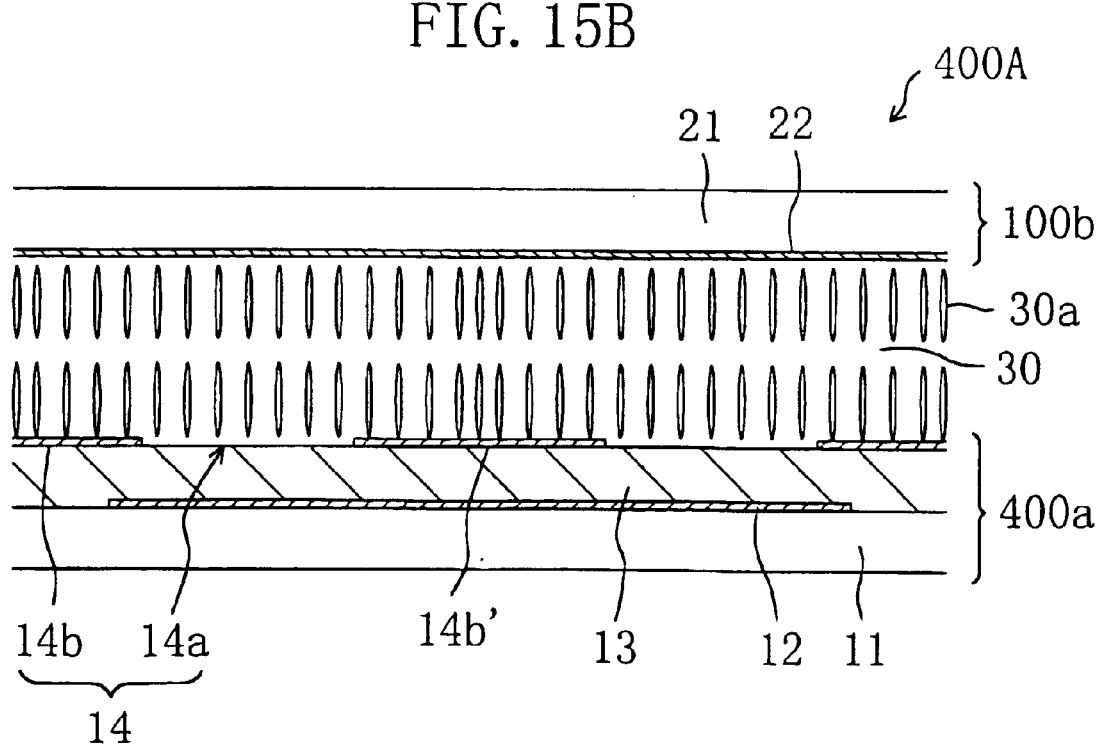

FIG. 15A and FIG. 15B schematically illustrate a picture element region of a liquid crystal display device 400A according to Embodiment 1 of the present invention, wherein FIG. 15A is a plan view, and FIG. 15B is a cross-sectional view taken along line 15B–15B' of FIG. 15A.

Figure 16A:
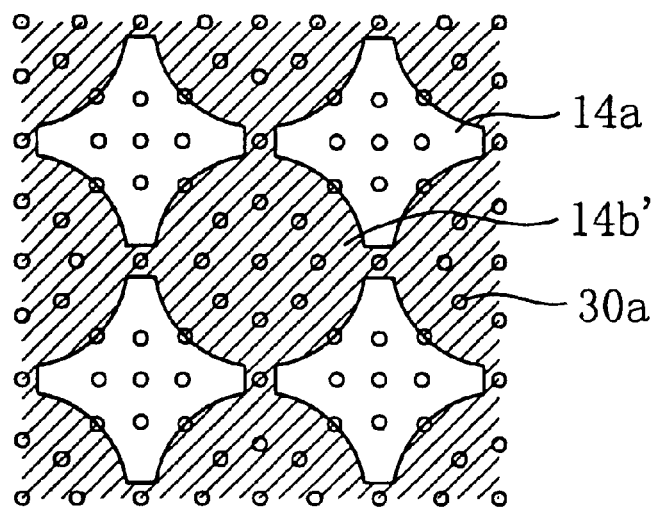
Figure 16B:
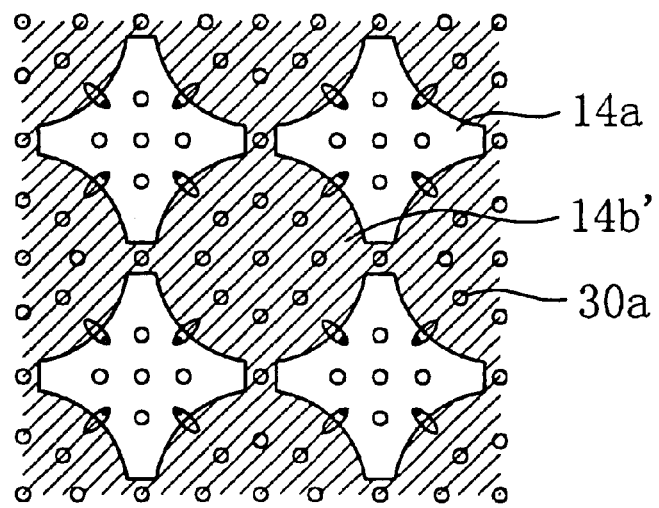
Figure 16C:
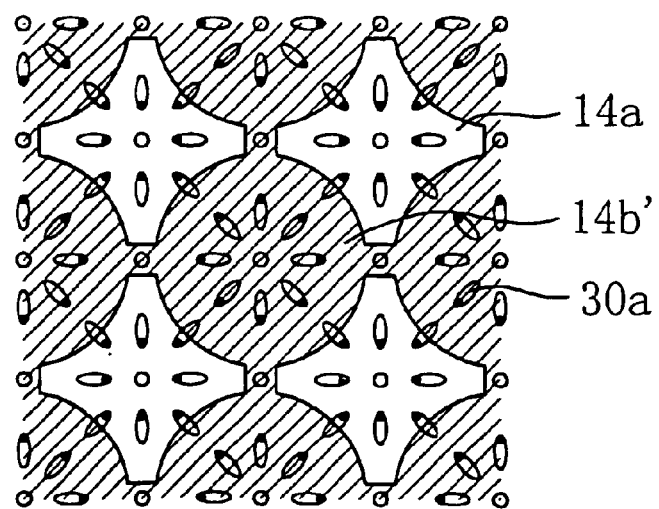

FIG. 16A to FIG. 16C schematically illustrate exemplary radially-inclined orientations of liquid crystal molecules.

Figure 17A:
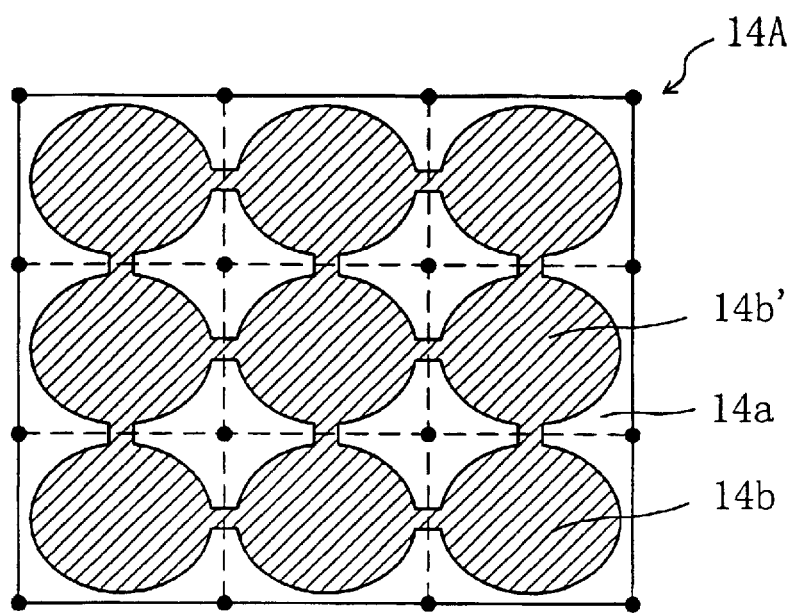
Figure 17B:
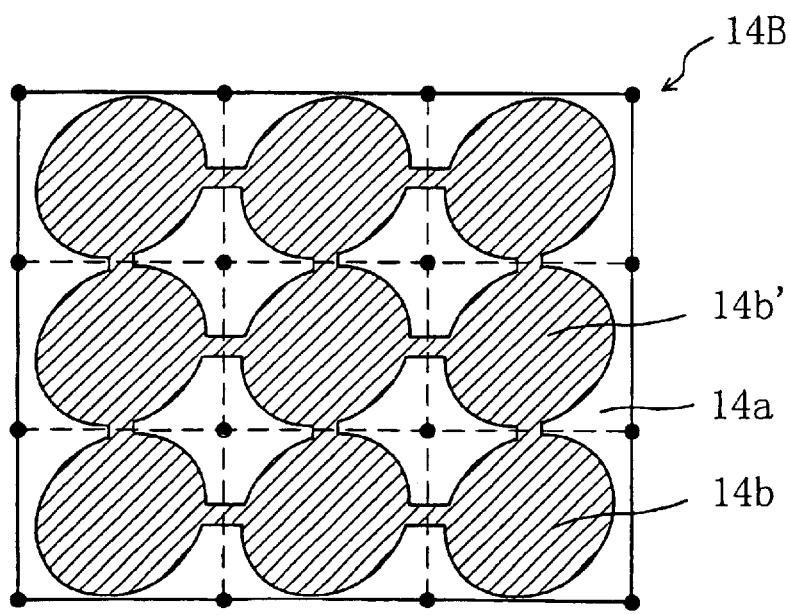

FIG. 17A and FIG. 17B are plan views schematically illustrating other picture element electrodes used in the liquid crystal display device according to Embodiment 1 of the present invention.

Figure 18A:
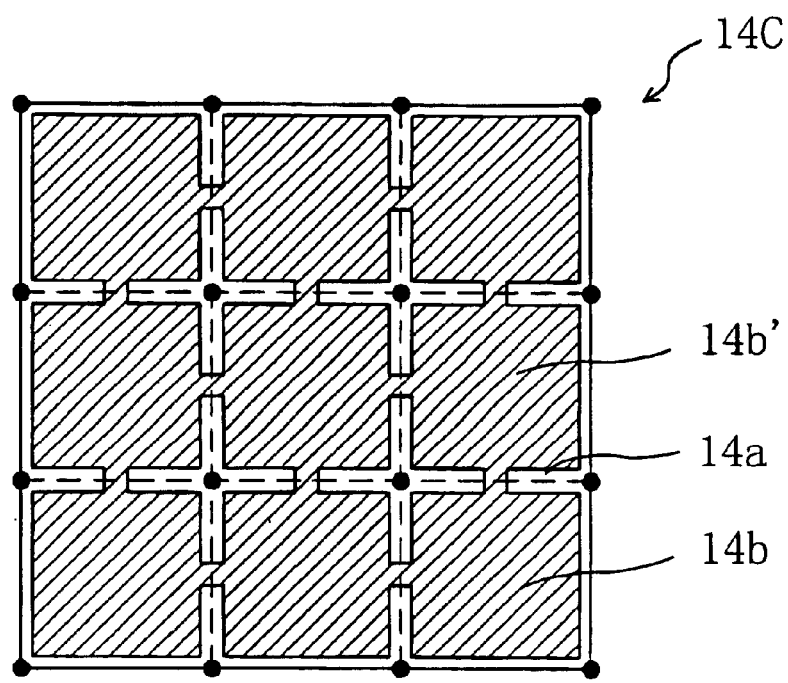
Figure 18B:
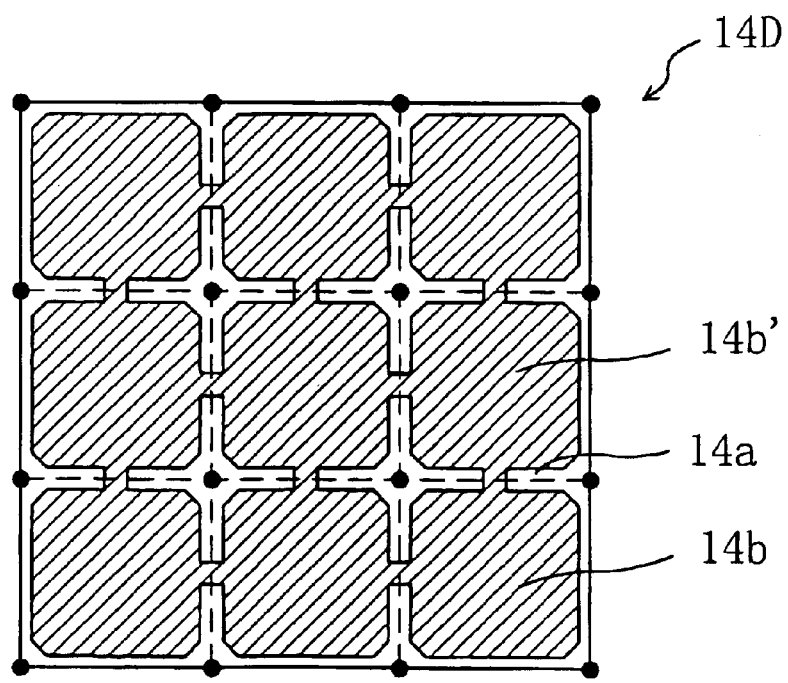

FIG. 18A and FIG. 18B are plan views schematically illustrating still other picture element electrodes used in the liquid crystal display device according to Embodiment 1 of the present invention.

Figure 19A:
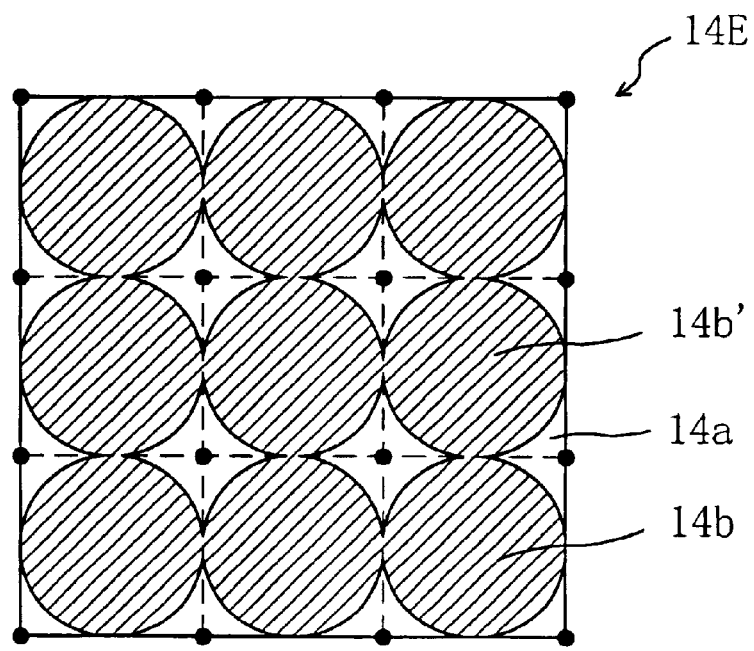
Figure 19B:
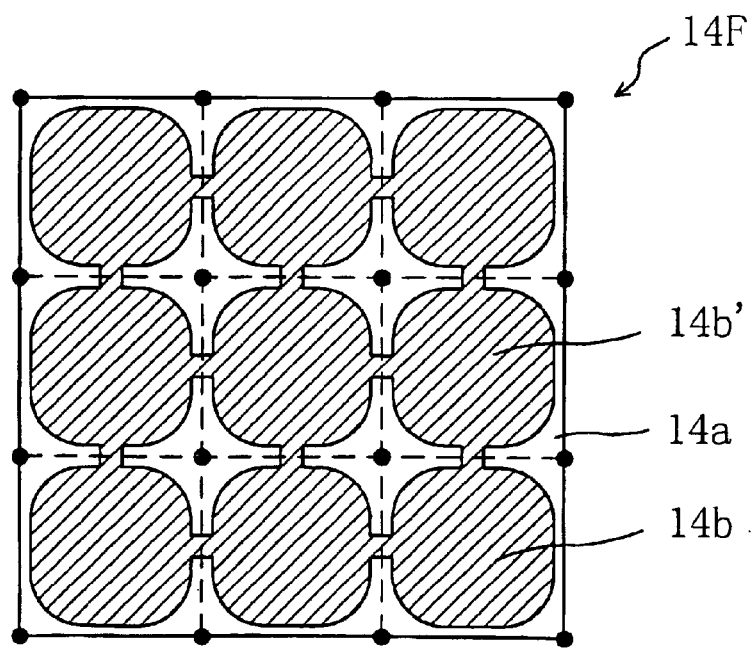

FIG. 19A and FIG. 19B are plan views schematically illustrating still other picture element electrodes used in the liquid crystal display device according to Embodiment 1 of the present invention.

Figure 20:
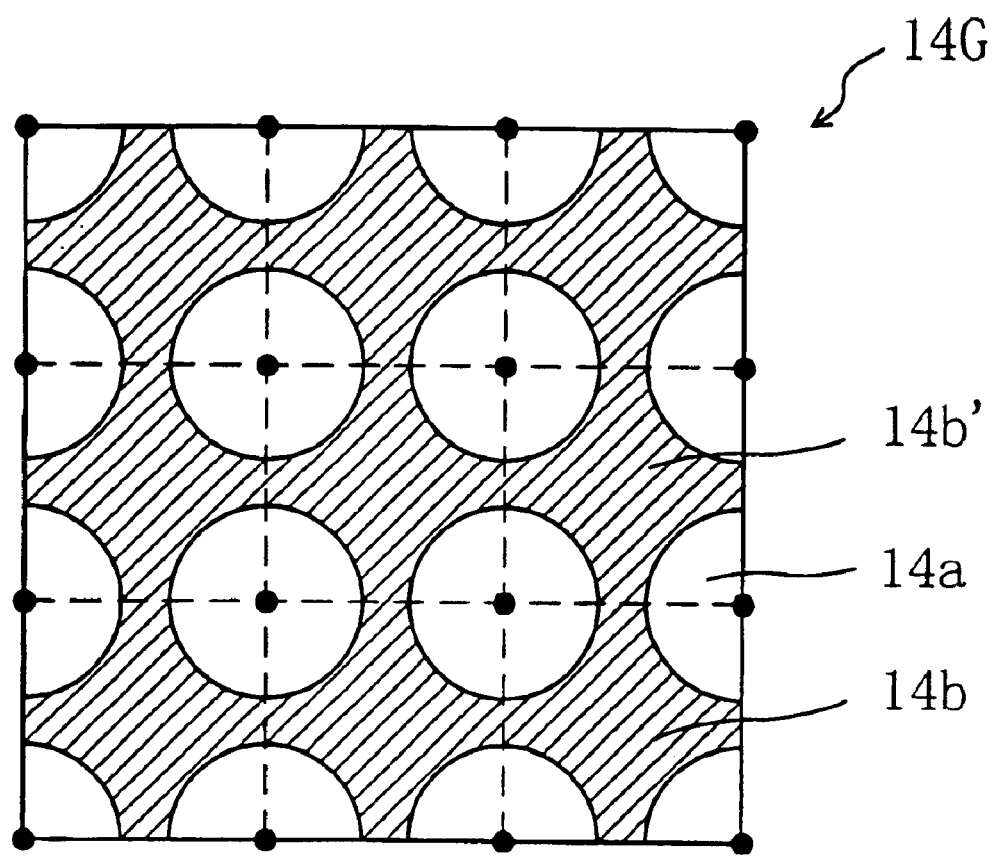

FIG. 20 is a plan view schematically illustrating still another alternative picture element electrode used in the liquid crystal display device according to Embodiment 1 of the present invention.

Figure 21A:
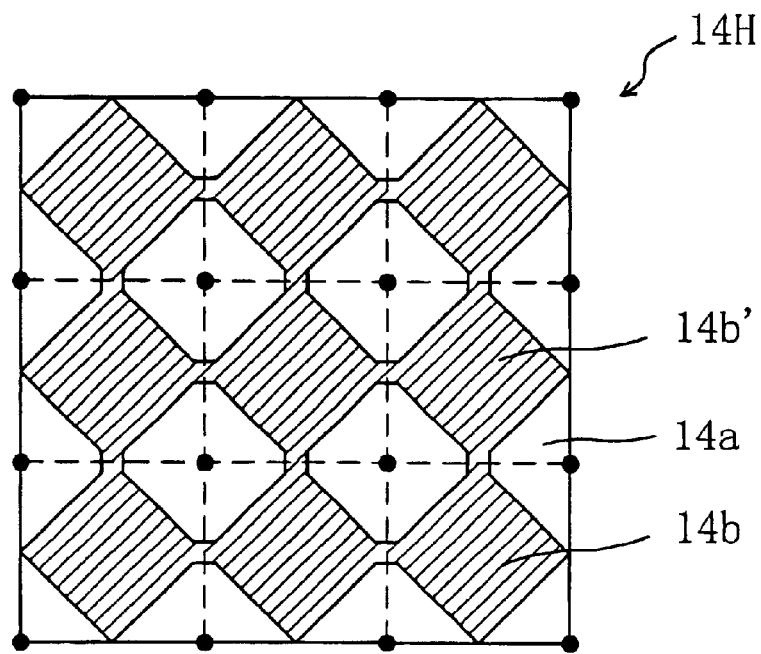
Figure 21B:
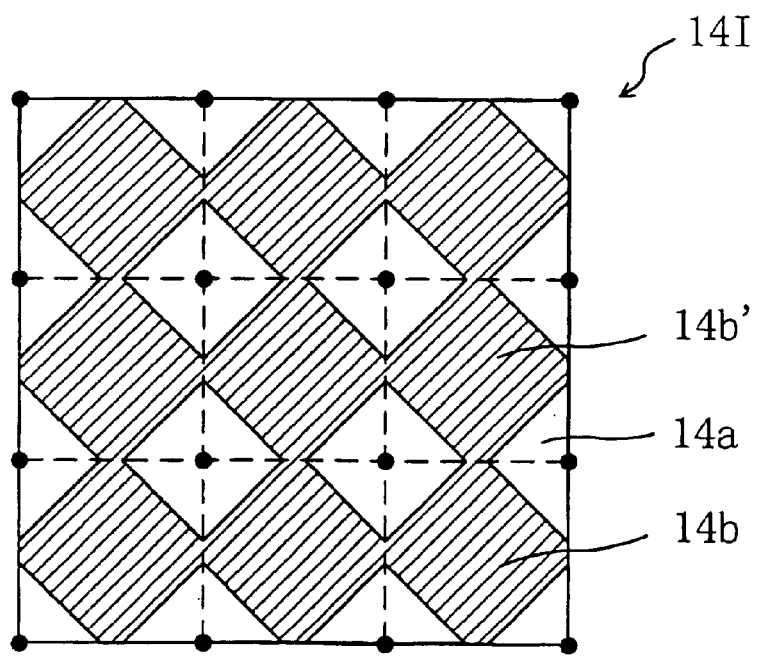

FIG. 21A and FIG. 21B are plan views schematically illustrating still another picture element electrode used in the liquid crystal display device according to Embodiment 1 of the present invention.

FIG. 22A schematically illustrates a unit lattice of the pattern illustrated in FIG. 15A, FIG. 22B schematically illustrates a unit lattice of the pattern illustrated in FIG. 20, and FIG. 22C is a graph illustrating the relationship between a pitch p and a solid portion area ratio.

Figure 23A:
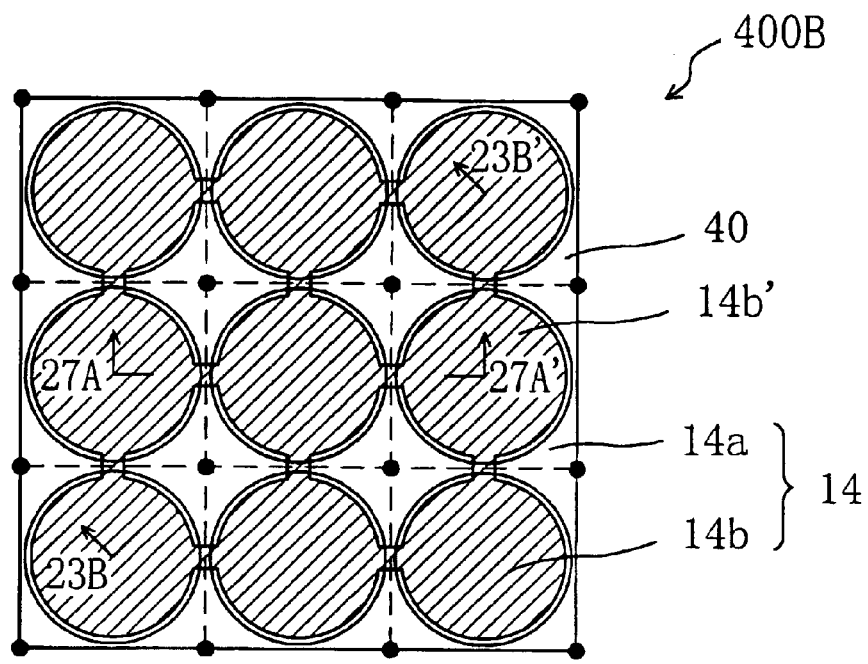
Figure 23B:
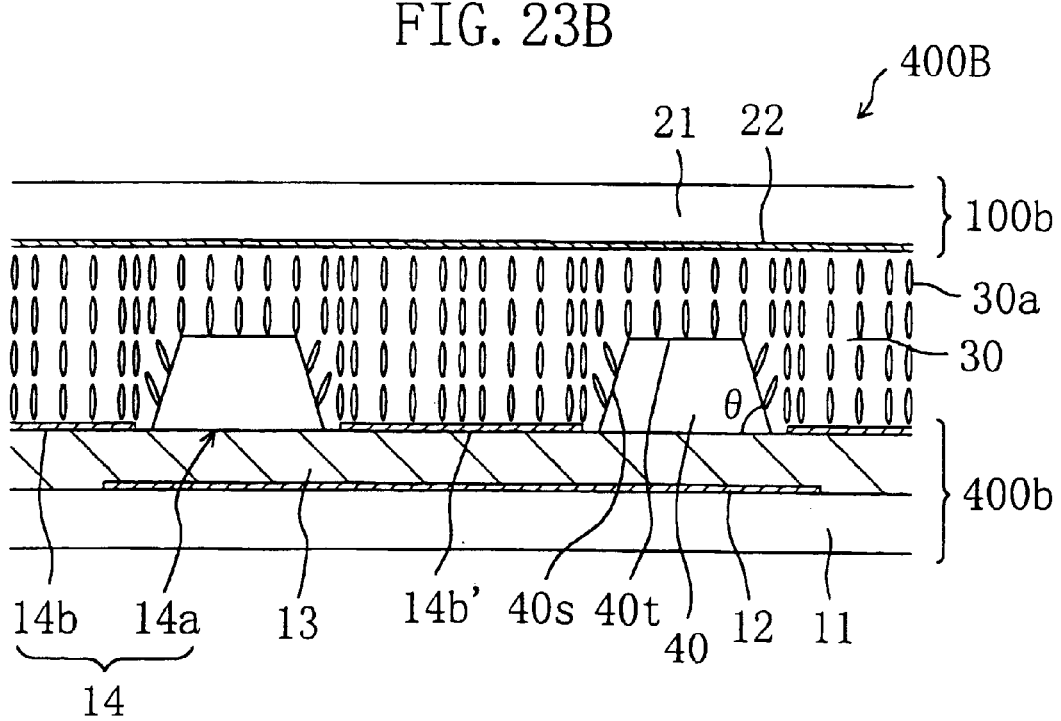

FIG. 23A and FIG. 23B schematically illustrate a picture element region of a liquid crystal display device 400B according to Embodiment 2 of the present invention, wherein FIG. 23A is a plan view, and FIG. 23B is a cross-sectional view taken along line 23B–23B' of FIG. 23A.

FIG. 24A to FIG. 24D schematically illustrate the relationship between an orientation of liquid crystal molecules 30a and a surface configuration having a vertical alignment power.

FIG. 25A and FIG. 25B illustrate a state in the presence of an applied voltage across a liquid crystal layer 30, wherein FIG. 25A schematically illustrates a state where an orientation has just started to change (initial ON state), and FIG. 25B schematically illustrates a steady state.

Figure 26A:
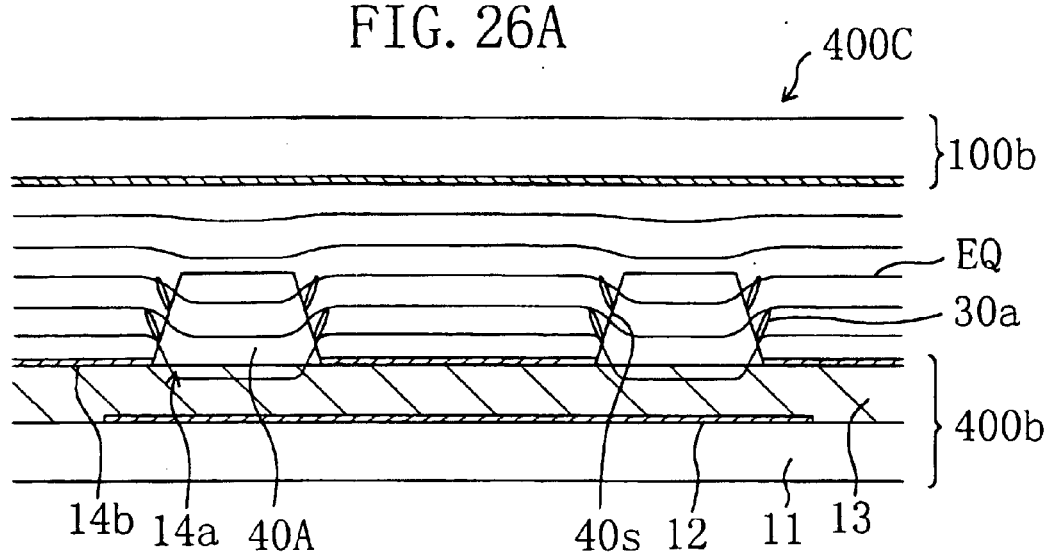
Figure 26B:
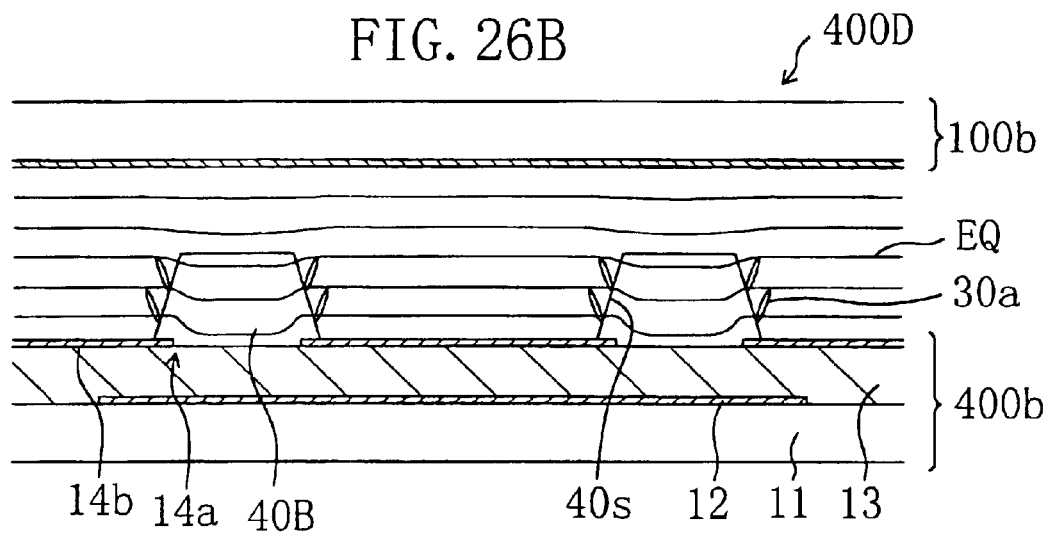
Figure 26C:
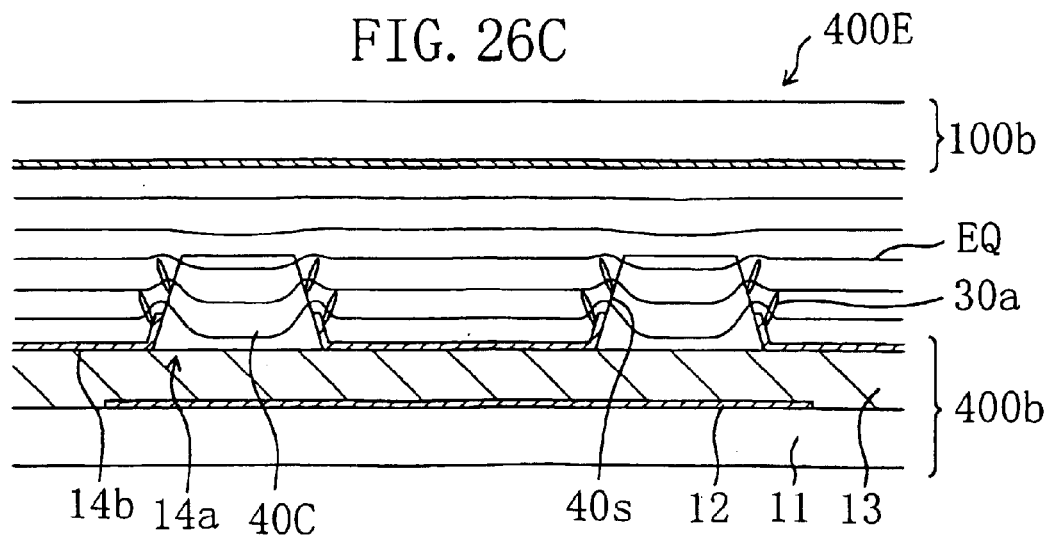

FIG. 26A to FIG. 26C are cross-sectional views schematically illustrating liquid crystal display devices 400C, 400D and 400E, respectively, of Embodiment 2 having different relationships between an opening and a protrusion.

Figure 27:
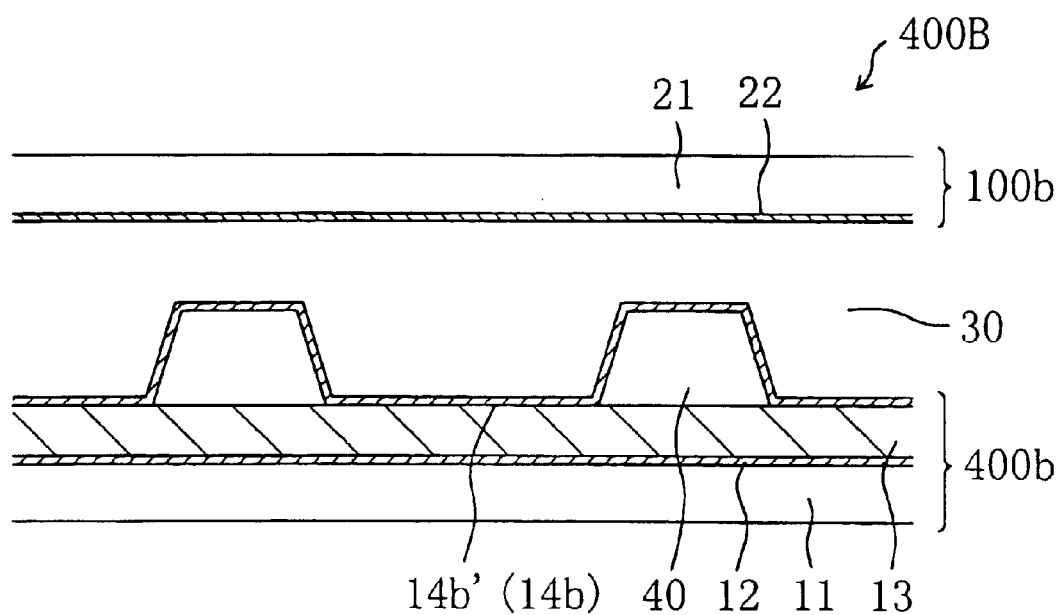

FIG. 27 is a cross-sectional view schematically illustrating the liquid crystal display device 400B taken along line 27A–27A' of FIG. 23A.

FIG. 28A and FIG. 28B schematically illustrate a picture element region of a liquid crystal display device 400F according to Embodiment 2 of the present invention, wherein FIG. 28A is a plan view, and FIG. 28B is a cross-sectional view taken along line 28A–28A' of FIG. 28A.

FIG. 29A to FIG. 29E each schematically illustrate a counter substrate 200b including a second orientation-regulating structure 28.

Figure 30A:
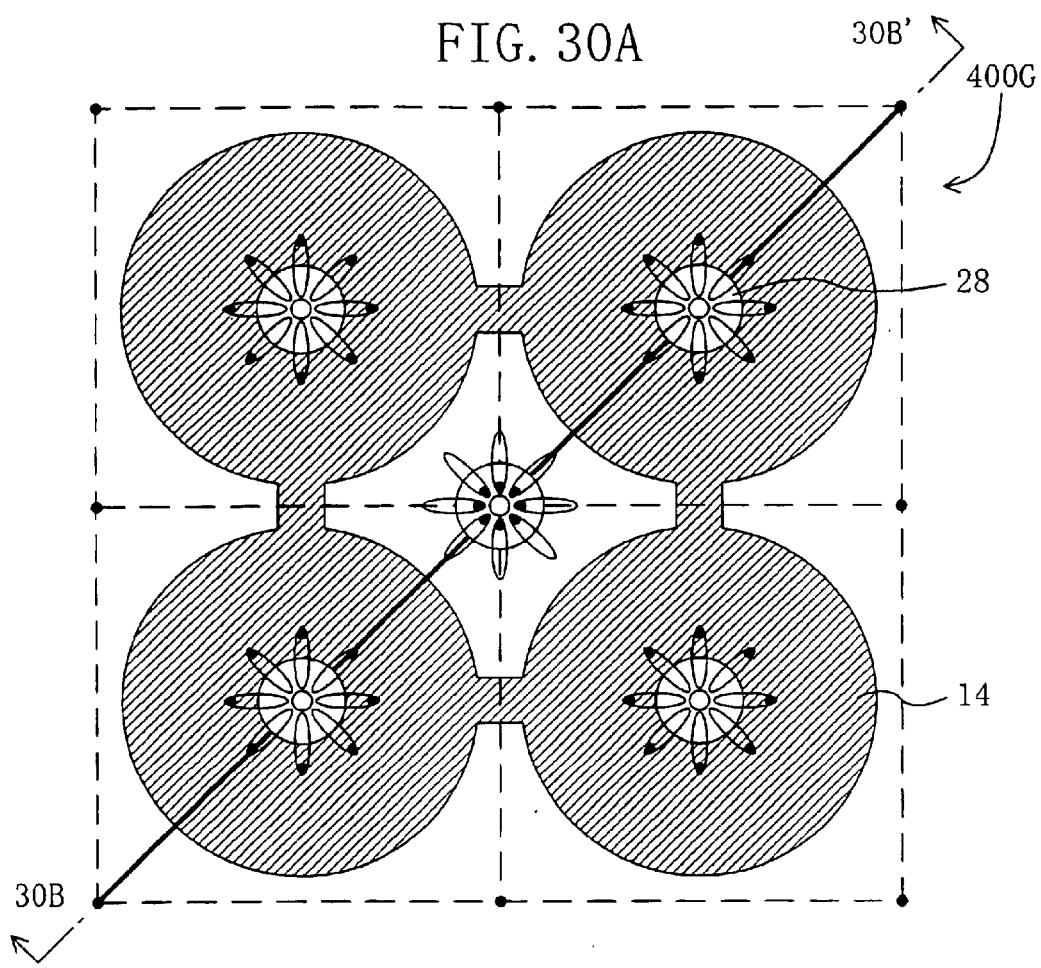
Figure 30B:
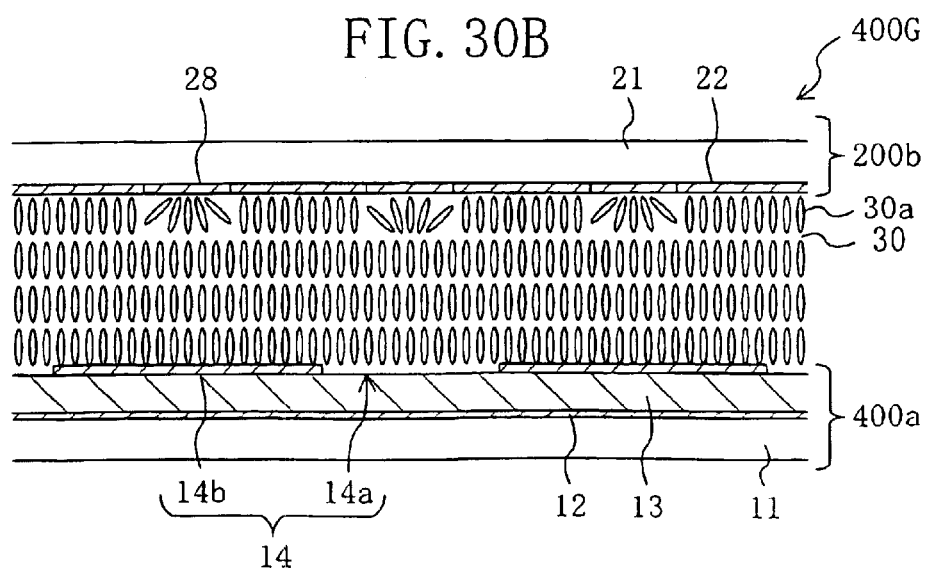

FIG. 30A and FIG. 30B schematically illustrate a liquid crystal display device 400G including a first orientation-regulating structure and a second orientation-regulating structure, wherein FIG. 30A is a plan view, and FIG. 30B is a cross-sectional view taken along line 30B–30B' of FIG. 30A.

Figure 31A:
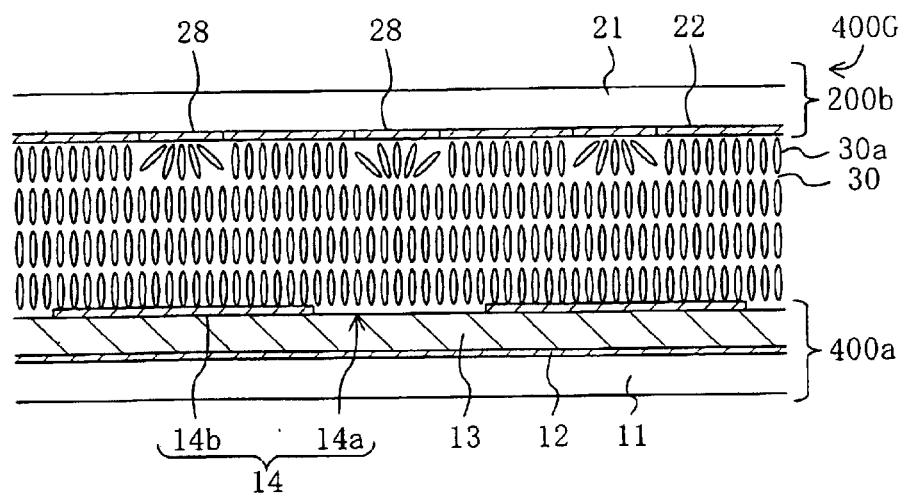
Figure 31B:
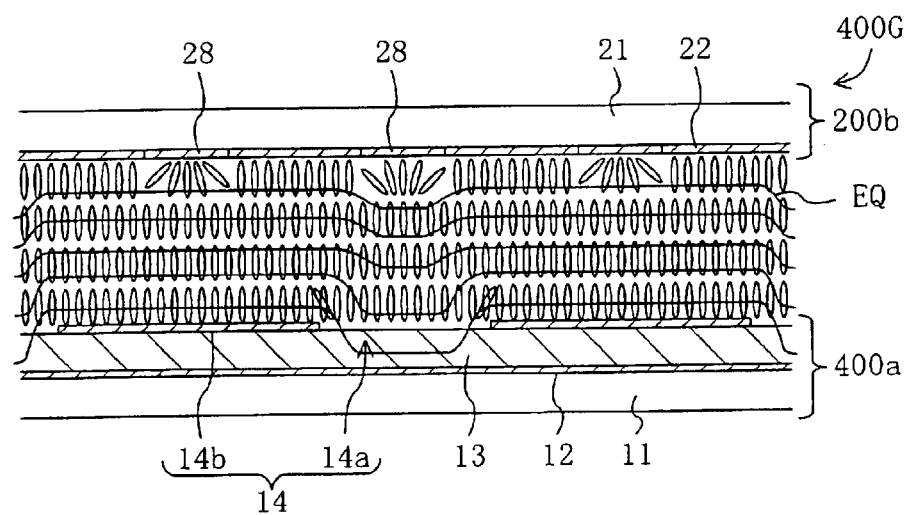
Figure 31C:
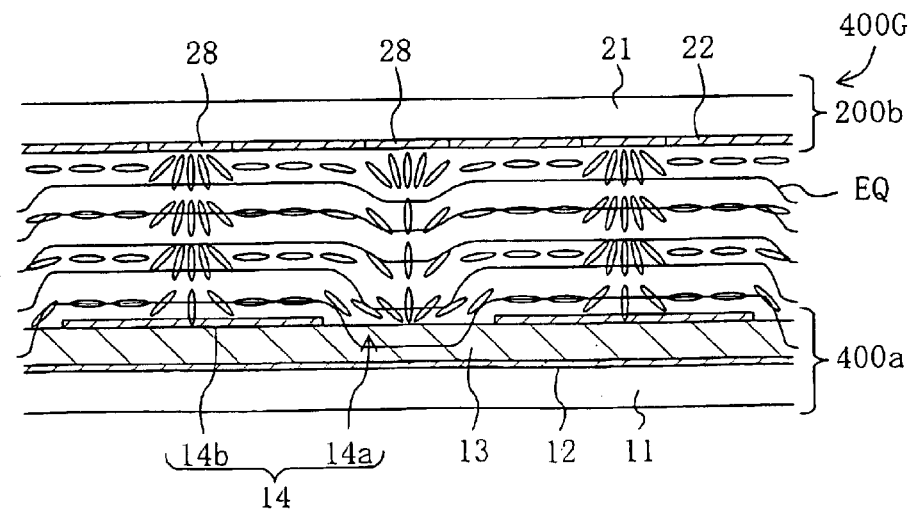

FIG. 31A to FIG. 31C are cross-sectional views schematically illustrating a picture element region of the liquid crystal display device 400G, wherein FIG. 31A illustrates a state in the absence of an applied voltage, FIG. 31B illustrates a state where an orientation has just started to change (initial ON state), and FIG. 31C illustrates a steady state.

Figure 32A:
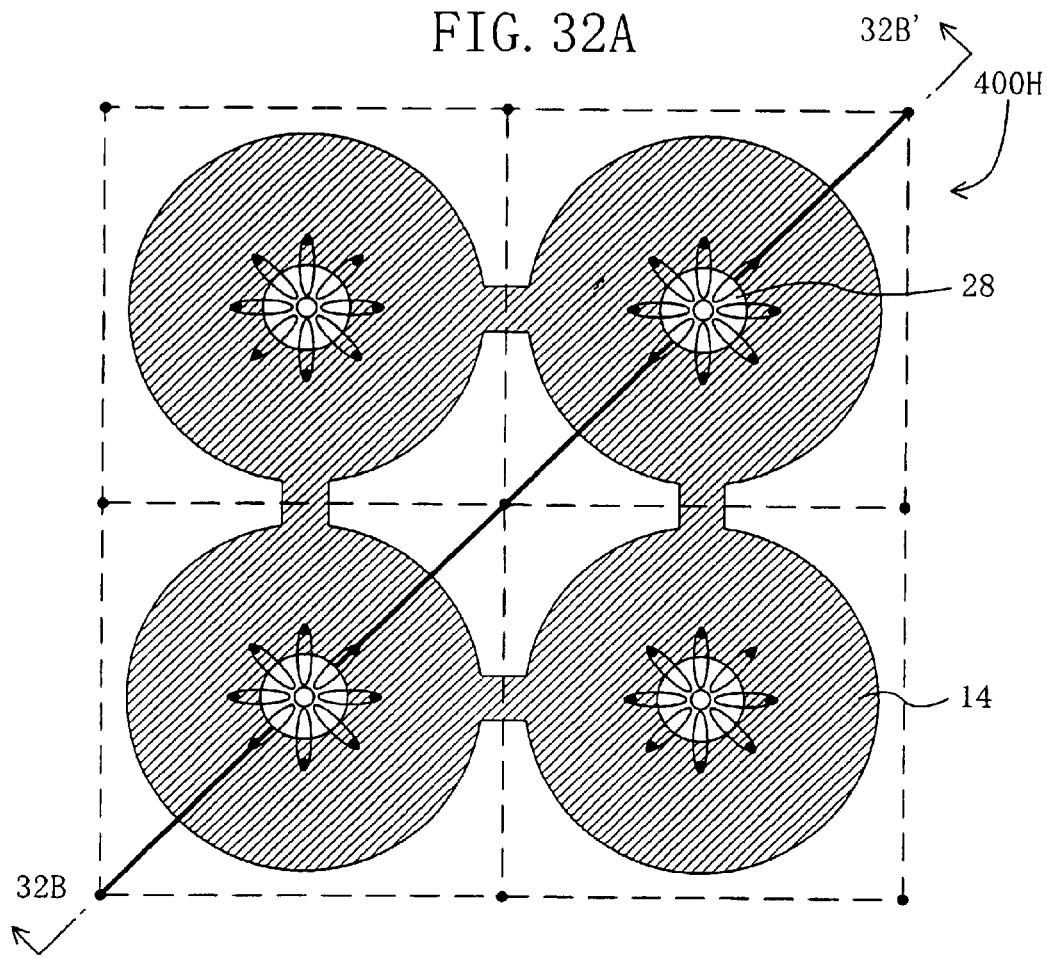
Figure 32B:
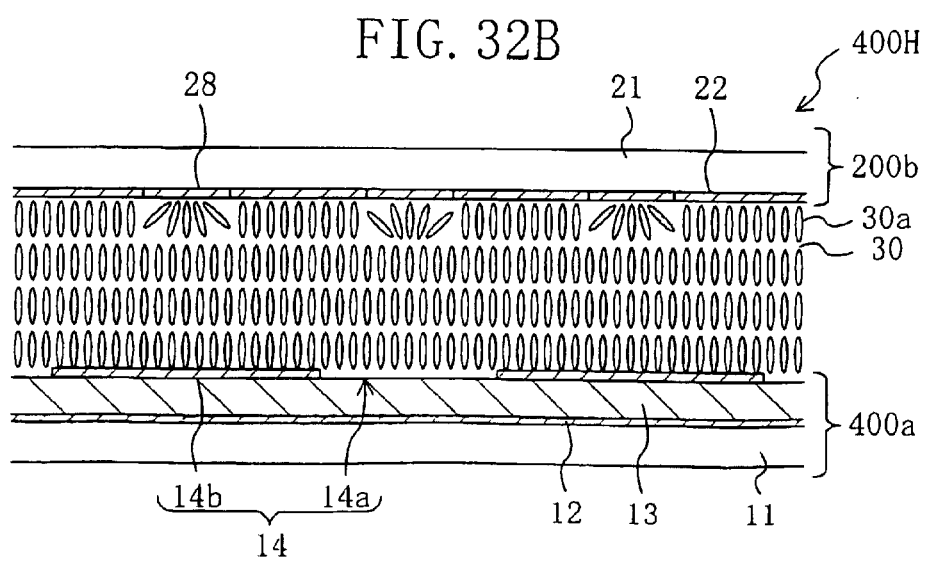

FIG. 32A and FIG. 32B schematically illustrate another liquid crystal display device 400H including a first orientation-regulating structure and a second orientation-regulating structure, wherein FIG. 32A is a plan view, and FIG. 32B is a cross-sectional view taken along line 32B–32B' of FIG. 32A.

Figure 33A:
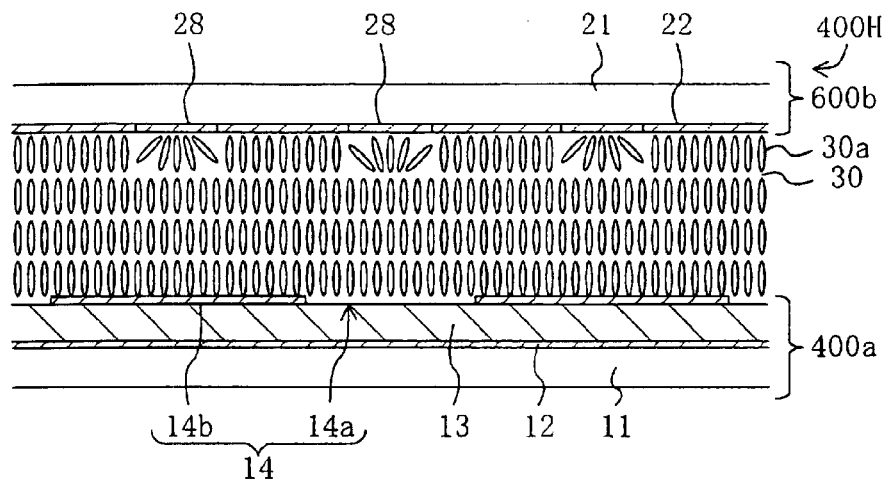
Figure 33B:
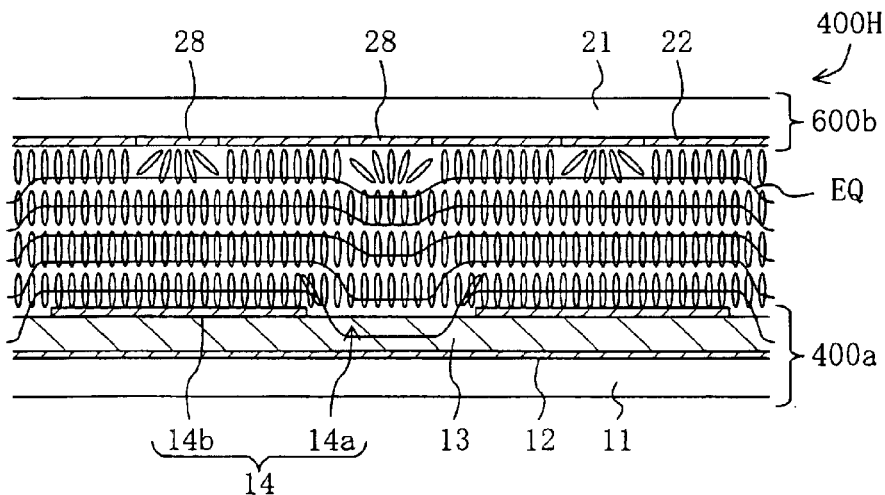
Figure 33C:
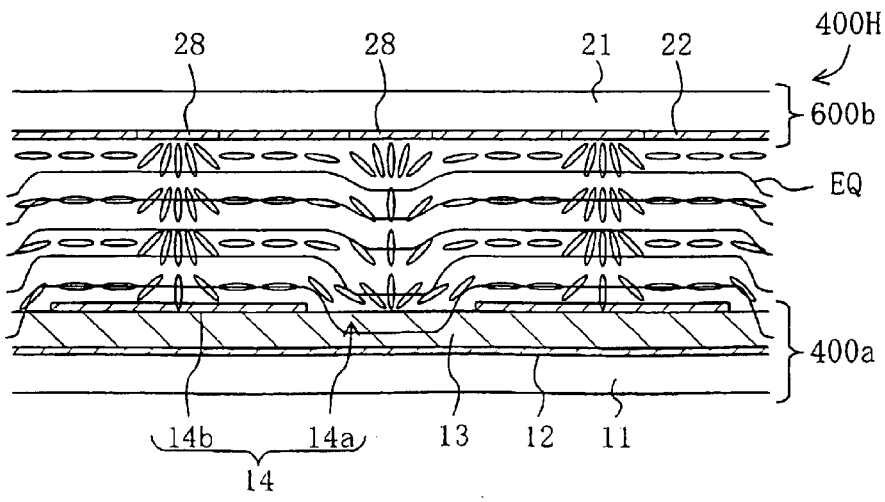

FIG. 33A to FIG. 33C are cross-sectional views schematically illustrating a picture element region of the liquid crystal display device 400H, wherein FIG. 33A illustrates a state in the absence of an applied voltage, FIG. 33B illustrates a state where an orientation has just started to change (initial ON state), and FIG. 33C illustrates a steady state.

Figure 34A:
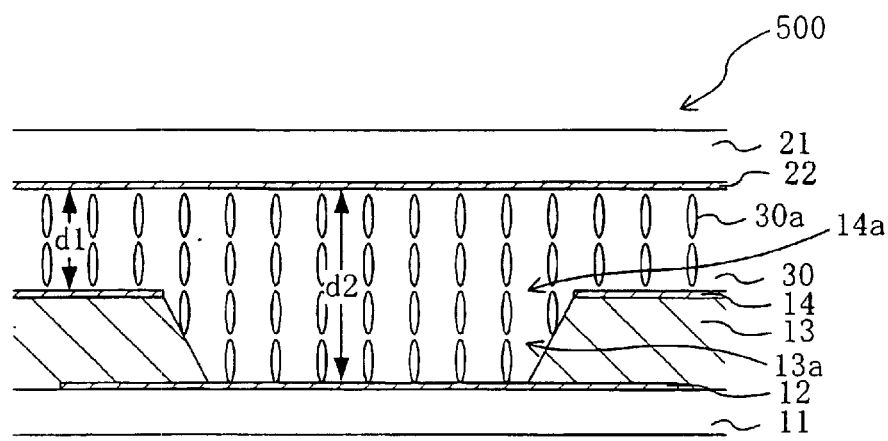
Figure 34B:
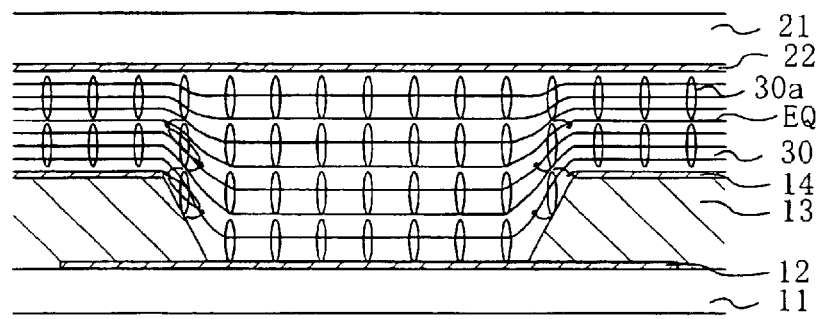
Figure 34C:
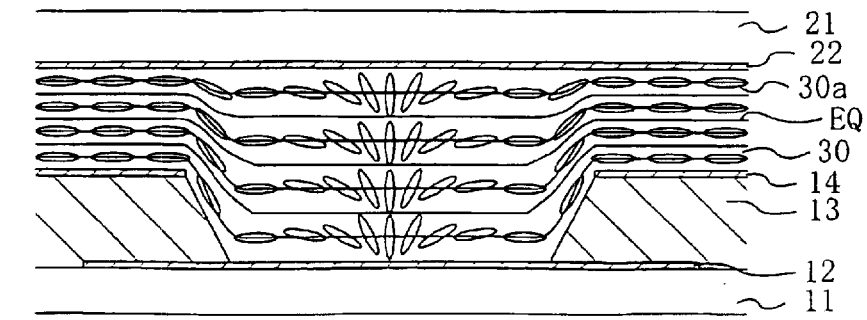

FIG. 34A to FIG. 34C are cross-sectional views schematically illustrating a picture element region of a liquid crystal display device 500 according to one embodiment of the present invention.

Figure 35:
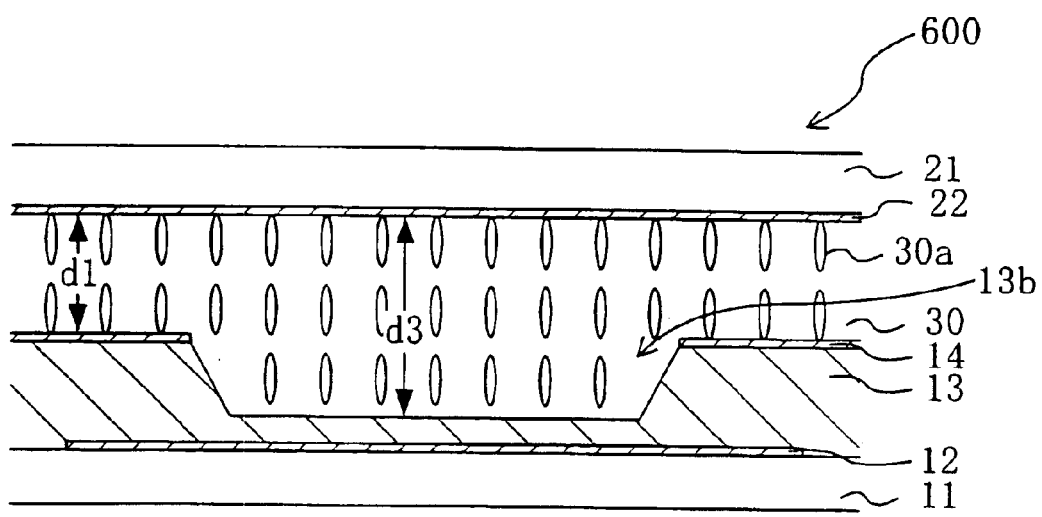

FIG. 35 is a cross-sectional view schematically illustrating a picture element region of a liquid crystal display device 600 according to one embodiment of the present invention.

Figure 36A:
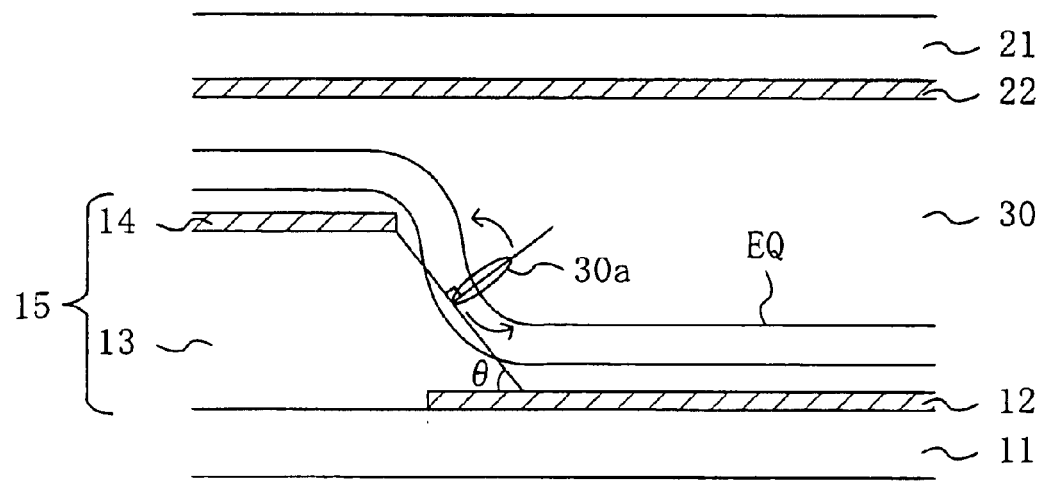
Figure 36B:
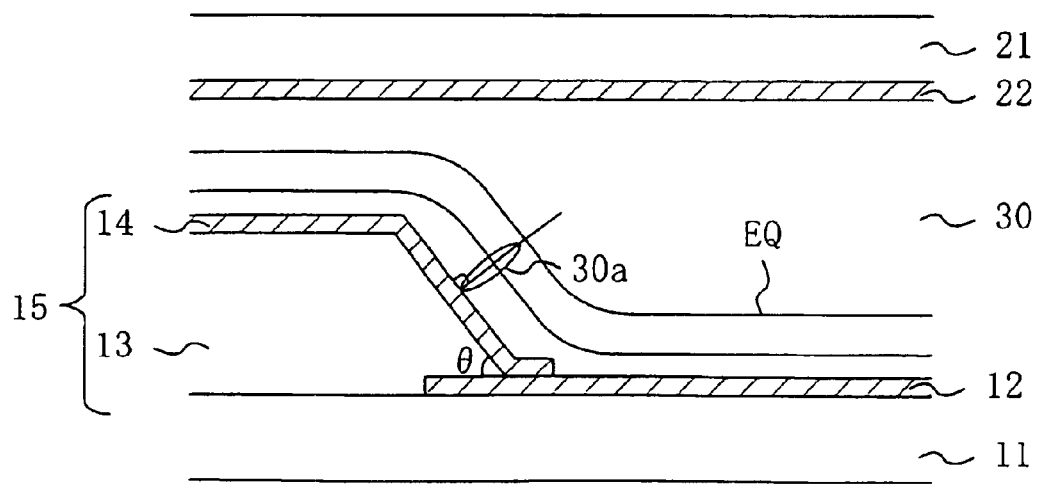

Each of FIG. 36A and FIG. 36B is an enlarged cross-sectional view schematically illustrating a structure around a picture element electrode in a liquid crystal display device according to one embodiment of the present invention.

Figure 37A:
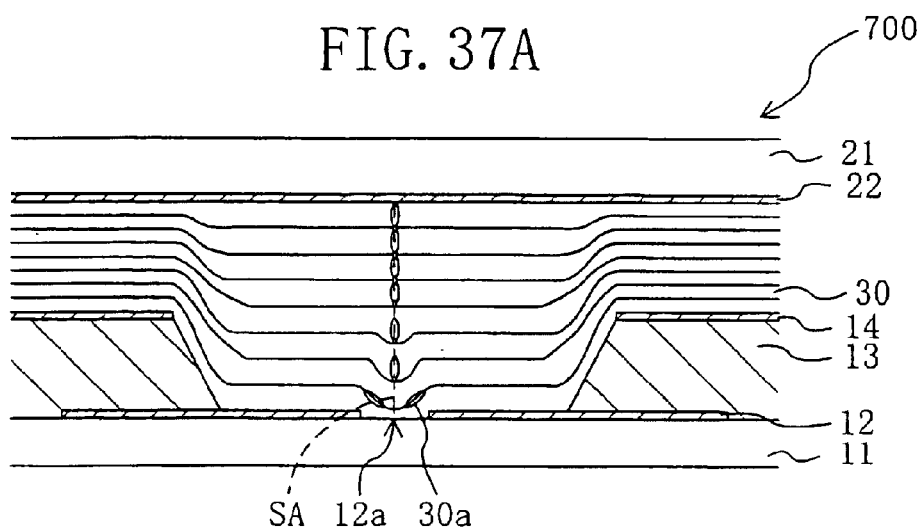
Figure 37B:
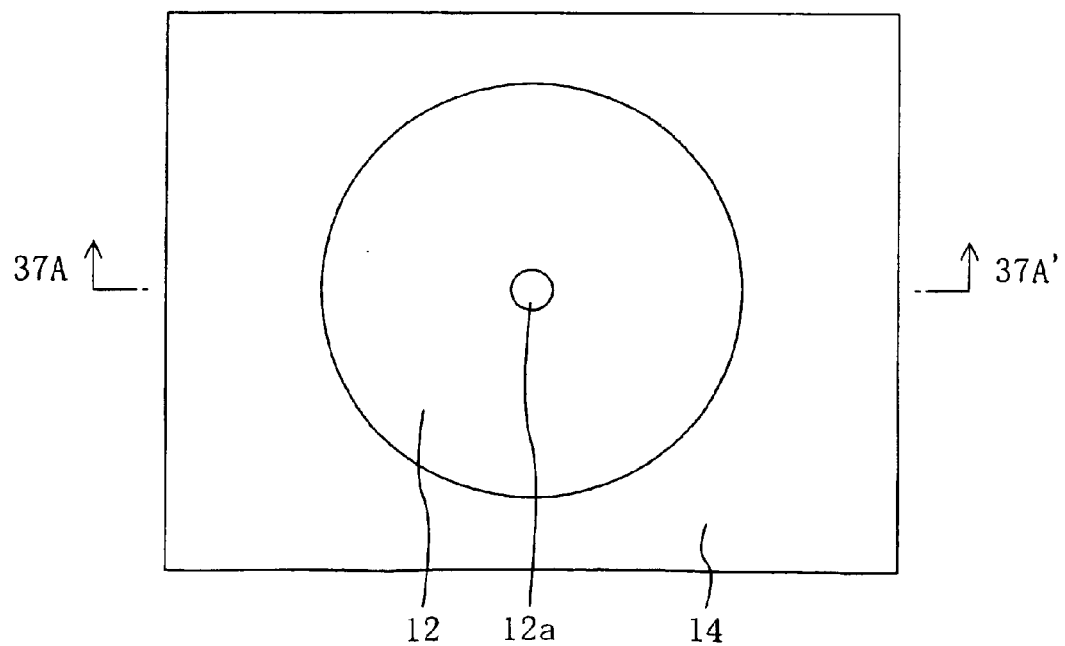

FIG. 37A is a cross-sectional view schematically illustrating a picture element region of a liquid crystal display device 700 according to one embodiment of the present invention, and FIG. 37B is a plan view thereof.

Figure 38A:
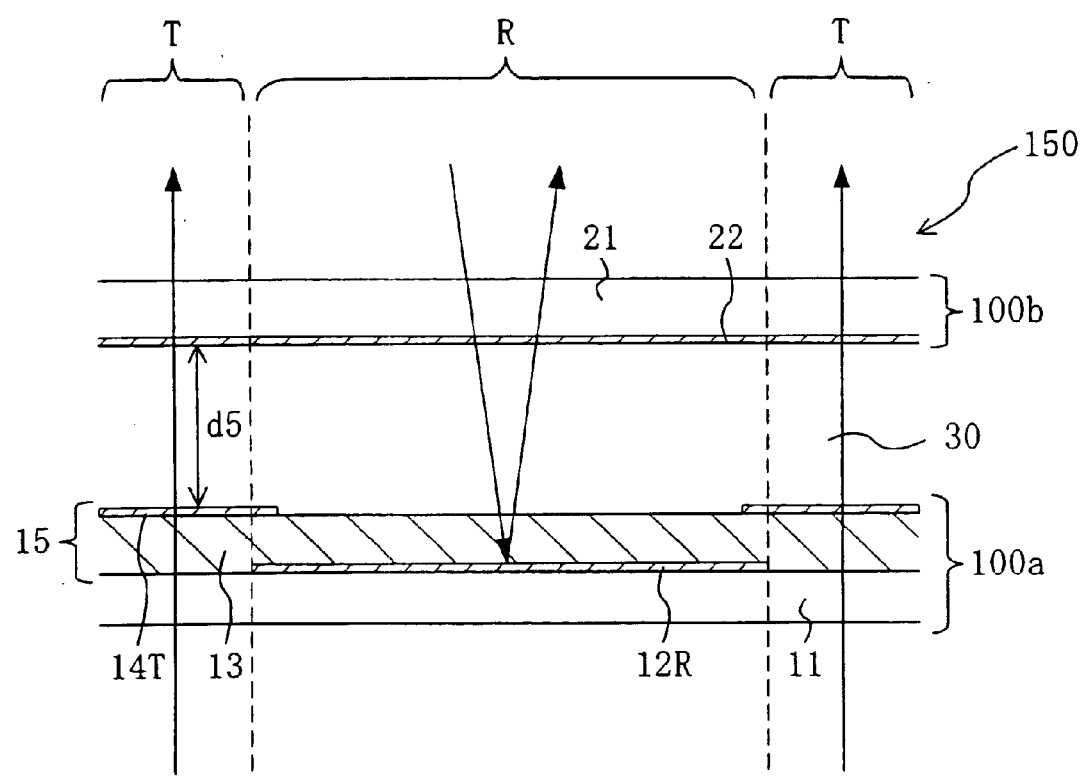

FIG. 38A is a cross-sectional view schematically illustrating a picture element region of a two-way liquid crystal display device 150 according to one embodiment of the present invention.

FIG. 38B is a cross-sectional view schematically illustrating a picture element region of a two-way liquid crystal display device 550 according to one embodiment of the present invention.

FIG. 38C is a cross-sectional view schematically illustrating a picture element region of a two-way liquid crystal display device 650 according to one embodiment of the present invention.

Figure 39A:
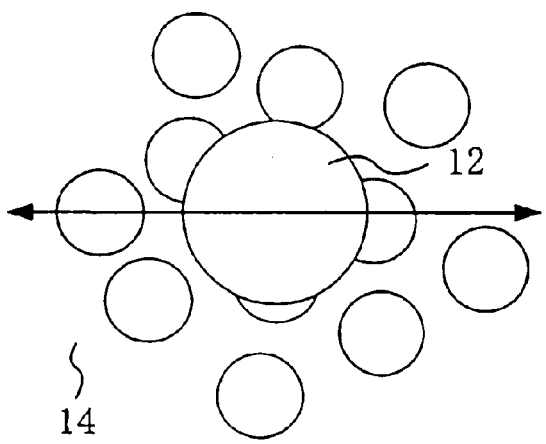
Figure 39B:
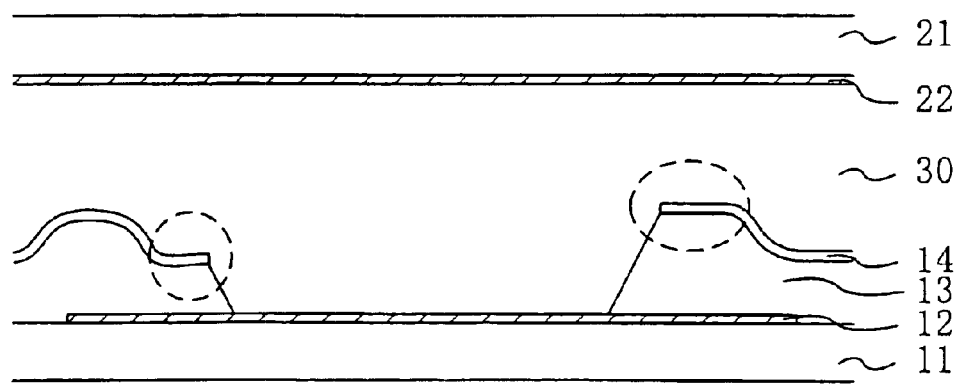

FIG. 39A and FIG. 39B schematically illustrate a structure around an opening in a two-way liquid crystal display device according to one embodiment of the present invention.

Figure 40A:
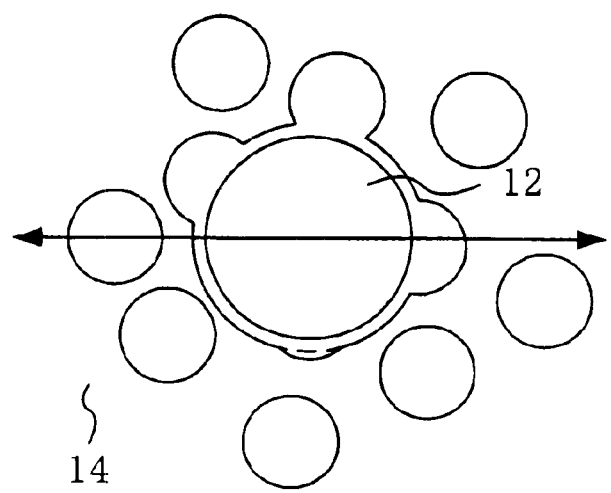
Figure 40B:
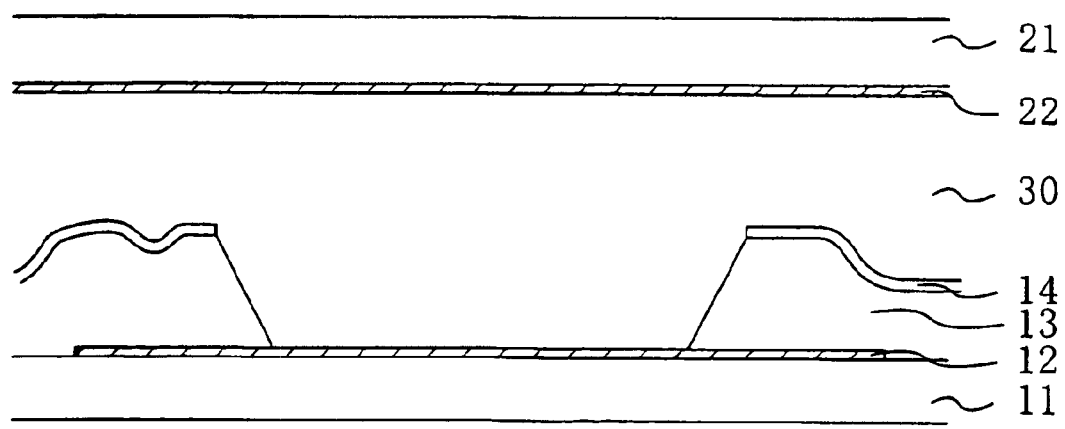

FIG. 40A and FIG. 40B schematically illustrate a structure around an opening in a two-way liquid crystal display device according to one embodiment of the present invention.

Figure 41A:
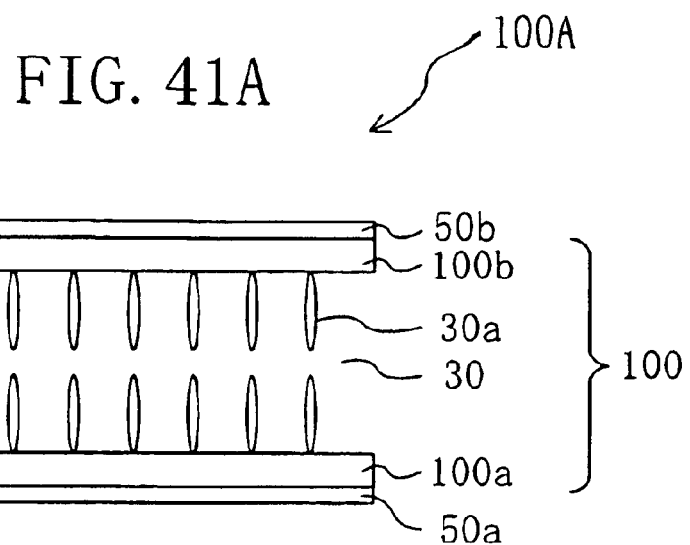
Figure 41B:
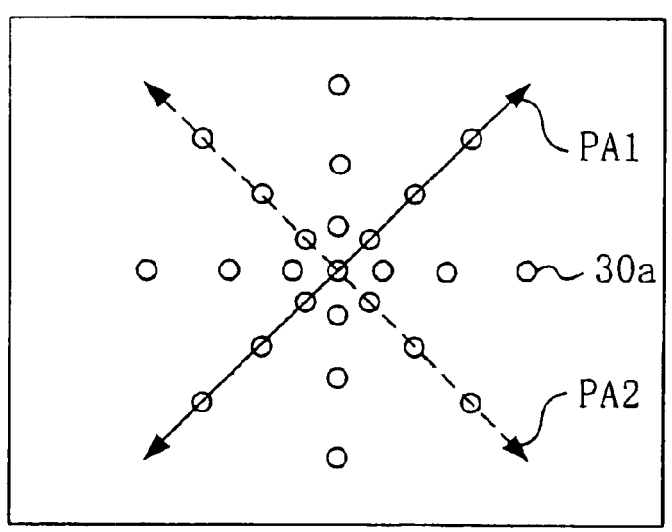

FIG. 41A and FIG. 41B illustrate an orientation of liquid crystal molecules and an arrangement of polarizing plates in a liquid crystal display device according to one embodiment of the present invention (in the absence of an applied voltage).

Figure 42A:
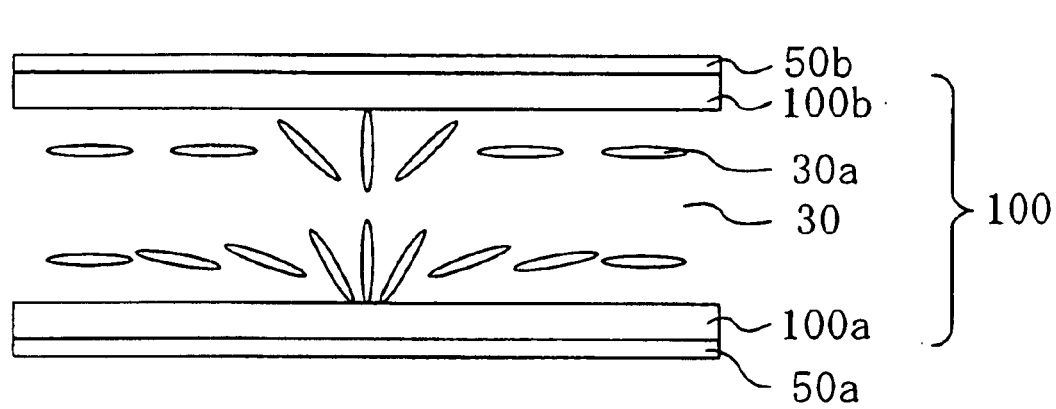
Figure 42B:
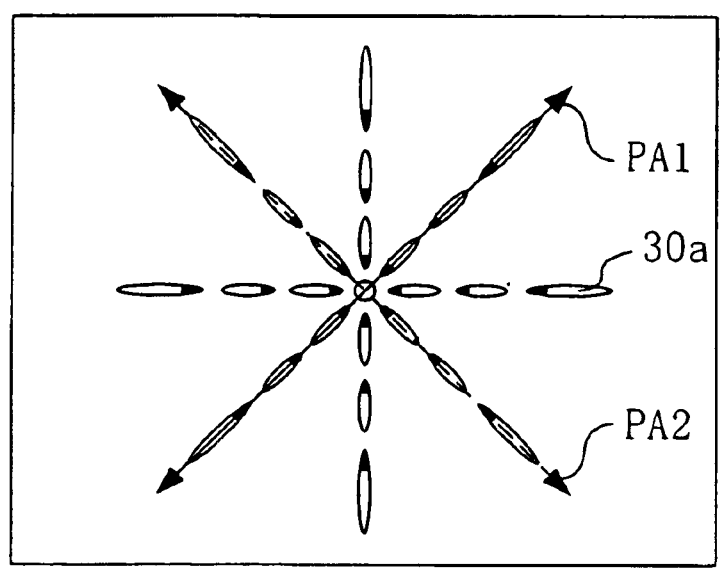

FIG. 42A and FIG. 42B illustrate an orientation of liquid crystal molecules and an arrangement of polarizing plates in a liquid crystal display device according to one embodiment of the present invention (in the presence of an applied voltage).

Figure 43A:
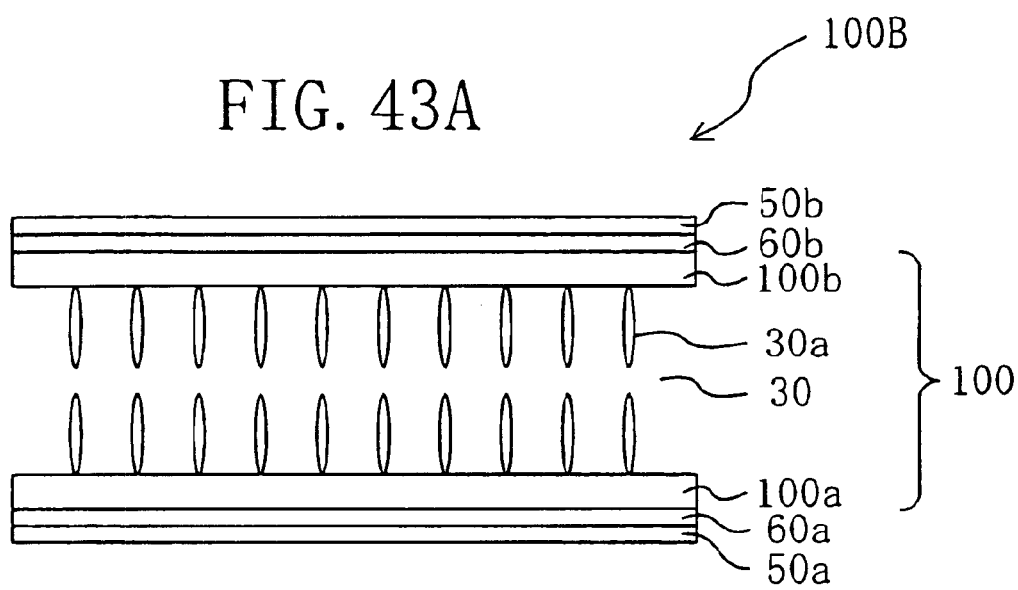
Figure 43B:
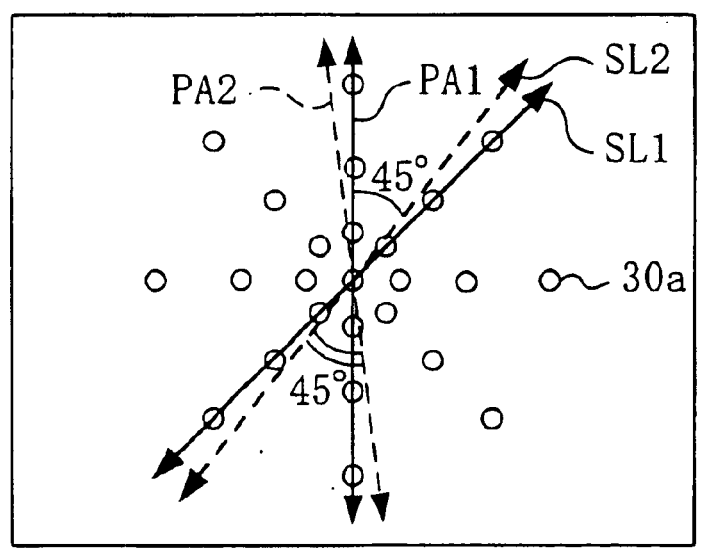

FIG. 43A and FIG. 43B illustrate an orientation of liquid crystal molecules and an arrangement of polarizing plates and $\lambda/4$ plates in a liquid crystal display device according to one embodiment of the present invention (in the absence of an applied voltage).

Figure 44A:
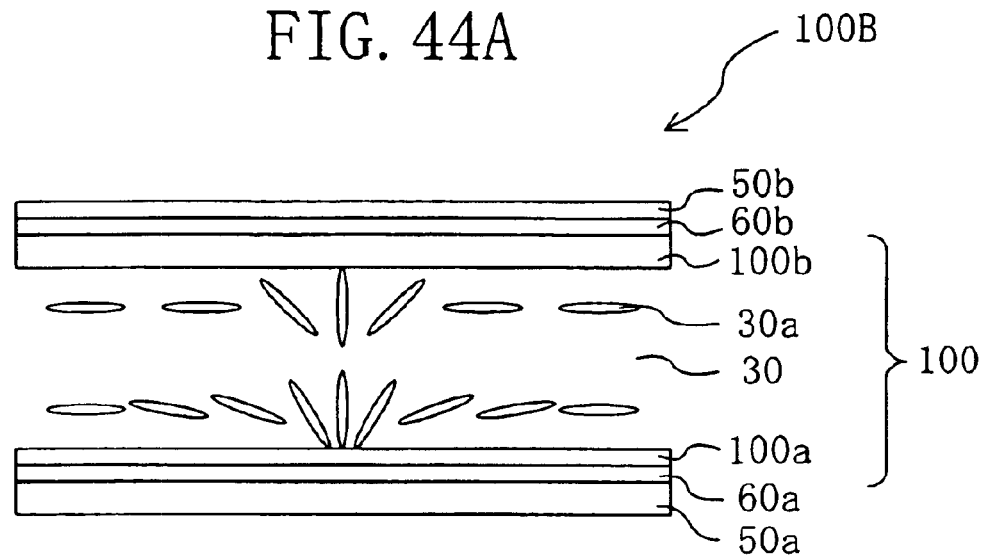
Figure 44B:
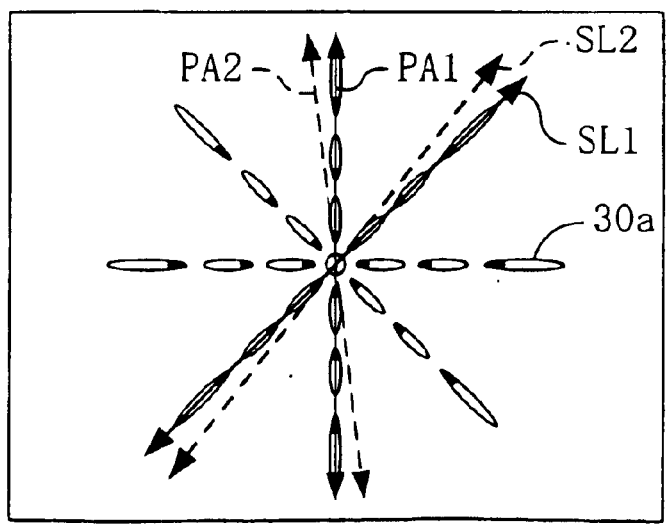

FIG. 44A and FIG. 44B illustrate an orientation of liquid crystal molecules and an arrangement of polarizing plates and $\lambda/4$ plates in a liquid crystal display device according to one embodiment of the present invention (in the presence of an applied voltage).

Figure 45A:
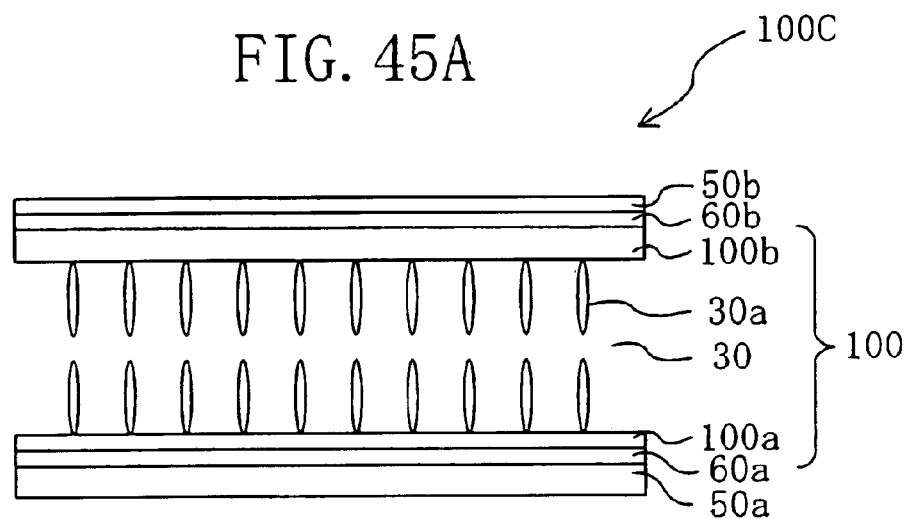
Figure 45B:
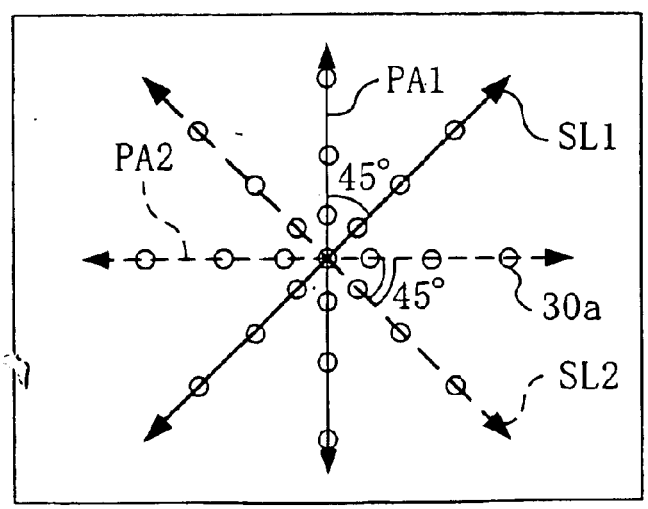

FIG. 45A and FIG. 45B illustrate an orientation of liquid crystal molecules and another arrangement of polarizing plates and $\lambda/4$ plates in a liquid crystal display device according to one embodiment of the present invention (in the absence of an applied voltage).

Figure 46A:
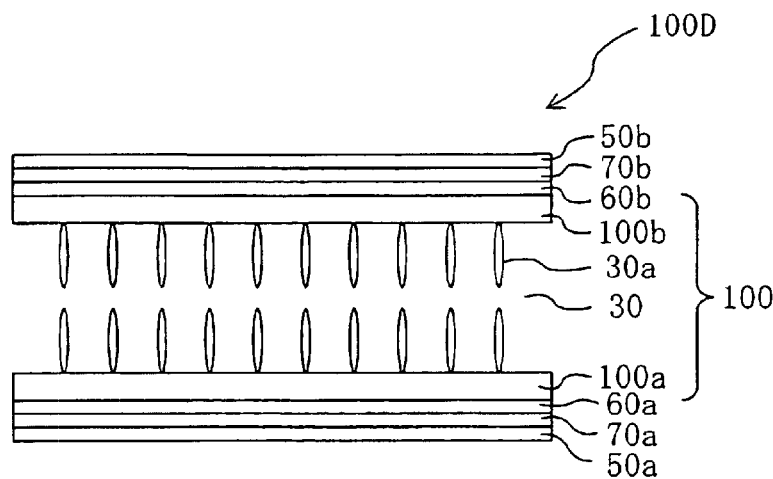
Figure 46B:
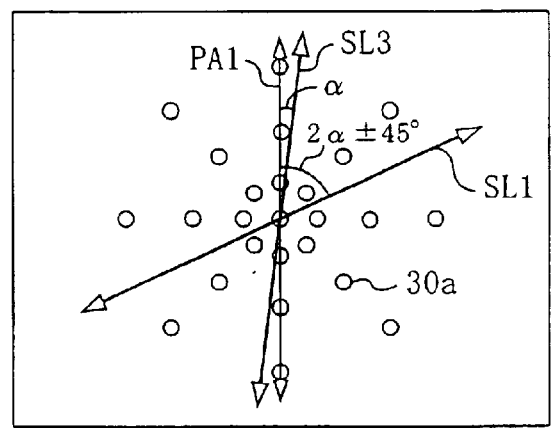
Figure 46C:
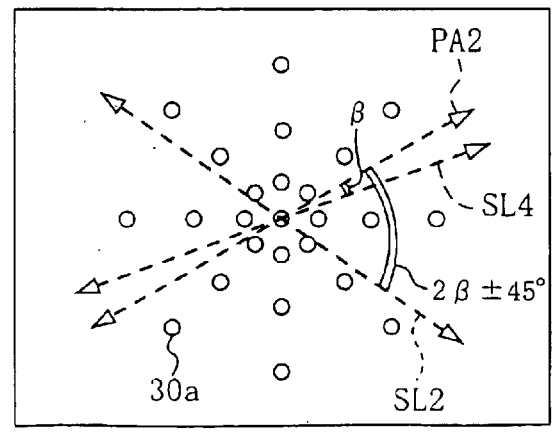

FIG. 46A to FIG. 46C illustrate an orientation of liquid crystal molecules and an arrangement of polarizing plates, $\lambda/4$ plates and $\lambda/2$ plates in a liquid crystal display device according to one embodiment of the present invention (in the absence of an applied voltage).

Figure 47A:
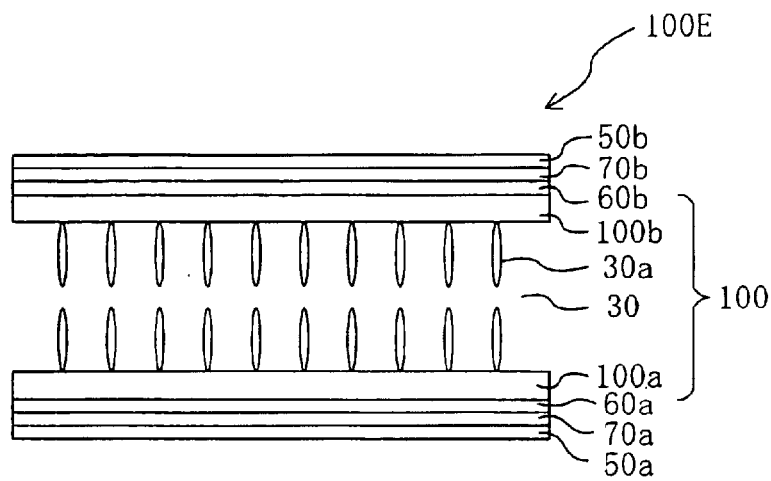
Figure 47B:
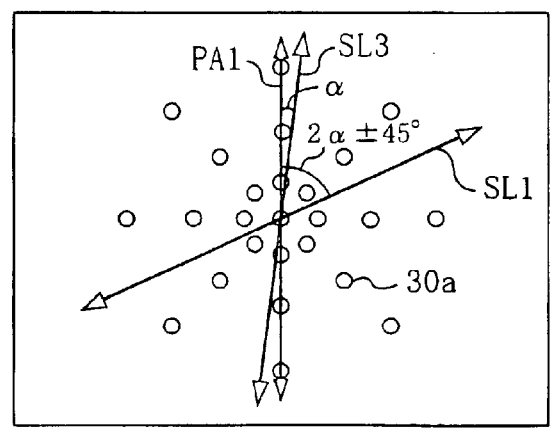
Figure 47C:
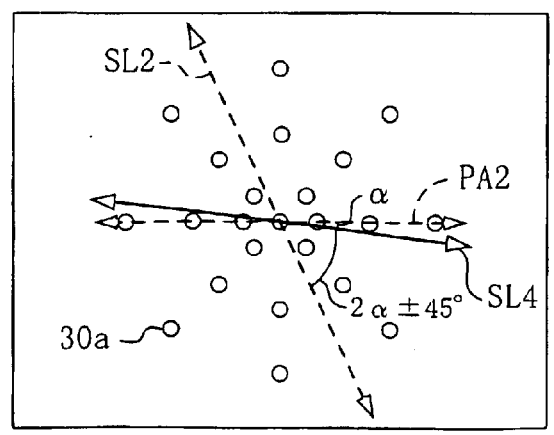

FIG. 47A to FIG. 47C illustrate an orientation of liquid crystal molecules and another arrangement of polarizing plates, $\lambda/4$ plates and $\lambda/2$ plates in a liquid crystal display device according to one embodiment of the present invention (in the absence of an applied voltage).

Figure 48:
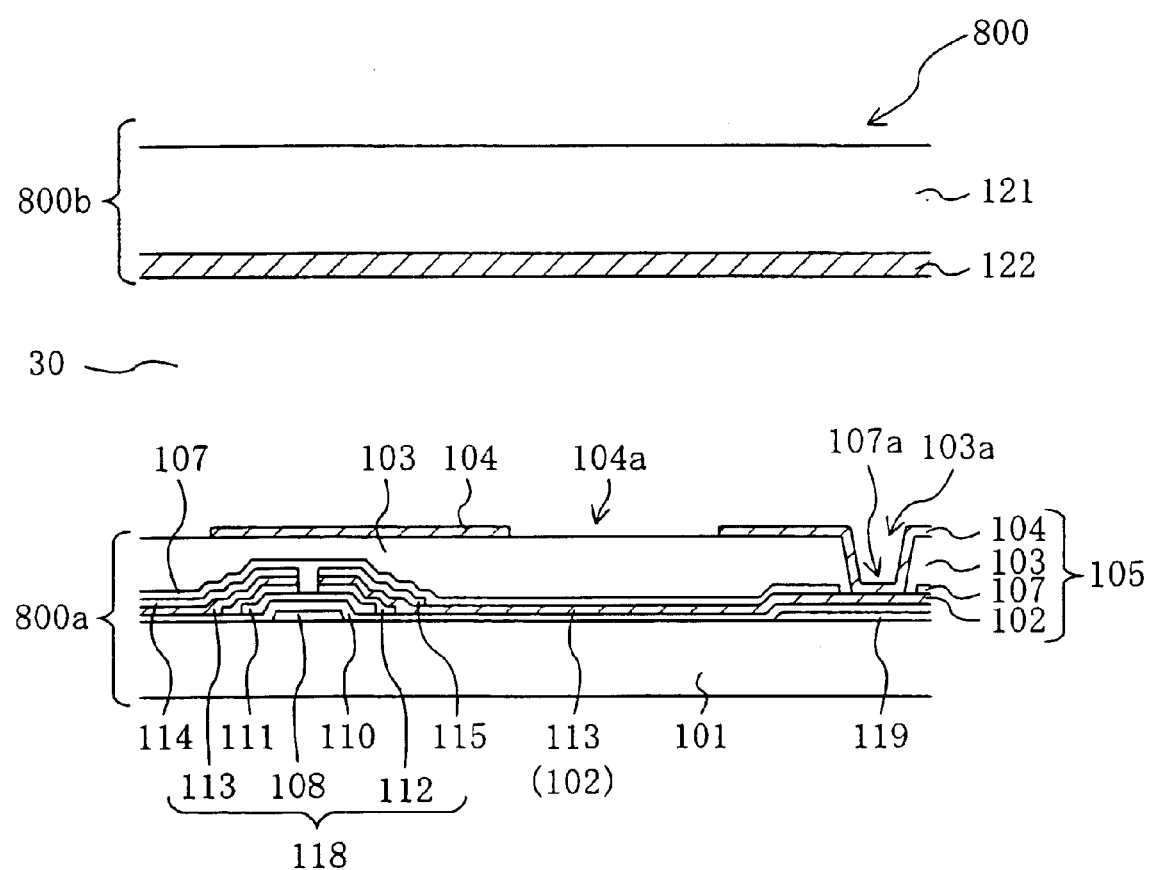

FIG. 48 is a cross-sectional view schematically illustrating a transmission type liquid crystal display device 800 according to Example 1 of the present invention.

Figure 49:
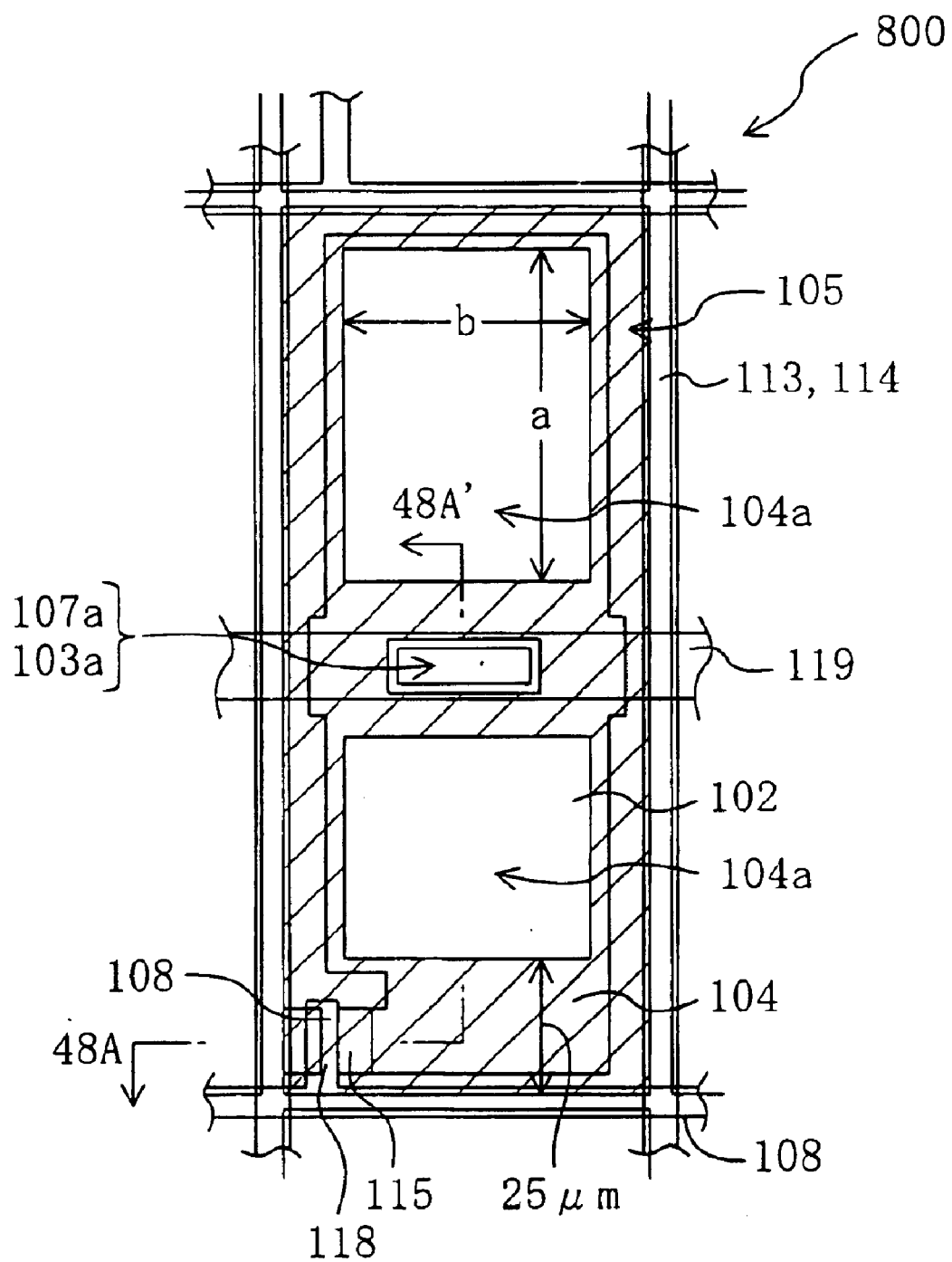

FIG. 49 is a plan view schematically illustrating the transmission type liquid crystal display device 800 according to Example 1 of the present invention.

FIG. 50A to FIG. 50E are cross-sectional views schematically illustrating a sequence of production steps of the liquid crystal display device 800.

FIG. 50F to FIG. 50K are cross-sectional views schematically illustrating another sequence of production steps of the liquid crystal display device 800.

Figure 51:
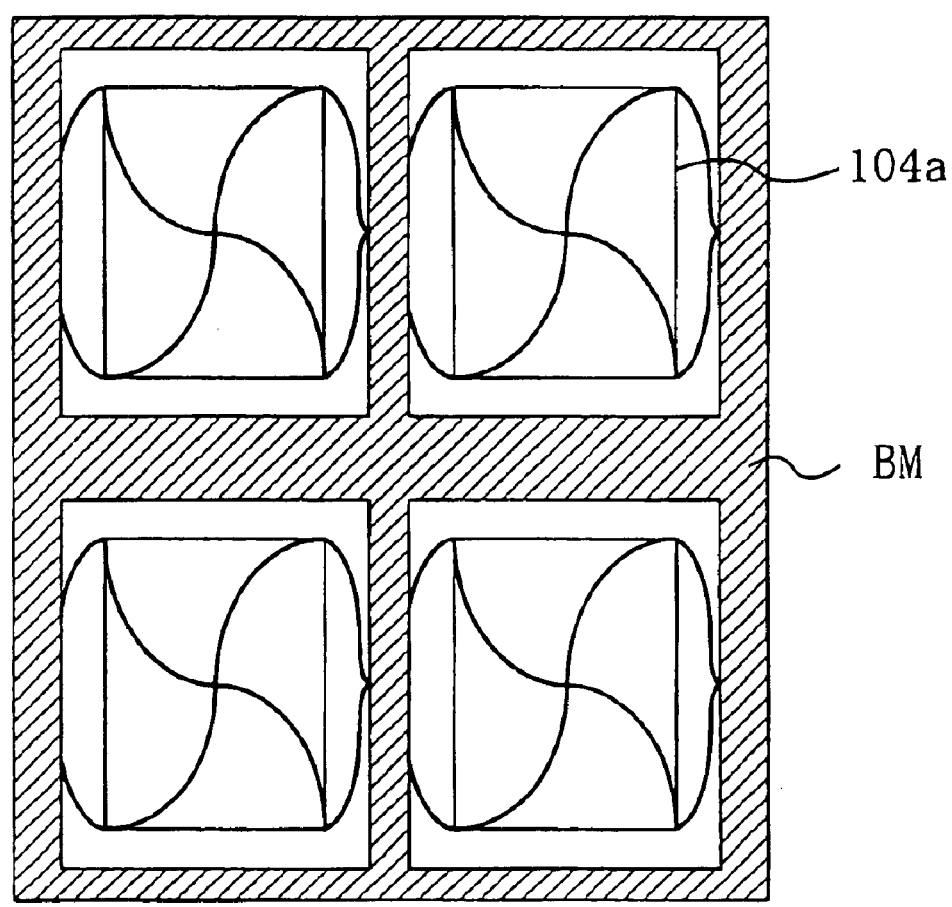

FIG. 51 schematically illustrates the appearance of picture element regions in the presence of an applied voltage across a liquid crystal layer of the liquid crystal display device 800.

Figure 52:
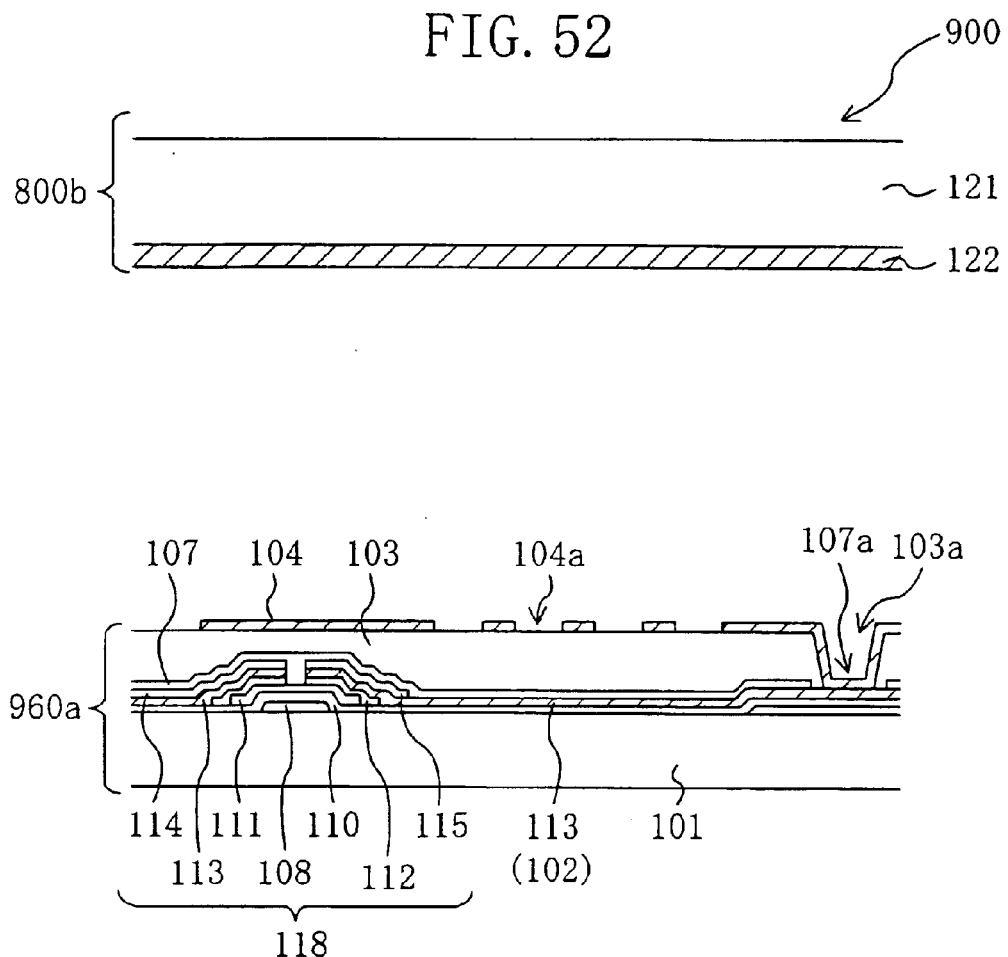

FIG. 52 is a cross-sectional view schematically illustrating the transmission type liquid crystal display device 900 according to Example 2 of the present invention.

Figure 53:
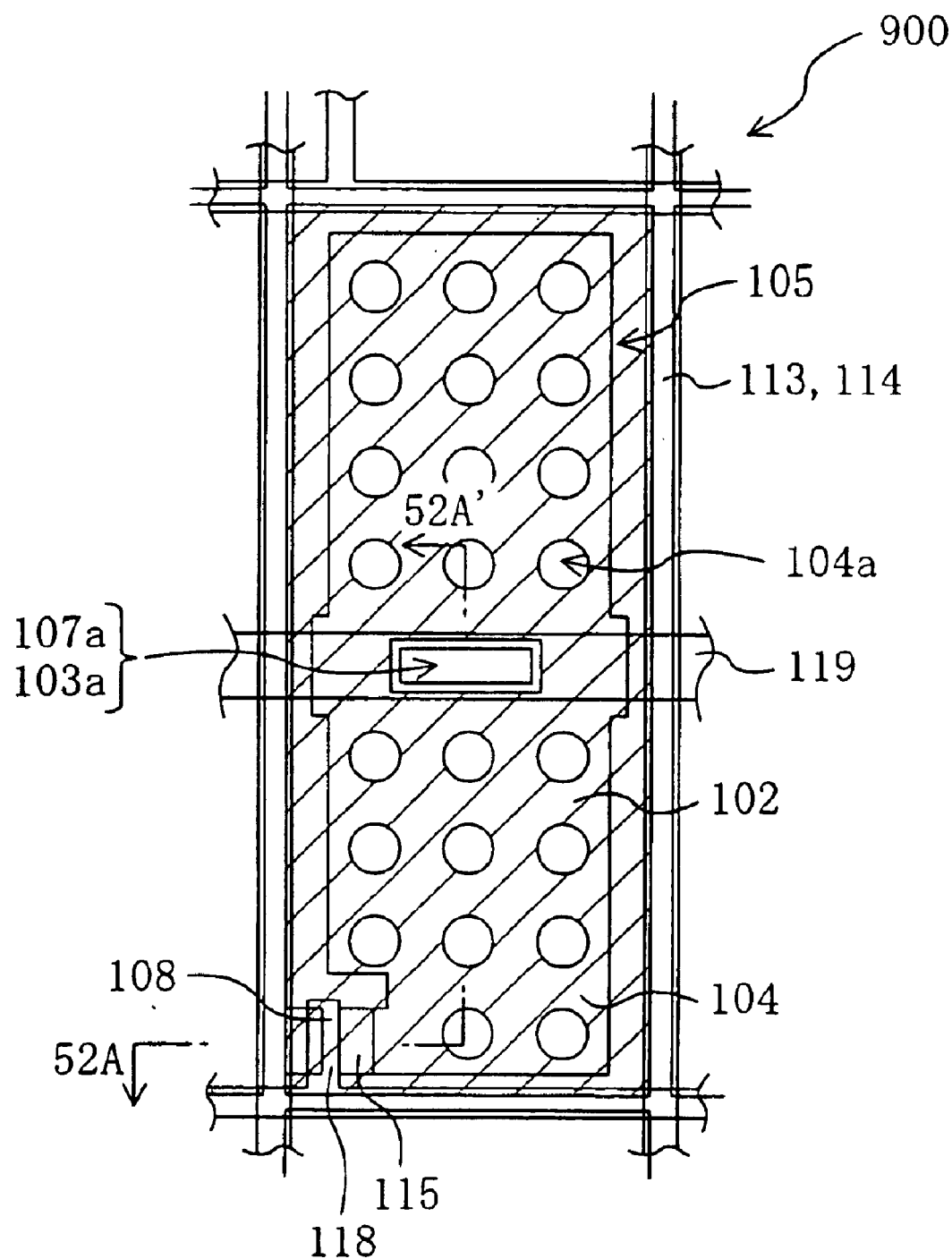

FIG. 53 is a plan view schematically illustrating a transmission type liquid crystal display device 900 according to Example 2 of the present invention.

Figure 54:
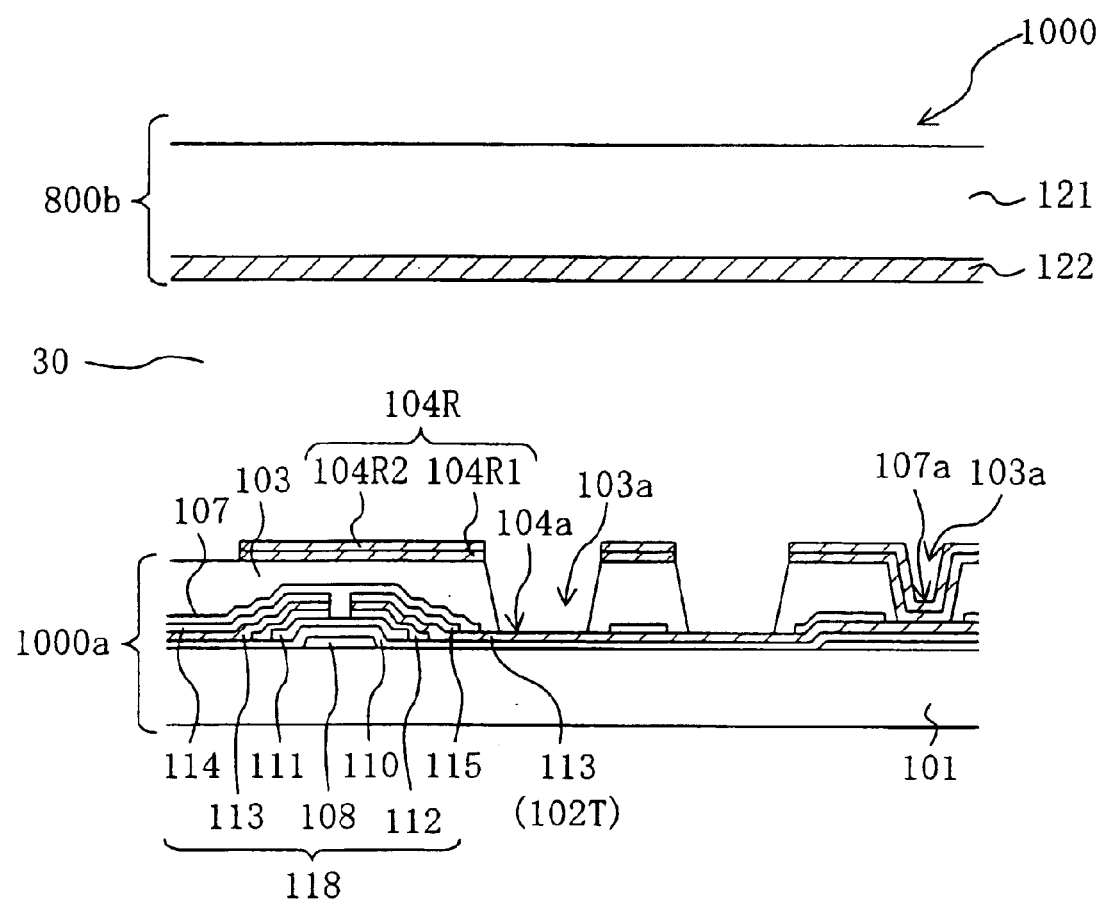

FIG. 54 is a cross-sectional view schematically illustrating a two-way liquid crystal display device 1000 according to Example 3 of the present invention.

Figure 55:
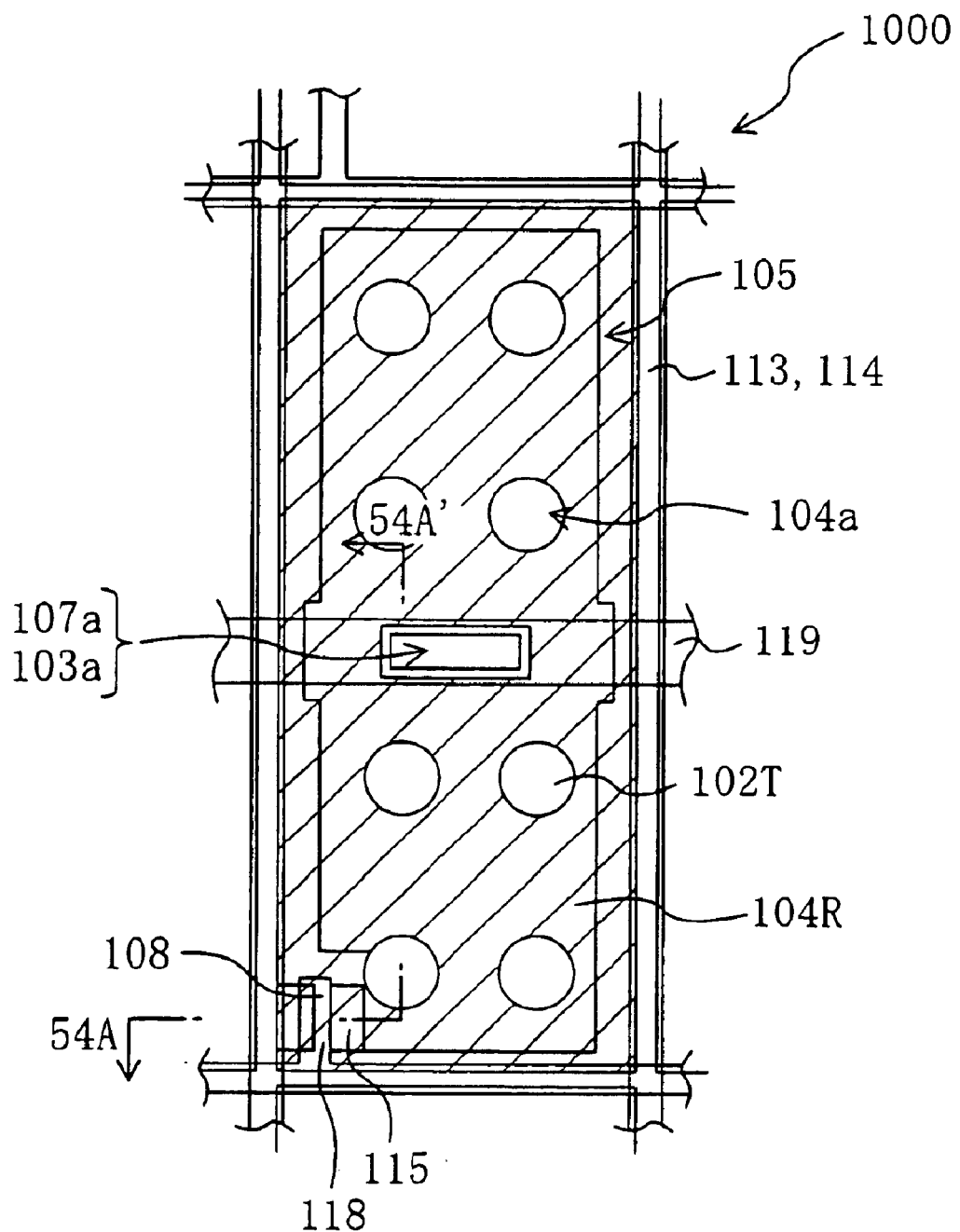

FIG. 55 is a plan view schematically illustrating the two-way liquid crystal display device 1000 according to Example 3 of the present invention.

Figure 56A:
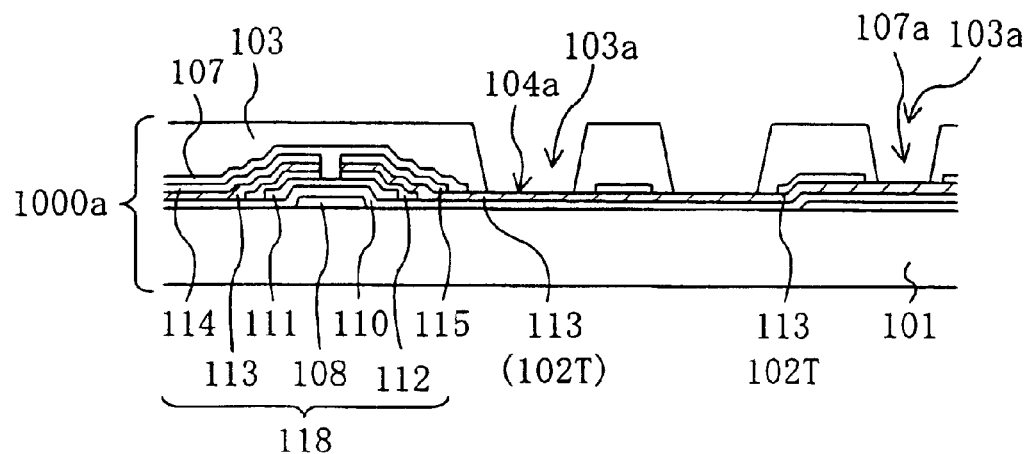
Figure 56B:
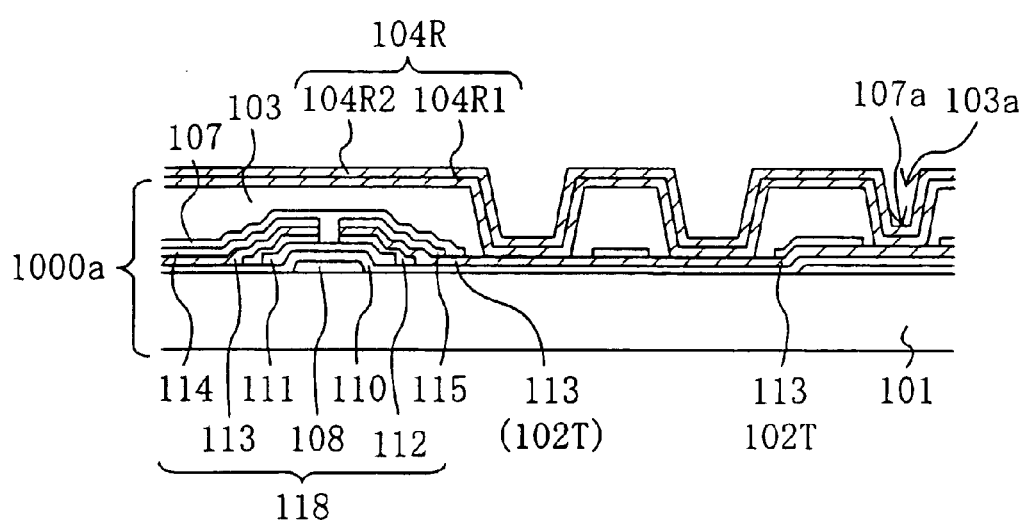

Each of FIG. 56A and FIG. 56B is a cross-sectional view schematically illustrating a production step of the liquid crystal display device 1000.

Figure 57:
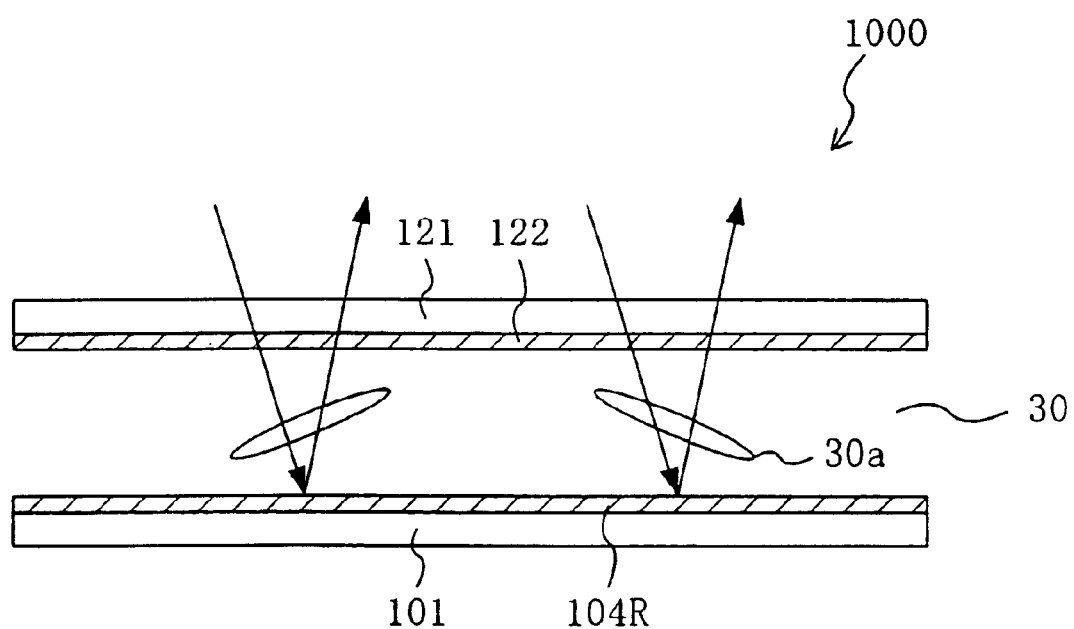

FIG. 57 schematically illustrates a display operation when a voltage is applied across a liquid crystal layer in a reflection region of the liquid crystal display device 1000.

Figure 58:
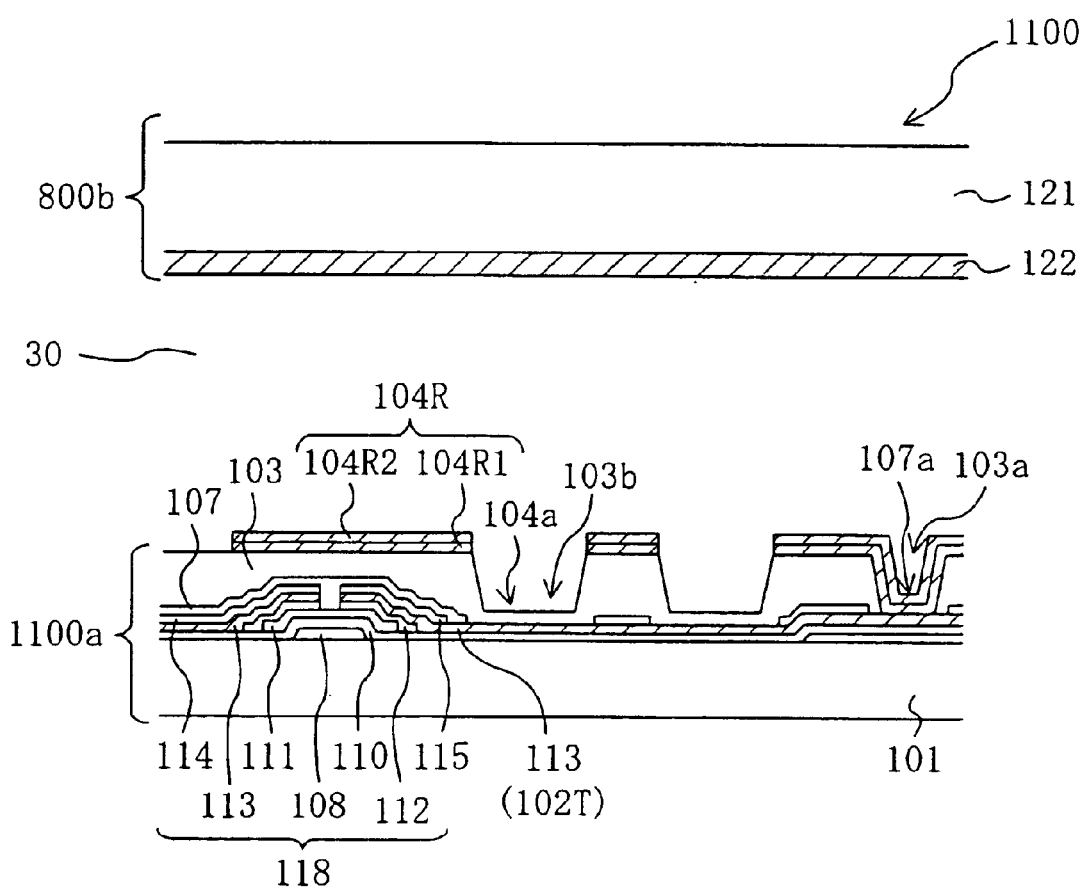

FIG. 58 is a cross-sectional view schematically illustrating a two-way liquid crystal display device 1100 according to Example 4 of the present invention.

Figure 59A:
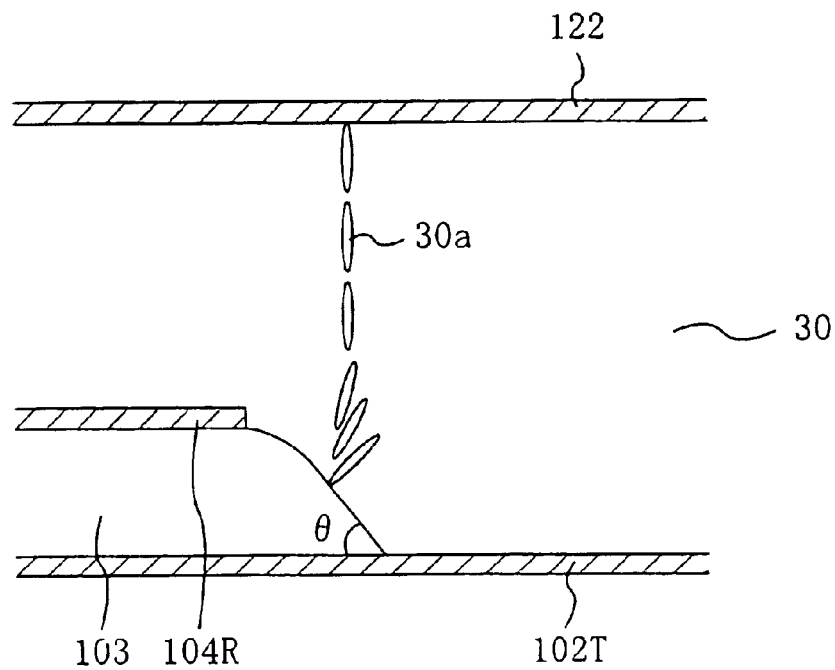
Figure 59B:
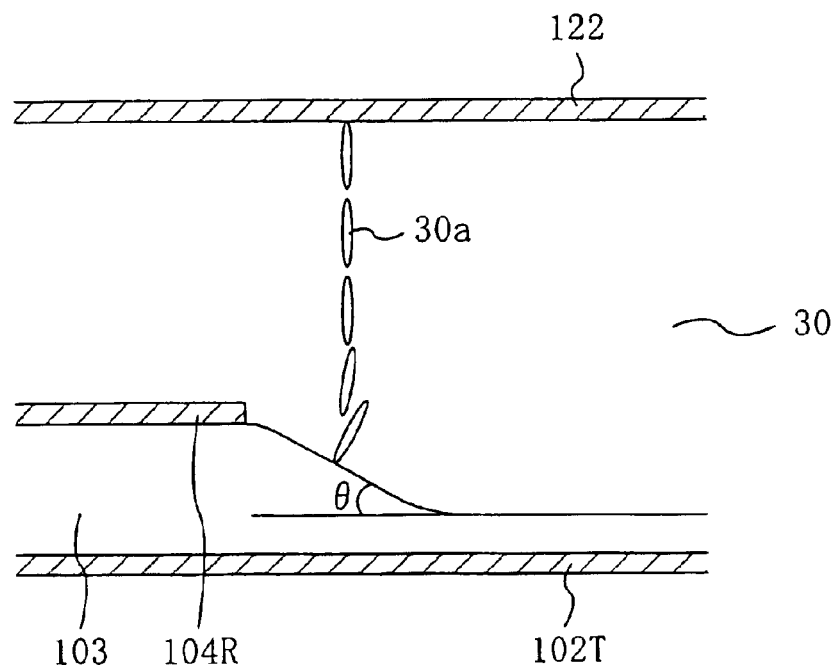

FIG. 59A schematically illustrates an edge portion of an opening 103a of a photosensitive resin layer 103 in the liquid crystal display device 1000, and FIG. 59B schematically illustrates an edge portion of a depressed portion 103b of the photosensitive resin layer 103 in the liquid crystal display device 1100.

Figure 60:
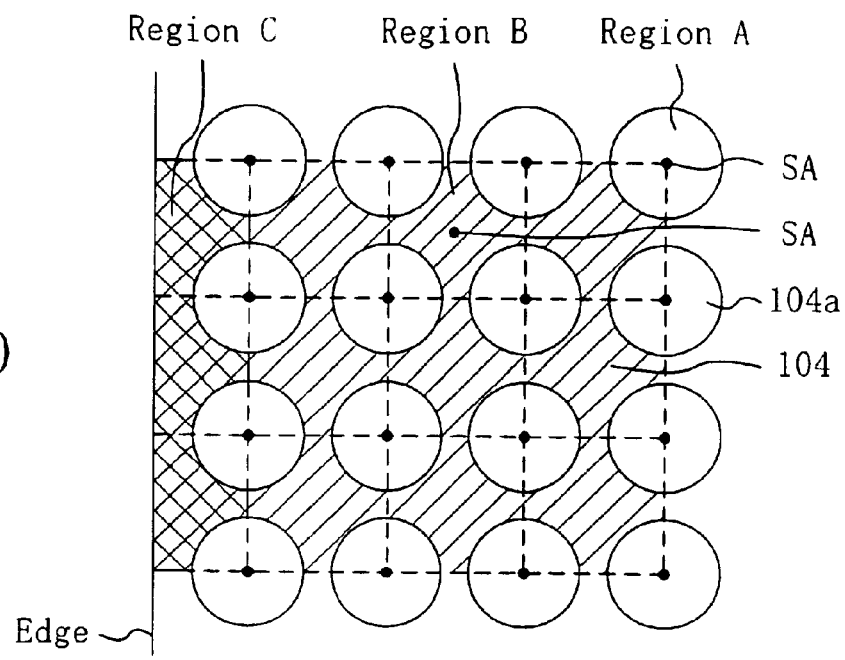

FIG. 60 is a plan view schematically illustrating a portion of an upper conductive layer 104 of the liquid crystal display device 900 according to Example 2 of the present invention.

Figure 61:
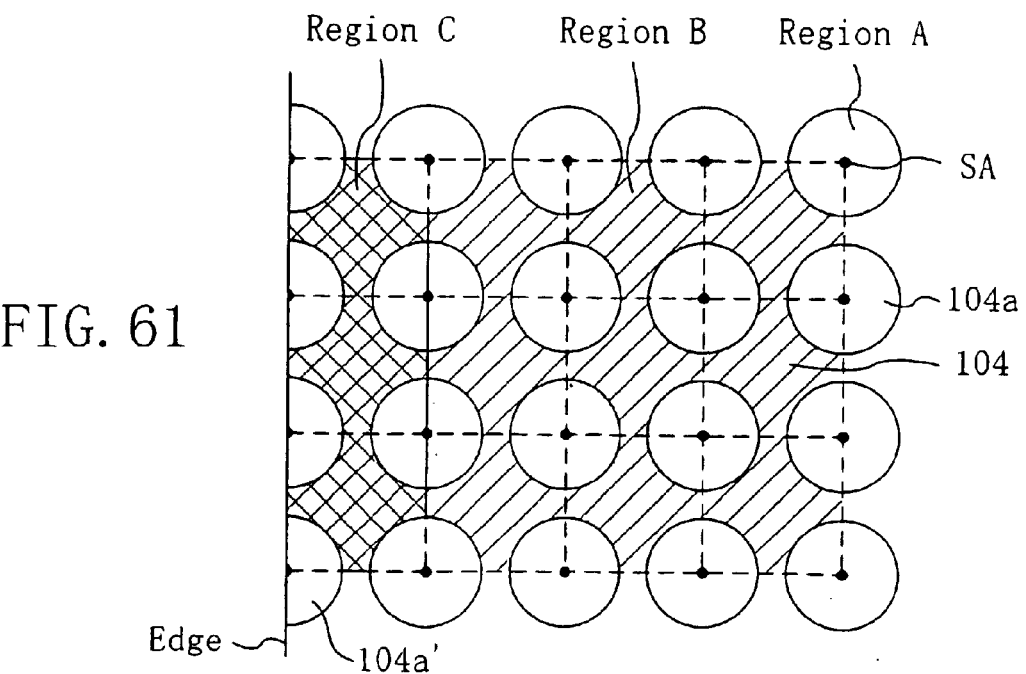

FIG. 61 schematically illustrates an arrangement of openings provided in the vicinity of a side of the upper conductive layer 104 of a liquid crystal display device according to Example 5 of the present invention.

Figure 62:
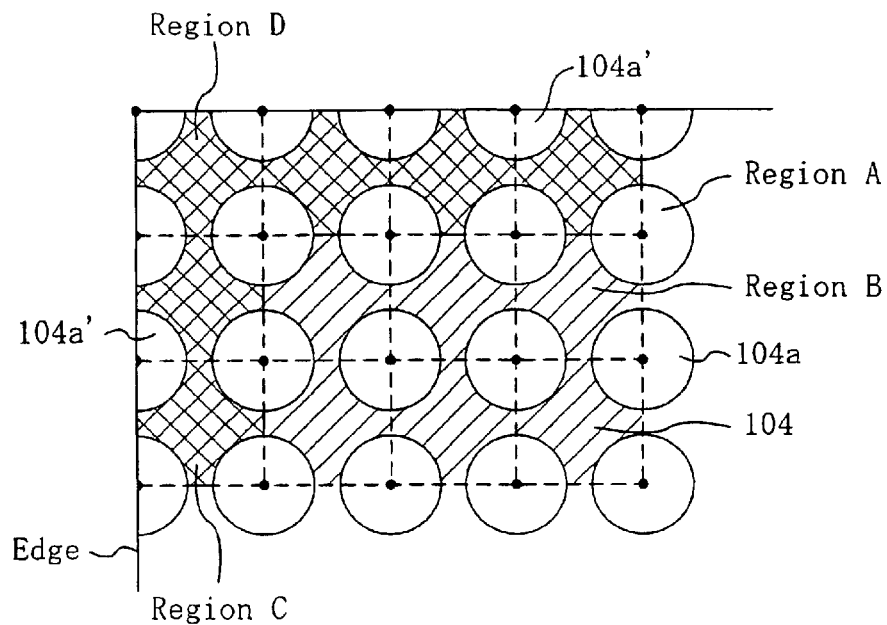

FIG. 62 schematically illustrates an arrangement of openings provided in the vicinity of a corner of the upper conductive layer 104 of the liquid crystal display device according to Example 5 of the present invention.

Figure 63:
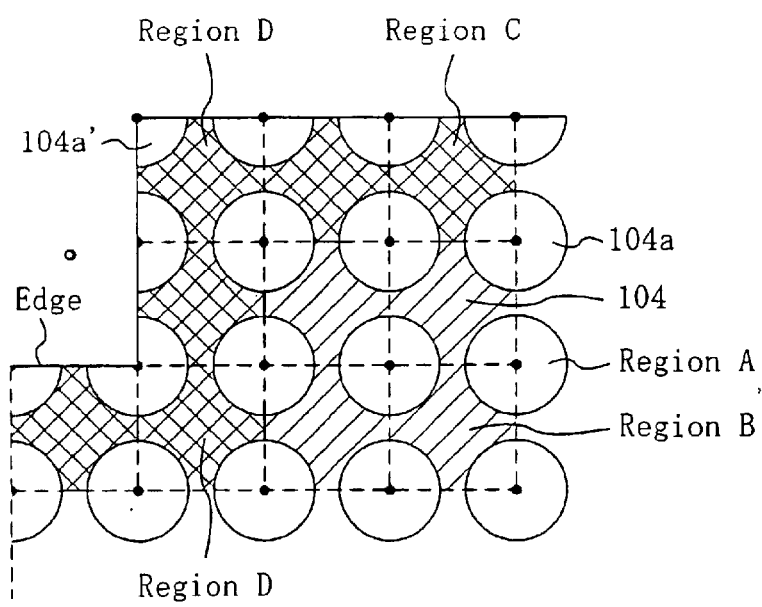

FIG. 63 schematically illustrates an arrangement of openings provided in the vicinity of a cut-out portion of the upper conductive layer 104 of the liquid crystal display device according to Example 5 of the present invention.

Figure 64:
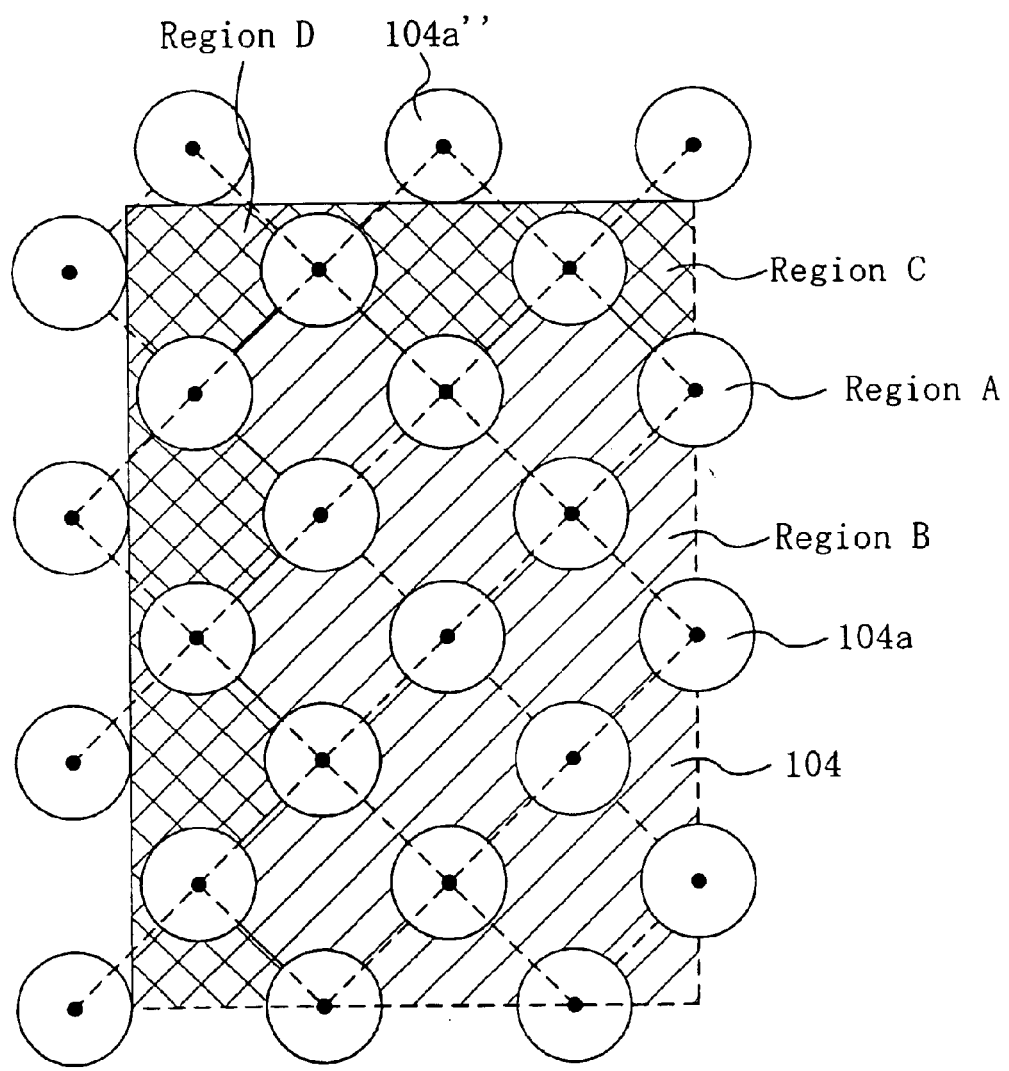

FIG. 64 schematically illustrates an arrangement of openings in the upper conductive layer 104 of a liquid crystal display device according to Example 6 of the present invention.

Figure 65:
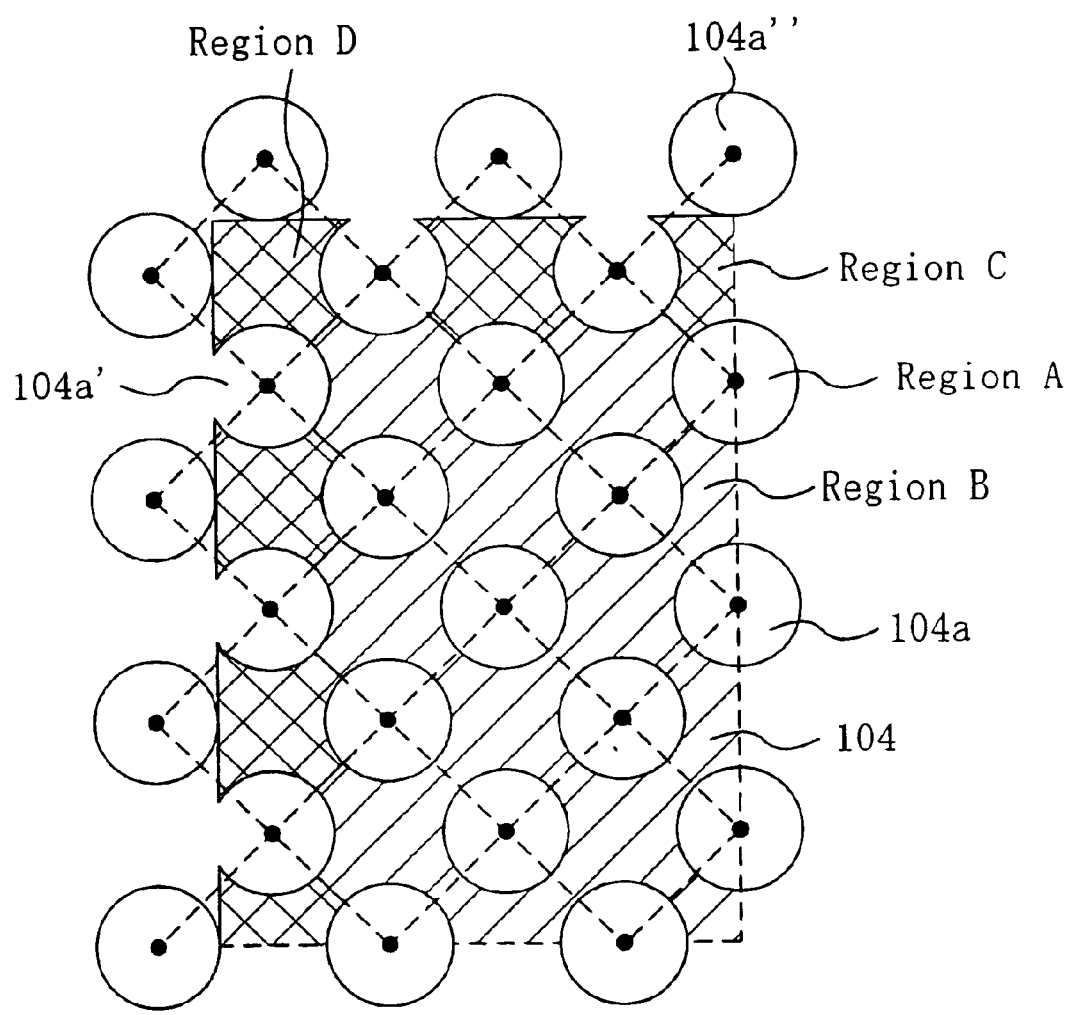

FIG. 65 schematically illustrates another arrangement of openings in the upper conductive layer 104 of the liquid crystal display device according to Example 6 of the present invention.

Figure 66:
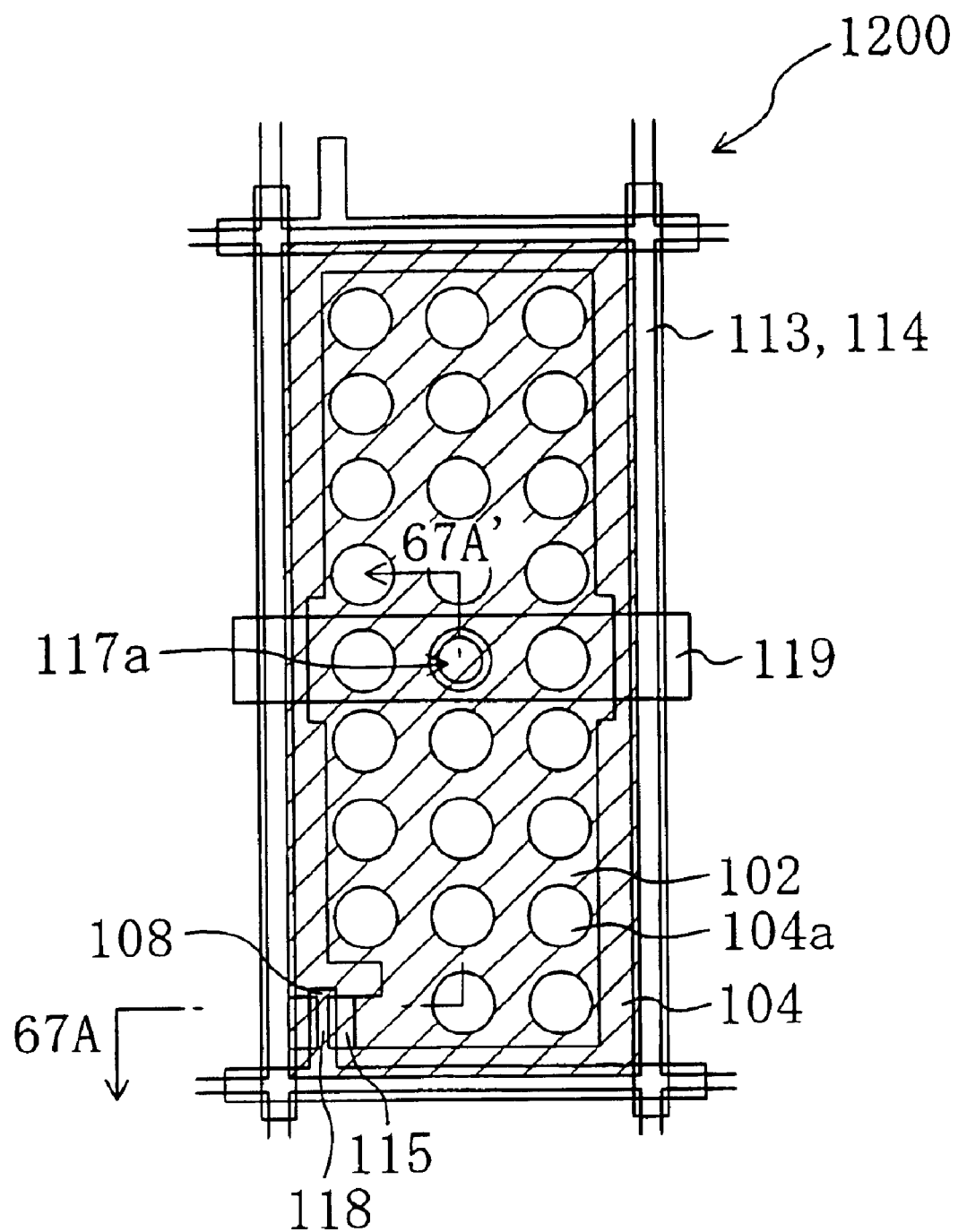

FIG. 66 is a plan view schematically illustrating a liquid crystal display device 1200 according to Example 7 of the present invention.

Figure 67:
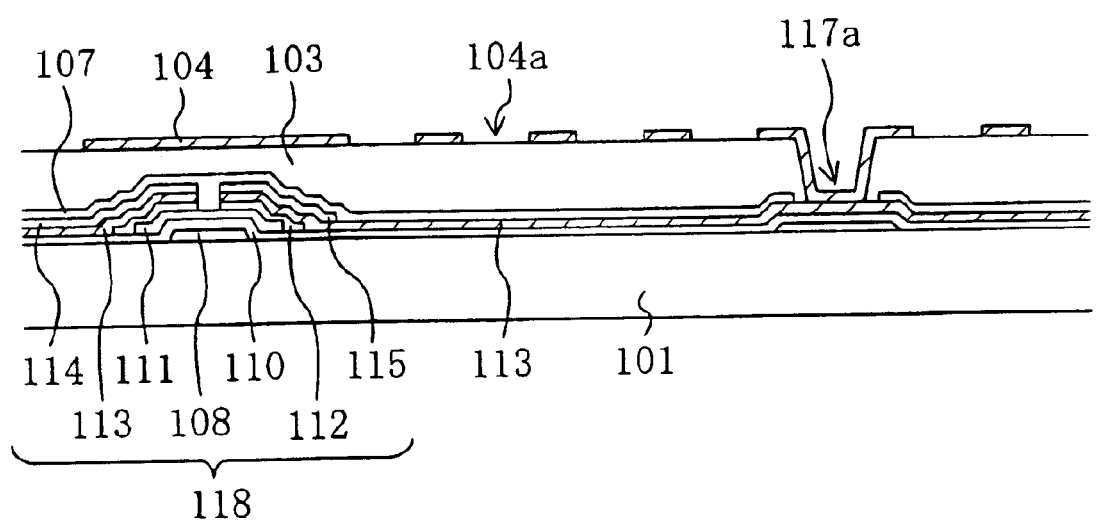

FIG. 67 is a cross-sectional view schematically illustrating the liquid crystal display device 1200 according to Example 7 of the present invention.

Figure 68:
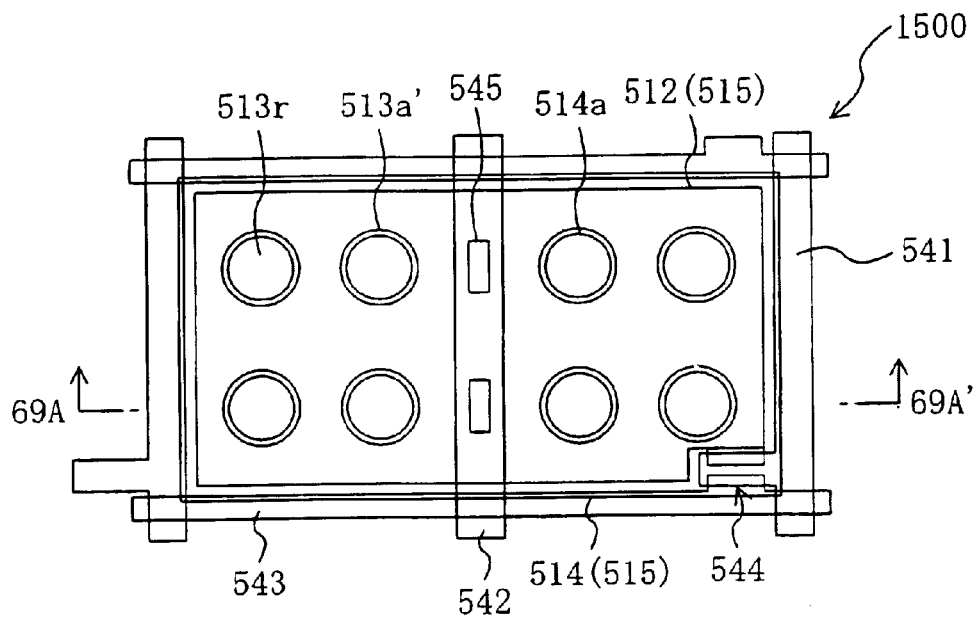

FIG. 68 is a plan view schematically illustrating a picture element region of a liquid crystal display device 1500 according to Example 8 of the present invention.

Figure 69:
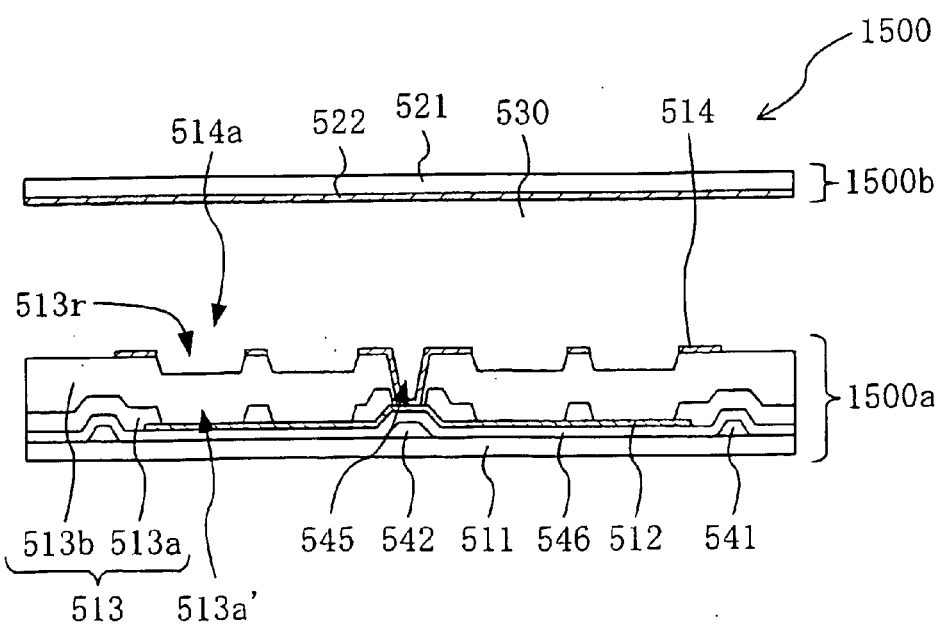

FIG. 69 is a cross-sectional view schematically illustrating a picture element region of the liquid crystal display device 1500 of Example 8.

Figure 70:
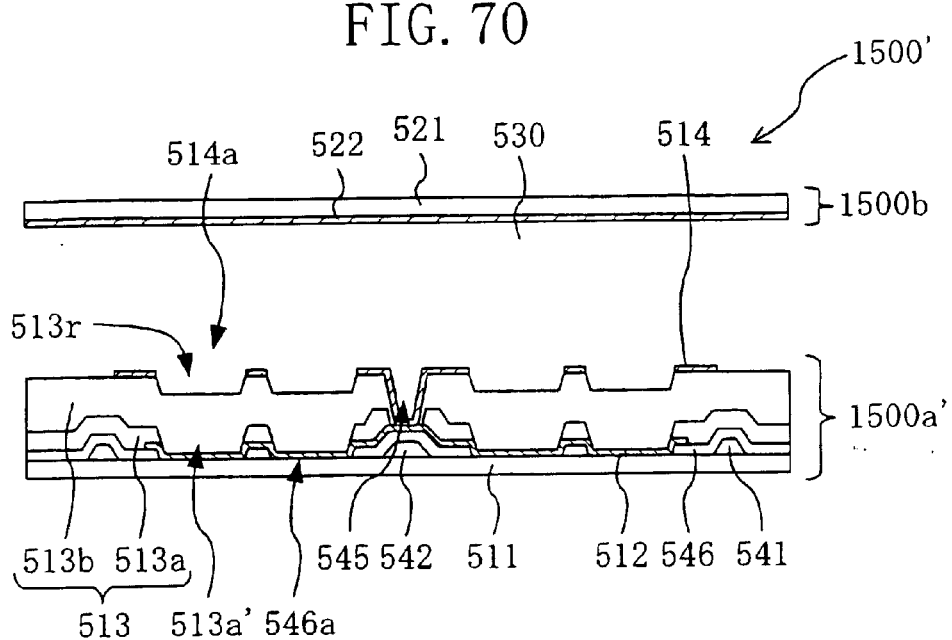

FIG. 70 is a cross-sectional view schematically illustrating a picture element region of a liquid crystal display device 1500' of Example 8.

Figure 71:
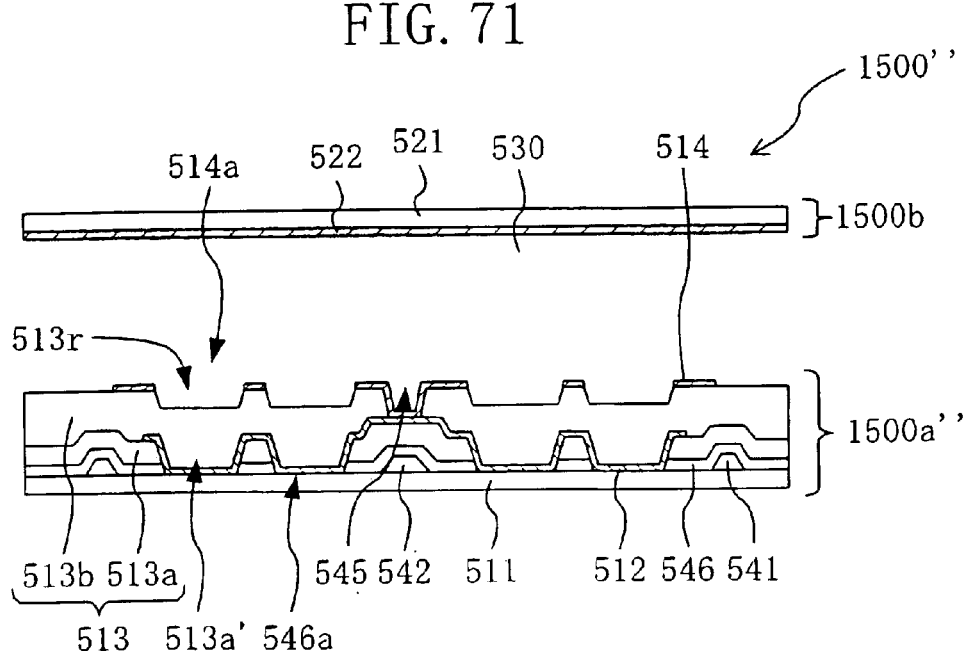

FIG. 71 is a cross-sectional view schematically illustrating a picture element region of a liquid crystal display device 1500" of Example 8.

FIG. 72A to FIG. 72E are cross-sectional views illustrating a production process of a TFT substrate 1500a of the liquid crystal display device 1500 of Example 8.

FIG. 73A to FIG. 73E are cross-sectional views illustrating a production process of a TFT substrate 1500a' of the liquid crystal display device 1500' of Example 8.

FIG. 74A to FIG. 74E are cross-sectional views illustrating a production process of a TFT substrate 1500a" of the liquid crystal display device 1500' of Example 8.

Figure 75:
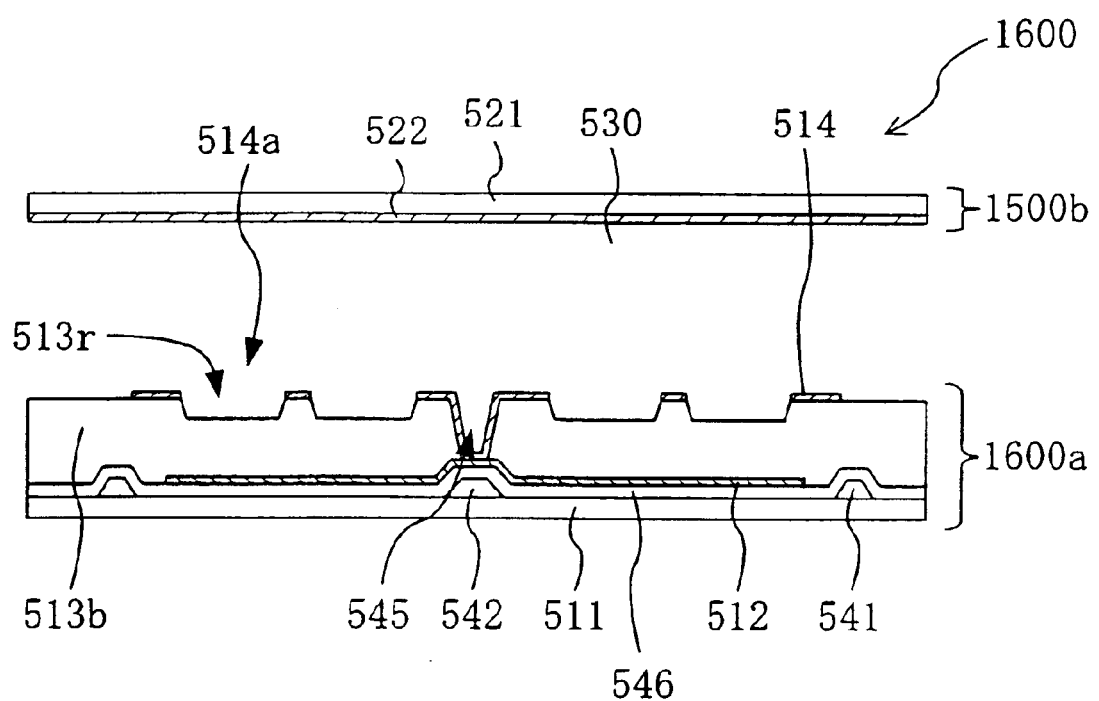

FIG. 75 is a cross-sectional view schematically illustrating a picture element region of a liquid crystal display device 1600 of Example 9.

FIG. 76A to FIG. 76E are cross-sectional views illustrating a production process of a TFT substrate 1600a of the liquid crystal display device 1600 of Example 9.

DETAILED DESCRIPTION OF THE INVENTION

Hereinafter, preferred embodiments of the present invention will be described with reference to the accompanying drawings, in which the same reference numerals denote the same components throughout the following embodiments.

Embodiment 1

First, the electrode structure of the liquid crystal display device of the present invention and the function thereof will be described. The liquid crystal display device of the present invention has desirable display characteristics and is therefore suitably used as an active matrix type liquid crystal display device. While the preferred embodiments of the present invention will be hereinafter described with respect to an active matrix type liquid crystal display device using thin film transistors (TFTs), the present invention can alternatively be used with an active matrix type liquid crystal display device using an MIM (metal-insulator-metal) structure, or a passive matrix type liquid crystal display device. Moreover, while the preferred embodiments of the present invention will be described with respect to a transmission type liquid crystal display device, the present invention can alternatively be used with a reflection type liquid crystal display device or even with a transmission-reflection type liquid crystal display device which will be described below.

In the present specification, a region of a liquid crystal display device corresponding to a "picture element", which is the minimum unit of display, will be referred to as a "picture element regions". In a color liquid crystal display device, R, G and B "picture elements" correspond to one "pixel". In an active matrix type liquid crystal display device, a picture element region is defined by a picture element electrode and a counter electrode which opposes the picture element electrode. In a passive matrix type liquid crystal display device, a picture element region is defined as a region where one of column electrodes which are arranged in a stripe pattern crosses one of row electrodes which are also arranged in a stripe pattern perpendicular to the column electrodes. In an arrangement with a black matrix, strictly speaking, a picture element region is a portion of each region across which a voltage is applied according to the intended display state which corresponds to an opening of the black matrix.

Figure 1A:
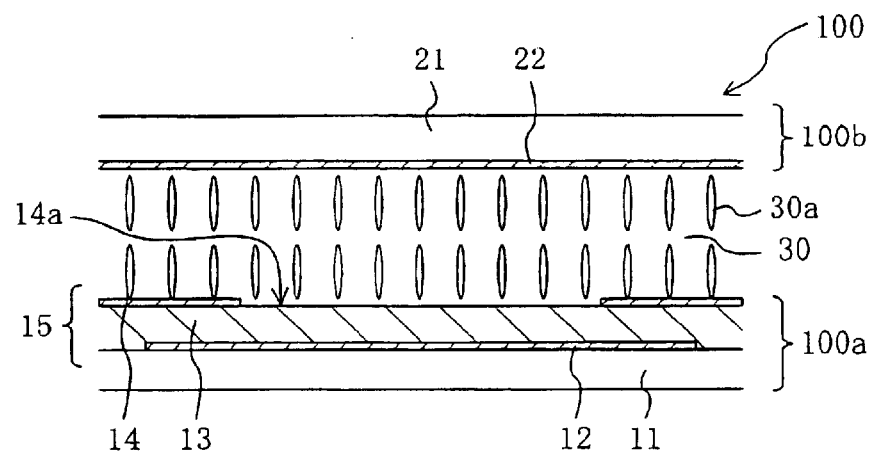
Figure 1B:
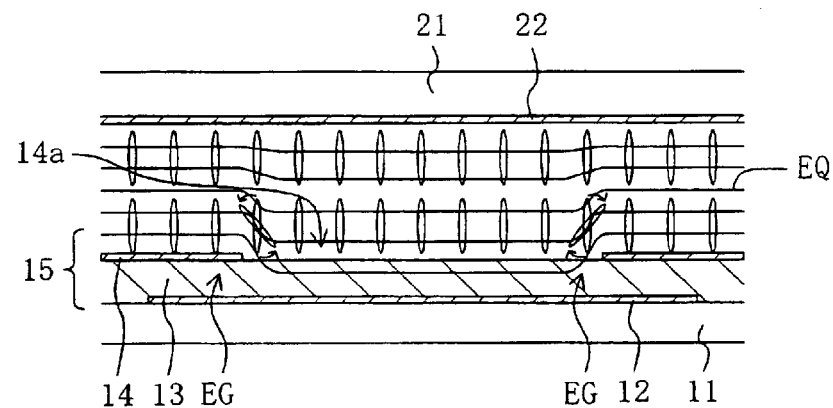
Figure 1C:
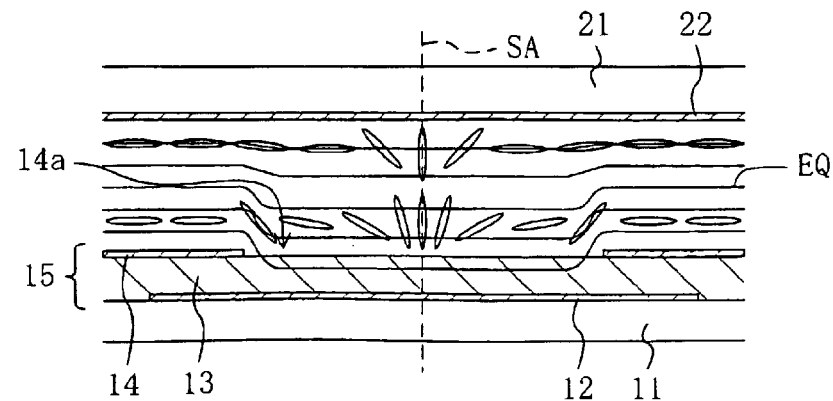

Each of FIG. 1A to FIG. 1C schematically illustrates a cross section of one picture element region of a liquid crystal display device 100 according to one embodiment of the present invention. In the following description, a color filter and a lack matrix are omitted for the sake of simplicity. Moreover, in subsequent figures, each element having substantially the same function as the corresponding element in the liquid crystal display device 100 will be denoted by the same reference numeral and will not be further described below. While FIG. 1A to FIG. 1C show one picture element region of the liquid crystal display device 100 for the sake of simplicity, the liquid crystal display device of the present invention may include at least one such electrode structure as illustrated in FIG. 1A to FIG. 1C in each picture element region, as will be more fully described later.

The liquid crystal display device 100 includes an active matrix substrate (hereinafter, referred to as a "TFT substrate") 110a, a counter substrate (referred to also as a "color filter substrate") 100b, and a liquid crystal layer 30 provided between the TFT substrate 100a and the counter substrate 100b. Liquid crystal molecules 30a of the liquid crystal layer 30 have a negative dielectric anisotropy, and are aligned vertical to the surface of the vertical alignment film, as illustrated in FIG. 1A, in the absence of an applied voltage across the liquid crystal layer 30 by virtue of a vertical alignment layer (not shown) which is provided on one surface of each of the TFT substrate 100a and the counter substrate 100b which is closer to the liquid crystal layer 30. This state is described as the liquid crystal layer 30 being in a vertical alignment. Note, however, that the liquid crystal molecules 30a of the liquid crystal layer 30 in a vertical alignment may slightly incline from the normal to the surface of the vertical alignment film (the surface of the substrate) depending upon the type of vertical alignment film or the type of liquid crystal material used. Generally, a vertical alignment is defined as a state where the axis of the liquid crystal molecules (referred to also as the "axial orientation") is oriented at an angle of about 85° or more with respect to the surface of the vertical alignment film.

The TFT substrate 100a of the liquid crystal display device 100 includes a transparent substrate (e.g., a glass substrate) 11 and a picture element electrode 15 provided on the surface of the transparent substrate 11. The counter substrate 100b includes a transparent substrate (e.g. a glass substrate) 21 and a counter electrode 22 provided on the surface of the transparent substrate 21. The orientation of the liquid crystal layer 30 changes for each picture element region according to the voltage applied between the picture element electrode 15 and the counter electrode 22 which are arranged so as to oppose each other via the liquid crystal layer 30. A display is produced by utilizing a phenomenon that the polarization or amount of light passing through the liquid crystal layer 30 changes along with the change in the orientation of the liquid crystal layer 30.

The picture element electrode 15 of the liquid crystal display device 100 includes a lower conductive layer 12, a dielectric layer 13 covering at least a portion of the lower conductive layer 12, and an upper conductive layer 14 provided on one side of the dielectric layer 13 which is closer to the liquid crystal layer 30. In the liquid crystal display device 100 illustrated in FIG. 1A to FIG. 1C, the lower conductive layer 12 is provided so as to entirely cover the region of the substrate 11 opposing an opening 14a (area of the lower conductive layer 12>area of the opening 14a).

The structure of the picture element electrode 15 of the liquid crystal display device of the present embodiment is not limited to the illustrated example. Alternatively, the lower conductive layer 12 may be provided so as to cover only the region of the substrate 11 opposing the opening 14a (area of the lower conductive layer 12 area of the opening 14a), as in a liquid crystal display device 100' illustrated in FIG. 2A. Alternatively, the lower conductive layer 12 may be provided so as to cover a smaller region within the region of the substrate 11 opposing the opening 14a (area of the lower conductive layer 12<area of the opening 14a), as in a liquid crystal display device 100' illustrated in FIG. 2B. Thus, the structure of the lower conductive layer 12 is not limited to any particular structure as long as the lower conductive layer 12 opposes at least a portion of the opening 14a via the dielectric layer 13. However, when the lower conductive layer 12 is provided so as to cover a smaller region within the region of the substrate 11 opposing the opening 14a (FIG. 2B), there is a region (gap region) in the plane of the substrate 11 in which neither the lower conductive layer 12 nor the upper conductive layer 14 is present as viewed in the normal direction (or "substrate normal direction", i.e., the direction normal to the substrate plane). A sufficient voltage may not be applied across the liquid crystal layer 30 in the region opposing the gap region. In order to stabilize the orientation of the liquid crystal layer 30, it is preferred that the width of the gap region (WS in FIG. 2B) is sufficiently reduced. Typically, it is preferred that WS does not exceed about 4 $\mu$m.

The picture element electrode 15 including the lower conductive layer 12 and the upper conductive layer 14 is referred to also as a "two-layer electrode". The terms "lower layer" and "upper layer" are used herein merely to describe the structure of the two electrode, the lower conductive layer 12 and the upper conductive layer 14, with respect to the dielectric layer 13, and the terms are not to limit the placement of the liquid crystal display device in use. Moreover, the term "two-layer electrode" is not to exclude a structure having any electrodes) other than the lower conductive layer 12 and the upper conductive layer 14, and the term refers to any electrode structure as long as it includes at least the lower conductive layer 12 and the upper conductive layer 14 and has the function which will be described below. Moreover, the two-layer electrode does not have to be a picture element electrode in a TFT type liquid crystal display device, and may alternatively be used with any other type of liquid crystal display device as long as it includes a two-layer electrode for each picture element region. More specifically, if, for example, a column electrode (signal electrode) in a passive matrix type liquid crystal display device has a two-layer structure for each picture element region, the column electrode in each picture element region will function as the two-layer electrode as used herein.

Next, referring to FIG. 1A to FIG. 1C, FIG. 3A to FIG. 3C and FIG. 4A to FIG. 4C, the operation of the liquid crystal display device including the two-layer electrode will be described in comparison with the operation of a liquid crystal display device having a different electrode structure.

First, the operation of the liquid crystal display device 100 will be described with reference to FIG. 1A to FIG. 1C.

FIG. 1A schematically illustrates an orientation of the liquid crystal molecules 30a in the liquid crystal layer 30 in the absence of an applied voltage (OFF state). FIG. 18 schematically illustrates a state where the orientation of the liquid crystal molecules 30a has just started to change (initial ON state) according to the voltage applied across the liquid crystal layer 30. FIG. 1C schematically illustrates a state where the orientation of the liquid crystal molecules 30a which has changed and become steady according to the applied voltage. FIG. 1A to FIG. 1C illustrate an example where the same voltage is applied across the lower conductive layer 12 and the upper conductive layer 14 of the picture element electrode 15 for the sake of simplicity. Curves EQ in FIG. 1B and FIG. 1c denote equipotential lines.

As illustrated in FIG. 1A, when the picture element electrode 15 and the counter electrode 22 are at the same potential (a state where no voltage is applied across the liquid crystal layer 30), the liquid crystal molecules 30a in each picture element region are aligned vertical to the surfaces of the substrates 11 and 21.

When a voltage is applied across the liquid crystal layer 30, a potential gradient represented by the equipotential lines EQ shown in FIG. 1B (perpendicular to the electric force line) is produced. A uniform potential gradient represented by equipotential lines EQ parallel to the surfaces of the upper conductive layer 14 and the counter electrode 22 is produced in the liquid crystal layer 30 in a region between the upper conductive layer 14 of the picture element electrode 15 and the counter electrode 22. A potential gradient according to the potential difference between the lower conductive layer 12 and the counter electrode 22 is produced in a region of the liquid crystal layer 30 located above the opening 14a of the upper conductive layer 14. The potential gradient produced in the liquid crystal layer 30 is influenced by a voltage drop (capacitance division) due to the dielectric layer 13, whereby the equipotential lines EQ in the liquid crystal layer 30 drop in a region corresponding to the opening 14a (creating a "trough" in the equipotential lines EQ). A portion of an equipotential line EQ being drawn into the dielectric layer 13 in a region corresponding to the opening 14a indicates that a voltage drop (capacitance division) has occurred due to the dielectric layer 13. Since the lower conductive layer 12 is provided in a region opposing the opening 14a via the dielectric layer 13, the liquid crystal layer 30 around the central portion of the opening 14a also has a potential gradient which is represented by a portion of the equipotential lines EQ parallel to the plane of the upper conductive layer 14 and the counter electrode 22 ("the bottom of the trough" of the equipotential lines EQ). An inclined electric field represented by an inclined portion of the equipotential lines EQ is produced in the liquid crystal layer 30 above an edge portion EG of the opening 14a (the peripheral portion of and within the opening 14a including the boundary thereof).

A torque acts upon the liquid crystal molecules 30a having a negative dielectric anisotropy so as to direct the axial orientation of the liquid crystal molecules 30a to be parallel to the equipotential lines EQ (perpendicular to the electric force line). Therefore, the liquid crystal molecules 30a above the right edge portion EG in FIG. 1B incline (rotate) clockwise and the liquid crystal molecules 30a above the left edge portion EG incline (rotate) counterclockwise as indicated by arrows in FIG. 1B. As a result, the liquid crystal molecules 30a above the edge portions EG are oriented parallel to the corresponding portions of the equipotential lines EQ.

Referring to FIG. 5A to FIG. 5D, the change in the orientation of the liquid crystal molecules 30a will now be described in greater detail.

Figure 5A:
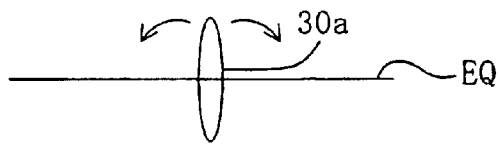

When an electric field is produced in the liquid crystal layer 30, a torque acts upon the liquid crystal molecules 30a having a negative dielectric anisotropy so as to direct the axial orientation thereof to be parallel to an equipotential line EQ. As illustrated in FIG. 5A, when an electric field represented by an equipotential line EQ perpendicular to the axial orientation of the liquid crystal molecule 30a is produced, either a torque urging the liquid crystal molecule 30a to incline clockwise or a torque urging the liquid crystal molecule 30a to incline counterclockwise occurs with the same probability. Therefore, as will be described later with reference to FIG. 3A to FIG. 3C, the liquid crystal layer 30 between the pair of parallel plate-shape electrodes opposing each other has some liquid crystal molecules 30a which are subject to a clockwise torque and some other liquid crystal molecules 30a which are subject to a counterclockwise torque. As a result, the transition to the intended orientation according to the voltage applied across the liquid crystal layer 30 may not proceed smoothly.

Figure 5B:
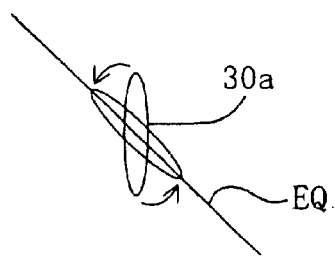
Figure 5C:
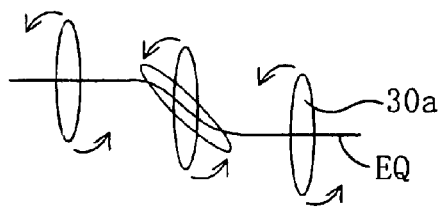
Figure 5D:
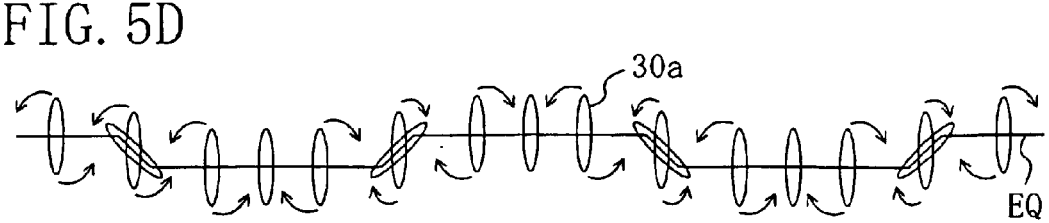

When an electric field represented by a portion of the equipotential lines EQ inclined with respect to the axial orientation of the liquid crystal molecules 30a (an inclined electric field) is produced at the edge portion EG of the opening 14a of the liquid crystal display device 100 of the present invention, as illustrated in FIG. 1B, the liquid crystal molecules 30a incline in whichever direction (the counterclockwise direction in the illustrated example) that requires less rotation for the liquid crystal molecules 30a to be parallel to the equipotential line EQ, as illustrated in FIG. 5B. The liquid crystal molecules 30a in a region where an electric field represented by an equipotential line EQ perpendicular to the axial orientation of the liquid crystal molecules 30a is produced incline in the same direction as the liquid crystal molecules 30a located on the inclined portion of the equipotential lines EQ so that the orientation thereof is continuous (in conformity) with the orientation of the liquid crystal molecules 30a located on the inclined portion of the equipotential lines EQ as illustrated in FIG. 5C. The phrase "being located on an equipotential line EQ" as used herein means "being located within an electric field which is represented by the equipotential line EQ".

The change in the orientation of the liquid crystal molecules 30a, starting from those which are located on the inclined portion of the equipotential lines EQ, proceeds as described above and reaches a steady state, which is schematically illustrated in FIG. 1C. The liquid crystal molecules 30a located around the central portion of the opening 14a are influenced substantially equally by the respective orientations of the liquid crystal molecules 30a at the opposing edge portions EG of the opening 14a, and therefore retain their orientation perpendicular to the equipotential lines EQ. The liquid crystal molecules 30a away from the center of the opening 14a incline by the influence of the orientation of other liquid crystal molecules 30a at the closer edge portion EG, thereby forming an inclined orientation which is symmetric about the center SA of the opening 14a. The orientation as viewed in a direction perpendicular to the display plane of the liquid crystal display device 100 (a direction perpendicular to the surfaces of the substrates 11 and 21) is a state where the liquid crystal molecules 30a have a radial axial orientation (not shown) about the center of the opening 14a. In the present specification, such an orientation will be referred to as a "radially-inclined orientation".

In order to improve the viewing angle dependence in all azimuthal angles, the orientation of the liquid crystal molecules in each picture element region preferably has rotational symmetry about an axis perpendicular to the display plane, and more preferably axial symmetry. Therefore, the opening 14a is preferably arranged so that the orientation of the liquid crystal layer 30 in each picture element region has rotational symmetry (or axial symmetry). When one opening 14a is provided for each picture element region, the opening 14a is preferably provided at the center of the picture element region. Moreover, the shape of the opening 14a (the shape in the layer plane of the liquid crystal layer 30) preferably has rotational symmetry (axial symmetry). Preferably, the shape of the opening 14a is a regular polygon such as a square, or a circle. A structure where a plurality of openings 14a are provided for each picture element region will be described later.

Figure 2A:
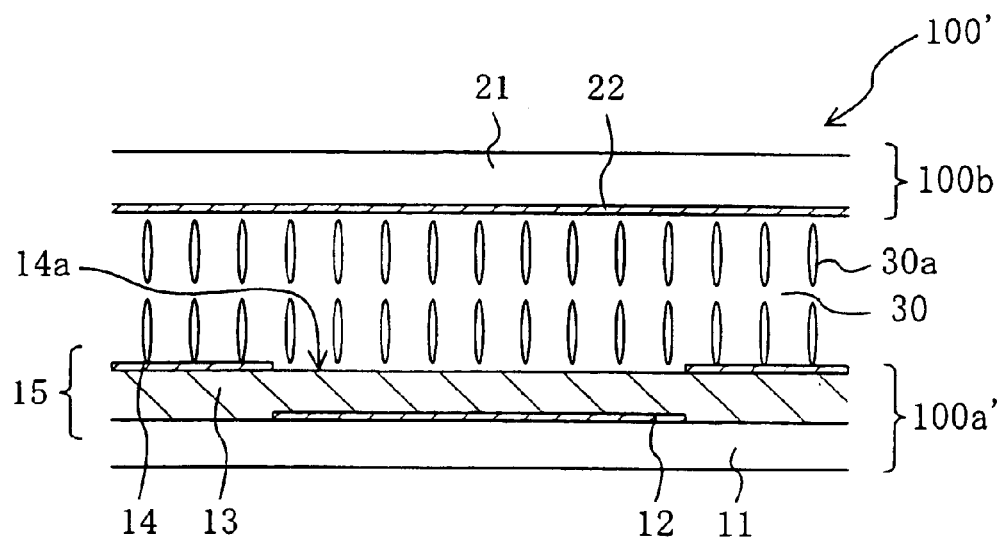
FIG. 2B is a cross-sectional view schematically illustrating a picture element region of other liquid crystal display devices 100' and 100", respectively, according to one embodiment of the present invention.
Figure 2B:
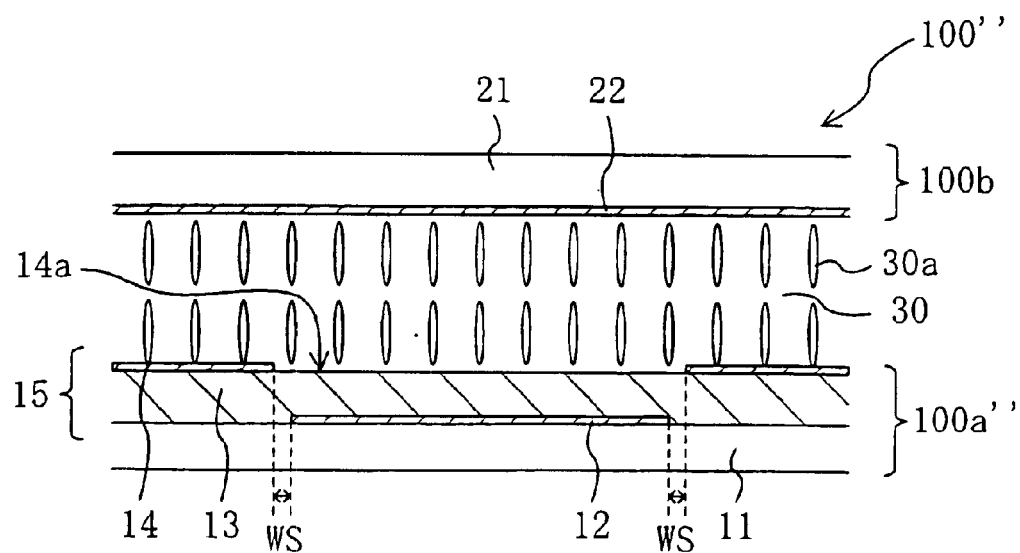

As described above with reference to FIG. 1A to FIG. 1C, the liquid crystal display device 100 of the present invention includes the two-layer electrode 15 for each picture element region, and an electric field represented by equipotential lines EQ having an inclined region is produced in the liquid crystal layer 30 in the picture element region. The liquid crystal molecules 30a having a negative dielectric anisotropy in the liquid crystal layer 30, which are in a vertical alignment in the absence of an applied voltage, change their orientation, starting from the change in the orientation of the liquid crystal molecules 30a located on the inclined portion of the equipotential lines EQ (the change in the orientation of those liquid crystal molecules 30a serves as a trigger), and eventually form a stable radially-inclined orientation. Of course, the liquid crystal display device 100' and the liquid crystal display device 100", as illustrated in FIG. 2A and FIG. 2B, respectively, operate in a similar manner. If, however, the gap region WS in the structure of FIG. 2B is excessively large (e.g., greater than about 4 μm), a sufficient voltage may not be applied to the edge portion of the opening 14a, whereby the region does not contribute to the display.

Next, the operation of a typical conventional liquid crystal display device 200 will be described with reference to FIG. 3A to FIG. 3C, which schematically illustrate one picture element region of the liquid crystal display device 200.

The liquid crystal display device 200 includes a picture element electrode 15A and a counter electrode 22 which are arranged so as to oppose each other. The picture element electrode 15A and the counter electrode 22 are each made of a single conductive layer which does not have the opening 14a.

As illustrated in FIG. 3A, the liquid crystal layer 30 takes a vertical alignment in the absence of an applied voltage across the liquid crystal layer 30.

The electric field produced by application of a voltage across the liquid crystal layer 30 is represented by equipotential lines EQ which are parallel to the surfaces of the picture element electrode 15A and the counter electrode 22 across the entire picture element region, as illustrated in FIG. 3B. The liquid crystal molecules 30a are urged to change their orientation direction so that the axial orientation thereof is parallel to the equipotential lines EQ. However, under the electric field in which the equipotential lines EQ are perpendicular to the axial orientation of the liquid crystal molecules 30a, the direction in which the liquid crystal molecules 30a are to incline (rotate) is not uniquely defined, as illustrated in FIG. 5A. In such a case, the liquid crystal molecules 30a would typically start inclining in various directions, being influenced by the local surface configurations of the vertical alignment film. As a result, the liquid crystal molecules 30a have different orientations in different picture element regions, whereby the liquid crystal display device 200 produces a non-uniform display. Moreover, as compared to the above-described liquid crystal display device 100 of the present invention, it requires a longer time for the orientation of the liquid crystal layer 30 to reach a steady state as illustrated in FIG. 3C.

Thus, the liquid crystal display device 100 of the present invention is capable of producing a high-quality display without non-uniformity and has a higher response speed as compared to the conventional liquid crystal display device 200.

Next, the operation of a liquid crystal display device 300 having an opening 15b in a picture element electrode 15B will be described with reference to FIG. 4A to FIG. 4C. The picture element electrode 15B is different from the picture element electrode 15 of the liquid crystal display device of the present invention in that the former is made of a single electrode having the opening 15b and does not have the lower conductive layer 12 (see, for example, FIG. 1A to FIG. 1C). The liquid crystal display device 300 produces an inclined electric field in the liquid crystal layer 30 as does the liquid crystal display device having the opening 14a in the counter electrode which is disclosed in Japanese Laid-Open Patent Publication No. 6-301036 mentioned above.

The liquid crystal layer 30 of the liquid crystal display device 300 takes a vertical alignment in the absence of an applied voltage, as illustrated in FIG. 4A. The orientation of the liquid crystal layer 30 in the absence of an applied voltage is the same as that of the liquid crystal display device of the present invention (FIG. 1A to FIG. 1C and FIG. 2A and FIG. 2B) or that of the typical conventional liquid crystal display device (FIG. 3A to FIG. 3C).

When a voltage is applied across the liquid crystal layer 30, an electric field represented by equipotential lines EQ shown in FIG. 4B is produced therein. Since the picture element electrode 15B includes the opening 15b as does the picture element electrode 15 of the liquid crystal display device 100 of the present embodiment (see, for example, FIG. 1A to FIG. 1C), the equipotential lines EQ produced in the liquid crystal layer 30 of the liquid crystal display device 300 drop in a region corresponding to the opening 15b, thereby producing an inclined electric field represented by the inclined portion of the equipotential lines EQ in the liquid crystal layer 30 above the edge portion EG of the opening 15b. However, since the picture element electrode 15B is made of a single conductive layer and does not have a lower conductive layer (at the same potential as that of the picture element electrode) in the region corresponding to the opening 15b, there is a region in which no electric field is produced in the liquid crystal layer 30 above the opening 15b (a region in which no equipotential line EQ is drawn).

The liquid crystal molecules 30a having a negative dielectric anisotropy which is placed under such an electric field behave as follows. First, the liquid crystal molecules 30a above the right edge portion EG of the opening 15b incline (rotate) clockwise and those above the left edge portion EG incline (rotate) counterclockwise, as indicated by an arrow in FIG. 4B, until they reach their respective orientations parallel to the equipotential lines EQ. This is the same behavior as that of the liquid crystal molecules 30a in the liquid crystal display device 100 of the present embodiment described above with reference to FIG. 1B, and the inclination (rotation) direction of the liquid crystal molecules 30a in the vicinity of the edge portion EG is uniquely defined, whereby realizing a stable orientation change.

However, since no electric field is produced in the liquid crystal layer 30 in the region above the opening 15b excluding the edge portion EG, there is no torque urging the orientation thereof to change. As a result, after a sufficient amount of time has elapsed and the orientation change of the liquid crystal layer 30 has reached a steady state, the liquid crystal layer 30 in the region above the opening 15b excluding the edge portion EG remains in a vertical alignment as illustrated in FIG. 4C. Of course, some of those liquid crystal molecules 30a change their orientation by the influence of the orientation change of other liquid crystal molecules 30a in the vicinity of the edge portion EG. Still, such an influence cannot change the orientation of all the liquid crystal molecules 30a in the liquid crystal layer 30 above the opening 15b. While the distance from the edge of the opening 15b such an influence can be effective on the liquid crystal molecules 30a depends upon the thickness of the liquid crystal layer 30 and the physical properties of the liquid crystal material (e.g., the magnitude of the dielectric anisotropy, and the modulus of elasticity), the liquid crystal molecules 30a around the central portion of the opening 15b do not change their orientation by an electric field but remain in a vertical alignment when the distance between two regions where the conductive layer actually exists (referred to also as "solid portions") which lie adjacent to each other via the opening 15b is greater than about 4 μm. Thus, the region in the liquid crystal layer 30 of the liquid crystal display device 300 located above the opening 15b does not contribute to the display, thereby deteriorating the display quality. In a normally black display mode, for example, the effective aperture ratio decreases, thereby decreasing the display brightness.

As described above, in the liquid crystal display device 300, the direction in which the orientation of the liquid crystal molecules 30a changes is uniquely defined by the inclined electric field produced in the picture element electrode 15B having the opening 15b, whereby it is possible to prevent the display non-uniformity which occurs in the typical conventional liquid crystal display device 200. However, in the liquid crystal display device 300, the brightness is low. In contrast, since the liquid crystal display device 100 of the present embodiment includes the upper conductive layer 14 having the opening 14a and the lower conductive layer 12 provided so as to oppose the opening 14a, the electric field can act upon substantially the entire region of the liquid crystal layer 30 located above the opening 14a, whereby the region can contribute to the display. Therefore, the liquid crystal display device 100 of the present embodiment is capable of realizing a high-quality display with a high brightness and without non-uniformity.

The shape of the opening 14a (as viewed in the substrate normal direction) of the upper conductive layer 14 of the two-layer electrode (picture element electrode) 15 provided in the liquid crystal display device of the present embodiment will be described. The shape of the opening 14a may be a polygon, a circle, or an ellipse.

The display characteristics of a liquid crystal display device exhibit an azimuthal angle dependence due to the orientation (optical anisotropy) of the liquid crystal molecules. In order to reduce the azimuthal angle dependence of the display characteristics, it is preferred that the liquid crystal molecules are oriented in all azimuthal angles with substantially the same probability. More preferably, the liquid crystal molecules in each picture element region are oriented in all azimuthal angles with substantially the same probability. Therefore, the opening 14a preferably has a shape such that the liquid crystal molecules in each picture element region are oriented in all azimuthal angles with substantially the same probability. More specifically, the shape of the opening 14a preferably has rotational symmetry about a symmetry axis extending through the center of each picture element region in the normal direction. More preferably, the shape of the opening 14a has a high-order rotation axis, e.g., at least a two-fold rotation axis.

The orientation of the liquid crystal molecules 30a when the opening 14a has a polygonal shape will be described with reference to FIG. 6A to FIG. 6c. Each of FIG. 6A to FIG. 6C schematically illustrates the orientation of the liquid crystal molecules 30a as viewed in the substrate normal direction. In figures, such as FIG. 6B and FIG. 6C, illustrating the orientation of the liquid crystal molecules 30a as viewed in the substrate normal direction, a black-spotted end of the liquid crystal molecule 30a drawn as an ellipse indicates that the liquid crystal molecule 30a is inclined so that the end is closer than the other end to the substrate on which the two-layer electrode having the opening 14a is provided. This similarly applies to all of the subsequent figures.

An exemplary structure where the opening 14a having a rectangular shape (including a square and an oblong rectangle) is provided so as to conform with a rectangular picture element region will be described below. Cross-sectional views taken along line 1A–1A' of FIG. 6A, line 1B–1B' of FIG. 6B and line 1C–1C' of FIG. 6C correspond to FIG. 1A to FIG. 1C, respectively, and FIG. 1A to FIG. 1C will also be referred to in the following description. Of course, the shape of the picture element region (picture element electrode 15) is not limited to the illustrated example.

When the picture element electrode 15, including the lower conductive layer 12 and the upper conductive layer 14, and the counter electrode 22 are at the same potential, i.e., in a state where no voltage is applied across the liquid crystal layer 30, the liquid crystal molecules 30a whose orientation direction is regulated by the vertical alignment layer (not shown) which is provided on one side of each of the TFT substrate 10a and the counter substrate 100b which is closer to the liquid crystal layer 30 take a vertical alignment as illustrated in FIG. 6A.

When an electric field is applied across the liquid crystal layer 30, thereby producing an electric field represented by equipotential lines EQ shown in FIG. 1A, a torque is produced urging the axial orientation of the liquid crystal molecules 30a having a negative dielectric anisotropy to be parallel to the equipotential lines EQ. As described above with reference to FIG. 5A and FIG. 5B, for the liquid crystal molecules 30a under an electric field represented by equipotential lines EQ perpendicular to the molecular axis of the liquid crystal molecules 30a, the direction in which the liquid crystal molecules 30a are to incline (rotate) is not uniquely defined (FIG. 5A), whereby the change in the orientation (inclination or rotation) does not easily occur. In contrast, for the liquid crystal molecules 30a under equipotential lines EQ inclined with respect to the molecular axis of the liquid crystal molecules 30a, the direction of inclination (rotation) is uniquely defined, whereby the change in the orientation easily occurs. In the structure illustrated in FIG. 6A to FIG. 6C, the liquid crystal molecules 30a incline, starting from those along the four edge portions of the rectangular opening 14a of the upper conductive layer 14 where the molecular axis of the liquid crystal molecules 30a is inclined with respect to the equipotential lines EQ. Then, the surrounding liquid crystal molecules 30a incline so as to conform with the orientation of the already-inclined liquid crystal molecules 30a at the edge portion of the opening 14a, as described above with reference to FIG. 5C. Then, the axial orientation of the liquid crystal molecules 30a becomes stable as illustrated in FIG. 6C (radially-inclined orientation).

As described above, when the opening 14a of the upper conductive layer 14 is in the form of a rectangle, not a slit (a shape whose width is significantly smaller than its length (perpendicular to the width)), the liquid crystal molecules 30a in the picture element region successively incline, starting from the four edge portions of the opening 14a toward the center of the opening 14a upon application of a voltage. As a result, there is obtained an orientation in which the liquid crystal molecules 30a around the center of the opening 14a, where the respective orientation-regulating forces from the liquid crystal molecules 30a at the edge portions are in equilibrium, remain in a vertical alignment with respect to the substrate plane, while the surrounding liquid crystal molecules 30a are inclined in a radial pattern about those liquid crystal molecules 30a around the center of the opening 14a, with the degree of inclination gradually increasing away from the center of the opening 14a. If the liquid crystal molecules 30a in each picture element region take a radially-inclined orientation as described above, the liquid crystal molecules 30a of various axial orientations are present with substantially the same probability for all viewing angles (including azimuthal angles), whereby it is possible to realize a high-quality display without non-uniformity for all viewing angles.

Moreover, when the shape of the opening 14a is a square, which has a high degree of rotational symmetry (with a four-fold rotation axis), the degree of symmetry of the radially-inclined orientation of the liquid crystal molecules 30a about the symmetry axis at the center of the opening 14a is higher than that when the shape of the opening 14a is a rectangle, which has a low degree of rotational symmetry (with a two-fold rotation axis), whereby it is possible to realize a desirable display with even less non-uniformity for changes in the viewing angle. While a rectangle has been used as an example of the shape of the opening 14a in the above description, the shape of the opening 14a may be any other polygon, preferably a regular polygon with a high degree of rotational symmetry, as long as the liquid crystal molecules 30a inside the boundary of the opening 14a take a stable radially-inclined orientation in the presence of an applied voltage.

For the radially-inclined orientation of the liquid crystal molecules 30a, a radially-inclined orientation having a counterclockwise or clockwise spiral pattern as illustrated in FIG. 8B or FIG. 8C, respectively, is more stable than the simple radially-inclined orientation as illustrated in FIG. 8A. The spiral orientation as used herein refers to an orientation of the liquid crystal molecules in the plane of the liquid crystal layer (in the substrate plane). In a spiral orientation observed when a small amount of chiral agent is added to a liquid crystal material, the orientation direction of the liquid crystal molecules 30a does not substantially change in a herical pattern along the thickness of the liquid crystal layer 3G as in a normal twist orientation. In the spiral orientation, the orientation direction of the liquid crystal molecules 30a does not substantially change along the thickness of the liquid crystal layer 30 for a minute region. In other words, the orientation in a cross section (in a plane parallel to the layer plane) at any thickness of the liquid crystal layer 30 is as illustrated in FIG. 8B or FIG. 8C, with substantially no twist deformation along the thickness of the liquid crystal layer 30. For the opening 14a as a whole, however, there may be a certain degree of twist deformation.

When a material obtained by adding a chiral agent to a nematic liquid crystal material having a negative dielectric anisotropy is used, the liquid crystal molecules 30a take a radially-inclined orientation of a counterclockwise or clockwise spiral pattern about the opening 14a, as illustrated in FIG. 7A or FIG. 7B, respectively, in the presence of an applied voltage. Whether the spiral pattern is counterclockwise or clockwise is determined by the type of chiral agent used. Thus, by controlling the liquid crystal layer 30 in the opening 14a into a radially-inclined orientation of a spiral pattern in the presence of an applied voltage, the direction of the spiral pattern of the radially-inclined liquid crystal molecules 30a about other liquid crystal molecules 30a standing vertical to the substrate plane can be constant in all openings 14a, whereby it is possible to realize a uniform display without non-uniformity. Since the direction of the spiral pattern around the liquid crystal molecules 30a standing vertical to the substrate plane is definite, the response speed upon application of a voltage across the liquid crystal layer 30 is also improved.

Moreover, when a larger amount of chiral agent is added, the orientation of the liquid crystal molecules 30a changes in a herical pattern along the thickness of the liquid crystal layer 30, even in the liquid crystal layer of a spiral orientation with respect to a minute region thereof, as in a normal twist orientation.

In an orientation where the orientation of the liquid crystal molecules 30a does not change in a herical pattern along the thickness of the liquid crystal layer 30, the liquid crystal molecules 30a which are oriented perpendicular or parallel to the polarization axis of the polarizing plate do not give a phase difference to the incident light, whereby incident light passing through a region of such an orientation does not contribute to the transmittance. For example, when a picture element region producing a white display is observed in the liquid crystal display device where the polarizing plates are arranged in a crossed-Nicols state, a cross-shaped extinction pattern is clearly observed in the central portion of a liquid crystal domain being in a radially-inclined orientation.

In contrast, in an orientation where the orientation of the liquid crystal molecules 30a changes in a herical pattern along the thickness of the liquid crystal layer 30, the liquid crystal molecules 30a which are oriented perpendicular or parallel to the polarization axis of the polarizing plate also give a phase difference to the incident light, and the optical rotatory power can also be utilized, whereby incident light passing through a region of such an orientation also contributes to the transmittance. Thus, it is possible to obtain a liquid crystal display device capable of producing a bright display. For example, when a picture element region producing a white display is observed in the liquid crystal display device where the polarizing plates are arranged in a crossed-Nicols state, the cross-shaped extinction pattern in the central portion of a liquid crystal domain being in a radially-inclined orientation is unclear, thereby making the display as a whole brighter. The twist angle of the liquid crystal layer is preferably about 90° so as to efficiently improve the light efficiency due to the optical rotatory power.

The shape of the opening 14a is not limited to a polygon as described above, but may alternatively be a circle or an ellipse. The orientation of the liquid crystal molecules 30a when the shape of the opening 14a is a circle will be described with reference to FIG. 9A to FIG. 9C. Each of FIG. 9A to FIG. 9C schematically illustrates the orientation of the liquid crystal molecules 30a as viewed in the substrate normal direction. An exemplary structure where a rectangular picture element region is provided with a circular opening 14a will be described below. Cross-sectional views taken along line 1A–1A' of FIG. 9A, line 1B–1B' of FIG. 9B and line 1C–1C' of FIG. 9c correspond to FIG. 1A to FIG. 1C, respectively, and FIG. 1A to FIG. 1C will also be referred to in the following description.

When the picture element electrode 15, including the lower conductive layer 12 and the upper conductive layer 14, and the counter electrode 22 are at the same potential, i.e., in a state where no voltage is applied across the liquid crystal layer 30, the liquid crystal molecules 30a whose orientation direction is regulated by the vertical alignment layer (not shown) which is provided on one side of each of the TFT substrate 100a and the counter substrate 100b which is closer to the liquid crystal layer 30 take a vertical alignment as illustrated in FIG. 9A.

When an electric field is applied across the liquid crystal layer 30 so as to produce an electric field represented by equipotential lines EQ shown in FIG. 1A, a torque acts upon the liquid crystal molecules 30a having a negative dielectric anisotropy so as to direct the axial orientation thereof to be parallel to the equipotential lines EQ. As described above with reference to FIG. 5A and FIG. 5B, for the liquid crystal molecules 30a under an electric field represented by equipotential lines EQ perpendicular to the molecular axis thereof, the direction in which the liquid crystal molecules 30a are to incline (rotate) is not uniquely defined (FIG. 5A), whereby the orientation change (inclination or rotation) does not easily occur. In contrast, for the liquid crystal molecules 30a placed under equipotential lines EQ inclined with respect to the molecular axis of the liquid crystal molecules 30a, the direction of inclination (rotation) is uniquely defined, whereby the orientation change easily occurs. In the structure illustrated in FIG. 9A to FIG. 9C, the liquid crystal molecules 30a incline, starting from the edge portion along the circumference of the circular opening 14a of the upper conductive layer 14 where the molecular axis of the liquid crystal molecules 30a is inclined with respect to the equipotential lines EQ. Then, the surrounding liquid crystal molecules 30a incline so as to conform with the orientation of the already-inclined liquid crystal molecules 30a at the edge portion of the opening 14a, as described above with reference to FIG. 5C. Then, the axial orientation of the liquid crystal molecules 30a becomes stable as illustrated in FIG. 9C (radially-inclined orientation).

As described above, when the opening 14a of the upper conductive layer 14 is in the form of a circle, the liquid crystal molecules 30a in the picture element region successively incline, starting from the circumferential edge portion of the opening 14a toward the center of the opening 14a upon application of a voltage. As a result, there is obtained an orientation (radially-inclined orientation) in which those liquid crystal molecules 30a around the center of the opening 14a, where the respective orientation-regulating forces from the liquid crystal molecules 30a at the edge portion are in equilibrium, remain in a vertical alignment with respect to the substrate plane, while the surrounding liquid crystal molecules 30a are inclined in a radial pattern about those liquid crystal molecules 30a around the center of the opening 14a, with the degree of inclination gradually increasing away from the center of the opening 14a. When the shape of the opening 14a is a circle, as compared when it is a rectangle, the center of the radially-inclined orientation (the position of the liquid crystal molecules 30a oriented vertical to the substrate plane) is stably formed at the center of the opening 14a, whereby it is possible to realize a high-quality display without non-uniformity in all directions in the presence of an applied voltage.

It is believed that the effect that the center position of the radially-inclined orientation is stabilized, which is obtained when the shape of the opening 14a is a circle, is due to the fact that a circle has a high degree of rotational symmetry, and the edge of the circular opening 14a, which determines the inclination direction of the liquid crystal molecules 30a, is continuous. The effect of stabilizing the radially-inclined orientation due to the continuity of the edge of the opening 14a can also be obtained when the shape of the opening 14a is an ellipse (an oblong circle).

As described above with reference to FIG. 8A to FIG. 8C, the radially-inclined orientation of the liquid crystal molecules 30a can be more stabilized by giving a spiral pattern thereto. Therefore, it is preferred to employ a radially-inclined orientation of a counterclockwise or clockwise spiral pattern about the opening 14a, as illustrated in FIG. 10A or FIG. 10B, respectively. Particularly, when the opening 14a has a large area and the distance from a side of the opening 14a to the center thereof is long, it is preferred to give a spiral pattern because, in such a case, the orientation of the liquid crystal molecules 30a located in the opening 14a is less likely to be stable. A spiral pattern can be given to a radially-inclined orientation by, for example, adding a chiral agent to a liquid crystal material.

Structure with a Plurality of Openings

In the above, the structure and function of the two-layer electrode having an opening have been described with examples where one opening is provided for each picture element region. Alternatively, a plurality of openings may be provided for each picture element region. In the following description, a structure with a two-layer picture element electrode having a plurality of openings is used for each picture element region will be described.

When a plurality of openings are provided for each picture element region, each of the openings preferably has a shape having rotational symmetry as described above so that the liquid crystal molecules in the picture element region take a uniform orientation in all azimuthal angles, and it is more preferred that the arrangement of the plurality of openings has rotational symmetry. The structure and operation of an exemplary liquid crystal display device including a two-layer picture element electrode in which a plurality of openings are arranged so that the openings have rotational symmetry for each picture element region will be described below.

Each of FIG. 11A to FIG. 11C schematically illustrates a cross-sectional structure of one picture element region of a liquid crystal display device 400 including the picture element electrode 15 having a plurality of openings 14a (including 14a1 and 14a2). The liquid crystal display device 400 includes a TFT substrate 400a and a counter substrate 100b (substantially the same as the counter substrate 100b illustrated in FIG. 1A to FIG. 1C).

FIG. 11A schematically illustrates an orientation of the liquid crystal molecules 30a in the liquid crystal layer 30 in the absence of an applied voltage (OFF state). FIG. 11B schematically illustrates a state where the orientation of the liquid crystal molecules 30a has just started to change (initial ON state) according to the voltage applied across the liquid crystal layer 30. FIG. 11C schematically illustrates a state where the orientation of the liquid crystal molecules 30a which has changed and become steady according to the applied voltage. FIG. 11A to FIG. 11C respectively correspond to FIG. 1A to FIG. 1C illustrating the liquid crystal display device 100 including the picture element electrode 15 having only one opening 14a for each picture element region. In FIG. 11A to FIG. 1C, the lower conductive layer 12, which is provided so as to oppose the openings 14a1 and 14a2 via the dielectric layer 13, overlaps both of the openings 14al and 14a2 and also extends in a region between the openings 14al and 14a2 (a region where the upper conductive layer 14 exists). However, the arrangement of the lower conductive layer 12 is not limited to this, as long as the lower conductive layer 12 has the positional relationship with respect to the openings 14al and 14a2 as illustrated in FIG. 11A to FIG. 11C. The lower conductive layer 12 which is provided at a position such that it opposes the region where the conductive layer of the upper conductive layer 14 exists via the dielectric layer 13 has substantially no influence on the electric field applied across the liquid crystal layer 30. Therefore, such a lower conductive layer 12 may or may not be patterned.

As illustrated in FIG. 11A, when the picture element electrode 15 and the counter electrode 22 are at the same potential (a state where no voltage is applied across the liquid crystal layer 30), the liquid crystal molecules 30a in the picture element region are aligned vertical to the surfaces of the substrates 11 and 21.

When a voltage is applied across the liquid crystal layer 30, a potential gradient represented by equipotential lines EQ shown in FIG. 11B is produced. A uniform potential gradient represented by equipotential lines EQ parallel to the surfaces of the upper conductive layer 14 and the counter electrode 22 is produced in the liquid crystal layer 30 in a region between the upper conductive layer 14 of the picture element electrode 15 and the counter electrode 22. A potential gradient according to the potential difference between the lower conductive layer 12 and the counter electrode 22 is produced in regions of the liquid crystal layer 30 located above the openings 14al and 14a2 of the upper conductive layer 14. The potential gradient produced in the liquid crystal layer 30 is influenced by a voltage drop due to the dielectric layer 13, whereby the equipotential lines EQ in the liquid crystal layer 30 drop in regions corresponding to the openings 14al and 14a2 (creating a plurality of "troughs" in the equipotential lines EQ). Since the lower conductive layer 12 is provided in a region opposing the openings 14al and 14a2 via the dielectric layer 13, the liquid crystal layer 30 around the respective central portions of the openings 14al and 14a2 also has a potential gradient which is represented by a portion of the equipotential lines EQ parallel to the plane of the upper conductive layer 14 and the counter electrode 22 ("the bottom of the trough" of the equipotential lines EQ). An inclined electric field represented by an inclined portion of the equipotential lines EQ is produced in the liquid crystal layer 30 above an edge portion EG of each of the openings 14al and 14a2 (the peripheral portion of and within the opening including the boundary thereof).

A torque acts upon the liquid crystal molecules 30a having a negative dielectric anisotropy so as to direct the axial orientation of the liquid crystal molecules 30a to be parallel to the equipotential lines EQ. Therefore, the liquid crystal molecules 30a above the right edge portion EG in FIG. 11B incline (rotate) clockwise and the liquid crystal molecules 30a above the left edge portion EG incline (rotate) counterclockwise as indicated by arrows in FIG. 11B. As a result, the liquid crystal molecules 30a above the edge portions EG are oriented parallel to the corresponding portions of the equipotential lines EQ.

When an electric field represented by a portion of the equipotential lines EQ inclined with respect to the axial orientation of the liquid crystal molecules 30a (an inclined electric field) is produced at the edge portions EG of the openings 14a1 and 14a2 of the liquid crystal display device 400 of the present invention, as illustrated in FIG. 11B, the liquid crystal molecules 30a incline in whichever direction (the counterclockwise direction in the illustrated example) that requires less rotation for the liquid crystal molecules 30a to be parallel to the equipotential line EQ, as illustrated in FIG. 5B. The liquid crystal molecules 30a in a region where an electric field represented by an equipotential line EQ perpendicular to the axial orientation of the liquid crystal molecules 30a is produced incline in the same direction as the liquid crystal molecules 30a located on the inclined portion of the equipotential lines EQ so that the orientation thereof is continuous (in conformity) with the orientation of the liquid crystal molecules 30a located on the inclined portion of the equipotential lines EQ as illustrated in FIG. 5C.

The change in the orientation of the liquid crystal molecules 30a, starting from those which are located on the inclined portion of the equipotential lines EQ, proceeds as described above and reaches a steady state, i.e., an inclined orientation (radially-inclined orientation) which is symmetric about the center SA of each of the openings 14a1 and 14a2, as schematically illustrated in FIG. 11C. The liquid crystal molecules 30a in a region of the upper conductive layer 14 located between the two adjacent openings 14a1 and 14a2 also take an inclined orientation so that the orientation thereof is continuous (in conformity) with the orientation of the liquid crystal molecules 30a at the edge portions of the openings 14a1 and 14a2. The liquid crystal molecules 30a in the middle between the edge of the opening 14a1 and the edge of the opening 14a2 are subject to substantially the same influence from the liquid crystal molecules 30a at the respective edge portions, and thus remain in a vertical alignment as the liquid crystal molecules 30a located around the central portion of each of the openings 14a1 and 14a2. As a result, the liquid crystal layer above the upper conductive layer 14 between the adjacent two openings 14a1 and 14a2 also takes a radially-inclined orientation. Note that the inclination direction of the liquid crystal molecules differs between the radially-inclined orientation of the liquid crystal layer in each of the openings 14a1 and 14a2 and that of the liquid crystal layer between the openings 14a1 and 14a2. Observation of the orientation around the liquid crystal molecule 30a at the center of each region having the radially-inclined orientation illustrated in FIG. 11C shows that the liquid crystal molecules 30a in the regions of the openings 14a1 and 14a2 are inclined so as to form a cone which spreads toward the counter electrode, whereas the liquid crystal molecules 30a in the region between the openings are inclined so as to form a cone which spreads toward the upper conductive layer 14. Since both of these radially-inclined orientations are formed so as to conform with the inclined orientation of the liquid crystal molecules 30a at an edge portion, the two radially-inclined orientations are continuous with each other.

As described above, when a voltage is applied across the liquid crystal layer 30, the liquid crystal molecules 30a incline, starting from those above the respective edge portions EG of the openings 14a1 and 14a2 provided in the upper conductive layer 14. Then, the liquid crystal molecules 30a in the surrounding regions incline so as to conform with the inclined orientation of the liquid crystal molecules 30a above the edge portion EG. Thus, a radially-inclined orientation is formed. Therefore, as the number of openings 14a to be provided in each picture element region increases, the number of liquid crystal molecules 30a which initially start inclining in response to an applied electric field also increases, thereby reducing the amount of time which is required to achieve the radially-inclined orientation across the entire picture element region. Thus, by increasing the number of openings 14a to be provided in the picture element electrode for each picture element region, it is possible to improve the response speed of a liquid crystal display device.

As described above, by providing a plurality of openings 14a1 and 14a2 for each picture element region, it is possible to realize a liquid crystal display device having a desirable display quality and a desirable viewing angle characteristic in all azimuthal angles, and also to improve the response characteristic of the liquid crystal display device.

Next, the relationship between the shape and positional relationship of the plurality of openings 14a and the orientation of the liquid crystal molecules 30a will be described with reference to FIG. 12A to FIG. 12C and FIG. 13A to FIG. 13C. Cross-sectional views taken along line 11A–11A' of FIG. 12A and FIG. 13A, line 11B–11B' of FIG. 12B and FIG. 13B and line 11C–11C' of FIG. 12C and FIG. 13C correspond to FIG. 11A to FIG. 11C, respectively.

While FIG. 12A to FIG. 12C and FIG. 13A to FIG. 13C illustrate a rectangular picture element electrode 15 (picture element region), the outer shape of the picture element electrode 15 (upper conductive layer 14) and the opening 14a is not limited to this. The liquid crystal display device of the present invention is not limited to including only one electrode structure as illustrated in FIG. 12A to FIG. 12C or FIG. 13A to FIG. 13C for each picture element region, but may alternatively include a plurality of electrode structures as illustrated in FIG. 12A to FIG. 12C or FIG. 13A to FIG. 13C for each picture element region. The positional relationship between the periphery of the picture element electrode 15 (upper conductive layer 14) is not limited to any particular relationship. Alternatively, for example, a portion of the plurality of openings 14a may overlap a side or a corner defining the periphery of the upper conductive layer 14. This also applies to a liquid crystal display device of any other embodiment in which a picture element region includes a plurality of openings 14a. A preferred positional relationship among the openings 14a for stabilizing the orientation of the liquid crystal molecules across the entire picture element region (and for improving the response speed) will be described later.

First, as described above, the shape of each opening 14a may be a polygon, a circle or an ellipse. Since it is preferred that the shape of each opening 14a has a high degree of rotational symmetry in order to improve the viewing angle characteristic in all azimuthal angles (eliminate the display non-uniformity) in the liquid crystal display device 400, the shape of each opening 14a is preferably a regular polygon such as a square as illustrated in FIG. 12A to FIG. 12C or a circle as illustrated in FIG. 13A to FIG. 13C. The relationship between the shape of each opening 14a and the orientation of the liquid crystal molecules 30a is as described above, and will not be further described below.

In a structure where a plurality of openings 14a are provided for each picture element region, it is preferred that the arrangement of the plurality of openings 14a has rotational symmetry. For example, when four square openings 14a are provided in a square upper conductive layer 14 (i.e., when a picture element region has a square shape), as illustrated in FIG. 12A to FIG. 12C, the four openings 14a are preferably arranged so that they have rotational symmetry about the center SA of the square upper conductive layer 14. It is preferred that the center SA of the square upper conductive layer 14 is a four-fold rotation axis, as illustrated in the figures. With such an arrangement, each region having a radially-inclined orientation which is formed about each opening 14a in the presence of an applied voltage across the liquid crystal layer 30, has four-fold rotational symmetry about the center SA of the upper conductive layer 14, as illustrated in FIG. 12B and FIG. 12C. As a result, the viewing angle characteristic of the liquid crystal display device 400 is even more uniform in all azimuthal angles.

While a structure where four openings 14a are provided for each picture element region is illustrated in FIG. 12A to FIG. 12C, the number of openings 14a is not limited to this. The number of openings 14a to be provided for each picture element region can be suitably determined in view of the size and shape of the picture element region, the size of a region for which a radially-inclined orientation can be stably formed by a single opening 14a, and the response speed. When providing a large number of openings 14a for each picture element region, it is preferred that the arrangement of the openings 14a has rotational symmetry across the entire picture element region in order to improve the uniformity of the viewing angle characteristic. However, depending upon the shape of the picture element region, it may not be possible to arrange the openings 14a so as to have rotational symmetry across the entire picture element region. In such a case, it is preferred that the openings 14a are arranged so as to have rotational symmetry across as much area as possible. For example, when the shape of the picture element region is an oblong rectangle, the oblong rectangle can be divided into squares, and a plurality of openings 14a can be provided so that there is rotational symmetry for each of such squares. In this way, it is possible to obtain a liquid crystal display device having a sufficiently uniform viewing angle characteristic.

FIG. 13A to FIG. 13C illustrate a structure where a circular opening 14a is provided instead of the square opening 14a as illustrated in FIG. 12A to FIG. 12C.

It is possible to further improve the viewing angle characteristic of a liquid crystal display device by arranging four openings 14a so that the center SA of the upper conductive layer 14 is a four-fold rotation axis as described above with reference to FIG. 12A to FIG. 12C. When the shape of each opening 14a is a circle, rather than a polygon, there is a higher degree of continuity of orientation of the liquid crystal molecules 30a at the edge portion of each opening 14a, whereby the radially-inclined orientation of the liquid crystal molecules 30a is more stable. Moreover, in a structure with a plurality of openings 14a, if the shape of each opening 14a is a circle, there is a high degree of continuity between radially-inclined orientations formed by adjacent openings 14a, whereby the plurality of radially-inclined orientations formed in each picture element region are more easily stabilized.

For example, when four circular openings 14a are arranged so that the respective centers thereof are at the respective corners of an oblong rectangle, as illustrated in FIG. 14, the liquid crystal molecules 30a located along each diagonal of the oblong rectangle can form a continuous inclined orientation. In contrast, when four square openings 14a are used in the arrangement illustrated in FIG. 14, the diagonal of the oblong rectangle formed by the respective centers of the openings 14a does not coincide with the diagonal of each square opening 14a. As can be appreciated from the above, the orientation of the liquid crystal molecules 30a in the region surrounded by the four openings 14a is less likely to be continuous. This problem can be avoided by providing four openings 14a each having an oblong rectangle similar to the oblong rectangle which is formed by the respective centers of the four openings 14a. However, the continuity of the radially-inclined orientation formed in each of the openings 14a decreases. Thus, the shape and arrangement of the openings 14a is preferably determined in view of the shape and size of the picture element region. FIG. 14 illustrates a state in the presence of an applied voltage across the liquid crystal layer, and a cross-sectional view taken along line 11C–11C' of FIG. 14 corresponds to FIG. 11C.

A preferred arrangement of openings for an electrode structure having a plurality of openings for each picture element region (i.e., a two-layer electrode in which the picture element electrode or the counter electrode includes openings therein) will be described below in greater detail.

A pattern of the upper conductive layer 14 of another liquid crystal display device 400A of Embodiment 1 will be described with reference to FIG. 15A. FIG. 15B is a cross-sectional view taken along line 15B–15B' of FIG. 15A. The cross-sectional view of FIG. 15B is substantially the same as that of FIG. 11A except that a solid portion of the upper conductive layer 14 is denoted by a reference numeral 14b, and a unit solid portion thereof is denoted by a reference numeral 14b'.

The upper conductive layer 14 of the liquid crystal display device 400A includes a plurality of openings 14a and a solid portion 14b. The opening 14a refers to a portion of the upper conductive layer 14 made of a conductive film (e.g., an ITO film) from which the conductive film has been removed, and the solid portion 14b refers to a portion thereof where the conductive film is present (the portion other than the openings 14a). While a plurality of openings 14a are formed for each picture element electrode, the solid portion 14b is basically made of a single continuous conductive film.

The openings 14a are arranged so that the respective centers thereof form a square lattice, and the unit solid portion 14b' (defined as a portion of the solid portion 14b which is generally surrounded by four openings 14a whose respective centers are located at the four lattice points which form one unit lattice) has a generally circular shape. Each opening 14a has a generally star shape having four quarter-arc-shaped sides (edges) with a four-fold rotation axis at the center among the four sides. In order to stabilize the orientation across the entire picture element region, the unit lattices preferably exist up to the periphery of the upper conductive layer 14. Therefore, a peripheral portion of the upper conductive layer 14 is preferably patterned, as illustrated in the figure, into a shape which corresponds to a generally half piece of the opening 14a (in a peripheral portion of the upper conductive layer 14 along a side thereof) or into a shape which corresponds to a generally quarter piece of the opening 14a (in a peripheral portion of the upper conductive layer 14 at a corner thereof). The square shown in a solid line in FIG. 15A (a collection of the square lattices) represents a region (outer shape) corresponding to a conventional picture element electrode which is made of a single conductive layer.

The openings 14a located in the central portion of the picture element region have generally the same shape and size. The unit solid portions 14b' located respectively in unit lattices formed by the openings 14a are generally circular in shape, and have generally the same shape and size. Each unit solid portion 14b' is connected to adjacent unit solid portions 14b', thereby forming the solid portion 14b which substantially functions as a single conductive film.

When a voltage is applied between the upper conductive layer 14 having such a structure as described above and the counter electrode 22, an inclined electric field is produced at the edge portion of each opening 14a, thereby producing a plurality of liquid crystal domains each having a radially-inclined orientation. The liquid crystal domain is produced in each region corresponding to the opening 14a and in each region corresponding to the unit solid portion 14b' in a unit lattice.

While the upper conductive layer 14 having a square shape is illustrated herein, the shape of the picture element electrode 14 is not limited to this. A typical shape of the upper conductive layer 14 can be approximated to a rectangular shape (including a square and an oblong rectangle), whereby the openings 14a can be regularly arranged therein in a square lattice pattern. Even when the upper conductive layer 14 has a shape other than a rectangular shape, the effects of the present invention can be obtained as long as the openings 14a are arranged in a regular manner (e.g., in a square lattice pattern as illustrated herein) so that liquid crystal domains are formed in all regions in the picture element region.

The shape (as viewed in the substrate normal direction) and arrangement of the openings 14a of the upper conductive layer 14 of the liquid crystal display device 400A according to the present embodiment will now be described.

The display characteristics of a liquid crystal display device exhibit an azimuthal angle dependence due to the orientation (optical anisotropy) of the liquid crystal molecules. In order to reduce the azimuthal angle dependence of the display characteristics, it is preferred that the liquid crystal molecules are oriented in all azimuthal angles with substantially the same probability. More preferably, the liquid crystal molecules in each picture element region are oriented in all azimuthal angles with substantially the same probability. Therefore, the opening 14a preferably has a shape such that liquid crystal domains are formed in each picture element region so that the liquid crystal molecules 30a in the picture element region are oriented in all azimuthal angles with substantially the same probability. More specifically, the shape of the opening 14a preferably has rotational symmetry (preferably with a high-order rotation axis, e.g., at least a two-fold rotation axis) about a symmetry axis extending through the center of each picture element region in the normal direction. It is also preferred that the plurality of openings 14a are arranged so as to have rotational symmetry. Moreover, it is preferred that the shape of the unit solid portion 14b' which is generally surrounded by these openings also has rotational symmetry. It is also preferred that the unit solid portions 14b' are arranged so as to have rotational symmetry.

However, it may not be necessary to arrange the openings 14a or the unit solid portions 14b' so as to have rotational symmetry across the entire picture element region. The liquid crystal molecules can be oriented in all azimuthal angles with substantially the same probability across the entire picture element region when, for example, a square lattice (having symmetry with a four-fold rotation axis) is used as the minimum unit, and the picture element region is formed by such square lattices, as illustrated in FIG. 15A.

The orientation of the liquid crystal molecules 30a when the generally star-shaped openings 14a having rotational symmetry and the generally circular unit solid portions 14b'are arranged in a square lattice pattern, as illustrated in FIG. 15A, will be described with reference to FIG. 16A to FIG. 16C.

Each of FIG. 16A to FIG. 16C schematically illustrates an orientation of the liquid crystal molecules 30a as viewed in the substrate normal direction. In figures, such as FIG. 16B and FIG. 16C, illustrating the orientation of the liquid crystal molecules 30a as viewed in the substrate normal direction, a black-spotted end of the liquid crystal molecule 30a drawn as an ellipse indicates that the liquid crystal molecule 30a is inclined so that the end is closer than the other end to the substrate on which the upper conductive layer 14 having the opening 14a is provided. This similarly applies to all of the subsequent figures. A single unit lattice (which is formed by four openings 14a) in the picture element region illustrated in FIG. 15A will be described below. Cross-sectional views taken along the respective diagonals of FIG. 16A to FIG. 16C correspond to FIG. 11A to FIG. 11C, respectively, and FIG. 11A to FIG. 11C will also be referred to in the following description.

When the upper conductive layer 14 and the counter electrode 22 are at the same potential, i.e., in a state where no voltage is applied across the liquid crystal layer 30, the liquid crystal molecules 30a whose orientation direction is regulated by the vertical alignment layer (not shown) which is provided on one side of each of the TFT substrate 400a and the counter substrate 100b which is closer to the liquid crystal layer 30 take a vertical alignment as illustrated in FIG. 16A.

When an electric field is applied across the liquid crystal layer 30, the liquid crystal molecules 30a incline, starting from those at the edge portion of each opening 14a, as illustrated in FIG. 16B. Then, the surrounding liquid crystal molecules 30a incline so as to conform with the orientation of the already-inclined liquid crystal molecules 30a at the edge portion of the opening 14a. Then, the axial orientation of the liquid crystal molecules 30a becomes stable as illustrated in FIG. 16C (radially-inclined orientation).

As described above, when the shape of the opening 14a has rotational symmetry, the liquid crystal molecules 30a in the picture element region successively incline, starting from the edge portion of the opening 14a toward the center of the opening 14a upon application of a voltage. As a result, there is obtained an orientation in which those liquid crystal molecules 30a around the center of the opening 14a, where the respective orientation-regulating forces from the liquid crystal molecules 30a at the edge portion are in equilibrium, remain in a vertical alignment with respect to the substrate plane, while the surrounding liquid crystal molecules 30a are inclined in a radial pattern about those liquid crystal molecules 30a around the center of the opening 14a, with the degree of inclination gradually increasing away from the center of the opening 14a.

The liquid crystal molecules 30a in a region corresponding to the generally circular unit solid portion 14b' which is surrounded by the four generally star-shaped openings 14a arranged in a square lattice pattern also incline so as to conform with the orientation of the liquid crystal molecules 30a which have been inclined by an inclined electric field produced at the edge portion of each opening 14a. As a result, there is obtained an orientation in which those liquid crystal molecules 30a around the center of the unit solid portion 14b', where the respective orientation-regulating forces from the liquid crystal molecules 30a at the edge portions are in equilibrium, remain in a vertical alignment with respect to the substrate plane, while the surrounding liquid crystal molecules 30a are inclined in a radial pattern about those liquid crystal molecules 30a around the center of the unit solid portion 14b', with the degree of inclination gradually increasing away from the center of the unit solid portion 14b'.

As described above, when liquid crystal domains in each of which the liquid crystal molecules 30a take a radially-inclined orientation are arranged in a square lattice pattern across the entire picture element region, the existence probabilities of the liquid crystal molecules 30a of the respective axial orientations have rotational symmetry, whereby it is possible to realize a high-quality display without non-uniformity for any viewing angle. In order to reduce the viewing angle dependence of a liquid crystal domain having a radially-inclined orientation, the liquid crystal domain preferably has a high degree of rotational symmetry (preferably with at least a two-fold rotation axis, and more preferably with at least a four-fold rotation axis). Moreover, in order to reduce the viewing angle dependence across the entire picture element region, the plurality of liquid crystal domains provided in the picture element region are preferably arranged in a pattern (e.g., a square lattice pattern) which is a combination of a plurality of unit patterns (e.g., unit lattice patterns) each having a high degree of rotational symmetry (preferably with at least a two-fold rotation axis, and more preferably with at least a four-fold rotation axis).

FIG. 15A illustrates an example in which each opening 14a has a generally star shape and each unit solid portion 14b has a generally circular shape, wherein such openings 14a and such unit solid portions 14b' are arranged in a square lattice pattern. However, the shape of the opening 14a, the shape of the unit solid portion 14b', and the arrangement thereof are not limited to those of the example above.

FIG. 17A and FIG. 17B are plan views respectively illustrating upper conductive layers 14A and 14B having respective openings 14a and unit solid portions 14b' of different shapes.

The openings 14a and the unit solid portions 14b' of the upper conductive layers 14A and 14B illustrated in FIG. 17A and FIG. 17B, respectively, are slightly distorted from those of the picture element electrode illustrated in FIG. 15A. The openings 14a and the unit solid portions 14b' of the upper conductive layers 14A and 14B have a two-fold rotation axis (not a four-fold rotation axis) and are regularly arranged so as to form oblong rectangular unit lattices. In both of the upper conductive layers 14A and 14B, the opening 14a has a distorted star shape, and the unit solid portion 14b' has a generally elliptical shape (a distorted circle). Also with the upper conductive layers 14A and 14B, it is possible to obtain a liquid crystal display device having a high display quality and a desirable viewing angle characteristic.

Moreover, upper conductive layers 14C and 14D as illustrated in FIG. 18A and FIG. 18B, respectively, may alternatively be used.

In the upper conductive layers 14C and 14D, generally cross-shaped openings 14a are arranged in a square lattice pattern so that each unit solid portion 14b' has a generally square shape. Of course, the patterns of the upper conductive layers 14C and 14D may be distorted so that there are oblong rectangular unit lattices. As described above, it is possible to obtain a liquid crystal display device having a high display quality and a desirable viewing angle characteristic alternatively by regularly arranging the generally rectangular (including a square and oblong rectangle) unit solid portions 14b'.

However, the shape of the opening 14a and/or the unit solid portion 14b' is preferably a circle or an ellipse, rather than a rectangle, so that a radially-inclined orientation is more stable. It is believed that a radially-inclined orientation is more stable with a circular or elliptical opening and/or unit solid portion because the edge of the opening 14a is more continuous (smooth), whereby the orientation direction of the liquid crystal molecules 30a changes more continuously (smoothly).

In view of the continuity of the orientation direction of the liquid crystal molecules 30a described above, upper conductive layers 14E and 14F as illustrated in FIG. 19A and FIG. 19B, respectively, are also desirable. The upper conductive layer 14E illustrated in FIG. 19A is a variation of the upper conductive layer 14 illustrated in FIG. 15A in which each opening 14a is simply comprised of four arcs. The upper conductive layer 14F illustrated in FIG. 19B is a variation of the upper conductive layer 14D illustrated in FIG. 18B in which each unit solid portion 14b' defined by the surrounding openings 14a is formed by a combination of quarter arcs. In both of the upper conductive layers 14E and 14F, the openings 14a and the unit solid portions 14b' have a four-fold rotation axis and are arranged in a square lattice pattern (having a four-fold rotation axis). Alternatively, the shape of the unit solid portion 14b' of the opening 14a may be distorted into a shape having a two-fold rotation axis and arranged so as to form oblong rectangular lattices (having a two-fold rotation axis), as illustrated in FIG. 17A and FIG. 17B.

In the examples described above, the openings 14a are generally star-shaped or generally cross-shaped, and the unit solid portions 14b' are generally circular, generally elliptical, generally square (rectangular), and generally rectangular with rounded corners. Alternatively, the negative-positive relationship between the openings 14a and the unit solid portions 14b' may be inverted (hereinafter, the inversion of the negative-positive relationship between the openings 14a and the unit solid portions 14b' will be referred to simply as "inversion"). For example, FIG. 20 illustrates an upper conductive layer 14G having a pattern obtained by inverting the negative-positive relationship between the openings 14a and the unit solid portions 14b' of the upper conductive layer 14 illustrated in FIG. 15A. The upper conductive layer 14G having an inverted pattern has substantially the same function as that of the upper conductive layer 14 illustrated in FIG. 15A. When the opening 14a and the unit solid portion 14b' both have a generally square shape, as in upper conductive layers 14H and 14I illustrated in FIG. 21A and FIG. 21B, respectively, the inverted pattern is substantially the same as the original pattern.

Also when the pattern illustrated in FIG. 15A is inverted as in the pattern illustrated in FIG. 20, it is preferred to form partial pieces (generally half or quarter pieces) of the opening 14a so as to form the unit solid portions 14b' having rotational symmetry at the edge portion of the upper conductive layer 14. By employing such a pattern, the effect of an inclined electric field can be obtained at the edge portion of a picture element region as in the central portion of the picture element region, whereby it is possible to realize a stable radially-inclined orientation across the entire picture element region.

Next, which one of two inverted patterns should be employed will be discussed with respect to the upper conductive layer 14 of FIG. 15A and the upper conductive layer 14G illustrated in FIG. 20 having a pattern obtained by inverting the pattern of the openings 14a and the unit solid portions 14b' of the upper conductive layer 14.

With either pattern, the length of the perimeter of each opening 14a is the same. Therefore, for the function of producing an inclined electric field, there is no difference between the two patterns. However, the area ratio of the unit solid portion 14b' (with respect to the total area of the upper conductive layer 14) may differ between the two patterns. In other words, the area of the solid portion 14b (the portion where the conductive film exists) for producing an electric field which is applied through the liquid crystal molecules of the liquid crystal layer may differ therebetween.

The voltage applied through a liquid crystal domain formed in the opening 14a is lower than the voltage applied through another liquid crystal domain formed in the solid portion 14b. As a result, in a normally black mode display, for example, the liquid crystal domain formed in the opening 14a appears darker. Thus, as the area ratio of the openings 14a increases, the display brightness decreases. Therefore, it is preferred that the area ratio of the solid portion 14b is high. While the description herein ignores the effect of the lower conductive layer for the sake of simplicity, the two-layer electrode of the liquid crystal display device of the present invention includes a lower conductive layer (e.g., the lower conductive layer 12 of FIG. 1A to FIG. 1C) in a region corresponding to the opening 14a of the upper conductive layer 14. Therefore, since an electric field from the lower conductive layer acts also upon the liquid crystal layer 30 in the region corresponding to the opening 14a, the degree of decrease in the display brightness along with an increase in the area ratio of the openings 14a is less than that for the conventional liquid crystal display device 300 described above with reference to FIG. 4A to FIG. 4C.

Whether the area ratio of the solid portion 14b is higher in the pattern of FIG. 15A or in the pattern of FIG. 20 depends upon the pitch (size) of the unit lattice.

FIG. 22A illustrates a unit lattice of the pattern illustrated in FIG. 15A, and FIG. 22B illustrates a unit lattice of the pattern illustrated in FIG. 20 (the opening 14a being taken as the center of each lattice). The portions illustrated in FIG. 20 which serve to connect adjacent unit solid portions 14b' together (the branch portions extending in four directions from the circular portion) are omitted in FIG. 22B. The length of one side of the square unit lattice (the pitch) is denoted by "p", and the distance between the opening 14a or the unit solid portion 14b' and a side of the unit lattice (the width of the side space) is denoted by "s". It should be noted that at least one branch portion is sufficient to connect the unit solid portions 14b' with each other so as to set the unit solid portions 14b' at the same voltage. In general, boundary portions between the openings 14a or boundary portions between the unit solid portions 14b' may be in the form of the solid portion 14b or the opening 14a so long as the boundary portions do not affect the orientation of the liquid crystal molecules adversely.

Various samples of upper conductive layers 14 having different pitches p and side spaces s were produced so as to examine the stability of the radially-inclined orientation, etc. As a result, it was found that with the upper conductive layer 14 having a pattern illustrated in FIG. 22A (hereinafter, referred to as the "positive pattern"), the side spaces needs to be about 2.75 μm or more so as to produce an inclined electric field required to obtain a radially-inclined orientation. It was found that with the upper conductive layer 14 having a pattern illustrated in FIG. 22B (hereinafter, referred to as the "negative pattern"), the side space s needs to be about 2.25 μm or more so as to produce an inclined electric field required to obtain a radially-inclined orientation. For each pattern, the area ratio of the solid portion 14b was examined while changing the value of the pitch p with the side space s fixed to its lower limit value above. The results are shown in Table 1 below and in FIG. 22C.

TABLE 1

| Pitch p (μm) | Solid portion area ratio (%) | |
|---|---|---|
| | Positive (FIG. 22A) | Negative (FIG. 22B) |
| 20 | 41.3 | 52.9 |
| 25 | 47.8 | 47.2 |
| 30 | 52.4 | 43.3 |
| 35 | 55.8 | 40.4 |
| 40 | 58.4 | 38.2 |
| 45 | 60.5 | 36.4 |
| 50 | 62.2 | 35.0 |

As can be seen from Table 1 and FIG. 22c, the positive pattern (FIG. 22A) has a higher area ratio of the solid portion 14b when the pitch p is about 25 μm or more, and the negative pattern (FIG. 22B) has a higher area ratio of the solid portion 14b when the pitch p is less than about 25 μm. Therefore, in view of the display brightness and the stability of orientation, the pattern which should be employed changes at the critical pitch p of about 25 μm. For example, when three or fewer unit lattices are provided along the width direction of the upper conductive layer 14 having a width of 75 μm, the positive pattern illustrated in FIG. 22A is preferred, and when four or more unit lattices are provided, the negative pattern illustrated in FIG. 22B is preferred. For patterns other than that illustrated herein, the selection between a positive pattern and a negative pattern can similarly be made so as to obtain the larger area ratio of the solid portion 14b.

The number of unit lattices can be determined as follows. The various sizes for each unit lattice are calculated so that one or more (an integer number of) unit lattices are arranged along the width (horizontal or vertical) of the upper conductive layer 14, and the area ratio of the solid portion is calculated for each calculated unit lattice size. Then, the unit lattice size such that the area ratio of the solid portion is maximized. Note that the orientation-regulating force from an inclined electric field decreases, whereby a stable radially-inclined orientation is not easily obtained, when the diameter of the unit solid portion 14b' (for the positive pattern) or the opening 14a (for the negative pattern) is less than 15 μm. The lower limit diameter value is for a case where the thickness of the liquid crystal layer 30 is about 3 μm. When the thickness of the liquid crystal layer 30 is less than about 3 μm, a stable radially-inclined orientation can be obtained even with a smaller diameter. When the thickness of the liquid crystal layer 30 is greater than about 3 μm, the lower limit diameter for obtaining a stable radially-inclined orientation is greater than the value shown above. In the liquid crystal display device of the present invention, since an electric field from the lower conductive layer also acts upon the liquid crystal layer 30, the deterioration in the display quality can be suppressed even when the diameter of the opening 14a is set to be slightly greater than that shown in the above results.

Except that the picture element electrode 15 is a two-layer electrode having openings, the liquid crystal display device of Embodiment 1 described above may employ the same structure as that of a known vertical alignment type liquid crystal display device and can be produced by a known production method. A method for forming the two-layer picture element electrode will be described below and the description of the other steps of the production method will be omitted. Again, FIG. 1A, for example, will be referred to.

Up to the step of depositing a transparent conductive layer (typically, an ITO layer) which is to be the lower conductive layer 12, a known method can be employed. Then, in the process of producing a known liquid crystal display device, the conductive layer is patterned into a predetermined pattern to provide a picture element electrode. The lower conductive layer 12 of the liquid crystal display device of the present embodiment can be patterned in the step of patterning the picture element electrode in the process of producing a known liquid crystal display device. The pattern of the lower conductive layer may be either the same as the picture element electrode or a divided pattern corresponding to the openings 14a in the upper conductive layer 14. As in a conventional picture element electrode, the lower conductive layer 12 is electrically connected to the drain electrode, or the like, (an electrode substantially at the same potential as the drain) of a TFT.

The dielectric layer 13 is provided substantially across the entire surface of the substrate 100a on which the lower conductive layer 12 has been patterned. The dielectric layer 13 may be provided by using a transparent photosensitive resin, for example. Then, a conductive layer is deposited on the dielectric layer 13 again. The obtained conductive layer is patterned so as to provide the upper conductive layer 14 having the openings 14a.

Contact holes are provided in the dielectric layer 13 in advance for connecting the upper conductive layer 14 to TFT drain electrodes. This step can also be performed by using a known process. With a structure where the upper conductive layer 14 and the lower conductive layer 12 are driven at the same potential, the upper conductive layer 14 and the lower conductive layer 12 may be connected to the same TFT, as illustrated herein. This structure also provides an advantage that a conventional driving circuit can be employed as it is.

Typically, a vertical alignment layer (not shown) is provided on one side of each of the picture element electrode 15 and the counter electrode 22 which is closer to the liquid crystal layer 30 so as to vertically align the liquid crystal molecules having a negative dielectric anisotropy. The vertical alignment layer can be provided in the display region of the substrate 10a by a printing process after the provision of the upper conductive layer 14 having the openings 14a.

Herein, the liquid crystal material is a nematic liquid crystal material having a negative dielectric anisotropy. A guest-host mode liquid crystal display device can be obtained by adding a dichroic dye to a nematic liquid crystal material having a negative dielectric anisotropy. A guest-host mode liquid crystal display device does not require a polarizing plate.

Embodiment 2

The structure of one picture element region of a liquid crystal display device 400B according to Embodiment 2 of the present invention will now be described with reference to FIG. 23A and FIG. 23B. In the subsequent figures, each element having substantially the same function as that of the liquid crystal display device 400 illustrated in FIG. 11A to FIG. 11c will be denoted by the same reference numeral and will not be further described. FIG. 23A is a plan view as viewed in the substrate normal direction, and FIG. 23B is a cross-sectional view taken along line 23B–23B' of FIG. 23A. FIG. 23B schematically illustrates a state where no voltage is applied across the liquid crystal layer.

As illustrated in FIG. 23A and FIG. 23B, the liquid crystal display device 400B is different from the liquid crystal display device 400A of Embodiment 1 illustrated in FIG. 15A and FIG. 15B in that a TFT substrate 400b of the liquid crystal display device 400B includes a protrusion 40 in the opening 14a of the upper conductive layer 14. A vertical alignment film (not shown) is provided on the surface of the protrusion 40. Hereinafter, the TFT substrate having the protrusion 40 in the opening 14a will be denoted by the reference numeral 400b regardless of the structure of the protrusion 40.

While the liquid crystal display device 400B obtained by providing the protrusion 40 in the opening 14a of the upper conductive layer 14 of the liquid crystal display device 400 illustrated in FIG. 11A to FIG. 11C is illustrated herein, the structure with the protrusion 40 can also be applied to other liquid crystal display devices of Embodiment 1.

The cross section of the protrusion 40 along the plane of the substrate 11 is a generally star-shaped cross section, i.e., the same shape as that of the opening 14a, as illustrated in FIG. 23A. Note that adjacent protrusions 40 are connected to each other so as to completely surround each unit solid portion 14b' in a generally circular pattern. The cross section of the protrusion 40 along a plane vertical to the substrate 11 is trapezoidal shape as illustrated in FIG. 23B. Specifically, the cross section has a top surface 40t parallel to the substrate plane and a side surface 40s inclined by a taper angle $\theta$ (<90°) with respect to the substrate plane. Since the vertical alignment film (not shown) is provided so as to cover the protrusion 40, the side surface 40s of the protrusion 40 has an orientation-regulating force of the same direction as that of an inclined electric field for the liquid crystal molecules 30a of the liquid crystal layer 30, thereby functioning to stabilize the radially-inclined orientation.

The function of the protrusion 40 will now be described with reference to FIG. 24A to FIG. 24D, FIG. 25A and FIG. 25B.

First, the relationship between the orientation of the liquid crystal molecules 30a and the configuration of the surface having a vertical alignment power will be described with reference to FIG. 24A to FIG. 24D.

Figure 24A:
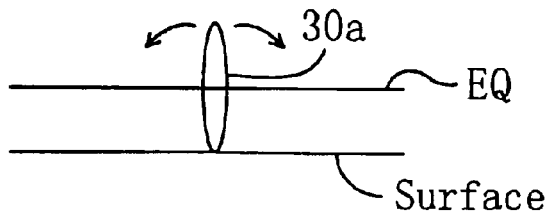

As illustrated in FIG. 24A, a liquid crystal molecule 30a on a horizontal surface is aligned vertical to the surface due to the orientation-regulating force of the surface having a vertical alignment power (typically, the surface of a vertical alignment film). When an electric field represented by an equipotential line EQ perpendicular to the axial orientation of the liquid crystal molecule 30a is applied through the liquid crystal molecule 30a in a vertical alignment, a torque urging the liquid crystal molecule 30a to incline clockwise and a torque urging the liquid crystal molecule 30a to incline counterclockwise act upon the liquid crystal molecule 30a with the same probability. Therefore, in the liquid crystal layer 30 between a pair of opposing electrodes in a parallel plate arrangement include some liquid crystal molecules 30a which are subject to the clockwise torque and other liquid crystal molecules 30a which are subject to the counterclockwise torque. As a result, the transition to the orientation according to the voltage applied across the liquid crystal layer 30 may not proceed smoothly.

Figure 24B:
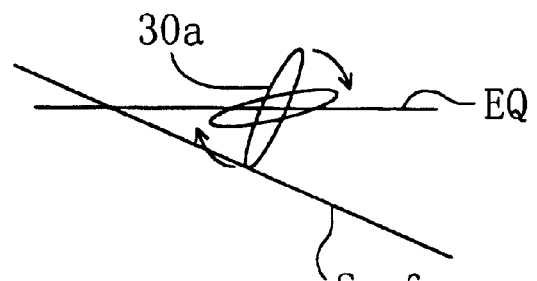
Figure 24C:
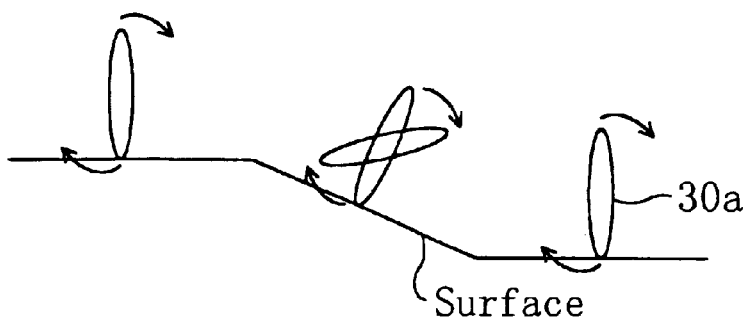

When an electric field represented by a horizontal equipotential line EQ is applied through a liquid crystal molecule 30a vertically aligned to an inclined surface, as illustrated in FIG. 24B, the liquid crystal molecule 30a inclines in whichever direction (the clockwise direction in the illustrated example) that requires less inclination for the liquid crystal molecule 30a to be parallel to the equipotential line EQ. Then, as illustrated in FIG. 24C, other adjacent liquid crystal molecules 30a aligned vertical to a horizontal surface incline in the same direction (the clockwise direction) as the liquid crystal molecule 30a located on the inclined surface so that the orientation thereof is continuous (in conformity) with the orientation of the liquid crystal molecule 30a aligned vertical to the inclined surface.

Figure 24D:
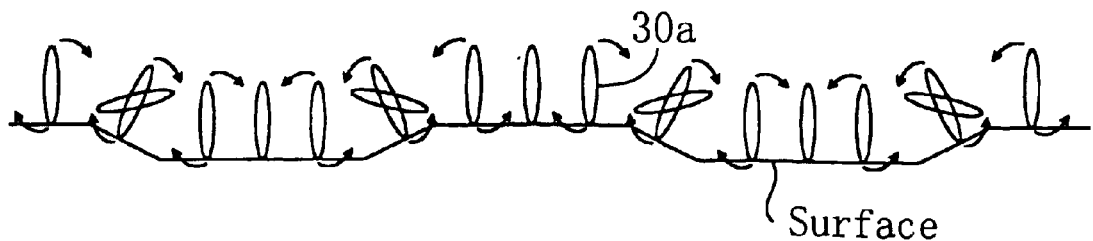

As illustrated in FIG. 24D, for a surface with concave/convex portions whose cross section includes a series of trapezoids, the liquid crystal molecules 30a on the top surface and those on the bottom surface are oriented so as to conform with the orientation direction regulated by other liquid crystal molecules 30a on the inclined portions of the surface.

In the liquid crystal display device of the present embodiment, the direction of the orientation-regulating force exerted by the configuration (protrusions) of the surface is aligned with the direction of the orientation-regulating force exerted by an inclined electric field, thereby stabilizing the radially-inclined orientation.

FIG. 25A and FIG. 25B each illustrate a state in the presence of an applied voltage across the liquid crystal layer 30 shown in FIG. 23B. FIG. 25A schematically illustrates a state where the orientation of the liquid crystal molecules 30a has just started to change (initial ON state) according to the voltage applied across the liquid crystal layer 30. FIG. 25B schematically illustrates a state where the orientation of the liquid crystal molecules 30a which has changed and become steady according to the applied voltage. In FIG. 25A and FIG. 25B, curves EQ denote equipotential lines.

When the upper conductive layer 14, the lower conductive layer 12 and the counter electrode 22 are at the same potential (i.e., in a state where no voltage is applied across the liquid crystal layer 30), the liquid crystal molecules 30a in each picture element region are aligned vertical to the surfaces of the substrates 11 and 21 as illustrated in FIG. 23B. The liquid crystal molecules 30a in contact with the vertical alignment film (not shown) on the side surface 40s of the protrusion 40 are aligned vertical to the side surface 40s, and the liquid crystal molecules 30a in the vicinity of the side surface 40s take an inclined orientation as illustrated due to the interaction (the nature as an elastic continuum) with the surrounding liquid crystal molecules 30a.

When a voltage is applied across the liquid crystal layer 30, a potential gradient represented by equipotential lines EQ shown in FIG. 25A is produced. The equipotential lines EQ are parallel to the surfaces of the solid portion 14b and the counter electrode 22 in a region of the liquid crystal layer 30 located between the solid portion 14b of the upper conductive layer 14 and the counter electrode 22, and drop in a region corresponding to the opening 14a of the upper conductive layer 14, thereby producing an inclined electric field represented by the inclined portion of the equipotential lines EQ in each region of the liquid crystal layer 30 above an edge portion (the peripheral portion of and within the opening 14a including the boundary thereof) EG of the opening 14a. An electric field represented by equipotential lines EQ parallel to the surfaces of the lower conductive layer 12 and the counter electrode 22 is produced in a portion of the region of the liquid crystal layer 30 corresponding to the opening 14a of the upper conductive layer 14 where the liquid crystal molecules 30a are not influenced by the potential of the upper conductive layer 14.

Due to the inclined electric field, the liquid crystal molecules 30a above the right edge portion EG in FIG. 25A incline (rotate) clockwise and the liquid crystal molecules 30a above the left edge portion EG incline (rotate) counterclockwise as indicated by arrows in FIG. 25A, as described above, so as to be parallel to the equipotential lines EQ. The direction of the orientation-regulating force exerted by the inclined electric field is the same as that of the orientation-regulating force exerted by the side surface 40s located at each edge portion EG.

As described above, the change in the orientation starts from the liquid crystal molecules 30a located on the inclined portion of the equipotential lines EQ, and reaches a steady state of the orientation schematically illustrated in FIG. 25B. The liquid crystal molecules 30a around the central portion of the top surface 40t of the protrusion 40 are substantially equally influenced by the respective orientations of the liquid crystal molecules 30a at the opposing edge portions EG of the opening 14a, and therefore retain their orientation perpendicular to the equipotential lines EQ. The liquid crystal molecules 30a away from the center of the opening 14a (the top surface 40t of the protrusion 40) incline by the influence of the orientation of other liquid crystal molecules 30a at the closer edge portion EG, thereby forming an inclined orientation which is symmetric about the center SA of the opening 14a (the top surface 40t of the protrusion 40). An inclined orientation symmetric about the center SA of the unit solid portion 14b' is formed also in the region corresponding to the unit solid portion 14b' which is substantially surrounded by the openings 14a and the protrusions 40.

As described above, in the liquid crystal display device 400B of Embodiment 2, as in the liquid crystal display device 400A of Embodiment 1, liquid crystal domains each having a radially-inclined orientation are formed corresponding to the openings 14a and the unit solid portions 14b' (see FIG. 16C). Since the protrusions 40 are provided so as to completely surround each unit solid portion 14b' in a generally circular pattern, each liquid crystal domain is formed corresponding the generally circular region surrounded by the protrusions 40. Since the side surface 40s of the protrusion 40 provided in the opening 14a functions to incline the liquid crystal molecules 30a in the vicinity of the edge portion EG of the opening 14a in the same direction as the direction of the orientation-regulating force exerted by the inclined electric field, thereby stabilizing the radially-inclined orientation.

Of course, the orientation-regulating force exerted by the inclined electric field only acts in the presence of an applied voltage, and the strength thereof depends upon the strength of the electric field (the level of the applied voltage). Therefore, when the electric field strength is small (i.e., when the applied voltage is low), the orientation-regulating force exerted by the inclined electric field is weak, in which case the radially-inclined orientation may collapse due to floating of the liquid crystal material when an external force is applied to the liquid crystal panel. Once the radially-inclined orientation collapses, it is not restored until application of a voltage sufficient to produce an inclined electric field which exerts a sufficiently strong orientation-regulating force. On the other hand, the orientation-regulating force from the side surface 40s of the protrusion 40 is exerted regardless of the applied voltage, and is very strong as it is known in the art as the "anchoring effect" of the alignment film. Therefore, even when floating of the liquid crystal material occurs and the radially-inclined orientation once collapses, the liquid crystal molecules 30a in the vicinity of the side surface 40s of the protrusion 40 retain the same orientation direction as that of the radially-inclined orientation. Therefore, the radially-inclined orientation is easily restored once the floating of the liquid crystal material stops.

Thus, the liquid crystal display device 400B of Embodiment 2 has an additional advantage of being strong against an external force in addition to the advantages of the liquid crystal display device 400A of Embodiment 1. Therefore, the liquid crystal display device 400B can be suitably used in apparatuses which are often subject to an external force, such as PCs which are often carried around and PDAs.

When the protrusion 40 is made of a dielectric material having a high transparency, there is obtained an advantage of improving the contribution to the display of a liquid crystal domain which is formed in a region corresponding to the opening 14a. When the protrusion 40 is made of an opaque dielectric material, there is obtained an advantage that it is possible to prevent light leakage caused by the retardation of the liquid crystal molecules 30a which are in an inclined orientation due to the side surface 40s of the protrusion 40. Whether to employ a transparent dielectric material or an opaque dielectric material can be determined in view of the application of the liquid crystal display device. In either case, the use of a photosensitive resin provides an advantage that the step of patterning the protrusions 40 corresponding to the openings 14a can be simplified. In order to obtain a sufficient orientation-regulating force, the height of the protrusion 40 is preferably in the range of about 0.5 $\mu$m to about 2 $\mu$m, when the thickness of the liquid crystal layer 30 is about 3 $\mu$m. Typically, the height of the protrusion 40 is preferably in the range of about 1/6 to about 2/3 of the thickness of the liquid crystal layer 30.

As described above, the liquid crystal display device 400B includes the protrusion 40 in the opening 14a of the upper conductive layer 14, and the side surface 40s of the protrusion 40 exerts an orientation-regulating force in the same direction as that of the orientation-regulating force exerted by an inclined electric field for the liquid crystal molecules 30a of the liquid crystal layer 30. Preferred conditions for the side surface 40s to exert an orientation-regulating force of the same direction as that of the orientation-regulating force exerted by the inclined electric field will now be described with reference to FIG. 26A to FIG. 26C.

FIG. 26A to FIG. 26C schematically illustrate cross-sectional views of liquid crystal display devices 400C, 400D and 400E, respectively. FIG. 26A to FIG. 26C correspond to FIG. 25A. The liquid crystal display devices 400C, 400D and 400E all have a protrusion at least in the opening 14a, but differ from the liquid crystal display device 400B in terms of the positional relationship between the entire protrusion 40 as a single structure and the corresponding opening 14a.

In the liquid crystal display device 400B described above, the entire protrusion 40 as a structure is formed in the opening 14a, and the bottom surface of the protrusion 40 is smaller than the opening 14a, as illustrated in FIG. 25A. In the liquid crystal display device 400C illustrated in FIG. 26A, the bottom surface of a protrusion 40A is aligned with the opening 14a. In the liquid crystal display device 400D illustrated in FIG. 26B, the bottom surface of the protrusion 40B is greater than the opening 14a so as to cover a portion of the solid portion (conductive film) 14b surrounding the opening 14a. The solid portion 14b is not formed on the side surface 40s of any of the protrusions 40, 40A and 40B. As a result, the equipotential lines EQ are substantially flat over the solid portion 14b and drop into the opening 14a, as illustrated in the respective figures. Therefore, as the protrusion 40 of the liquid crystal display device 400B, the side surface 40s of the protrusion 40A of the liquid crystal display device 400C and that of the protrusion 40B of the liquid crystal display device 400D both exert an orientation-regulating force of the same direction as that of the orientation-regulating force exerted by the inclined electric field, thereby stabilizing the radially-inclined orientation.

In contrast, in the liquid crystal display device 400E illustrated in FIG. 26c, the bottom surface of a protrusion 40C is greater than the opening 14a, and a portion of the solid portion 14b extending into a region above the opening 14a is formed on the side surface 40s of the protrusion 40C. Due to the influence of the portion of the solid portion 14b formed on the side surface 40s, a ridge portion is created in the equipotential lines EQ. The ridge portion of the equipotential lines EQ has a gradient opposite to that of the other portion of the equipotential lines EQ dropping into the opening 14a. This indicates that an inclined electric field has been produced whose direction is opposite to that of an inclined electric field for orienting the liquid crystal molecules 30a into a radially-inclined orientation. Therefore, in order for the side surface 40s to have an orientation-regulating force of the same direction as that of the orientation-regulating force exerted by the inclined electric field, it is preferred that the solid portion (conductive film) 14b is not formed on the side surface 40s.

Next, a cross-sectional structure of the protrusion 40 taken along line 27A–27A' of FIG. 23A will be described with reference to FIG. 27.

Since the protrusions 40 illustrated in FIG. 23A are formed so as to completely surround each unit solid portion 14b' in a generally circular pattern, as described above, the portions serving to connect adjacent unit solid portions 14b' together (the branch portions extending in four directions from the circular portion) are formed on the protrusion 40 as illustrated in FIG. 27. Therefore, in the step of depositing the conductive film to be the solid portions 14b of the upper conductive layer 14, there is a considerable possibility that disconnection may occur on the protrusion 40 or delamination may occur in an after-treatment of the production process.

In view of this, in a liquid crystal display device 400F illustrated in FIG. 28A and FIG. 28B, protrusions 40D independent of one another are formed so that each of the protrusions 40D is completely included within the opening 14a so that the conductive film to be the solid portion 14b is formed on the flat surface of the substrate 11, thereby eliminating the possibility of disconnection or delamination. Although the protrusions 40D do not completely surround each unit solid portion 14b' in a generally circular pattern, a generally circular liquid crystal domain corresponding to each unit solid portion 14b' is formed, and the radially-inclined orientation of the unit solid portion 14b' is stabilized as in the above-described examples.

The effect of stabilizing the radially-inclined orientation which is obtained by forming the protrusion 40 in the opening 14a is not limited to the pattern of the opening 14a described above, but may similarly be applied to any pattern of the opening 14a described above in Embodiment 1 to obtain effects as those described above. In order for the protrusion 40 to sufficiently exert the effect of stabilizing the orientation against an external force, it is preferred that the pattern of the protrusion 40 (the pattern as viewed in the substrate normal direction) covers as much area as possible of the liquid crystal layer 30. Therefore, for example, a greater orientation stabilizing effect of the protrusion 40 can be obtained with the positive pattern with circular unit solid portions 14b' than with the negative pattern with circular openings 14a.

Embodiment 3

In the liquid crystal display device of Embodiment 1 described above, a two-layer electrode is employed for one (the picture element electrode 15 in the illustrated example) of the picture element electrode 15 defining picture element regions and the counter electrode 22 opposing each other via the liquid crystal layer 30, and the openings 14a are provided in the upper conductive layer 14, so that an inclined electric field is produced in the presence of an applied voltage, thereby orienting the liquid crystal molecules into a radially-inclined orientation by using the inclined electric field. In the liquid crystal display device of Embodiment 2, the protrusion is provided in the opening 14a of the upper conductive layer 14 so as to stabilize the radially-inclined orientation.

Embodiment 3 is a liquid crystal display device including a further orientation-regulating structure provided on the substrate (the counter substrate in the examples described above) which is different from the substrate on which the two-layer electrode is provided (the TFT substrate in the examples described above). In the following description, an electrode structure for realizing a radially-inclined orientation by the above-described inclined electric field will be referred to as the first orientation-regulating structure, and a further orientation-regulating structure provided on the other side of the liquid crystal layer with respect to the first orientation-regulating structure will be referred to as the second orientation-regulating structure.

Next, the specific structure and function of the second orientation-regulating structure will be described. A case where the first orientation-regulating structure is provided on the TFT substrate and the second orientation-regulating structure is provided on the counter substrate will be described below in conformity with the examples illustrated above.

FIG. 29A to FIG. 29E schematically illustrate a counter substrate 200b having a second orientation-regulating structure 28. Each element having substantially the same function as that of the liquid crystal display devices described above will be denoted by the same reference numeral and will not be further described.

Figure 29A:
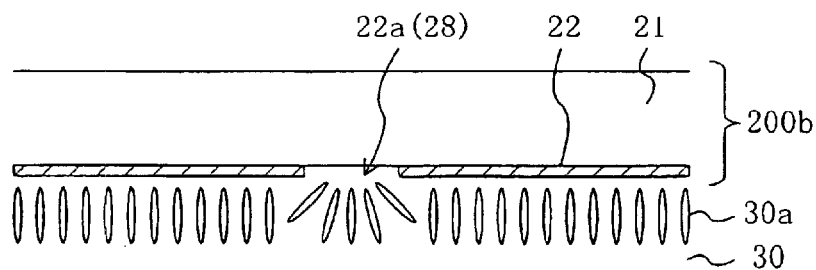
Figure 29B:
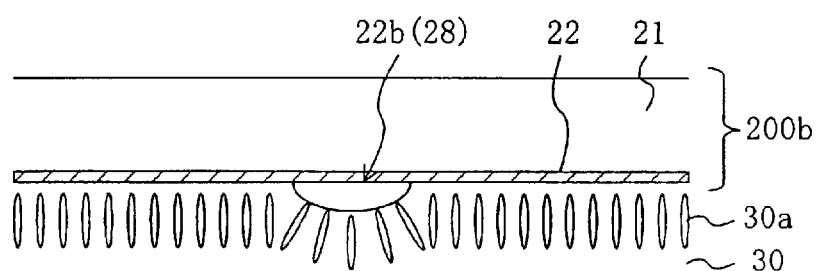
Figure 29C:
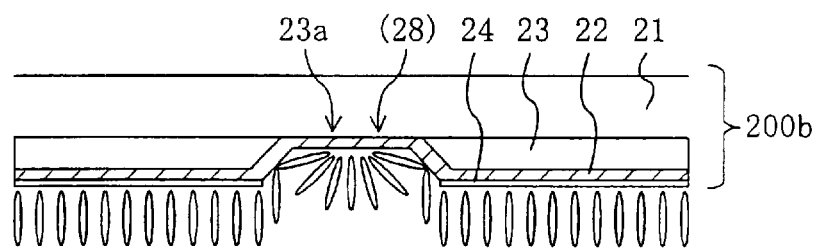
Figure 29D:
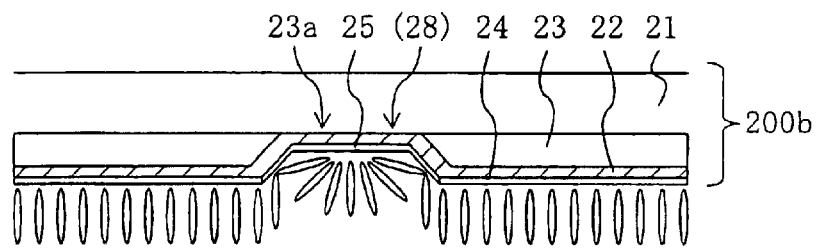
Figure 29E:
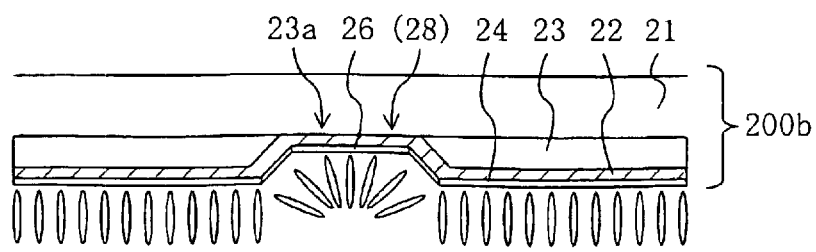

The second orientation-regulating structure 28 illustrated in FIG. 29A to FIG. 29E functions to orient the liquid crystal molecules 30a of the liquid crystal layer 30 into a radially-inclined orientation. Note that the second orientation-regulating structure 28 illustrated in FIG. 29A to FIG. 29D and that illustrated in FIG. 29E are different in terms of the direction in which the liquid crystal molecules 30a are to be inclined.

The direction in which the liquid crystal molecules are inclined by the second orientation-regulating structure 28 illustrated in FIG. 29A to FIG. 29D is aligned with the orientation direction of the radially-inclined orientation of each liquid crystal domain which is formed by the first orientation-regulating structure in a region corresponding to the unit solid portion 14b' (see, for example, FIG. 11C) of the upper conductive layer 14. In contrast, the direction in which the liquid crystal molecules are inclined by the second orientation-regulating structure 28 illustrated in FIG. 29E is aligned with the orientation direction of the radially-inclined orientation of each liquid crystal domain which is formed by the first orientation-regulating structure in a region corresponding to the opening 14a (see, for example, FIG. 1C) of the upper conductive layer 14.

The second orientation-regulating structure 28 illustrated in FIG. 29A is formed by an opening 22a of the counter electrode 22 which is provided so as to oppose the upper conductive layer 14 (e.g., the unit solid portion 14b' of FIG. 15A). A vertical alignment film (not shown) is provided on one surface of the counter substrate 200b which is closer to the liquid crystal layer 30.

The second orientation-regulating structure 28, as the first orientation-regulating structure described above, exerts an orientation-regulating force only in the presence of an applied voltage. Since the second orientation-regulating structure 28 is only required to exert an orientation-regulating force upon the liquid crystal molecules in each liquid crystal domain in a radially-inclined orientation formed by the first orientation-regulating structure, the size of the opening 22a is smaller than the opening 14a provided in the upper conductive layer 14, and smaller than the unit solid portion 14b' (see, for example, FIG. 15A) which is surrounded by the openings 14a. For example, a sufficient effect can be obtained only with an area less than or equal to one half of that of the opening 14a or the unit solid portion 14b'. When the opening 22a of the counter electrode 22 is provided so as to oppose the central portion of the unit solid portion 14b' of the upper conductive layer 14, the continuity of the orientation of the liquid crystal molecules increases, and it is possible to fix the position of the central axis of the radially-inclined orientation.

As described above, when a structure exerting an orientation-regulating force only in the presence of an applied voltage is employed as the second orientation-regulating structure, substantially all of the liquid crystal molecules 30a of the liquid crystal layer 30 take a vertical alignment in the absence of an applied voltage. Therefore, when employing a normally black mode, substantially no light leakage occurs in a black display, thereby realizing a display with a desirable contrast ratio.

However, in the absence of an applied voltage, the orientation-regulating force is not exerted and thus the radially-inclined orientation is not formed. Moreover, when the applied voltage is low, there is only a weak orientation-regulating force, whereby an after image may be observed when a considerable stress is applied upon the liquid crystal panel.

Each of the second orientation-regulating structures 28 illustrated in FIG. 29B to FIG. 29D exerts an orientation-regulating force regardless of the presence/absence of an applied voltage, whereby it is possible to obtain a stable radially-inclined orientation at any display gray level, and there is provided a high resistance to a stress.

First, the second orientation-regulating structure 28 illustrated in FIG. 29B includes a protrusion 22b which is provided on the counter electrode 22 so as to protrude into the liquid crystal layer 30. While there is no particular limitation on the material of the protrusion 22b, the protrusion 22b can be easily provided by using a dielectric material such as a resin. A vertical alignment film (not shown) is provided on one surface of the counter substrate 200b which is closer to the liquid crystal layer 30. The protrusion 22b orients the liquid crystal molecules 30a into a radially-inclined orientation by virtue of the configuration of the surface thereof (with a vertical alignment power). It is preferred to use a resin material which deforms by heat, in which case it is possible to easily form the protrusion 22b having a slightly-humped cross section as illustrated in FIG. 29B through a heat treatment after patterning. The protrusion 22b having a slightly-humped cross section with a vertex (e.g., a portion of a sphere) as illustrated in the figure or a conical protrusion provides a desirable effect of fixing the central position of the radially-inclined orientation.

The second orientation-regulating structure 28 illustrated in FIG. 29C is provided as a surface having a horizontal alignment power facing the liquid crystal layer 30 which is provided in an opening (or a depressed portion) 23a in a dielectric layer 23 formed under the counter electrode 22 (i.e., on one side of the counter electrode 22 which is closer to the substrate 21). A vertical alignment film 24 is provided so as to cover one side of the counter substrate 200b which is closer to the liquid crystal layer 30 while leaving a region corresponding to the opening 23a uncovered, whereby the surface in the opening 23a functions as a horizontal alignment surface. Alternatively, a horizontal alignment film 25 may be provided only in the opening 23a as illustrated in FIG. 29D.

The horizontal alignment film illustrated in FIG. 29D can be provided by, for example, once providing the vertical alignment film 24 across the entire surface of the counter substrate 200b, and then selectively irradiating a portion of the vertical alignment film 24 in the opening 23a with UV light so as to reduce the vertical alignment power thereof. The horizontal orientation power required for the second orientation-regulating structure 28 does not have to be so high that the resulting pretilt angle is as small as that resulting from an alignment film used in a TN type liquid crystal display device. For example, a pretilt angle of $_{45}°$ or less is sufficient.

As illustrated in FIG. 29C and FIG. 29D, on the horizontal orientation surface in the opening 23a, the liquid crystal molecules 30a are urged to be horizontal with respect to the substrate plane. As a result, the liquid crystal molecules 30a form an orientation which is continuous with the orientation of the surrounding, vertically aligned liquid crystal molecules 30a on the vertical alignment film 24, thereby obtaining a radially-inclined orientation as illustrated in the figure.

A radially-inclined orientation can be obtained only by selectively providing a horizontal orientation surface (e.g., the surface of the electrode, or a horizontal alignment film) on the flat surface of the counter electrode 22 without providing a depressed portion (which is formed by the opening in the dielectric layer 23) on the surface of the counter electrode 22. However, the radially-inclined orientation can be further stabilized by virtue of the surface configuration of the depressed portion.

It is preferred to use a color filter layer or an overcoat layer of a color filter layer as the dielectric layer 23, for example, to form the depressed portion in the surface of the counter substrate 200b which is closer to the liquid crystal layer 30, because it adds nothing to the process. In the structures illustrated in FIG. 29C and FIG. 29D, there is little decrease in light efficiency because there is no region where a voltage is applied across the liquid crystal layer 30 via the protrusion 22b as in the structure illustrated in FIG. 29A.

In the second orientation-regulating structure 28 illustrated in FIG. 29E, a depressed portion is formed on one side of the counter substrate 200b which is closer to the liquid crystal layer 30 by using the opening 23a of the dielectric layer 23, as in the second orientation-regulating structure 28 illustrated in FIG. 29D, and a horizontal alignment film 26 is formed only in the bottom portion of the depressed portion. Instead of forming the horizontal alignment film 26, the surface of the counter electrode 22 may be exposed as illustrated in FIG. 29C.

A liquid crystal display device 400G having the first orientation-regulating structure and the second orientation-regulating structure as described above is shown in FIG. 30A and FIG. 30B. FIG. 30A is a plan view, and FIG. 30B is a cross-sectional view taken along line 22B–22B' of FIG. 30A.

The liquid crystal display device 400G includes the TFT substrate 400a having the upper conductive layer 14 with the openings 14a which includes the first orientation-regulating structure, and the counter substrate 200b which includes the second orientation-regulating structure 28. The first orientation-regulating structure is not limited to the structure illustrated herein, but may be any other structure described above. A structure which exerts an orientation-regulating force even in the absence of an applied voltage (FIG. 29B to FIG. 29D and FIG. 29E) will be illustrated as the second orientation-regulating structure 28. Note that the first orientation-regulating structure illustrated in FIG. 29B to FIG. 29D can be replaced with that illustrated in FIG. 29A.

Among the second orientation-regulating structures 28 provided in the counter substrate 200b of the liquid crystal display device 400G, the second orientation-regulating structure 28 provided around the center of a region opposing the solid portion 14b of the upper conductive layer 14 is one of those illustrated in FIG. 29B to FIG. 29D, and the second orientation-regulating structure 28 provided around the center of a region opposing the opening 14a of the upper conductive layer 14 is one illustrated in FIG. 29E.

With such an arrangement, in the presence of an applied voltage across the liquid crystal layer 30, i.e., in the presence of an applied voltage between the upper conductive layer 14 and the counter electrode 22, the direction of the radially-inclined orientation formed by the first orientation-regulating structure is aligned with the direction of the radially-inclined orientation formed by the second orientation-regulating structure 28, thereby stabilizing the radially-inclined orientation. This is schematically shown in FIG. 30A to FIG. 30c. FIG. 30A illustrates a state in the absence of an applied voltage, FIG. 30B illustrates a state where the orientation has just started to change (initial ON state) after application of a voltage, and FIG. 30C schematically illustrates a steady state during the voltage application.

As illustrated in FIG. 31A, the orientation-regulating force exerted by the second orientation-regulating structure (FIG. 29B to FIG. 29D) acts upon the liquid crystal molecules 30a in the vicinity thereof even in the absence of an applied voltage, thereby forming a radially-inclined orientation.

When voltage application begins, an electric field represented by equipotential lines EQ shown in FIG. 31B is produced (by the first orientation-regulating structure), and a liquid crystal domain in which the liquid crystal molecules 30a are in a radially-inclined orientation is formed in each region corresponding to the opening 14a and each region corresponding to the solid portion 14b, and the liquid crystal layer 30 reaches a steady state as illustrated in FIG. 31C. The inclination direction of the liquid crystal molecules 30a in each liquid crystal domain coincides with the direction in which the liquid crystal molecules 30a are inclined by the orientation-regulating force exerted by the second orientation-regulating structure 28 which is provided in a corresponding region.

When a stress is applied upon the liquid crystal display device 400G which is in a steady state, the radially-inclined orientation of the liquid crystal layer 30 once collapses, but upon removal of the stress, the radially-inclined orientation is restored because of the orientation-regulating forces from the first orientation-regulating structure and the second orientation-regulating structure acting upon the liquid crystal molecules 30a. Therefore, the occurrence of an after image due to a stress is suppressed. When the orientation-regulating force from the second orientation-regulating structure 28 is excessively strong, retardation occurs even in the absence of an applied voltage due to the radially-inclined orientation, whereby the display contrast ratio may decrease. However, the orientation-regulating force from the second orientation-regulating structure 28 does not have to be strong because it is only required to have an effect of stabilizing a radially-inclined orientation formed by the first orientation-regulating structure and fixing the central axis position thereof. Therefore, an orientation-regulating force which would not cause such a degree of retardation as to deteriorate the display quality is sufficient.

For example, when the protrusion 22b illustrated in FIG. 29B is employed, each protrusion 22b may have a diameter of about 15 µm and a height (thickness) of about 1 µm for the unit solid portion 14b having a diameter of about 30 µm to about 35 µm, thereby obtaining a sufficient orientation-regulating force and suppressing the reduction in the contrast ratio due to retardation to a practical level.

FIG. 32A and FIG. 32B illustrate another liquid crystal display device 400H including the first orientation-regulating structure and the second orientation-regulating structure. FIG. 32A is a plan view, and FIG. 32B is a cross-sectional view taken along line 32B–32B' of FIG. 32A.

The liquid crystal display device 400H does not have the second orientation-regulating structure in a region opposing the opening 14a of the upper conductive layer 14 of the TFT substrate 400a. Formation of the second orientation-regulating structure 28 illustrated in FIG. 29E which should be formed in a region opposing the opening 14a introduces difficulties into the process. Therefore, in view of the productivity, it is preferred to use only one of the second orientation-regulating structures 28 illustrated in FIG. 29A to FIG. 29D. Particularly, the second orientation-regulating structure 28 illustrated in FIG. 29B is preferred because it can be produced by a simple process.

Even if no second orientation-regulating structure is provided in a region corresponding to the opening 14a as in the liquid crystal display device 400H, a radially-inclined orientation as that of the liquid crystal display device 400G is obtained, as schematically illustrated in FIG. 33A to FIG. 33C, and also the stress resistance thereof is at a practical level.

Embodiment 4

In the liquid crystal display device of the present embodiment, the dielectric layer provided between the upper conductive layer and the lower conductive layer of the picture element electrode includes an opening (aperture) or a depressed portion in the opening of the upper conductive layer. In other words, in the two-layer picture element electrode of the liquid crystal display device of the present embodiment, the whole of a region of the dielectric layer located in the opening of the upper conductive layer is removed (thereby forming a opening therein) or a portion of such a region is removed (thereby forming a depressed portion).

First, the structure and operation of a liquid crystal display device 500 having such a picture element electrode which includes a opening in the dielectric layer will be described with reference to FIG. 34A to FIG. 34C.

In the liquid crystal display device 500, the upper conductive layer 14 of the picture element electrode 15 includes the opening 14a, and the dielectric layer 13 provided between the lower conductive layer 12 and the upper conductive layer 14 includes an opening 13a formed so as to correspond to the opening 14a of the upper conductive layer 14, with the lower conductive layer 12 being exposed through the opening 13a. The side wall of the opening 14a of the dielectric layer 13 is typically tapered (taper angle: θ). The liquid crystal display device 500 has substantially the same structure as that of the liquid crystal display device 100 of Embodiment 1 except that the dielectric layer 13 includes the opening 13a, and the two-layer picture element electrode 15 functions in substantially the same manner as the picture element electrode 15 of the liquid crystal display device 100, to orient the liquid crystal layer 30 into a radially-inclined orientation in the presence of an applied voltage.

The operation of the liquid crystal display device 500 will be described with reference to FIG. 34A to FIG. 34C. FIG. 34A to FIG. 34C respectively correspond to FIG. 1A to FIG. 1C illustrating the liquid crystal display device 100 of Embodiment 1.

As illustrated in FIG. 34A, the liquid crystal molecules 30a in each picture element region are aligned vertical to the surfaces of the substrates 11 and 21 in the absence of an applied voltage (OFF state). In the following description, the orientation-regulating force from the side wall of the opening 13a will be ignored for the sake of simplicity.

When a voltage is applied across the liquid crystal layer 30, a potential gradient represented by equipotential lines EQ shown in FIG. 34B is produced. As can be seen from the drop of the equipotential lines EQ (creating a "trough" therein) in a region corresponding to the opening 14a of the upper conductive layer 14, an inclined electric field is produced in the liquid crystal layer 30 of the liquid crystal display device 500 as in the potential gradient illustrated in FIG. 1B. However, since the dielectric layer 13 of the picture element electrode 15 includes the opening 13a in a region corresponding to the opening 14a of the upper conductive layer 14, the voltage applied across the region of the liquid crystal layer 30 corresponding to the opening 14a (the opening 13a) is exactly the potential difference between the lower conductive layer 12 and the counter electrode 22, and the voltage drop (capacitance division) due to the dielectric layer 13 does not occur. In other words, all of the seven equipotential lines EQ drawn in FIG. 34B between the upper conductive layer 14 and the counter electrode 22 stay between the upper conductive layer 14 and the counter electrode 22 across the entire liquid crystal layer 30 (as opposed to FIG. 1B where one of the five equipotential lines EQ is drawn into the dielectric layer 13), thereby applying a constant voltage across the entire picture element region.

Thus, by providing the opening 13a in the dielectric layer 13, it is possible to apply the same voltage across the region of the liquid crystal layer 30 corresponding to the opening 13a as that applied across the other regions of the liquid crystal layer 30. However, the thickness of the liquid crystal layer 30, across which a voltage is applied, varies depending upon the location in each picture element region, whereby the change in retardation in the presence of an applied voltage also varies depending upon the location. If the degree of variation is significant, the display quality may deteriorate.

In the structure illustrated in FIG. 34A to FIG. 34C, the thickness d1 of the liquid crystal layer 30 on the upper conductive layer 14 (excluding the opening 14a) and the thickness d2 of the liquid crystal layer 30 on the lower conductive layer 12 exposed through the opening 14a (and the opening 13a) differ from each other by the thickness of the dielectric layer 13. When the portion of the liquid crystal layer 30 having the thickness d1 and the other portion of the liquid crystal layer 30 having the thickness d2 are driven with the same voltage range, the amount of retardation change caused by the orientation change in the liquid crystal layer 30 varies therebetween by the influence of the difference in thickness between the respective portions of the liquid crystal layer 30. When the relationship between the applied voltage and the amount of retardation of the liquid crystal layer 30 considerably varies depending upon the location, the following problem arises. That is, in a design where the display quality is given a higher priority, the transmittance is sacrificed, and when the transmittance is given a higher priority, the color temperature of the white display shifts, thereby sacrificing the display quality. Therefore, when the liquid crystal display device 500 is used as a transmission type liquid crystal display device, the thickness of the dielectric layer 13 is preferably small.

Next, a liquid crystal display device 600 in which the dielectric layer of the picture element electrode includes a depressed portion will be described with reference to FIG. 35, which shows a cross-sectional view illustrating the structure of one picture element region of the liquid crystal display device 600.

The dielectric layer 13 of the picture element electrode 15 of the liquid crystal display device 600 includes a depressed portion 13b corresponding to the opening 14a of the upper conductive layer 14. Other than this, the structure of the liquid crystal display device 600 is substantially the same as that of the liquid crystal display device 500 illustrated in FIG. 34A to FIG. 34C.

In the liquid crystal display device 600, a portion of the dielectric layer 13 located in the opening 14a of the upper conductive layer 14 of the picture element electrode 15 is not completely removed, whereby the thickness d3 of a portion of the liquid crystal layer 30 located in the opening 14a is smaller than the thickness d2 of the corresponding portion of the liquid crystal layer 30 located in the opening 14a of the liquid crystal display device 500 by the thickness of the dielectric layer 13 in the depressed portion 13b. Moreover, the voltage applied across the region of the liquid crystal layer 30 in the opening 14a is subject to the voltage drop (capacitance division) due to the dielectric layer 13 in the depressed portion 13b, and thus is lower than the voltage applied across the region of the liquid crystal layer 30 on the upper conductive layer (the region thereof excluding the opening 14a). Therefore, by adjusting the thickness of the dielectric layer 13 in the depressed portion 13b, it is possible to control the relationship between the variations in retardation amount due to the difference in thickness of the liquid crystal layer 30 and the variations in the applied voltage across the liquid crystal layer 30 depending upon the location (the amount of decrease in the voltage applied across the liquid crystal layer in the opening 14a), so as to ensure that the relationship between the applied voltage and the retardation does not depend upon the location in the picture element region. More strictly, the relationship between the applied voltage and the retardation can be controlled to be uniform across the picture element region, thereby realizing a high-quality display, by adjusting the birefringence of the liquid crystal layer, thickness of the liquid crystal layer, the dielectric constant and the thickness of the dielectric layer, and the thickness (or depth) of the depressed portion of the dielectric layer. Particularly, as compared to a transmission type liquid crystal display device having a flat-surface dielectric layer, there is an advantage that the decrease in transmittance due to a decrease in the voltage applied across the region of the liquid crystal layer 30 corresponding to the opening 14a of the upper conductive layer 14 (the decrease in the light efficiency) is suppressed.

In the above description, the same voltage is applied to the upper conductive layer 14 and the lower conductive layer 12 of the picture element electrode 15. When different voltages are applied to the lower conductive layer 12 and the upper conductive layer 14, it is possible to increase the variety of structures of liquid crystal display devices capable of displaying an image without display non-uniformity. For example, in the structure where the dielectric layer 13 is provided in the opening 13a of the upper conductive layer 14, a voltage lower than the voltage applied to the upper conductive layer 14 by the voltage drop due to the dielectric layer 13 is applied to the lower conductive layer 12, whereby it is possible to prevent the voltage applied across the liquid crystal layer 30 from varying depending upon the location in the picture element region.

In the liquid crystal display device 500 and the liquid crystal display device 600 of Embodiment 4, as in the liquid crystal display device 100 of Embodiment 1, the liquid crystal molecules 30a incline, starting from those at the edge portion of the opening 14a, by the function of the inclined electric field produced by the two-layer picture element electrode 15 including the upper conductive layer 14 having the opening 14a, whereby the liquid crystal layer 30 in each picture element region takes a radially-inclined orientation about the opening 14a. The formation of a radially-inclined orientation will not be further described below.

The structure of the picture element electrode of the liquid crystal display device of the present embodiment will be described in greater detail with reference to FIG. 36A and FIG. 36B. Each of FIG. 36A and FIG. 36B is an enlarged cross-sectional view schematically illustrating a structure around the picture element electrode. FIG. 36A illustrates the structure of a picture element electrode where the upper conductive layer 14 is not formed on the side wall of the opening 13a of the dielectric layer 13, and FIG. 36B illustrates the structure of another picture element electrode where the upper conductive layer 14 is formed on the side wall of the opening 13a of the dielectric layer 13.

The liquid crystal display device 500 and the liquid crystal display device 600 respectively illustrated in FIG. 34A to FIG. 34C and FIG. 35 both have the structure as illustrated in FIG. 36A. The picture element electrode structure illustrated in FIG. 36A is preferred over that illustrated in FIG. 36B for the following reason. In the picture element electrode structure illustrated in FIG. 36A, the inclined electric field produced at the edge portion of the opening 14a of the upper conductive layer 14 is more inclined (with a larger inclination angle), whereby the liquid crystal molecules 30a in the vicinity of the edge portion can be more stably inclined (in a uniquely defined direction). As can be seen from the equipotential lines EQ shown in FIG. 36A, since a portion of the equipotential lines EQ in the opening 14a is drawn into the side wall of the opening 13a of the dielectric layer 13, the degree of inclination of the equipotential lines EQ at the edge portion of the opening 14a is greater than the inclination of the side wall. Thus, the liquid crystal molecules 30a whose orientation is regulated vertical to the surface of the side wall of the opening 13a (on the vertical alignment film (not shown) formed on the side surface) can be inclined in a uniquely defined direction (the counterclockwise direction in the illustrated example). Moreover, as can be seen from FIG. 36A, it is preferred that the inclination angle θ of the side wall is small so that the liquid crystal molecules 30a on the side wall of the opening 13a are inclined (rotated) in a uniquely defined direction by the inclined electric field.

In contrast, when the upper conductive layer 14 is formed on the side wall of the opening 13a of the dielectric layer 13, the equipotential lines EQ are parallel to the surface of the upper conductive layer 14 on the side wall as shown in FIG. 36B, whereby the inclination of the equipotential lines EQ at the edge portion of the opening 14a is less steep than the inclination of the side wall. Therefore, the equipotential lines EQ are perpendicular to the liquid crystal molecules 30a whose orientation is regulated to be vertical to the surface of the side wall of the opening 13a of the dielectric layer 13 (the vertical alignment film (not shown) formed on the upper conductive layer), whereby the direction in which the liquid crystal molecules 30a incline may not be uniquely defined. A portion of the upper conductive layer 14 may overlap a portion of the lower conductive layer 12 so as to electrically connect the upper conductive layer 14 to the lower conductive layer 12. In such a case, it is no longer necessary to separately provide contact holes for electrically connecting the upper conductive layer 14 to the lower conductive layer 12. In this way, the aperture ratio can be improved particularly in a reflection type liquid crystal display device in which the upper conductive layer 14 formed on the flat surface (upper surface) of the dielectric layer 13 is used as a reflection electrode (reflection layer).

The above description of the structure where the dielectric layer 13 includes the opening 13a also applies to the structure where the dielectric layer 13 includes the depressed portion 13b.

A liquid crystal display device including a picture element electrode in which the upper conductive layer 14 includes one opening 14a for each picture element region has been described above as the liquid crystal display device of the present embodiment. However, the present embodiment is not limited to the above-described example, but may also be applied to a liquid crystal display device having a plurality of openings 14a for each picture element region. The above-described structure where the opening 13a or the depressed portion 13b is formed in the dielectric layer 13 corresponding to the opening 14a of the upper conductive layer 14 can be applied to any of the liquid crystal display devices described above in Embodiment 1.

Embodiment 5

FIG. 37A and FIG. 37B schematically illustrate one picture element region of a liquid crystal display device 700 of Embodiment 5. FIG. 37A is a cross-sectional view of the liquid crystal display device 700, and FIG. 37B is a plan view of the liquid crystal display device 700. FIG. 37A is a cross-sectional view taken along line 37A–37A' of FIG. 37B. The structure of the liquid crystal display device 700 is substantially the same as that of the liquid crystal display device 500 of Embodiment 4 except that the lower conductive layer 12 further includes an opening 12a, and thus the common elements will not be further described below.

The lower conductive layer of the picture element electrode 15 of the liquid crystal display device 700 includes the opening 12a in a region of the dielectric layer 13 which is exposed through the opening 13a. As illustrated in FIG. 37B, the circular opening 13a of the dielectric layer 13 is provided at the center of the picture element region, i.e., in a position corresponding to the circular opening 14a which is provided in the central portion of the upper conductive layer 14. The opening 12a which is provided in the portion of the lower conductive layer 12 exposed through the opening 13a of the dielectric layer 13 is located at the center of the opening 14a and the opening 13a.

When a voltage is applied through the liquid crystal layer 30 of the liquid crystal display device 700, an electric field represented by the equipotential lines EQ shown in FIG. 37A is produced. The equipotential lines EQ once drop at the edge portion EG of the opening 14a of the upper conductive layer 14 and further drop in the opening 12a of the lower conductive layer 12.

Since an inclined electric field is also formed at the edge portion of the opening 12a of the lower conductive layer 12, the orientation change of the liquid crystal molecules 30a in the liquid crystal layer 30 across which a voltage is applied occurs with the inclination of the liquid crystal molecules 30a at the edge portion of the opening 14a and at the edge portion of the opening 12a serving as a trigger, thereby forming a radially-inclined orientation about the liquid crystal molecules 30a which are vertically oriented at the center of the opening 12a. Thus, by providing the opening 12a at the center of the lower conductive layer 12 opposing the opening 14a, in addition to providing the opening 14a of the upper conductive layer 14, the position of the radially-inclined orientation of the liquid crystal molecules 30a in the opening 14a can be accurately and stably controlled, whereby it is possible to further stabilize the radially-inclined orientation and improve the response speed.

Since no voltage is applied across the region of the liquid crystal layer 30 corresponding to the opening 12a, it is preferred that the opening 12a is not large. Typically, the diameter of the opening 12a is preferably about 8 $\mu$m or less. Since the opening 12a is only required to be provided at the center of the radially-inclined orientation, only one opening 12a at the center of each opening 14a is sufficient. As described above with respect to the opening 14a, the shape of the opening 12a is not limited to a circle and may alternatively be an ellipse or a polygon.

The function of the opening 12a has been described above with respect to the structure where the opening 13a is provided in the dielectric layer 13. The opening 12a may alternatively be used with the structure where the depressed portion 13b is provided in the dielectric layer 13 (FIG. 35) or the structure where the flat dielectric layer 13 is used (e.g., FIG. 1A to FIG. 1C). Thus, the structure where the lower conductive layer 12 of the picture element electrode 15 includes the opening 12a in a region opposing the opening 14a of the upper conductive layer 14, which has been described above with respect to the liquid crystal display device 700, can be suitably used in combination with any of the above-described liquid crystal display devices of Embodiments 1 and 2. However, since the opening 12a is small (typically, with a diameter of 8 $\mu$m or less), a sufficient effect may not be obtained when the dielectric layer 13 above the opening 12a is thick.

Application to Transmission-Reflection Type Liquid Crystal Display Device

A transmission-reflection type liquid crystal display device (hereinafter, referred to simply as a "two-way liquid crystal display device") refers to a liquid crystal display device which includes, in each picture element region, a transmission region displaying an image in a transmission mode and a reflection region displaying an image in a reflection mode. Typically, the transmission region and the reflection region are defined respectively by a transparent electrode and a reflection electrode. The reflection region can be defined by a structure using a combination of a reflection layer and a transparent electrode instead of the reflection electrode.

In the two-way liquid crystal display device, an image can be displayed in either the reflection mode or the transmission mode which can be switched from one to another, or an image can be displayed in both display modes at the same time. Therefore, for example, the reflection mode display can be used under an environment with bright ambient light, and the transmission mode display can be used under a dark environment. When both of these display modes are used at the same time, it is possible to suppress the decrease in the contrast ratio which is observed when a transmission mode liquid crystal display device is used under an environment with a bright ambient light (a state where light from a fluorescent lamp or sun light is directly incident upon the display plane at a certain angle). Thus, the two-way liquid crystal display device can compensate for the drawback of a transmission type liquid crystal display device. The ratio between the area of the transmission region and that of the reflection region can be suitably determined according to the application of the liquid crystal display device. For a liquid crystal display device which is used exclusively as a transmission type display device, the area ratio of the reflection region can be reduced to such a degree that an image cannot be displayed in a reflection mode, and it is still possible to compensate for the drawback of a transmission type liquid crystal display device described above.

The structure and operation of a two-way liquid crystal display device will now be described with reference to FIG. 38A, FIG. 38B and FIG. 38C. Two-way liquid crystal display devices 150, 550 and 650, respectively illustrated in FIG. 38A, FIG. 38B and FIG. 38C, have structures which are basically the same as those of the liquid crystal display device 100 of Embodiment 1, the liquid crystal display device 500 of Embodiment 4, and the liquid crystal display device 600 of Embodiment 4, respectively. The two-way liquid crystal display device is not limited to these illustrated examples. An alternative two-way liquid crystal display device can be obtained by employing any other liquid crystal display device described above in Embodiment 1, 2 and 3, while providing one of the upper electrode layer and the lower electrode layer as a transparent conductive layer and the other as a reflection conductive layer.

In the two-way liquid crystal display device 150 illustrated in FIG. 38A, an upper conductive layer 14T of the picture element electrode 15 is made of a transparent conductive layer, and a lower conductive layer 12R is made of a conductive layer having a light-reflecting property (typically, a metal layer). Each picture element region defined by the picture element electrode 15 includes a reflection region R defined by the reflective lower conductive layer 12R and a transmission region T defined by the transparent upper conductive layer 14T. In view of the overlap between the transparent upper conductive layer 14T and the reflective lower conductive layer 12R and the contribution to the display of light which is incident upon the device in an inclined direction with respect to the substrate normal (the direction normal to the display plane), the reflection region R and the transmission region T overlap each other in the vicinity of the boundary therebetween. However, for the sake of simplicity, these regions are shown to be separate from each other, assuming a display mode such that light is incident in the substrate normal.

The basic structure of the two-way liquid crystal display device 150 is the same as that of the liquid crystal display device 100, and therefore the liquid crystal layer thereof is driven substantially in the same manner as that of the liquid crystal display device 100. Specifically, the liquid crystal layer 30 takes a stable radially-inclined orientation in the presence of an applied voltage by the function of the two-layer picture element electrode 15, thereby realizing a liquid crystal display device having a desirable viewing angle characteristic.

The display operation of the two-way liquid crystal display device 150 will now be described.

When the two-way liquid crystal display device 150 is in a white display, light which is incident upon the transmission region T from a backlight (not shown) provided on the outer side (the lower side of the figure) of the TFT substrate 110a passes successively through the substrate 11, the dielectric layer 13, and the transparent upper conductive layer 14T and is emitted to the counter substrate 100b side via the liquid crystal layer 30. The light coming from the counter substrate 100b side (typically, the ambient light) successively passes through the substrate 21, the counter electrode 22, the liquid crystal layer 30 and the dielectric layer 13, and is incident upon the reflective lower conductive layer 12R, by which it is reflected. The reflected light passes along the same path in the opposite direction and is emitted to the counter substrate 100b side.

Thus, light contributing to the display in a transmission mode passes through the liquid crystal layer 30 only once, whereas light contributing to the display in a reflection mode passes therethrough twice. Therefore, when the same voltage is applied across the liquid crystal layer 30 which has a uniform thickness (d5) across the entire picture element region (the transmission region T and the reflection region R), the amount of change in the retardation due to the liquid crystal layer 30 which is experienced by the transmitted light and that experienced by the reflected light do not coincide with each other. As a result, in the presence of an applied voltage across the liquid crystal layer 30, the same gray level cannot be produced at the same time by the transmitted light and the reflected light, thereby deteriorating the display quality.

However, the above-described problem can be avoided with the two-way liquid crystal display device 150 of the present invention, as will be described below.

Since the two-way liquid crystal display device 150 includes the two-layer picture element electrode 15, the voltage applied across the reflection region R of the liquid crystal layer 30 (the voltage between the reflective lower conductive layer 12R and the counter electrode 22) is lower than the voltage applied across the transmission region T of the liquid crystal layer 30 (the voltage between the transparent upper conductive layer 14T and the counter electrode 22) by the influence of the voltage drop due to the dielectric layer 13 as described above with respect to the liquid crystal display device of Embodiment 1. As a result, the amount of change in the retardation due to the liquid crystal layer 30 in the reflection region R is less than the amount of change in the retardation due to the liquid crystal layer 30 in the transmission region T. Therefore, the amount of change in the retardation due to the liquid crystal layer 30 in the transmission region T and the amount of change in the retardation due to the liquid crystal layer 30 in the reflection region R can be brought closer to each other by adjusting the birefringence and thickness of the liquid crystal layer 30 and the dielectric constant and thickness of the dielectric layer 13. In other words, the influence of the optical path length on the retardation of the reflected light can be compensated for by adjusting the applied voltage.

As described above, when the two-way liquid crystal display device 150 of the present invention is used, the voltage-transmittance characteristics in the transmission mode and the voltage-reflectance characteristics in the reflection mode can be brought closer to each other. Thus, it is possible to obtain a transmission-reflection type liquid crystal display device having a desirable viewing angle characteristic in all azimuthal angles and a high visibility in any environment.

Next, the structure and operation of the two-way liquid crystal display device 550 will be described with reference to FIG. 38B. The picture element electrode 15 of the two-way liquid crystal display device 550 includes an upper conductive layer 14R which is made of a conductive layer having a light-reflecting property and a lower conductive layer 12T which is made of a transparent conductive layer. Each picture element region defined by the picture element electrode 15 includes a reflection region R defined by the reflective upper conductive layer 14R and a transmission region T defined by the transparent lower conductive layer 12T. Other than this, the basic structure of the two-way liquid crystal display device 550 is as that of the liquid crystal display device 500 illustrated in FIG. 34A to FIG. 34C, and thus will not be further described below.

The thickness of the liquid crystal layer 30 in the region other than the opening 14a of the reflective upper conductive layer 14R of the two-way liquid crystal display device 550 (i.e., in the reflection region R) will be denoted as d1, and the thickness of the liquid crystal layer 30 in the opening 14a of the reflective upper conductive layer 14R and the opening 13a of the dielectric layer 13 (i.e., in the transmission region T) will be denoted as d2. Light which contributes to the reflection mode display (the reflected light) passes twice through the liquid crystal layer 30 in the reflection region R having the thickness d1. Light which contributes to the transmission mode display (the transmitted light) passes once through the liquid crystal layer 30 in the transmission region T having the thickness d2. Therefore, when the dielectric layer 13 is designed so as to have a thickness equal to d1, then, d1=d2/2. Thus, the total distance which the reflected light travels through the liquid crystal layer 30 can be matched with the distance the transmitted light travels through the liquid crystal layer 30. Since the picture element electrode 15 of the two-way liquid crystal display device 550 has a structure where the transparent lower conductive layer 12T is exposed in the opening 13a of the dielectric layer 13 (a structure where no dielectric layer 13 exists on the transparent lower conductive layer 12T), the voltage applied across the liquid crystal layer 30 in the transmission region T is equal to the voltage applied across the liquid crystal layer 30 in the reflection region R.

Therefore, when the thickness d1 of the liquid crystal layer 30 in the reflection region R and the thickness d2 of the liquid crystal layer 30 in the transmission region T satisfy the relationship of 2·d1=d2, the amount of change in the retardation due to the liquid crystal layer 30 which is experienced by the transmitted light and that experienced by the reflected light do coincide with each other in the presence of the same applied voltage across the reflective lower conductive layer 12R and the transparent upper conductive layer 14T. However, when the thickness of the liquid crystal layer 30 in the reflection region R is different from that in the transmission region T, the strength of the electric field produced may differ between these regions for the same applied voltage. Therefore, it is more preferred that the relationship between d1 and d2 is shifted from 2·d1=d2 in view of the difference in electric field strength.

As described above, when the two-way liquid crystal display device 550 of the present invention is used, the voltage-transmittance characteristics in the transmission mode and the voltage-reflectance characteristics in the reflection mode can be brought closer to each other. Thus, it is possible to obtain a transmission-reflection type liquid crystal display device having a desirable viewing angle characteristic in all azimuthal angles and a high visibility in any environment.

Next, the structure and operation of the two-way liquid crystal display device 650 will be described with reference to FIG. 38C. The picture element electrode 15 of the two-way liquid crystal display device 650 includes the upper conductive layer 14R which is made of a conductive layer having a light-reflecting property and the lower conductive layer 12T which is made of a transparent conductive layer. Each picture element region defined by the picture element electrode 15 includes a reflection region R defined by the reflective upper conductive layer 14R and a transmission region T defined by the transparent lower conductive layer 12T. Other than this, the basic structure of the two-way liquid crystal display device 650 is as that of the liquid crystal display device 600 illustrated in FIG. 35, and thus will not be further described below.

The thickness of the liquid crystal layer 30 in the region other than the opening 14a of the reflective upper conductive layer 14R of the two-way liquid crystal display device 650 (i.e., in the reflection region R) will be denoted as d1, and the thickness of the liquid crystal layer 30 in the opening 14a of the reflective upper conductive layer 14R and the depressed portion 13b of the dielectric layer 13 (i.e., in the transmission region T) will be denoted as d3. The thickness d3 of the liquid crystal layer 30 in the transmission region T is greater than the thickness d1 of the liquid crystal layer 30 in the reflection region R by the depth of the depressed portion 13b of the dielectric layer 13. Light which contributes to the reflection mode display (the reflected light) passes twice through the liquid crystal layer 30 in the reflection region R having the thickness d1. Light which contributes to the transmission mode display (the transmitted light) passes once through the liquid crystal layer 30 in the transmission region T having the thickness d3. Thus, the distance the transmitted light travels through the liquid crystal layer 30 is d3, and the distance the reflected light travels through the liquid crystal layer 30 is 2·d1.

The voltage applied across the liquid crystal layer 30 in the transmission region T is subject to a voltage drop (capacitance division) due to the dielectric layer 13 in the depressed portion 13b, and thus is lower than the voltage applied across the liquid crystal layer 30 in the reflection region R. Therefore, by adjusting the thickness of the dielectric layer 13 in the depressed portion 13b, it is possible to control the relationship between the variations in retardation amount due to the difference in the distance light travels through the liquid crystal layer 30 and the variations in the applied voltage across the liquid crystal layer 30 depending upon the location (the amount of decrease in the voltage applied across the liquid crystal layer 30 in the transmission region T), so that the relationship between the applied voltage and the retardation in the transmission region T is matched with that in the reflection region R. More strictly, the relationship between the applied voltage and the retardation can be controlled to be uniform across the transmission region and the reflection region, by adjusting the birefringence of the liquid crystal layer, thickness of the liquid crystal layer, the dielectric constant and the thickness of the dielectric layer, and the thickness (or depth) of the depressed portion of the dielectric layer.

As described above, when the two-way liquid crystal display device 650 of the present invention is used, the voltage-transmittance characteristics in the transmission mode and the voltage-reflectance characteristics in the reflection mode can be brought closer to each other. Thus, it is possible to obtain a transmission-reflection type liquid crystal display device having a desirable viewing angle characteristic in all azimuthal angles and a high visibility in any environment.

In FIG. 38A, FIG. 38B and FIG. 38C illustrating the two-way liquid crystal display devices 150, 550 and 650, respectively, the surface of the reflective conductive layer (upper or lower conductive layer) is shown to be flat. Alternatively, the surface of the reflective conductive layer may be processed into a configuration with concave/convex portions, thereby providing a function of diffuse-reflecting (or scattering) light. By providing the reflective conductive layer with the light-diffusing function, it is possible to realize a reflection mode display with no parallax and with a high display quality.

A method for providing the surface of the reflective conductive layer with concave/convex portions may be, for example, the method disclosed in Japanese Laid-Open Patent Publication No. 6-75238.

For example, the dielectric layer 13 is formed by using a photoresist (of either a negative or positive type), and the surface of the resist layer is processed into a configuration with concave/convex portions through a photolithography process using a photomask having a predetermined pattern of light-transmitting portions (or light-blocking portions). As necessary, the resist layer having the concave/convex portions formed thereon may be heated so as to smoothen the concave/convex portions (into a continuous wavy configuration) through a phenomenon of the surface of the resist layer being deformed by heat (thermal deformation). By forming a reflective upper conductive layer on the surface of the dielectric layer 13 having the concave/convex portions formed thereon, it is possible to form concave/convex portions on the surface of the reflective upper conductive layer.

However, when using the reflective upper conductive layer 14R as in the two-way liquid crystal display devices 550 and 650 illustrated in FIG. 38B and FIG. 38C, it is preferred that the height of the dielectric layer 13 at the edge portion of the opening 14a is uniform as illustrated in FIG. 40A and FIG. 40B.

In the liquid crystal display device of the present invention, the liquid crystal molecules are oriented in a radially-inclined orientation by utilizing an inclined electric field which is produced at the edge portion of the opening 14a by the two-layer picture element electrode 15 including the reflective upper conductive layer 14R having the opening 14a.

However, if the concave/convex portions formed on the surface of the dielectric layer 13 (in the figure, each circle schematically illustrates a concave portion or a convex portion) are arranged to overlap the opening 13a or the depressed portion 13b of the dielectric layer 13, as illustrated in FIG. 39A, the thickness of the dielectric layer 13 at the edge portion of the opening 14a varies depending upon the location as illustrated in FIG. 39B. If the concave/convex portions exist on the surface of the dielectric layer 13 at the edge portion, the direction of the inclined electric field produced at the edge portion (the inclination direction of the equipotential line) varies depending upon the location, whereby the stability of the radially-inclined orientation about the opening 14a may decrease, or the state of the radially-inclined orientation may vary depending upon the location of the opening 14a.

In view of this, the surface of the dielectric layer 13 around the opening 14a (the opening 13a or the depressed portion 13b of the dielectric layer 13) may be made flat without providing the concave/convex portions, as illustrated in FIG. 40A, it is possible to obtain a structure where the dielectric layer 13 in the vicinity of the edge portion has a uniform thickness along the entire periphery of the opening 14a, as illustrated in FIG. 40B.

Instead of providing the reflective conductive layer with a light-diffusing function by processing the surface of the reflective conductive layer into a configuration with concave/convex portions, a diffusion layer having a light-diffusing function may be provided on the light-receiving side of the reflective conductive layer. The diffusion layer may be provided either on the inner side of the liquid crystal panel (one side of the substrate which is closer to the liquid crystal layer) or on the outer side (the viewer side). It is preferred that the diffusion layer is provided selectively in the reflection region of the liquid crystal display device.

Arrangement of Polarizing Plate and Phase Plate

A so-called "vertical alignment type liquid crystal display device", including a liquid crystal layer in which liquid crystal molecules having a negative dielectric anisotropy are vertically aligned in the absence of an applied voltage, is capable of displaying an image in various display modes. Among others, the birefringence mode, in which an image is displayed by controlling the birefringence of the liquid crystal layer with an electric field, is preferred in terms of the display quality. The arrangement of polarizing plates and phase plates (wave plates) for improving the display quality of a birefringence-mode vertical alignment type liquid crystal display device will now be described. It is possible to obtain a birefringence-mode liquid crystal display device by providing a pair of polarizing plates on the outer side (the side away from the liquid crystal layer 30) of the pair of substrates (e.g., the TFT substrate and the counter substrate) of any of the liquid crystal display devices described above in Embodiments 1 to 5.

First, the arrangement of polarizing plates will be described with reference to FIG. 41A, FIG. 41B, FIG. 42A and FIG. 42B. FIG. 41A and FIG. 41B illustrate a state in the absence of an applied voltage (OFF state), and FIG. 42A and FIG. 42B illustrate a state in the presence of an applied voltage (ON state).

FIG. 41A is a cross-sectional view schematically illustrating a liquid crystal display device 100A including polarizing plates 50a and 50b on the outer side of the TFT substrate 100a and counter substrate 100b, respectively. The liquid crystal display device 100A may be any of the liquid crystal display devices of Embodiments 1 to 5. The liquid crystal molecules 30a in the liquid crystal layer 30 are in a vertical alignment in the absence of an applied voltage, as illustrated in FIG. 41A.

FIG. 41B schematically illustrates the arrangement of the respective transmission axes (polarization axes) PA of the polarizing plates 50a and 50b as the liquid crystal display device 100A is viewed in the direction normal to the display plane (substrate normal) from the counter substrate 100b side (the viewer side). The solid line arrow in the figure denotes the transmission axis PA1 of the (upper) polarizing plate 50b, and the broken line arrow denotes the transmission axis PA2 of the (lower) polarizing plate 50a. As illustrated in FIG. 41B, the transmission axes PA2 and PA1 of the polarizing plates 50a and 50b are arranged so as to be perpendicular to each other. In other words, the polarizing plates 50a and 50b are arranged in a crossed-Nicols state.

Since the axial orientation of the liquid crystal molecules 30a of the liquid crystal layer 30 in the absence of an applied voltage is vertical to the display plane, the liquid crystal molecules 30a do not give a phase difference to polarized light which is vertically incident upon the liquid crystal layer 30. The phrase "vertical to the liquid crystal layer 30" as used herein refers to being vertical to the plane of the liquid crystal layer 30 which is parallel to the substrates 100a and 100b.

The liquid crystal layer 30 in a vertical alignment does not give a phase difference to the polarized light which is vertically incident upon the liquid crystal layer 30. Therefore, for example, the light which is vertically incident upon the liquid crystal layer 30 from the TFT substrate 100a side becomes linearly-polarized light having a polarization direction along the transmission axis PA2 as it passes through the polarizing plate 50a, and is vertically incident upon the liquid crystal layer 30. Thus, the light passes through the liquid crystal layer 30 while maintaining its polarization direction and is incident upon the polarizing plate 50b. Since the transmission axes PA2 and PA1 of the polarizing plate 50a and the polarizing plate 50b are perpendicular to each other, the linearly-polarized light having passed through the counter substrate 100b is absorbed by the polarizing plate 50b. As a result, the liquid crystal display device 100A produces a black display in the absence of an applied voltage.

In the presence of an applied voltage, the liquid crystal molecules 30a are in a radially-inclined orientation as illustrated in FIG. 42A and FIG. 42B. While only one radially-inclined orientation region is shown in FIG. 42A and FIG. 42B for the sake of simplicity, a plurality of radially-inclined orientation regions may be formed in each picture element region as described above in Embodiments 1 to 5. This also applies to other subsequent figures.

The liquid crystal layer 30 including the liquid crystal molecules 30a in a radially-inclined orientation produces a display as follows. For example, light which is vertically incident upon the liquid crystal layer 30 from the TFT substrate 100a side becomes linearly-polarized light having a polarization direction along the transmission axis PA2 as it passes through the polarizing plate 50a, and is vertically incident upon the liquid crystal layer 30. The liquid crystal molecules 30a which are oriented so that the axial orientation thereof as viewed in the substrate normal direction is parallel or perpendicular to the polarization direction of the linearly-polarized light and the liquid crystal molecules 30a which are in a vertical alignment (the liquid crystal molecules which are located at the center of the radially-inclined orientation) do not give a phase difference to the linearly-polarized light which is vertically incident upon the liquid crystal layer 30. Therefore, linearly-polarized light incident upon a region where the liquid crystal molecules 30a have such an orientation direction passes through the liquid crystal layer 30 while maintaining its polarization direction, and is incident upon the polarizing plate 50b through the counter substrate 100b. Since the transmission axes PA2 and PA1 of the polarizing plate 50a and the polarizing plate 50b are perpendicular to each other, the linearly-polarized light is absorbed by the polarizing plate 50b. As a result, a portion of the radially-inclined orientation region of the liquid crystal layer 30 produces a black display even in the presence of an applied voltage.

On the other hand, another portion of the linearly-polarized light (having a polarization direction parallel to the transmission axis PA2 of the polarizing plate 50a) which is incident upon a region including other liquid crystal molecules 30a (the liquid crystal molecules other than those whose axial orientation as viewed in the substrate normal direction is parallel or perpendicular to the polarization direction of the linearly-polarized light and those which are in a vertical alignment) is given a phase difference by the liquid crystal layer 30. Thus, the linear polarization collapses and the linearly-polarized light becomes elliptically-polarized light. The phase difference is maximum in a region where the polarization direction of the incident linearly-polarized light and the axial orientation of the liquid crystal molecules 30a as viewed in the substrate normal direction make an angle of 45°, and gradually decreases as the axial orientation of the liquid crystal molecules 30a as viewed in the substrate normal direction becomes more parallel or perpendicular to the polarization direction of the incident linearly-polarized light. Therefore, in a region where the molecular axis of the liquid crystal molecules 30a is not parallel to the substrate normal direction and where the axial orientation of the liquid crystal molecules 30a as viewed in the substrate normal direction is not parallel or perpendicular to the polarization direction of the incident linearly-polarized light, the linearly-polarized light incident upon the liquid crystal layer 30 is given a phase difference, whereby the linear polarization thereof collapses (typically, such light becomes elliptically-polarized light). Therefore, when polarized light whose polarization has been converted to another through the liquid crystal layer 30 is incident upon the polarizing plate 50b, a portion of such light is transmitted through the polarizing plate 50b. The amount of the polarized light to be transmitted depends upon the magnitude of the phase difference given by the liquid crystal layer 30, and thus can be adjusted by controlling the voltage to be applied across the liquid crystal layer 30. Thus, a gray-scale display can be produced by controlling the voltage to be applied across the liquid crystal layer 30.

λ/4 Plate

The display quality can be further improved by providing a quarter-wave plate (λ/4 Plate) between the liquid crystal layer and at least one of the pair of polarizing plates provided on opposing sides of the liquid crystal layer. Specifically, the light efficiency can be increased by an arrangement such that circularly-polarized light is incident upon the liquid crystal layer 30 exhibiting a radially-inclined orientation. For example, in the liquid crystal display device disclosed in Japanese Laid-Open Patent Publication No. 10-301114, in which linearly-polarized light is incident upon the vertical alignment type liquid crystal layer of a 4-division multi-domain orientation, the boundary region between adjacent domains of the multi-domain orientation cannot contribute to the display. In contrast, with a structure where circularly-polarized light is incident upon a liquid crystal layer exhibiting a radially-inclined orientation through which the orientation direction changes continuously, it is possible to realize a liquid crystal display device having a higher brightness (higher light efficiency).

The function of a λ/4 plate will be described with reference to FIG. 43A, FIG. 43B, FIG. 44A and FIG. 44B. FIG. 43A and FIG. 43B schematically illustrate a state in the absence of an applied voltage, and FIG. 44A and FIG. 44B schematically illustrate a state in the presence of an applied voltage. In this specification, unless otherwise noted, the term "λ/4 plate" refers to a single layer λ/4 plate, and a phase plate which is made of a plurality of phase plates laminated together and which as a whole satisfies the λ/4 conditions will be referred to particularly as a "broadband λ/4 plate". In the following description, a structure using a single-layer λ/4 plate will be described.

A liquid crystal display device 100B illustrated in FIG. 43A, FIG. 43B, FIG. 44A and FIG. 44B uses the liquid crystal display device 100, and further includes the polarizing plates 50a and 50b and λ/4 plates 60a and 60b provided on the opposing sides thereof. Each of the λ/4 plates 60a and 60b is a phase plate which converts linearly-polarized light whose polarization direction is 45° with respect to the slow axis thereof into circularly-polarized light, or vice versa. Any of the liquid crystal display devices described above in Embodiments 1 to 5 may be used instead of the liquid crystal display device 100.

The liquid crystal display device 100B includes the λ/4 plate 60a between the TFT substrate 100a and the polarizing plate 50a which is provided on the outer side (the side away from the liquid crystal layer 30) of the TFT substrate 100a, and the λ/4 plate 60b between the counter substrate 100b and the polarizing plate 50b which is provided on the outer side of the counter substrate 100b. The respective transmission axes PA2 and PA1 of the polarizing plates 50a and 50b and respective slow axes SL2 and SL1 of the λ/4 plates 60a and 60b are arranged as illustrated in FIG. 43B.

The slow axis SL2 of the λ/4 plate 60a is at an angle of 45° with respect to the transmission axis PA2 of the polarizing plate 50a, and the slow axis SL1 of the λ/4 plate 60b is at an angle of 45° with respect to the transmission axis PA1 of the polarizing plate 50b. The respective transmission axes PA1 and PA2 and the slow axes SL1 and SL2 are arranged so that each pair of axes form an angle of 45° in the same direction (for example, as viewed in the substrate normal direction from the counter substrate 100b side, the slow axes SL1 and SL2 are 45° away from the respective transmission axes PA1 and PA2 both in the clockwise direction, as illustrated in the figure, or both in the counter-clockwise direction).

The liquid crystal layer 30 is in a vertical alignment in the absence of an applied voltage, as illustrated in FIG. 43A, and thus does not give a phase difference to light which is vertically incident upon the liquid crystal layer 30. Therefore, for example, light which is vertically incident upon the liquid crystal layer 30 from the TFT substrate 100a side passes through the polarizing plate 50a, becomes linearly-polarized light whose polarization direction is 45° with respect to the slow axis SL2 of the λ/4 plate 60a, and is incident upon the λ/4 plate 60a. The linearly-polarized light is converted into circularly-polarized light as it passes through the λ/4 plate 60a. The circularly-polarized light passes through the liquid crystal layer 30 while maintaining its polarization, and is incident upon the λ/4 plate 60b. The circularly-polarized light becomes linearly-polarized light whose polarization direction is 45° with respect to the slow axis SL1 as it passes through the λ/4 plate 60b, and is incident upon the polarizing plate 50b. The polarization direction of the linearly-polarized light having passed through the λ/4 plate 60b is perpendicular to the transmission axis PA1 of the polarizing plate 50b. Therefore, the linearly-polarized light is absorbed by the polarizing plate 50b. Thus, the liquid crystal display device 100B produces a black display in the absence of an applied voltage.

In the presence of an applied voltage, the liquid crystal molecules 30a are in a radially-inclined orientation as illustrated in FIG. 44A and FIG. 44B.

The liquid crystal layer 30 including the liquid crystal molecules 30a which are in a radially-inclined orientation gives light incident upon the liquid crystal layer 30 a phase difference according to the polarization direction thereof. For example, light which is vertically incident upon the liquid crystal layer 30 from the TFT substrate 100a side becomes linearly-polarized light whose polarization direction is 45° with respect to the slow axis SL1 of the λ/4 plate 60a as it passes through the polarizing plate 50a, and is incident upon the λ/4 plate 60a. The linearly-polarized light is converted into circularly-polarized light as it passes through the λ/4 plate 60a. The liquid crystal molecules 30a in a vertical alignment (those liquid crystal molecules located at the center of a radially-inclined orientation) do not give a phase difference to the polarized light which is vertically incident upon the liquid crystal layer 30. Therefore, the circularly-polarized light incident upon a region in which the liquid crystal molecules 30a are in a vertical alignment passes through the liquid crystal layer 30 while maintaining its polarization, and is incident upon the λ/4 plate 60b. The circularly-polarized light becomes linearly-polarized light whose polarization direction is 45° with respect to the slow axis SL1 as it passes through the λ/4 plate 60b, and is incident upon the polarizing plate 50b. The polarization direction of the linearly-polarized light having passed through the λ/4 plate 60b is perpendicular to the transmission axis PA1 of the polarizing plate 50b. Therefore, the linearly-polarized light is absorbed by the polarizing plate 50b. Thus, a portion of the radially-inclined orientation region of the liquid crystal layer 30 (only the vertical alignment region) produces a black display even in the presence of an applied voltage.

On the other hand, a portion of the circularly-polarized light (which has resulted through the conversion from linearly-polarized light by the λ/4 plate 60b) which is incident upon the region including the liquid crystal molecules 30a other than those in a vertical alignment is given a phase difference by the liquid crystal layer 30. Thus, the polarization of the circularly-polarized light changes (typically, such light becomes elliptically-polarized light). Therefore, a portion of the polarized light having passed through the λ/4 plate 60b passes through the polarizing plate 50b. The amount of the polarized light to be transmitted depends upon the magnitude of the phase difference given by the liquid crystal layer 30, and thus can be adjusted by controlling the voltage to be applied across the liquid crystal layer 30. Thus, a gray-scale display can be produced by controlling the voltage to be applied across the liquid crystal layer 30.

As described above, in the liquid crystal display device 100B further including the λ/4 plates 60a and 60b, the only region which produces a black display in the presence of an applied voltage is the vertical alignment region (the center of the radially-inclined orientation), whereby there is less region which produces a black display in the presence of an applied voltage as compared to the liquid crystal display device 100A in which the vertical alignment region and also the region where the liquid crystal molecules are oriented in a direction parallel or perpendicular to the transmission axis of a polarizing plate produce a black display in the presence of an applied voltage. Thus, the liquid crystal display device 100B has a higher light efficiency (effective aperture ratio) than that of the liquid crystal display device 100A, thereby realizing a display with a higher brightness.

Generally, it is not easy to completely eliminate the wavelength dispersion of the single-layer λ/4 plates 60a and 60b. For example, when a λ/4 plate which is designed so as to satisfy the λ/4 conditions for light having a wavelength of 550 nm (light of the highest visibility) is used for the λ/4 plates 60a and 60b, the λ/4 plate shifts away from the λ/4 conditions as the wavelength of light shifts away from 550 nm. As a result, when the liquid crystal display device 100B is producing a black display, visible light whose wavelength is shifted from the 550 nm passes through the polarizing plate 50b, thereby causing the coloring phenomenon.

In order to suppress the coloring phenomenon in a black display, the transmission axes PA2 and PA1 of the polarizing plates 50a and 50b can be arranged perpendicular to each other with the slow axes SL2 and SL1 of the λ/4 plates 60a and 60b being also arranged perpendicular to each other, as in a liquid crystal display device 100C illustrated in FIG. 45A and FIG. 45B. The transmission axis PA2 of the polarizing plate 50a and the slow axis SL2 of the λ/4 plate 60a form an angle of 45° and the transmission axis PA1 of the polarizing plate 50b and the slow axis SL1 of the λ/4 plate 60b also form an angle of 45° in the same direction, as in the liquid crystal display device 100B. When the slow axis SL2 of the λ/4 plate 60a and the slow axis SL1 of the λ/4 plate 60b are arranged perpendicular to each other, as described above, the wavelength dispersion of refractive index anisotropy of the λ/4 plate 60a and that of the λ/4 plate 60b are canceled out by each other. As a result, visible light over a wide wavelength range is absorbed by the polarizing plate 50b in a black display, thereby realizing a desirable black display. Particularly, it is preferred to use the same λ/4 plate (or at least λ/4 plates made of the same material) as the λ/4 plate 60a and as the λ/4 plate 60b. With such a structure, it is possible to produce a liquid crystal display device at a lower cost as compared to the structure with a broadband λ/4 plate to be described below.

Another approach for suppressing the occurrence of the coloring phenomenon in a black display due to the wavelength dispersion of refractive index anisotropy of the single-layer λ/4 plates 60a and 60b, as described above, is to use a broadband λ/4 plate in place of a single λ/4 plate. A broadband λ/4 plate is made of a plurality of phase plates laminated together so as to cancel out the influence of the wavelength dispersion, thereby satisfying the λ/4 conditions across the entire visible range (400 nm to 800 nm). For example, a broadband λ/4 plate can be produced by laminating together a single-layer λ/4 plate and a single-layer half-wave plate (hereinafter, referred to as a λ/2 plate").

A liquid crystal display device 100D illustrated in FIG. 46A to FIG. 46C includes the polarizing plates 50a and 50b, the λ/4 plates 60a and 60b, and λ/2 plates 70a and 70b respectively on the opposing sides of the liquid crystal display device 100. On the outer side (the side away from the liquid crystal layer 30) of the TFT substrate 100a, the λ/4 plate 60a, the λ/2 plate 70a and the polarizing plate 50a are provided in this order from the liquid crystal layer 30 side. On the outer side of the counter substrate 100b, the λ/4 plate 60b, the λ/2 plate 70b and the polarizing plate 50b are provided in this order from the liquid crystal layer 30 side.

The λ/4 plate 60b, the λ/2 plate 70b and the polarizing plate 50b are provided on the counter substrate 100b so that the respective optical axes are arranged as illustrated in FIG. 46B. The arrangement is such that the angle between the transmission axis PA1 of the polarizing plate 50b and the slow axis SL1 of the λ/4 plate 60b is 2α±45', wherein α(°) denotes the angle between the transmission axis PA1 of the polarizing plate 50b and the slow axis SL3 of the λ/2 plate 70b.

On the other hand, the λ/4 plate 60a, the λ/2 plate 70a and the polarizing plate 50a are provided on the TFT substrate 10a so that the respective optical axes are arranged as illustrated in FIG. 46C. The arrangement is such that the angle between the transmission axis PA2 of the polarizing plate 50a and the slow axis SL2 of the λ/4 plate 60a is 2β±45°, wherein β(°) denotes the angle between the transmission axis PA2 of the polarizing plate 50a and the slow axis SL4 of the λ/2 plate 70a. Moreover, the angle (2β±45°) between the transmission axis PA2 of the polarizing plate 50a and the slow axis SL2 of the λ/4 plate 60a is selected so as to have the same sign as that of the angle (2α±45°) between the transmission axis PA1 of the polarizing plate 50b and the slow axis SL1 of the λ/4 plate 60b. That is, the arrangement is such that the angle between the transmission axis PA2 and the slow axis SL2 is 2β±45° when the angle between the transmission axis PA1 and the slow axis SL1 is 2α±45°.

Light vertically incident upon the liquid crystal layer 30 in a vertical alignment from the TFT substrate 100a side becomes linearly-polarized light as it passes through the polarizing plate 50a. Then, it passes through the λ/2 plate 70a and becomes linearly-polarized light having a polarization direction at an angle of 2β with respect to the transmission axis PA2 of the polarizing plate 50a. The linearly-polarized light is incident upon the λ/4 plate 60a and is converted into circularly-polarized light. The circularly-polarized light passes through the liquid crystal layer 30 while maintaining its polarization, and is incident upon the λ/4 plate 60b. The light is converted by the λ/4 plate 60b into linearly-polarized light whose polarization direction is at an angle of 45° with respect to the slow axis SL1 of the λ/4 plate 60b. The linearly-polarized light is incident upon the λ/2 plate 70b, becomes linearly-polarized light whose polarization direction is at an angle of 2β+45° with respect to the slow axis SL1 of the λ/4 plate 60b, and is then incident upon the polarizing plate 50b. The polarization direction of the linearly-polarized light having passed through the λ/2 plate 70b is perpendicular to the transmission axis PA1 of the polarizing plate sob, and thus the linearly-polarized light is absorbed by the polarizing plate 50b. Thus, the liquid crystal display device 100D produces a black display in the absence of an applied voltage.

In the liquid crystal display device 100D, the λ/2 plate 70a and the λ/2 plate 70b are provided respectively between the λ/4 plate 60a and the polarizing plate 50a and between the λ/4 plate 60b and the polarizing plate 50b, and the λ/2 plate 70a and the λ/2 plate 70b reduce the wavelength dispersion of refractive index anisotropy of the λ/4 plates 60a and 60b, respectively, thereby realizing a desirable black display without coloring.

In order to further suppress the occurrence of the coloring phenomenon in a black display, it is possible to employ the structure of a liquid crystal display device 100E as illustrated in FIG. 47A to FIG. 47C, in which the transmission axes PA2 and PA1 of the polarizing plates 50a and 50b are perpendicular to each other, the slow axes SL2 and SL1 of the λ/4 plates 60a and 60b are perpendicular to each other, and the slow axes SL4 and SL3 of the λ/2 plates 70a and 70b are perpendicular to each other. Moreover, the arrangement is such that when α(°) denotes the angle between the transmission axis PA1 of the polarizing plate 50b and the slow axis SL3 of the λ/2 plate 70b, the angle between the transmission axis PA1 of the polarizing plate 50b and the slow axis SL1 of the λ/4 plate 60b is 2α±45°, the angle between the transmission axis PA2 of the polarizing plate 50a and the slow axis SL4 of the λ/2 plate 70a is α, and the angle between the transmission axis PA2 of the polarizing plate 50a and the slow axis SL2 of the λ/4 plate 60a is 2α±45°. The angle (2α±45°) between the transmission axis PA2 of the polarizing plate 50a and the slow axis SL2 of the λ/4 plate 60a is selected so as to have the same sign as that of the angle (2α±45°) between the transmission axis PA1 of the polarizing plate 50b and the slow axis SL1 of the λ/4 plate 60b.

When the transmission axes of the polarizing plates 50a and 50b, the slow axes of the λ/4 plates 60a and 60b, and the slow axes of the λ/2 plates 70a and 70b are perpendicular to each other, as described above, the wavelength dispersion of refractive index anisotropy of the λ/4 plate 60a can be canceled out by that of the λ/4 plate 60b. As a result, visible light over a wide wavelength range is absorbed by the polarizing plate 50b in a black display. Thus, the liquid crystal display device 100E realizes an even better black display than that of the liquid crystal display device 100D.

In the above, the effect of the liquid crystal layer 30 on light which is vertically incident upon the liquid crystal layer 30 has been described. In a liquid crystal display device, particularly in those of a transmission type, light which is vertically incident upon the liquid crystal layer 30 provides the greatest contribution to the display. However, light incident upon the liquid crystal layer 30 in an inclined direction also contributes to the display. Such light which is incident upon the liquid crystal layer 30 in an inclined direction is given a phase difference also by the liquid crystal layer 30 in a vertical alignment. Therefore, when the display plane of the liquid crystal display device is viewed in an inclined direction (a direction which is inclined from the direction normal to the display plane), light leakage may occur in a vertical alignment, where a black display is supposed to be produced, thereby reducing the display contrast ratio.

By further providing a phase plate (viewing angle compensation plate) having such a refractive index anisotropy as to cancel out the phase difference given to the light incident man inclined direction, it is possible to realize a liquid crystal display device having a desirable contrast ratio in any viewing angle. The viewing angle compensation plate does not need to be a single phase plate, but may alternatively be a laminate of a plurality of phase plates. The viewing angle compensation plate may be provided either or both of the outer side (the side farthest away from the liquid crystal layer 30) of the TFT substrate 100a and the outer side of the counter substrate 100b.

While a λ/4 plate has been described above for a case where it is used in a transmission type liquid crystal display device, in order to improve the display quality in a reflection type liquid crystal display device or in a reflection mode of a transmission-reflection type liquid crystal display device, it is necessary to reduce the wavelength dispersion of the λ/4 phase plate which is provided on the viewer side of the liquid crystal display device. Therefore, it is preferred to use a broadband λ/4 plate. For a two-way liquid crystal display device, a broadband λ/4 plate may be provided on both sides of the liquid crystal display device so as to cancel out the wavelength dispersion of each broadband λ/4 plate with that of the other, as described above with respect to a transmission type liquid crystal display device.

EXAMPLES

Examples of the present invention will now be described. The present invention is not limited by the following examples. Particularly, the pattern of the openings and solid portion of the upper conductive layer (the shape and arrangement thereof) may be any of the various patterns described above in Embodiment 1.

Example 1

FIG. 48 is a cross-sectional view illustrating a transmission type liquid crystal display device 800 of Example 1, and FIG. 49 is a plan view thereof. FIG. 48 is across-sectional view taken along line 48A–48A' of FIG. 49.

The transmission type liquid crystal display device 800 is, for example, a 3.5-inch, 180 k-pixel (number of dots: 840 (horizontal)×220 (vertical), dot pitch: 86 μm (horizontal)× 229 μm (vertical)) TFT type liquid crystal display device.

The liquid crystal display device 800 includes a TFT substrate 800a, a counter substrate 800b, and the vertical alignment liquid crystal layer 30 provided therebetween. Each of a plurality of picture element regions arranged in a matrix pattern is driven by a voltage applied between a picture element electrode 105 and a counter electrode 122. The picture element electrode 105 is connected, via a TFT 118, to a source line to which a signal voltage is applied, and the TFT 118 is switched by a scanning signal applied from a gate line 108. A signal voltage is applied to the picture element electrode 105 connected to the TFT 118 which is turned ON by the scanning signal.

The picture element electrode 105 includes a lower conductive layer 102, an upper conductive layer 104, and a dielectric layer (an interlayer insulative layer 107 and a photosensitive resin layer 103) provided therebetween. The lower conductive layer 102 and the upper conductive layer 104 are electrically connected to each other via a contact hole 107a. The upper conductive layer 104 includes an opening 104a, thereby producing an inclined electric field at the edge portion thereof in the presence of an applied voltage. One opening 104a is provided in each region which is surrounded by the gate line 108, the source line 114 and a storage capacitance line 119. Accordingly, two openings 104a are provided for each picture element region.

The storage capacitance line 119 is provided so as to extend parallel to the gate line 108 passing substantially the center of the picture element region. The storage capacitance line 119 forms a storage capacitor together with the lower conductive layer 102 which opposes the storage capacitance line 119 via a gate insulating layer 110. The storage capacitor is provided for improving the retention of the picture element capacitance. Of course, the storage capacitor may be omitted, and the structure thereof is not limited to the illustrated example.

First, a method for producing a TFT substrate 800a of the liquid crystal display device 800 will be described with reference to FIG. 50A to FIG. 50E.

Figure 50A:
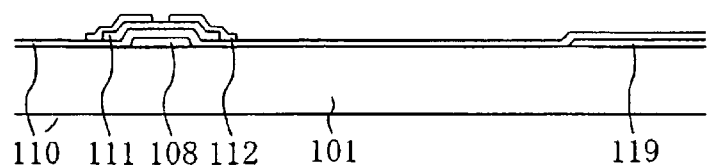

As necessary, an insulative layer (not shown) made of $Ta_2O_5$, $SiO_2$, or the like, is provided as a basecoat layer on an insulative transparent substrate 101, as illustrated in FIG. 50A. Then, a metal layer made of Al, Mo, Ta, or the like, is provided by a sputtering method, and the metal layer is patterned so as to provide the gate electrode (including the gate line) 108. In this example, the gate electrode 108 is provided by using Ta. At this point, the storage capacitance line 119 may be provided in the same step by using the same material.

Then, the gate insulating layer 110 is provided on substantially the entire surface of the substrate 101 so as to cover the gate electrode 108. In this example, an SiNx film having a thickness of about 300 mL is deposited by a P-CVD method so as to provide the gate insulating layer 110. The gate electrode 108 may be subjected to an anodic oxidation process so as to use the anodic oxidation film as the gate insulating layer. Of course, it is possible to employ a two-layer structure including an anodic oxidation film and an insulative film such as SiNx.

Two Si layers to be a channel layer 111 and an electrode contact layer 112, respectively, are deposited successively on the gate insulating layer 110 by using a CVD method. An amorphous Si layer having a thickness of about 150 nm is used for the channel layer 111, and an amorphous Si or microcrystal Si layer which is doped with an impurity such as phosphorus and has a thickness of about 50 nm is used for the electrode contact layer 112. These Si layers are patterned by, for example, a dry etching method using a mixed gas of $HCl+SF_6$, so as to provide the channel layer 111 and the electrode contact layer 112.

Figure 50B:
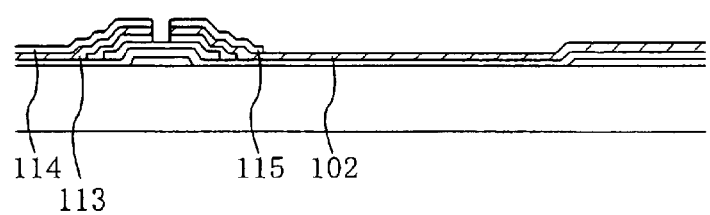

Then, a transparent conductive layer (ITO) 102 to be the lower conductive layer is deposited to a thickness of about 150 nm by a sputtering method, as illustrated in FIG. 50B, followed by deposition of a metal layer 114, 115 made of Al, Mo, Ta, or the like. In this example, Ta is used. These metal layers are patterned so as to provide a source electrode 113, 114 and a drain electrode 113, 115 (hereinafter, referred to as the "source electrode 114"and the "drain electrode 115", respectively). Each of the source electrode 114 and the drain electrode 115 has a two-layer structure, and the conductive layer made of the ITO layer 102 is denoted by the reference numeral 113. The ITO layer 102 functions as the lower conductive layer of the two-layer picture element electrode.

Then, an insulative layer made of SiNx, or the like, is deposited to a thickness of about 300 nm by a CVD method, and then patterned to provide the interlayer insulative layer 107, as illustrated in FIG. SOC. In the patterning step, the contact hole 107a for electrically connecting the upper conductive layer 103 to be formed later to the ITO layer 102 is provided in the interlayer insulative layer 107 above the storage capacitance line 119.

Then, the photosensitive resin layer 103 to be the dielectric layer is provided on the interlayer insulative layer 107, and an opening 103a for exposing the drain electrode 102 is provided in the contact hole 107a of the interlayer insulative layer 107, as illustrated in FIG. SOD by exposing and developing the photosensitive resin layer 103. The photosensitive resin layer 103 is provided to have a thickness of about 1.5 $\mu$m by using, for example, a positive type photosensitive resin (an acrylic resin manufactured by JSR Corporation, relative dielectric constant: 3.7). Alternatively, the photosensitive resin layer 103 may be provided by using a resin with no photosensitivity, separately providing the opening 103a in the non-photosensitive resin layer through a photolithography step using a photoresist.

Figure 50C:
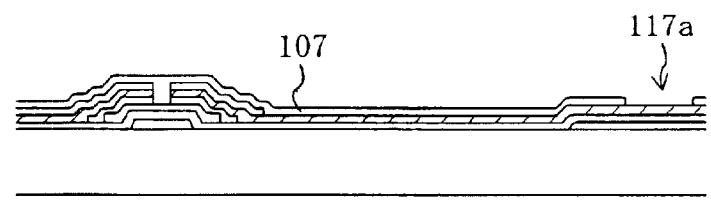
Figure 50D:
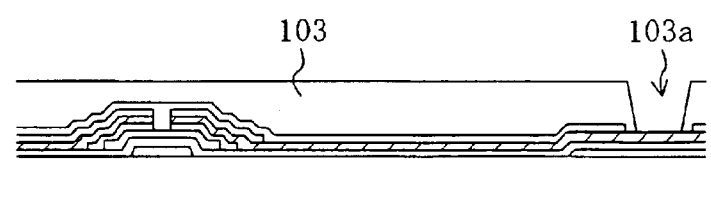
Figure 50E:
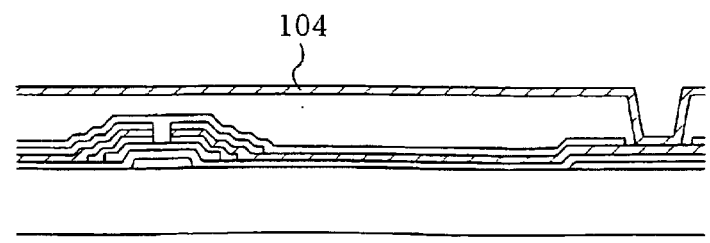

Then, the transparent conductive film (ITO) 104 to be the upper conductive layer is provided to have a thickness of about 100 nm by a sputtering method on the substrate 101 having the interlayer insulative layer 107 and the photosensitive resin layer 103 provided thereon, as illustrated in FIG. 50E.

Then, the opening 104a is provided in the transparent conductive layer 104, thereby obtaining the TFT substrate 800a as illustrated in FIG. 48. The opening 104a can be provided by, for example, the following method.

A photoresist material is applied on the transparent conductive layer 104, and a photoresist layer of a predetermined pattern is obtained by a photolithography process. An etching process is performed using the photoresist layer as a mask, thereby providing the opening 104a. Then, the photoresist layer is removed. In this example, two different oblong rectangular openings 14a, on where a=68 $\mu$m, b=59 $\mu$m (the upper opening in FIG. 49), and another where a=68 $\mu$m, b=36 $\mu$m (the lower opening in FIG. 49), are provided as the openings 104a of the transparent conductive layer 104.

In this way, there is obtained the TFT substrate 800a having a two-layer picture element electrode including the lower conductive layer 102 made of an ITO layer, the upper conductive layer 104 made of an ITO layer, and the interlayer insulative layer 107 and the dielectric layer 103 therebetween.

In this example, the dielectric layer interposed between the upper conductive layer 104 and the lower conductive layer 102 is composed of two layers of the interlayer insulative layer 107 and the photosensitive resin layer 103. Alternatively, the dielectric layer may include only one of these layers or may further include one or more additional layer(s). There are no limitations on the type of material, the thickness, and the number of layers of the dielectric layer provided between the upper conductive layer and the lower conductive layer, as long as the dielectric layer produces an inclined electric field for inclining the liquid crystal molecules at the edge portion of the opening 104a of the upper conductive layer. Preferably, a material having a high transparency is used so as not to reduce the light efficiency.

Another method for producing the TFT substrate 800a of the liquid crystal display device 800 will be described with reference to FIG. 50F to FIG. 50K.

Figure 50F:
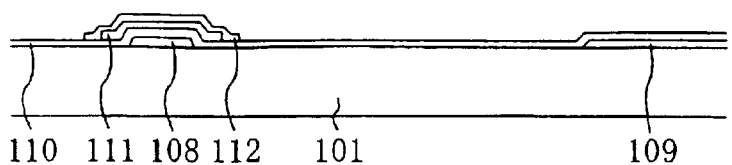

As necessary, an insulative layer (not shown) made of $Ta_2O_5$, $SiO_2$, or the like, is provided as a basecoat layer on the insulative transparent substrate 101, as illustrated in FIG. 50F. Then, a metal layer made of Al, Mo, Ta, or the like, is provided by a sputtering method, and the metal layer is patterned so as to provide the gate electrode (including the gate line) 108. In this example, the gate electrode 108 is provided by using a layered film of Ti/Al/Ti. At this point, the storage capacitance line 119 may be provided in the same step by using the same material.

Then, the gate insulating layer 110 is provided on substantially the entire surface of the substrate 101 so as to cover the gate electrode 108. In this example, an SiNx film having a thickness of about 300 nm is deposited by a P-CVD method so as to provide the gate insulating layer 110.

Two Si layers to be the channel layer 111 and the electrode contact layer 112, respectively, are deposited successively on the gate insulating layer 110 by using a CVD method. An amorphous Si layer having a thickness of about 150 nm is used for the channel layer 111, and an amorphous Si or microcrystal Si layer which is doped with an impurity such as phosphorus and has a thickness of about 50 nm is used for the electrode contact layer 112. These Si layers are patterned by, for example, a dry etching method using a mixed gas of $HCl+SF_6$, so as to provide the channel layer 111 and the electrode contact layer 112.

Figure 50G:
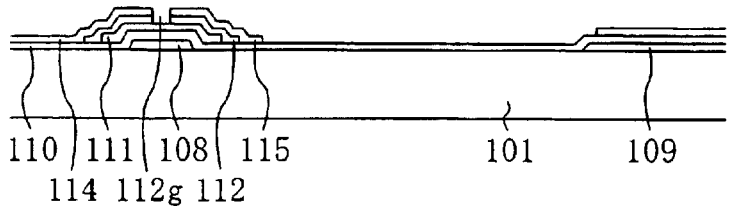

Then, the metal layer 114, 115 made of Al, Mo, Ta, or the like, is deposited as illustrated in FIG. 50G. In this example, a layered film of Al/Ti is used. These metal layers are patterned so as to provide the source electrode 114 and the drain electrode 115. Then, a gap portion 112g is formed by etching in the electrode contact layer 112 through a patterning process by, for example, a dry etching method using a mixed gas of $HCl+SF_6$ while using the source electrode 114 and the drain electrode 115 as a mask.

Figure 50H:
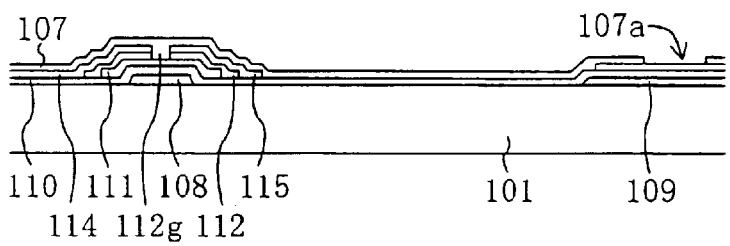

Then, an insulative layer made of SiNx, or the like, is deposited to a thickness of about 300 nm by a CVD method, and then patterned to provide the interlayer insulative layer 107, as illustrated in FIG. 50H. In the patterning step, the contact hole 107a for electrically connecting the lower conductive layer 102 made of an ITO layer to be formed later to the drain electrode 115 is provided in the interlayer insulative layer 107 above the storage capacitance line 119.

Figure 50I:
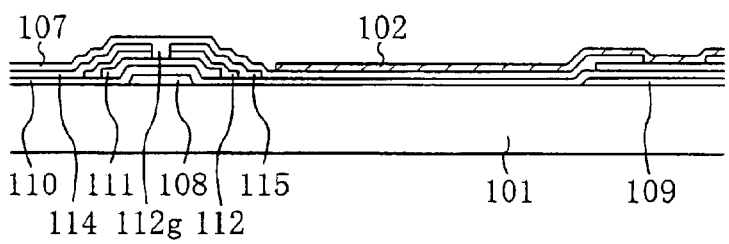

Then, the transparent conductive layer (ITO) 102 to be the lower conductive layer is provided to have a thickness of about 140 nm by a sputtering method, as illustrated in FIG. 50I.

Figure 50J:
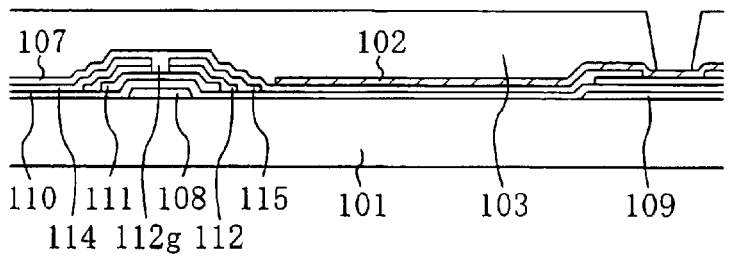

Then, the photosensitive resin layer 103 to be the dielectric layer is provided on the lower conductive layer 102 made of the ITO layer, and the photosensitive resin layer 103 is exposed and developed so as to provide the opening 103a for exposing the lower conductive layer 102 made of the ITO layer, as illustrated in FIG. 50J. The photosensitive resin layer 103 is provided to have a thickness of about 1.5 $\mu$m by using, for example, a positive type photosensitive resin (an acrylic resin manufactured by JSR Corporation, relative dielectric constant: 3.7). Alternatively, the photosensitive resin layer 103 may be provided by using a resin with no photosensitivity, separately providing the opening 103a in the non-photosensitive resin layer through a photolithography step using a photoresist.

Figure 50K:
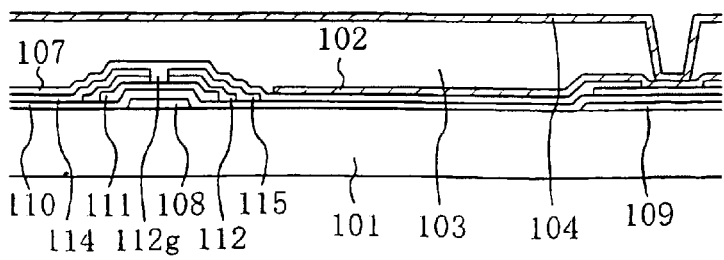

Then, the transparent conductive layer (ITO) 104 to be the upper conductive layer is provided to have a thickness of about 100 nm by a sputtering method on the substrate 101 having the photosensitive resin layer 103 formed thereon, as illustrated in FIG. 50K.

Then, the opening 104a is provided in the transparent conductive layer 104, thereby obtaining the TFT substrate 800a illustrated in FIG. 48. The opening 104a can be provided by, for example, the following method.

A photoresist material is applied on the transparent conductive layer 104, and a photoresist layer of a predetermined pattern is obtained by a photolithography process. An etching process is performed using the photoresist layer as a mask, thereby providing the opening 104a. Then, the photoresist layer is removed.

In this way, there is obtained the TFT substrate 800a having a two-layer picture element electrode including the lower conductive layer 102 made of an ITO layer, the upper conductive layer 104 made of an ITO layer, and the interlayer insulative layer 107 and the dielectric layer 103 therebetween.

There are no limitations on the type of material, the thickness, and the number of layers of the dielectric layer provided between the upper conductive layer and the lower conductive layer, as long as the dielectric layer produces an inclined electric field for inclining the liquid crystal molecules at the edge portion of the opening 104a of the upper conductive layer and thus realizes a stable radially-inclined orientation. Preferably, a material having a high transparency is used so as not to reduce the light efficiency.

On the other hand, the counter substrate 800b can be obtained by providing the counter electrode 122 made of ITO on an insulative transparent substrate 121 by using a sputtering method.

The inner surface of each of the TFT substrate 800a and the counter substrate 800b obtained as described above is subjected to a vertical alignment treatment. A vertical alignment layer is provided by using, for example, polyimide having a vertical alignment power manufactured by JSR Corporation. The vertical alignment layer is not subjected to a rubbing treatment.

Spherical plastic beads having a diameter of 3 µm, for example, are dispersed across the inner surface of the counter substrate 800b, and the counter substrate 800b and the TFT substrate 800a are attached together by using a known sealant. Then, a material which is obtained by adding a chiral agent to a nematic liquid crystal material having a negative dielectric anisotropy (Δn=0.0996) manufactured by Merck & Co., Inc., for example, is injected. In this way, a liquid crystal panel is obtained. Herein, the part of a liquid crystal display device including a pair of substrates (the TFT substrate 800a and the counter substrate 800b in this example) and a liquid crystal layer interposed therebetween is referred to as a "liquid crystal panel".

The polarizing plate 50a is provided on the outer side of the TFT substrate 800a of the obtained liquid crystal panel, and the polarizing plate 50b is provided on the outer side of the counter substrate 800b, so that the respective transmission axes of the polarizing plate 50a and the polarizing plate 50b are perpendicular to each other (see FIG. 41B).

Moreover, the polarizing plate 50a and the polarizing plate 50b are arranged so that each of the respective transmission axes is at 45° with respect to the extension direction of the gate line of the liquid crystal panel.

The liquid crystal display device obtained as described above realizes a desirable black display in the absence of an applied voltage (including when a voltage less than the threshold voltage is applied).

FIG. 51 illustrates the appearance of two adjacent picture element regions in the presence of an applied voltage (a voltage equal to or greater than the threshold voltage) across the liquid crystal layer of the liquid crystal display device 800.

As shown in FIG. 51, an extinction pattern (a dark portion) centered about the center of the opening 104a can be seen in each opening 104a. The liquid crystal molecules are in a vertical alignment at the center of the extinction pattern (the intersection of the curves), and the surrounding liquid crystal molecules are in a radially-inclined orientation about those liquid crystal molecules in a vertical alignment. This is because of the production of an inclined electric field by the two-layer picture element electrode including the opening 104a. The dark portion appears in a generally cross-shaped pattern in the presence of an applied voltage for the following reason. As described above, linearly-polarized light passing through a region in which the liquid crystal molecules are oriented in a direction parallel or perpendicular to the polarization direction of the linearly-polarized light as it is incident upon the liquid crystal layer (i.e., a direction parallel or perpendicular to the transmission axis of the polarizing plate 50a) is not given a phase difference by the liquid crystal layer, and thus passes through the liquid crystal layer while maintaining its polarization. As a result, the light is absorbed by the polarizing plate 50b, and thus does not contribute to the display. In this example, since a liquid crystal material including a chiral agent added thereto is used, the liquid crystal layer takes a radially-inclined orientation of a spiral pattern.

The region appearing to be white (bright) in the presence of an applied voltage is a region in which linearly-polarized light incident upon the liquid crystal layer is given a phase difference by the liquid crystal layer, and the degree of whiteness (brightness) depends upon the magnitude of the phase difference given by the liquid crystal layer. Therefore, a gray-scale display can be produced by controlling the level of the voltage to be applied across the liquid crystal layer so as to change the orientation of the liquid crystal layer and thus to adjust the magnitude of the phase difference given by the liquid crystal layer.

The arrangement of the pair of polarizing plates 50a and 50b whose transmission axes are perpendicular to each other is not limited to that shown in the above example. Alternatively, the arrangement may be such that each transmission axis is parallel or perpendicular to the gate line. Since the liquid crystal layer of the liquid crystal display device of the present invention is a vertical alignment type liquid crystal layer which takes a radially-inclined orientation in the presence of an applied voltage, the direction of the transmission axis of the polarizing plate may be set to any direction. The direction may be suitably determined depending upon the application of the liquid crystal display device in view of the viewing angle characteristic, and the like. Particularly, when the transmission axis of the polarizing plate is parallel or perpendicular to the gate line (or the source line), it is possible to improve the viewing angle characteristic in the vertical direction and the horizontal direction along the display plane. This is because the polarization selectivity of a polarizing plate is highest in a direction parallel or perpendicular to the transmission axis and lowest in a direction at 45° with respect to the transmission axis. Arranging the transmission axis of the polarizing plate in a direction parallel or perpendicular to the gate line also provides an advantage that light leakage does not occur even when the liquid crystal molecules in the vicinity of the gate line incline in a direction perpendicular to the extension direction of the gate line by the inclined electric field from the gate line.

When a λ/4 plate is used so that circularly-polarized light is incident upon the liquid crystal layer, it is possible to eliminate the extinction pattern which is observed substantially along the transmission axis of the polarizing plate and thus to improve the light efficiency. By additionally providing a λ/2 plate or a viewing angle compensation plate, it is possible to suppress the occurrence of the coloring phenomenon in a black display and thus to obtain a liquid crystal display device capable of displaying an image with a high quality.

The liquid crystal display device 800 of this example is a vertical alignment type liquid crystal display device of a normally black mode, capable of displaying an image with a high contrast ratio. Moreover, since a liquid crystal layer in a radially-inclined orientation is used, the liquid crystal display device has a wide viewing angle characteristic in any azimuthal angle. Furthermore, for the formation of the radially-inclined orientation, an inclined electric field produced by a two-layer electrode having an opening is used, whereby it is possible to realize a desirable radially-inclined orientation with a good controllability.

Of course, the structure of the picture element electrode is not limited to that illustrated in this example, but may alternatively be any of the various two-layer electrode structures described above in the preceding embodiments of the present invention. Moreover, it is also possible to obtain a reflection type liquid crystal display device or a transmission-reflection type liquid crystal display device by changing the material of the upper conductive layer and/or the lower conductive layer.

Example 2

As compared to the liquid crystal display device 800 of Example 1, a picture element electrode of a transmission type liquid crystal display device of Example 2 includes a large number of relatively small openings, and the openings are formed across the entirety of the picture element electrode (upper conductive layer). The shape and arrangement of the openings and solid portion are merely exemplary, and any of the various patterns described above in Embodiment 1 may be employed. In view of the display brightness, the pattern illustrated in FIG. 19B is preferred. The area ratio between the openings and the solid portion can be optimized according to the guideline described above with reference to FIG. 22A to FIG. 22C.

Before describing the structure and operation of the liquid crystal display device of Example 2, possible drawbacks of the liquid crystal display device 800 of Example 1 will be described. Note, however, that these drawbacks may not cause any problem depending upon the application of the liquid crystal display device.

First, for the opening 104a (particularly, the larger one, i.e., the upper opening in FIG. 49: a=68 μm, b=59 μm) of the upper conductive layer 104 of the liquid crystal display device 800, since it has a relatively large size, it takes a long time for the liquid crystal layer 30 in the opening 104a to take a stable radially-inclined orientation after application of a voltage across the liquid crystal layer 30. Therefore, the response speed may be insufficient for some applications.

The liquid crystal layer 30 in a region distant from the edge portion of the opening 104a, e.g., a region between the lower edge portion of the lower opening 104a and the gate line 108 in FIG. 49 (the region having a width of about 25 μm in the direction parallel to the source line), may also take a long time to take a stable radially-inclined orientation. Moreover, in the liquid crystal layer 30 near an edge portion of the upper conductive layer 104 distant from the edge portion of the opening 104a (e.g., in a region near the lower right corner of the picture element region shown in FIG. 49), the inclination direction of the liquid crystal molecules 30a may not be stable for each pixel because such a region is influenced by both the inclined electric field produced by the opening 104a and the electric field produced by the signal voltage being applied to the source electrode 114 (113). As a result, non-uniformity may be observed in the display.

The structure and operation of a liquid crystal display device 900 of Example 2 will now be described with reference to FIG. 52 and FIG. 53. FIG. 52 is a cross-sectional view illustrating the liquid crystal display device 900, and FIG. 53 is a plan view thereof. FIG. 52 is a cross-sectional view taken along line 52A–52A' of FIG. 53. In the following description, each element of the liquid crystal display device 900 having substantially the same function as that of the liquid crystal display device 800 of Example 1 will be denoted by the same reference numeral and will not be further described. The liquid crystal display device 900 can be produced by substantially the same process as the liquid crystal display device 800.

As illustrated in FIG. 52, the upper conductive layer 104 of the liquid crystal display device 900 includes a relatively large number of relatively small openings 104a. In the illustrated example, 23 circular openings 104a are provided for each picture element region 105 (for each upper conductive layer 104). The diameter of each opening 104a is 20 μm, and the interval between each pair of openings 104a located adjacent to each other in the row or column direction (the direction parallel to the gate or source line) is 4 μm. The openings 104a are arranged in a square lattice pattern across the entire picture element electrode 105 so that each set of four (2×2) openings 104a located at the respective lattice points of a square lattice has rotational symmetry. The distance between the edge of the outermost one of the openings 104a (the one which is closest to the edge of the upper conductive layer 104) and the edge of the upper conductive layer 104 is about 5 μm.

Since the opening 104a of the upper conductive layer 104 of the liquid crystal display device 900 has a relatively small diameter of 20 μm, the liquid crystal layer 30 in the opening 104a quickly takes a stable radially-inclined orientation in response to an applied voltage. Moreover, since the openings 104a are arranged in a square lattice pattern so that each set of four (2×2) openings 104a located at the respective lattice points of a square lattice has rotational symmetry, the liquid crystal layer 30 between the openings 104a also takes a stable radially-inclined orientation. Furthermore, since the distance between adjacent openings 104a is relatively short, i.e., 4 μm, the liquid crystal layer 30 between the openings 104a also quickly changes its orientation. Moreover, by arranging the openings 104a in the vicinity of (about 5 μm from) the edge portion of the upper conductive layer 104, it is possible to reduce the region in the vicinity of the edge portion of the upper conductive layer 104 where the inclination direction of the liquid crystal molecules is not stable.

It has actually been confirmed that the liquid crystal display device 900 of this example has a higher response speed as compared to the liquid crystal display device 800, with no non-uniformity observed in the display.

As described above, with a structure where a plurality of openings 104a are provided for each picture element electrode 105, it is possible to optimize the size and arrangement of the openings 104a, and to obtain a liquid crystal display device with an improved response speed and an improved stability (including the reproducibility) of the radially-inclined orientation.

In the liquid crystal display devices 800 and 900 of Examples 1 and 2 described above, the voltage applied across the liquid crystal layer 30 in a region above the opening 104a of the upper conductive layer 104 is influenced by a voltage drop due to the photosensitive resin layer 103. Therefore, the voltage applied across the liquid crystal layer 30 in a region above the opening 104a is lower than the voltage applied across the liquid crystal layer 30 in a region above the upper conductive layer 104 (the region excluding the opening 104a). Therefore, when the same voltage (signal voltage) is applied to the upper conductive layer 104 and the lower conductive layer 102, the voltage-transmittance characteristics vary depending upon the location in the picture element region, and the transmittance of the liquid crystal layer 30 in a region above the opening 104a becomes relatively low. While deterioration in a black display (a slight increase in transmittance in the absence of an applied voltage) is not experienced since the liquid crystal display devices 800 and 900 display an image in a normally black mode, it is necessary to apply a voltage higher than normal across the liquid crystal layer in order to realize a sufficient white level (the brightest display state in practical use).

In order to suppress the decrease in the voltage applied across the liquid crystal layer 30 in the opening 104a due to the photosensitive resin layer 103, a depressed portion or an opening may be provided in a portion of the upper conductive layer 103 located in the opening 104a, as described above with reference to FIG. 34A to FIG. 34C and FIG. 35. In Examples 1 and 2, since a photosensitive resin is used, a depressed portion or an opening can be provided by a known photolithography process.

When a depressed portion or an opening is provided in a portion of the photosensitive resin layer 103 located in the opening 104a, it is possible to reduce the decrease in the voltage applied across the liquid crystal layer 30 in the openings 104a due to the photosensitive resin layer 103 and to reduce the decrease in the transmittance due to the upper conductive layer 103, thereby improving the light efficiency. When the thickness of the upper conductive layer 103 in the opening 103a is reduced, the thickness of the liquid crystal layer 30 in a region above the opening 104a becomes greater than the thickness of the liquid crystal layer 30 in a region above the upper conductive layer 104 excluding the opening 104a. That is, the retardation increases, thereby improving the transmittance (light efficiency).

Example 3

FIG. 54 is a cross-sectional view illustrating a transmission-reflection type liquid crystal display device 1000 of Example 3, and FIG. 55 is a plan view thereof. FIG. 54 is a cross-sectional view taken along line 54A–54A' of FIG. 55. In the following description, each element of the liquid crystal display device 1000 having substantially the same function as that of the liquid crystal display device 800 of Example 1 will be denoted by the same reference numeral and will not be further described.

The liquid crystal display device 1000 includes a TFT substrate 1000a, the counter substrate 800b, and the vertical alignment liquid crystal layer 30 provided therebetween. Each of a plurality of picture element regions arranged in a matrix pattern is driven by a voltage applied between the picture element electrode 105 and the counter electrode 122. The picture element electrode 105 is connected to the source line 114 via the TFT 118, and the TFT 118 is switched by a scanning signal applied from the gate line 108. A signal voltage is applied to the picture element electrode 105 connected to the TFT 118 which is turned ON by the scanning signal.

The picture element electrode 105 includes a transparent lower conductive layer 102T which functions as a transparent electrode, a reflective upper conductive layer 104R which functions as a reflection electrode, and a dielectric layer (the interlayer insulative layer 107 and the photosensitive resin layer 103) provided therebetween. The transparent lower conductive layer 102T and the reflective upper conductive layer 104R are electrically connected to each other via the contact hole 107a. The reflective upper conductive layer 104R includes the opening 104a, thereby producing an inclined electric field at the edge portion thereof in the presence of an applied voltage. The photosensitive resin layer 103 includes the opening 103a provided so as to correspond to the opening 104a. The transparent lower conductive layer 102T is exposed through the opening 103a. Eight openings 104a and eight openings 103a are provided for each picture element region.

The liquid crystal display device 1000 can be produced as follows. The steps similar to those in the production method of the liquid crystal display device 800 will not be further described below.

The TFT substrate 10a can be produced by the same process as that of the TFT substrate 800a up to the step of applying the photosensitive resin layer 103 (see FIG. 50A to FIG. 50C).

Then, a photosensitive resin is applied on the interlayer insulative layer 107 as illustrated in FIG. 56A. For example, a positive type photosensitive resin (an acrylic resin manufactured by JSR Corporation) is used as the photosensitive resin, and the photosensitive resin is applied to a thickness of about 3.7 $\mu$m. The thickness is selected so that the thickness after completion of the post-bake step is about 3 $\mu$m.

In the exposure step, the photosensitive resin layer 103 is exposed (e.g., with an exposure of about 50 mJ) by using a photomask having a predetermined pattern so as to form a plurality of smooth concave/convex portions on the surface of the photosensitive resin layer 103 (see, for example, FIG. 40).

By developing the exposed photosensitive resin layer 103, the contact hole 107a, the opening 103a and the concave/convex portions (not shown) on the surface are provided. As necessary, a heat treatment may be performed so as to smoothen the concave/convex portions formed on the surface of the photosensitive resin layer 103.

Then, as illustrated in FIG. 56B, an Mo layer 104R1 and an Al layer 104R2 to be the upper conductive layer are provided in this order by a sputtering method across substantially the entire surface of the substrate 101 so as to each have a thickness of about 100 nm.

Then, the reflective upper conductive layer 104R including the Al layer 104R2/the Mo layer 104R1 is processed into a predetermined pattern through a photolithography, thereby providing the openings 104a. The openings 104a can be produced by the method described above in Example 1.

While the dielectric layer interposed between the upper conductive layer 104 and a lower conductive layer 113 has a two-layer structure including the interlayer insulative layer 107 and the photosensitive resin layer 103 in this example, the dielectric layer may alternatively include either one of these layers or more than two layers, as in Example 1.

Then, the inner surface of each of the TFT substrate 800a, obtained as described above, and the counter substrate 800b, produced by a common method, is subjected to a vertical alignment treatment. For example, a vertical alignment layer is provided by using polyimide having a vertical alignment power manufactured by JSR Corporation. The vertical alignment layer is not subjected to a rubbing treatment.

Spherical plastic beads having a diameter of 3.0 $\mu$m, for example, are dispersed across the inner surface of the counter substrate 800b, and then the counter substrate 800b and the TFT substrate 1000a are attached together by using a known sealant. Then, a nematic liquid crystal material having a negative dielectric anisotropy (n=0.0649) manufactured by Merck & Co., Inc., for example, is injected. In this way, a liquid crystal panel is obtained.

The thickness of the liquid crystal layer 30 of the obtained liquid crystal panel is 3 $\mu$m corresponding to the diameter of the plastic beads in the reflection region (above the reflective upper conductive layer 104R), and about 6 $\mu$m (3 $\mu$m, the plastic beads diameter, plus about 3 $\mu$m, the thickness of the photosensitive resin layer 103 after the post-bake step) in the transmission region (the region corresponding to the opening 104a). By adjusting the thickness of the photosensitive resin layer 103 as described above, the retardation (liquid crystal thickness d×birefringence $\Delta$ n) for light used for the display can be made substantially constant in the transmittance region and in the reflection region, thereby improving the light efficiency.

The pair of polarizing plates 50a and 50b and the pair of $\lambda$/4 plates 60a and 60b are arranged on the obtained liquid crystal panel as illustrated in FIG. 43A and FIG. 43B. Because the display operation in the transmission mode has already been described above, the display operation of the liquid crystal display device 1000 in the reflection mode in the reflection region will be described below.

First, the display operation in the absence of an applied voltage will be described. Light which is incident upon the reflection region from the counter substrate 800b side in a direction vertical to the counter substrate 800b becomes linearly-polarized light as it passes through the polarizing plate 50b, and is incident upon the $\lambda$/4 plate 60b. After converted into circularly-polarized light by the $\lambda$/4 plate 60b, the light is incident upon the liquid crystal layer 30. The circularly-polarized light having passed through the liquid crystal layer 30 and reached the reflective upper conductive layer 104R is reflected by the surface of the reflective upper conductive layer 104R and becomes circularly-polarized light of the opposite rotational direction. Then, the light again passes through the liquid crystal layer 30 and is incident upon the $\lambda$/4 plate 60b. The circularly-polarized light is converted by the $\lambda$/4 plate 60b into linearly-polarized light whose polarization direction is at 45° with respect to the slow axis SL1 of the $\lambda$/4 plate 60b, and is incident upon the polarizing plate 50b. Since the transmission axis PA1 of the polarizing plate 50b and the polarization axis of the linearly-polarized light having passed through the $\lambda$/4 plate 60b are perpendicular to each other, the linearly-polarized light is absorbed by the polarizing plate 50b. Thus, the reflection region of the liquid crystal display device 1000 produces a black display in the absence of an applied voltage, as in the transmission region.

Next, the display operation in the presence of an applied voltage will be described.

Among the liquid crystal molecules 30a in the liquid crystal layer 30 in a radially-inclined orientation in the presence of an applied voltage, those which are vertically aligned with respect to the substrate surface do not give a phase difference to circularly-polarized light. Therefore, such a region produces a black display. Circularly-polarized light incident upon other regions (regions other than the vertical alignment region) of the liquid crystal layer 30 is given a phase difference by the liquid crystal layer 30 as it passes through the liquid crystal layer 30 twice, and is incident upon the $\lambda$/4 plate 60b. Since the polarization of the light incident upon the $\lambda$/4 plate 60b is shifted from a circular polarization, a portion of the light having passed through the $\lambda$/4 plate 60b is transmitted through the polarizing plate 50b. The amount of the polarized light to be transmitted depends upon the magnitude of the phase difference given by the liquid crystal layer 30, and thus can be adjusted by controlling the voltage to be applied across the liquid crystal layer 30. Thus, a gray-scale display can be produced also in the reflection region by controlling the voltage to be applied across the liquid crystal layer 30.

The arrangement of the polarizing plates and the phase plates is not limited to the above example. For example, a $\lambda$/2 plate and/or a viewing angle compensation plate may further be provided as described above with reference to FIG. 41A to FIG. 47C.

When the liquid crystal display device of the present invention is used to produce a two-way liquid crystal display device, the shape, the size, the number, and the arrangement of the openings 104a are not only determined so as to obtain a radially-inclined orientation but also are limited by the desired display characteristics (the area ratio between the transmission region and the reflection region).

For example, for a two-way liquid crystal display device in which the utilization of reflected light is given a high priority, it is necessary to have a large area ratio for the reflective upper conductive layer 104R other than the openings 104a. When a sufficient number of sufficiently large openings 104a cannot be provided, it is difficult to achieve a stable radially-inclined orientation of the liquid crystal layer 30 in the reflection region (above the reflective upper conductive layer 104R). Specifically, the azimuthal angle of the inclination direction of the molecular axis of the liquid crystal molecules 30a in the presence of an applied voltage is not stable (the orientation direction of the liquid crystal molecules 30a in the substrate plane as viewed in the substrate normal direction does not take a radial pattern but varies depending upon the location). Therefore, the orientation of the molecular axis of the liquid crystal molecules 30a in the substrate plane often varies from one picture element region to another.

The display operation of the liquid crystal display device 1000 when a voltage is applied across the liquid crystal layer 30 in the reflection region will be described with reference to FIG. 57. FIG. 57 schematically illustrates a region where two liquid crystal molecules 30a have respective inclination directions (azimuthal angles) different from each other by 180°.

As illustrated in FIG. 57, the same phase difference is given by the liquid crystal molecules 30a to light beams which are respectively incident upon the two liquid crystal molecules 30a having different inclination directions and reflected by the reflective upper conductive layer 104R so as to be emitted to the viewer side. As can be appreciated from the above, variations in the azimuthal angle of orientation direction in a reflection region of a liquid crystal layer displaying an image in the reflection mode are less likely to be observed as display non-uniformity than in the transmission mode.

Example 4

FIG. 58 is a cross-sectional view illustrating a transmission-reflection type liquid crystal display device 1100 of Example 4. The plan view of the liquid crystal display device 1100 would look substantially the same as FIG. 55 and is thus omitted. FIG. 58 corresponds to a cross-sectional view taken along line 54A–54A' of FIG. 55.

In the following description, each element of the liquid crystal display device 1100 having substantially the same function as that of the liquid crystal display device 1000 of Example 3 will be denoted by the same reference numeral and will not be further described. The liquid crystal display device 1100 can be produced by substantially the same process as that of the liquid crystal display device 1000.

The liquid crystal display device 1100 is different from the liquid crystal display device 1000 of Example 3 in that the photosensitive resin layer 103 includes a depressed portion 103b. The depressed portion 103b of the photosensitive resin layer 103 can be provided by, for example, the following method.

In the production process of the liquid crystal display device 1000 described above with reference to FIG. 56A and FIG. 56B, the positive type photosensitive resin (an acrylic resin manufactured by JSR Corporation) applied to a thickness of about 3.7 µm (about 3 µm after the post-bake step) can be exposed (e.g., with an exposure of about 10 mJ) so as to leave a portion (e.g., with a thickness of about 1 µm) of the photosensitive resin layer 103 in the opening 104a (the transmission region). Then, the depressed portion 103b having a predetermined depth (about 2 µm in this example) is provided through the subsequent development step.

By performing the subsequent steps as those of the liquid crystal display device 1000 of Example 3, a liquid crystal panel of the liquid crystal display device 1100 is obtained. In this example, the cell gap setting or the liquid crystal material are the same as those of Example 3.

The thickness of the liquid crystal layer 30 of the obtained liquid crystal panel is 3 µm corresponding to the diameter of the plastic beads in the reflection region (above the reflective upper conductive layer 104R), and about 5 µm (3 µm, the plastic beads diameter, plus about 3 µm, the thickness of the photosensitive resin layer 103 after the post-bake step, minus about 1 µm, the thickness of the remaining portion of the photosensitive resin layer 103 in the opening 104a) in the transmission region (the region corresponding to the opening 104a). By adjusting the thickness of the photosensitive resin layer 103 as described above, the retardation (liquid crystal thickness d×birefringence Δ n) for light used for the display can be made substantially constant in the transmittance region and in the reflection region, thereby improving the light efficiency.

Next, the structure of the edge portion of the opening 103a of the photosensitive resin layer 103 in the liquid crystal display device 1000 of Example 3 and the structure of the edge portion of the depressed portion 103b of the photosensitive resin layer 103 in the liquid crystal display device 1100 of Example 4 will be described with reference to FIG. 59A and FIG. 59B.

As illustrated in FIG. 59A, at the edge portion of the opening 103a of the photosensitive resin layer 103, the thickness of the photosensitive resin layer 103 gradually and continuously decreases from the region with the photosensitive resin toward the region with no photosensitive resin. In other words, the side surface of the opening 103a is tapered. The tapering of the side surface of the opening 103a is due to the photosensitive characteristic and the development characteristic of the photosensitive resin.

At the edge portion of the opening 103a of Example 3, the tapered side surface having a taper angle θ of about 45° is formed as illustrated in FIG. 59A. When a vertical alignment layer (not shown) is provided on the tapered side surface, the liquid crystal molecules 30a are urged to be vertical to the tapered side surface. Therefore, the liquid crystal molecules 30a on the tapered side surface are inclined from the direction vertical to the surface of the substrate (substrate normal direction) even in the absence of an applied voltage. When the taper angle is large, the liquid crystal molecules 30a on the tapered side surface are inclined in the direction opposite to the direction of inclination due to the inclined electric field which is produced in the presence of an applied voltage, thereby causing the radially-inclined orientation to be disturbed.

On the other hand, in the depressed portion 103b of Example 4, the taper angle θ of the tapered side surface can be reduced by leaving a portion of the photosensitive resin layer 103 in the opening 104a as illustrated in FIG. 59B, and the photosensitive resin layer 103 exists between the liquid crystal layer 30 in the opening 104a and the lower conductive layer 102T. Thus, the inclined electric field effectively acts upon the liquid crystal layer 30 in the presence of an applied voltage, thereby obtaining a stable radially-inclined orientation. As a result, it is possible to obtain a liquid crystal display device having a desirable display quality without non-uniformity.

Example 5

A transmission type liquid crystal display device of Example 5 includes a picture element electrode which is different from that of the transmission type liquid crystal display device 900 of Example 2 in that an opening is also provided at the edge portion of the picture element electrode (the upper conductive layer). The liquid crystal display device of Example 5 has substantially the same structure as that of the liquid crystal display device of Example 2 except that the arrangement of the openings of the upper conductive layer 104 is different. Therefore, the common elements will not be further described below.

Before describing the structure and operation of the liquid crystal display device of Example 5, possible drawbacks of the liquid crystal display device 900 of Example 2 will be described. Note, however, that these drawbacks may not cause any problem depending upon the application of the liquid crystal display device.

FIG. 60 schematically illustrates a portion of the upper conductive layer 104 of the liquid crystal display device 900 of Example 2. The upper conductive layer 104 includes a relatively large number of relatively small openings 104a, and the openings 104a are arranged in a square lattice pattern across the entire picture element electrode 105 so that each set of four (2×2) openings 104a located at the respective lattice points of a square lattice has rotational symmetry.

When a voltage is applied across the liquid crystal layer 30, the liquid crystal layer 30 in the circular opening 104a (a region A) of the upper conductive layer 104 quickly takes a stable radially-inclined orientation about the center SA of the opening 104a. The liquid crystal layer 30 in a region (a region B in FIG. 60) which is surrounded by four (2×2) openings 104a located at the respective lattice points of a square lattice takes a stable radially-inclined orientation about the intersection SA of the two diagonals of a square shape defined by the four lattice points in response to an applied voltage.

However, the liquid crystal layer 30 in a region (a region C in FIG. 60) between the outermost ones of the openings 104a (those closest to the edge of the upper conductive layer 104) and the edge of the upper conductive layer 104 cannot achieve a stable orientation because the inclined electric field produced at the edge portion of the upper conductive layer 104 and the inclined electric field produced at the edge portion of the opening 104a have poor symmetry (in terms of the distribution of the direction and strength of the electric field) as compared to the region B in FIG. 60 which is defined by four lattice points. As a result, display non-uniformity or an after image may be observed, and the display quality may be deteriorated.

The above-described drawback can be solved to some extent by arranging the outermost openings 104a at a position close to (about 5 μm from) the edge of the upper conductive layer 104 so as to reduce the area of the region C in the vicinity of the edge portion of the upper conductive layer 104 where the inclination direction of the liquid crystal molecules is not stable, as in the liquid crystal display device 900 of Example 2. However, as long as such a region is used as a display area, there exists some adverse influence on the display quality.

When the outermost openings 104a are too close to the edge of the upper conductive layer 104, the liquid crystal layer 30 in the openings 104a cannot take a stable radially-inclined orientation due to the influence of the inclined electric field at the edge portion of the upper conductive layer 104. Therefore, there is a limit on reducing the region C in the vicinity of the edge of the upper conductive layer 104 where the inclination direction of the liquid crystal molecules is not stable. Another solution is to block light passing through the region C in FIG. 60 where the inclination direction of the liquid crystal molecules is not stable. However, it is not preferred because it reduces the aperture ratio.

In contrast, the upper conductive layer 104 of the liquid crystal display device of Example 5 includes openings 104a' at the edge (sides and corners) of the upper conductive layer 104 as schematically illustrated in FIG. 61, FIG. 62 and FIG. 63. The structure of the upper conductive layer 104 of Example 5 and the operation of the liquid crystal molecules in the presence of an applied voltage across the liquid crystal layer 30 will now be described with reference to these figures. The edge of the upper conductive layer 104 is defined by the boundary of the upper conductive layer 104 (a shape obtained by connecting the outermost sides with straight lines), and is indicated by a solid line in FIG. 61, FIG. 62 and FIG. 63.

As illustrated in FIG. 61, FIG. 62 and FIG. 63, the upper conductive layer 104 of the liquid crystal display device of Example 5 includes the openings 104a' at the edge thereof. Each opening 104a provided in a position other than at the edge preferably has a shape with rotational symmetry (a circle in this example) and has the same size. The centers (rotation axis positions) of the plurality of openings 104a are arranged so as to have rotational symmetry (typically, in a square lattice pattern as illustrated). Each opening 104a' at the edge does not have a shape with rotational symmetry as the opening 104a, but has a shape obtained by removing a portion from the opening 104a with the center thereof being arranged at the edge of the upper conductive layer 104. For example, when the opening 104a is circular, the opening 104a' whose center is located along a side of the upper conductive layer 104 has a semicircular shape as illustrated in FIG. 61. The opening 104a whose center is located at a corner (having an angle of 90°) of the upper conductive layer 104 has a shape of a quarter circle as illustrated in FIG. 62. When the upper conductive layer 104 has a shape obtained by cutting out a portion from a rectangular shape, the opening 104a' whose center is located at the corner of the cut-out portion (having an angle of 270°) has a shape of a three-quarter circle as illustrated in FIG. 63.

As described above, the opening 104a' provided at the edge of the upper conductive layer 104 has a shape which is obtained by removing a portion from a shape having rotational symmetry. Therefore, if at least one of the four openings 104a whose centers are at the four lattice points of a square lattice is the opening 104a provided at the edge, the arrangement as a whole does not have rotational symmetry. However, for each square lattice (having a square shape) which is formed by the centers of each set of four openings 104a and 104a', each corner of the square is occupied by a quarter circle of one of the openings 104a and 104a', and the quarter circles of the four openings 104a and 104a are arranged so as to have rotational symmetry.

With respect to the quarter circle portion (hereinafter, referred to as a "sub-opening") of one of the openings 104a and 104a' at each corner of each square, the entire region defined by the edge of the upper conductive layer 104 is divided into a number of equivalent square regions each being defined by sub-openings. Each set of four adjacent sub-openings form the opening 104a having a shape with rotational symmetry (circle in this example). For each sub-opening defining a square region including a side of the upper conductive layer 104, there are not three adjacent sub-openings, whereby such sub-opening forms an opening of a shape (a three-quarter circle, a semicircle, or a quarter circle) obtained by removing a portion from a shape having rotational symmetry (a circle).

Thus, when the openings 104a and 104a' are arranged as described above, a region corresponding to the opening 104a' located at the edge, within the region defined by the edge of the upper conductive layer 104 (typically corresponding to a pixel), has a shape with a low degree of symmetry, but the remaining region is a collection of regions having rotational symmetry (square regions and the circular openings 104a).

Therefore, when a voltage is applied across the liquid crystal layer 30 of the liquid crystal display device including the upper conductive layer 104 having the openings 104a and 104a' which are arranged as described above, a radially-inclined orientation is taken by the liquid crystal layer 30 in the region A in each opening 104a, in the region B surrounded by the openings 104a, as well as in the region C (a region including a side, but not a corner, of the upper conductive layer 104) surrounded by the openings 104a and 104a, and in the region D (a region including a corner of the upper conductive layer 104). As a result, in the liquid crystal display device of Example 5, the total area of regions which take a radially-inclined orientation in the presence of an applied voltage is larger than in the liquid crystal display device 900 in Example 2, whereby it is possible to realize a high quality display without non-uniformity or an after image.

In FIG. 61, FIG. 62 and FIG. 63, the shape of the opening 104a' at the edge of the upper conductive layer 104 is three quarters, a half or a quarter of the opening 104*a*. However, it may not be possible to arrange the openings 104*a*' as illustrated depending upon the pixel pitch and the size of the upper conductive layer 104. In such a case, the shape of the opening 104*a*' at the edge of the upper conductive layer 104 does not have to be three quarters, a half or a quarter of the opening 104*a*, and the center of the opening 104*a*' may be shifted from the position of rotational symmetry, as long as the liquid crystal layer 30 at the edge portion of the upper conductive layer 104 takes a stable radially-inclined orientation in the presence of an applied voltage.

Moreover, it is not necessary to provide the opening 104*a*' along each side and at each corner of the upper conductive layer 104. Particularly, even if the opening 104*a*' is not provided for a side or a corner of the upper conductive layer 104 which is located on a component such as a bus line (a signal line or a scanning line) which does not transmit light therethrough, the display quality of the liquid crystal display device 900 of Example 2 can still be improved significantly.

As in the transmission type liquid crystal display devices of Examples 1 and 2, in order to suppress the decrease in the voltage applied across the liquid crystal layer 30 in the opening 104*a* due to the photosensitive resin layer 103, a depressed portion or an opening may be provided in the photosensitive resin layer 103 in some of the openings 104*a*, as described above with reference to FIG. 34A to FIG. 34C and FIG. 35.

In this example, a transmission type liquid crystal display device has been described. However, the above-described arrangement of the openings 104*a* and 104*a*' may of course be applied to a transmission-reflection type liquid crystal display device. In such a case, as in the transmission-reflection type liquid crystal display devices of Examples 3 and 4, in order to suppress the decrease in the voltage due to the photosensitive resin layer 103, a depressed portion or an opening may be provided in the photosensitive resin layer 103 in some of the openings 104*a*.

Example 6

A picture element electrode (upper conductive layer) of a transmission type liquid crystal display device of Example 6 includes the openings 104*a* of a different arrangement form that of Example 5, so as to stabilize the radially-inclined orientation of the liquid crystal layer 30 at the edge portion of the upper conductive layer. The liquid crystal display device of Example 6 has substantially the same structure as those of the liquid crystal display devices of Examples 2 and 5 except that the arrangement of the openings of the upper conductive layer 104 is different. Therefore, the common elements will not be further described below.

FIG. 64 illustrates a portion of the upper conductive layer 104 of the liquid crystal display device of Example 6. The structure of the upper conductive layer 104 of Example 6 and the operation of the liquid crystal molecules in the presence of an applied voltage across the liquid crystal layer 30 will now be described with reference to FIG. 64. As illustrated in FIG. 64, the openings 104*a* of the upper conductive layer 104 are arranged in a square lattice pattern so that each set of four (2×2) openings 104*a* located at the respective lattice points of a square lattice has rotational symmetry. Moreover, among these openings 104*a*, those closest to the edge of the upper conductive layer 104 form a square lattice together with virtual openings 104*a*" (which do not actually exist) outside the upper conductive layer 104, and the arrangement is such that the edge of each virtual openings 104*a*" is tangential with the edge of the upper conductive layer 104.

When a region outside the upper conductive layer 104, where no conductive layer is provided, is considered as an opening, the openings 104*a*" are arranged in an arrangement having rotational symmetry (a square lattice in this example) together with the openings 104*a* formed in the upper conductive layer 104. A difference from the arrangement of the openings (including 104*a* and 104*a*') in Example 5 is that all of the openings provided in the upper conductive layer 104 have the same shape (preferably a shape having rotational symmetry (circle in this example)).

When a voltage is applied across the liquid crystal layer 30 of the liquid crystal display device having the upper conductive layer 104 as described above, the liquid crystal layer 30 in the opening 104*a* (the region A) of the upper conductive layer 104 quickly takes a radially-inclined orientation. Moreover, the openings 104*a* are arranged in a square lattice pattern so that each set of four (2×2) openings 104*a* located at the respective lattice points of a square lattice has rotational symmetry. Therefore, the liquid crystal layer 30 in a region between the openings 104*a* (the region B) also takes a stable radially-inclined orientation. Moreover, also in the region C (a region including a side of the upper conductive layer 104) in the vicinity of the edge portion of the upper conductive layer 104, the liquid crystal layer 30 takes a stable radially-inclined orientation due to the three openings 104*a* located at three lattice points of a square lattice and the virtual opening 104*a*" (where no conductive layer exists) located at the other lattice point of the square lattice whose edge is tangential with the edge of the upper conductive layer 104. Also in the region D including a corner of the upper conductive layer 104, the liquid crystal layer 30 takes a stable radially-inclined orientation due to two openings 104*a* located closest to the corner of the upper conductive layer 104 and two virtual openings 104*a*" (where no conductive layer exists) whose edges are tangential with the edge of the upper conductive layer 104.

In FIG. 64, the openings 104*a* are provided so that the edge of each virtual opening 104*a*" located at a lattice point is tangential with a side of the upper conductive layer 104. However, it may not be possible to arrange the openings 104*a* as illustrated depending upon the pixel pitch and the size of the upper conductive layer 104. In such a case, the openings 104*a* may alternatively be provided so as to form square lattices with the edge of the virtual opening 104*a*" being shifted from the edge of the upper conductive layer 104, as long as the liquid crystal layer 30 at the edge portion of the upper conductive layer 104 takes a stable radially-inclined orientation in the presence of an applied voltage.

FIG. 65 illustrates an alternative arrangement to that illustrated in FIG. 64. As the upper conductive layer 104 of FIG. 64, the upper conductive layer 104 illustrated in FIG. 65 is formed so that the edge of each virtual opening 104*a*" located at a lattice point is tangential with the edge of the upper conductive layer 104. However, while each opening 104*a* closest to the edge of the upper conductive layer 104 has a shape with rotational symmetry as the other openings 104*a* in FIG. 64, each opening 104*a*' closest to the edge of the upper conductive layer 104 has a shape obtained by removing a portion from the shape of another opening 104*a* in FIG. 65. Unlike the opening 104*a*' of the upper conductive layer 104 of Example 5 (see, for example, FIG. 61), the center of the opening 104*a*' having a shape which is obtained by removing a portion from the shape of another opening 104*a* is located inwardly away from the edge of the upper conductive layer 104.

When the openings 104*a* and 104*a*' are arranged as illustrated in FIG. 65, the liquid crystal layer 30 at the edge portion of the upper conductive layer 104 (in the region C and the region D) takes a stable radially-inclined orientation in the presence of an applied voltage, as in the arrangement described above with reference to FIG. 64. Moreover, as described above, the openings 104*a* may be arranged so as to form square lattices with the edge of the virtual opening 104*a*" being shifted from the edge of the upper conductive layer 104, as long as the liquid crystal layer 30 at the edge portion of the upper conductive layer 104 takes a stable radially-inclined orientation in the presence of an applied voltage.

Example 7

In a transmission type liquid crystal display device 1200 of Example 7, unlike the transmission type liquid crystal display device 900 of Example 2, contact holes 117*a* for electrically connecting the upper conductive layer 103 to the lower conductive layer 102 are provided at lattice points of square lattices formed by an array of the openings 104*a*.

Before describing the structure and operation of the liquid crystal display device 1200 of Example 7, possible drawbacks of the liquid crystal display device 900 of Example 2 will be described. Note, however, that these drawbacks may not cause any problem depending upon the application of the liquid crystal display device.

As illustrated in FIG. 53, in the upper conductive layer 104 of the liquid crystal display device 900 of Example 2, a relatively large number of relatively small openings 104*a* are arranged in a square lattice pattern across the entire picture element electrode 105 so that each set of four (2×2) openings 104*a* located at the respective lattice points of a square lattice has rotational symmetry. Therefore, when a voltage is applied across the liquid crystal layer 30, the liquid crystal layer 30 in the opening 104*a* of the upper conductive layer 104 quickly takes a stable radially-inclined orientation. In a region which is surrounded by four (2×2) openings 104*a* located at the respective lattice points of a square lattice, there is obtained a stable radially-inclined orientation about the intersection of the two diagonals of a square shape defined by the four lattice points in response to an applied voltage across the liquid crystal layer 30.

However, when the opening 104*a* overlaps the contact hole 107*a*, the electrical connection between the lower conductive layer 102 and the upper conductive layer 104 is lost in such a region. Therefore, it is difficult to arrange the openings 104*a* in a square lattice pattern in a region of the upper conductive layer 104 around the contact hole 107*a*. Thus, in a region around the contact hole 107*a*, the inclined electric field has poor symmetry (in terms of the distribution of the direction and strength of the electric field), whereby a stable orientation cannot be obtained. As a result, display non-uniformity or an after image may be observed, and the display quality may be deteriorated.

This drawback can be solved to some extent by providing the contact hole 107*a* in, for example, a region corresponding to the storage capacitance line 119 where light from the backlight is blocked, as in Example 2, so as to render the region around the contact hole 107*a* where the inclination direction of the liquid crystal molecules is not stable substantially invisible. However, as long as such a region, even only a portion thereof, exists in the light transmitting area, there exists some adverse influence on the display quality. Another solution is to completely block light passing through the region around the contact hole 107*a* shown in FIG. 53 where the inclination direction of the liquid crystal molecules. However, it is not preferred because it reduces the aperture ratio.

In contrast, in the liquid crystal display device 1200 of Example 7, the openings 104*a* are arranged in a square lattice pattern across the entire picture element electrode 105, and the contact holes 117*a* are provided at the lattice points of the square lattice, as illustrated in FIG. 66 and FIG. 67. The structure and operation of the liquid crystal display device 1200 of Example 7 will now be described with reference to these figures. In the following description, each element of the liquid crystal display device 1200 having substantially the same function as that of the liquid crystal display device 900 of Example 2 will be denoted by the same reference numeral and will not be further described. The liquid crystal display device 1200 can be produced by substantially the same process as that of the liquid crystal display device 900.

As illustrated in FIG. 66 and FIG. 67, the openings 104*a* are arranged in a square lattice pattern across the entire picture element electrode 15, and the contact holes 117*a* are provided at the lattice points of the square lattice. Moreover, the openings 104*a* of the upper conductive layer 104 are provided at the respective lattice points also in the region above the storage capacitance line 119 through which light from the backlight is not transmitted. Therefore, the liquid crystal layer 30 in the openings 104*a* of the upper conductive layer 104 quickly takes a stable radially-inclined orientation in response to an applied voltage across the liquid crystal layer 30. The liquid crystal layer 30 above the contact hole 117*a* also quickly takes a stable radially-inclined orientation. This is because the contact hole 117*a* functions as the depressed portion 103*b* provided in the photosensitive resin layer 103 in the transmission type liquid crystal display device 1100 of Example 4 illustrated in FIG. 58.

Moreover, since the openings 104*a* are arranged in a square lattice pattern so that each set of four (2×2) openings 104*a* located at the respective lattice points of a square lattice has rotational symmetry, the liquid crystal layer 30 between the openings 104*a* also takes a stable radially-inclined orientation. Furthermore, since the contact holes 117*a* and the openings 104*a* are arranged in a square lattice pattern so that each set of four (2×2) openings 104*a* and contact holes 117*a* located at the respective lattice points of a square lattice has rotational symmetry, the liquid crystal layer 30 in the vicinity of the contact hole 117*a* between the contact hole 117*a* and the opening 104*a* also takes a stable radially-inclined orientation.

As described above, in the liquid crystal display device 1200 of Example 7, it is possible to eliminate the region around the contact hole 107*a* where the inclination direction of the liquid crystal molecules is not stable, as that seen in the liquid crystal display device 900 of Example 2. Thus, it is possible to obtain a liquid crystal display device having a desirable display quality in which display uniformity or an after image is not observed.

It is preferred that the size of the contact hole 117*a* is the same as the size of the opening 104*a*, as illustrated in FIG. 66, so that the contact hole 117*a* and the opening 104*a* act upon the liquid crystal molecules in substantially the same manner. Particularly, when the contact hole 117*a* and the opening 104*a* have the same size and the same shape, it is possible to obtain a liquid crystal display device having a particularly desirable orientation stability in a region around the contact hole 117*a*. Even when it is difficult to provide the contact hole 117*a* and the opening 104*a* with the same size and the same shape due to pixel pitch and/or structural limitations, it is possible to sufficiently stabilize the orientation of the liquid crystal layer around the contact hole 117*a* by arranging the contact holes 117*a* and the openings 104*a* in an arrangement such that they have rotational symmetry (typically, a square lattice pattern as illustrated).

Of course, the structure illustrated in this example may be applied to a transmission-reflection type liquid crystal display device, or may be combined with any of the preceding examples.

Some examples of the liquid crystal display device of the present invention have been described above. Each liquid crystal display device illustrated in Embodiments 1 to 5 of the present invention can be realized according to any of these examples.

An exemplary specific structure of the liquid crystal display device 600 of FIG. 35 will be described below. Particularly, the structure of the dielectric layer 13 including a depressed portion 513*r* and a preferred method for producing the same will be described.

Example 8

FIG. 68 is a plan view illustrating a transmission type liquid crystal display device 1500 of Example 8, and FIG. 69 is a cross-sectional view taken along line 69A–69A' of FIG. 68.

The liquid crystal display device 1500 includes a TFT substrate 1500*a*, a counter substrate 1500*b*, and a vertical alignment liquid crystal layer 530 provided therebetween. Each of a plurality of picture element regions arranged in a matrix pattern is driven by a voltage applied between a picture element electrode 515 and a counter electrode 522. The picture element electrode 515 is connected, via a TFT 544, to a source line 543 to which a signal voltage is applied, and the TFT 544 is switched by a scanning signal applied from a gate line 541. A signal voltage is applied to the picture element electrode 515 connected to the TFT 544 which is turned ON by the scanning signal.

The picture element electrode 515 includes a lower conductive layer 512, an upper conductive layer 514, and a dielectric layer 513 (a first dielectric layer 513*a* and a second dielectric layer (e.g., a photosensitive resin layer) 513*b*) provided therebetween. The lower conductive layer 512 and the upper conductive layer 514 are electrically connected to each other via a contact hole 545. The upper conductive layer 514 includes openings 514*a*, and an inclined electric field is produced at the edge portion of each of the openings 514*a* in the presence of an applied voltage. Four openings 514*a* are provided in each region which is surrounded by the gate line 541, the source line 543 and a storage capacitance line 542. Eight openings 514*a* are provided for each picture element region.

The storage capacitance line 542 is provided so as to extend parallel to the gate line 541 passing substantially the center of the picture element region. The storage capacitance line 542 forms a storage capacitor together with the lower conductive layer 512 which opposes the storage capacitance line 542 via a gate insulating layer 546. The storage capacitor is provided for improving the retention of the picture element capacitance. Of course, the storage capacitor may be omitted, and the structure thereof is not limited to the illustrated example.

In the liquid crystal display device 1500, the dielectric layer 513 provided on the lower conductive layer 512 includes the first dielectric layer 513*a* and the second dielectric layer 513*b*. An opening 513*a*' having a shape as that of the opening 514*a* is provided in a region of the first dielectric layer (referred to also as the "protection layer") 513*a* opposing the opening 514*a* patterned in the upper conductive layer 514 which is to be provided later. The second dielectric layer 513*b* is provided on the first dielectric layer 513*a* by, for example, applying a photosensitive resin. In the step of providing the second dielectric layer 513*b* on the first dielectric layer 513*a* having the opening 513*a*' therein, the material of the second dielectric layer 513*b* (e.g., a photosensitive resin) falls into the first opening 513*a* of the first dielectric layer 513*a*, thereby forming the depressed portion 513*r* self-aligned with the first opening 513*a*'. The method for applying a photosensitive resin material on the first dielectric layer 513*a* is not limited to an application method, but may alternatively be, for example, a printing method. In view of the formation of contact holes in the second dielectric layer, it is preferred to use a photosensitive resin, in which case the process step can be simplified. However, the material to be used is not limited to this. Alternatively, an inorganic insulative material such as SiOx or SiNx may be deposited by using a thin film deposition method. There is no particular limitation on the material or the method for application of the material, as long as an insulative material can be applied in such a manner that the resultant layer reflects the steps in the surface (the difference in the height of the surface) provided by the first openings 513*a*' in the first dielectric layer 513*a*.

The depth of the depressed portion 513*r* can be controlled by adjusting the thickness of the first dielectric layer 513*a*, and the viscosity and application conditions of the photosensitive resin to be the second dielectric layer 513*b*. Therefore, it is desirable in terms of the productivity and reproducibility as compared to the method in which the depth of the depressed portion 513*r* is adjusted by adjusting the amount of light used in the exposure of the photosensitive resin layer.

In the liquid crystal display device 1500 illustrated in FIG. 69, the depressed portion 513*r* of the second dielectric layer 513*b* is formed by the opening 513*a*' in the first dielectric layer 513*a*. Alternatively, as shown in FIG. 70 illustrating an alternative liquid crystal display device 1500', the gate insulating film 546 under the lower conductive layer 512 may be provided with an opening 546*a* in a region thereof corresponding to the opening 514*a* of the upper conductive layer 514. The lower conductive layer 512 is provided so as to cover, for example, at least the opening 546*a* of the gate insulating film 546 as illustrated. By providing the opening 546*a* in the gate insulating film 546, it is possible to increase the depth of the depressed portion 513*r* without increasing the thickness of the first dielectric layer 513*a*.

Alternatively, as shown in FIG. 71 illustrating an alternative liquid crystal display device 1500", the first dielectric layer 513*a* may be provided under the lower conductive layer 512. With such a structure, the opening 546*a* of the gate insulating layer 546 and the opening 513*a*' of the first dielectric layer 513*a* can be provided at once in a single photolithography step, thereby improving the production efficiency. Of course, it is preferred to select the material so that the gate insulating layer 546 and the first dielectric layer 513*a* can be etched with the same etchant.

Next, a method for producing the above-described liquid crystal display devices 1500, 1500' and 1500" will be described.

FIG. 72A to FIG. 72E are cross-sectional view schematically illustrating the production process of a TFT substrate 1500*a* of the liquid crystal display device 1500.

Figure 72A:
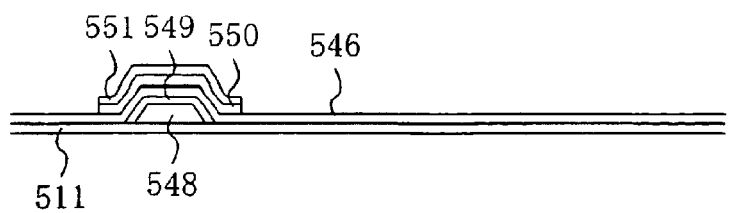

As necessary, an insulative layer (not shown) made of $Ta_2O_5$, $SiO_2$, or the like, is provided as a basecoat layer on an insulative transparent substrate (e.g., a glass substrate) 511, as illustrated in FIG. 72A. Then, a metal layer made of Al, Mo, Ta, or the like, is provided by a sputtering method, and the metal layer is patterned so as to provide a gate electrode (including the gate line 541) 548. In this example, the gate electrode 548 is provided by using Ta. At this point, the storage capacitance line 542 is provided in the same step by using the same material. Then, the gate insulating layer 546 is provided on substantially the entire surface of the substrate 511 so as to cover the gate electrode 548. In this example, an SiNx film having a thickness of about 300 nm is deposited by a P-CVD method so as to provide the gate insulating layer 546. The gate electrode 548 may be subjected to an anodic oxidation process so as to use an anodic oxidation film 549 as the gate insulating layer. Of course, it is possible to employ a two-layer structure including an anodic oxidation film and an insulative film such as SiNx.

Two Si layers to be a channel layer 550 and an electrode contact layer 551, respectively, are deposited successively on the gate insulating layer 546 by using a CVD method. An amorphous Si layer having a thickness of about 150 nm is used for the channel layer 550, and an amorphous Si or microcrystal Si layer which is doped with an impurity such as phosphorus and has a thickness of about 50 nm is used for the electrode contact layer 551. These Si layers are patterned by, for example, a dry etching method using a mixed gas of HCl+SF$_6$, so as to provide the channel layer 550 and the electrode contact layer 551.

Figure 72B:
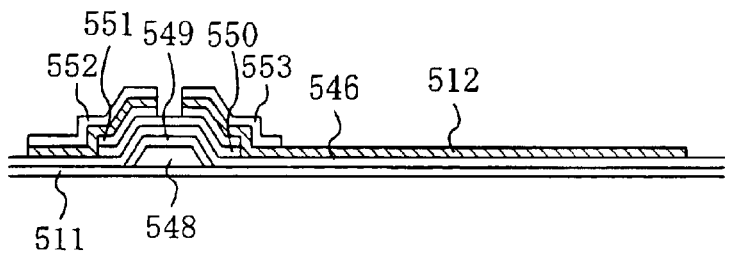

Then, a transparent conductive film (ITO) to be the lower conductive layer 512 is deposited to a thickness of about 150 nm by a sputtering method, as illustrated in FIG. 72B, followed by deposition of a metal film made of Al, Mo, Ta, or the like. In this example, Ta is used. These metal layers are patterned to provide the source signal line 543, a source electrode 552 and a drain electrode 553. Then, the transparent conductive film is patterned so as to provide the lower conductive layer 512. Then, the electrode contact layer 551 is patterned by a dry etching method to provide a channel portion of a thin film transistor (TFT).

Figure 72C:
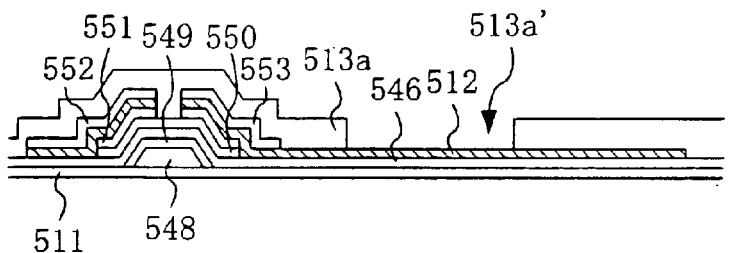

Then, an insulative layer made of SiNx, or the like, is deposited to a thickness of about 600 nm by a CVD method, and then patterned to provide the first dielectric layer (protection layer) 513a, as illustrated in FIG. 72C. In the patterning step, the first openings 513a' are provided at positions respectively opposing the openings 514a which are to be provided later. At the same time, the contact holes 545 for electrically connecting the lower conductive layer 512 to the upper conductive layer 514 are provided above the storage capacitance line 542.

Figure 72D:
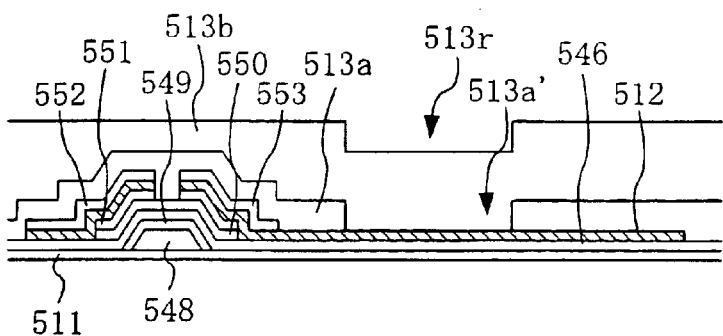

Then, a photosensitive resin to be the second dielectric layer 513b is applied on the first dielectric layer 513a, as illustrated in FIG. 72D. In this step, the photosensitive resin falls (flows) into the already-formed opening 513a', thereby obtaining the second dielectric layer 513b including the depressed portion 513r self-aligned with the opening 513a'. The photosensitive resin of the second dielectric layer 513b is exposed and developed to provide the contact holes 545 for electrically connecting the lower conductive layer 512 to the upper conductive layer 514. The photosensitive resin layer is provided to have a thickness of about 1.5 µm by using, for example, a positive type photosensitive resin (an acrylic resin manufactured by JSR Corporation, relative dielectric constant: 3.7). In this step, the depth of the depressed portion 513r can be adjusted by adjusting the viscosity and application conditions of the photosensitive resin. Alternatively, the second dielectric layer 513b may be obtained by using a resin with no photosensitivity, separately performing a separate photolithography step using a photoresist.

Figure 72E:
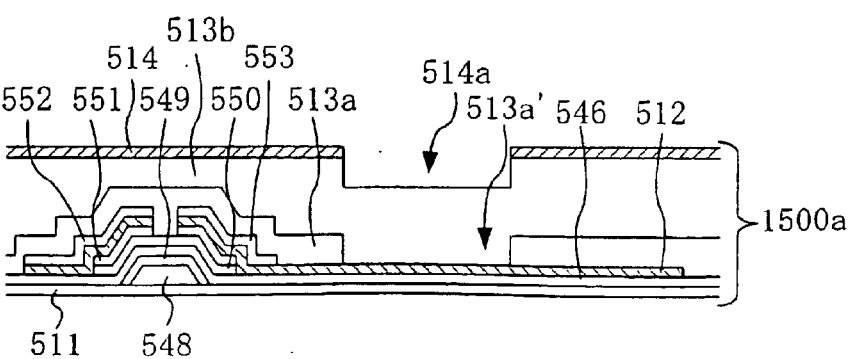

Then, the transparent conductive layer (ITO) to be the upper conductive layer 514 is deposited to a thickness of about 100 nm on the second dielectric layer 513b by a sputtering method, as illustrated in FIG. 72E. Then, the transparent conductive film is patterned according to a common method, thereby providing the upper conductive layer 514 including the openings 514a.

In this way, there is obtained the TFT substrate 1500a provided with a two-layer picture element electrode including the lower conductive layer 512 of an ITO layer, the upper conductive layer 514 of an ITO layer, and the dielectric layer 513 therebetween.

While the dielectric layer 513 interposed between the upper conductive layer 514 and the lower conductive layer 512 has a two-layer structure including the first dielectric layer 513a and the second dielectric layer 513b in this example, it is not necessary to employ such a structure, and the dielectric layer 513 may further include one or more additional layers. There is no limitation on the type of material or the number of layers of the dielectric layer 513. Preferably, a material having a high transparency is used so as not to reduce the light efficiency. When the second dielectric layer 513b is provided by using a photosensitive resin, there is an advantage that the step of providing the contact holes 545 can be simplified. The thickness of the dielectric layer 513 including the openings 513a', as well as the viscosity of the material of the second dielectric layer and the application conditions thereof, influences the depth of the depressed portion 513r. Thus, the thickness of the dielectric layer 513 can be adjusted so as to obtain a predetermined depth.

The counter substrate 1500b can be obtained by providing the counter electrode 522 made of ITO by using, for example, a sputtering method, on a color filter substrate 521. Then, the liquid crystal display device 1500 is finally obtained through the step of providing a vertical alignment film, the step of attaching the pair of substrates together, the step of injecting a nematic liquid crystal material having a negative dielectric anisotropy, etc. These steps can be carried out by a known method.

Next, a method for producing the liquid crystal display device 1500' illustrated in FIG. 70 will be described. Other than the TFT substrate 1500a', the structure of the liquid crystal display device 1500' is the same as that of the liquid crystal display device 1500 illustrated in FIG. 69, and thus the production method will not be described below except for the method for producing the TFT substrate 1500a'.

FIG. 73A to FIG. 73E are cross-sectional view schematically illustrating the production process of the TFT substrate 1500a' of the liquid crystal display device 1500'.

Figure 73A:
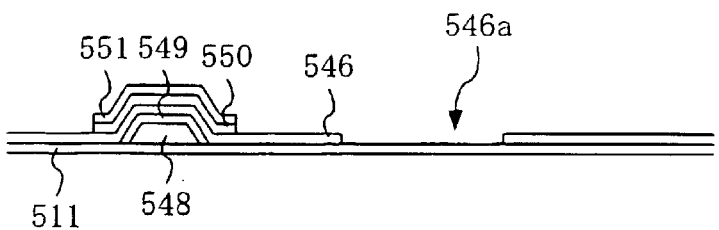

As necessary, an insulative layer (not shown) made of Ta$_2$O$_5$, SiO$_2$, or the like, is provided as a basecoat layer on the insulative transparent substrate (e.g., a glass substrate) 511, as illustrated in FIG. 73A. Then, a metal layer made of Al, Mo, Ta, or the like, is provided by a sputtering method, and the metal layer is patterned so as to provide the gate electrode (including the gate line 541) 548. In this example, the gate electrode 548 is provided by using Ta. At this point, the storage capacitance line 542 is provided in the same step by using the same material. Then, the gate insulating layer 546 is provided on substantially the entire surface of the substrate 511 so as to cover the gate electrode 548. In this example, an SiNx film having a thickness of about 300 nm is deposited by a P-CVD method so as to provide the gate insulating layer 546. In the step of patterning the gate insulating layer 546, the openings 546a are provided at positions respectively opposing the openings 514a. The gate electrode 548 may be subjected to an anodic oxidation process so as to use an anodic oxidation film 549 as the gate insulating layer. Of course, it is possible to employ a two-layer structure including an anodic oxidation film and an insulative film such as SiNx.

Two Si layers to be the channel layer 550 and the electrode contact layer 551, respectively, are deposited successively on the gate insulating layer 546 by using a CVD method. An amorphous Si layer having a thickness of about 150 nm is used for the channel layer 550, and an amorphous Si or microcrystal Si layer which is doped with an impurity such as phosphorus and has a thickness of about 50 nm is used for the electrode contact layer 551. These Si layers are patterned by, for example, a dry etching method using a mixed gas of HCl+$SF_6$, so as to provide the channel layer 550 and the electrode contact layer 551.

Figure 73B:
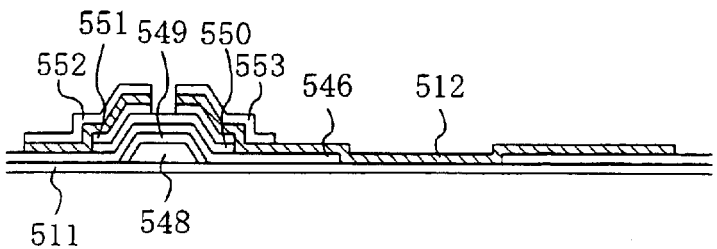

Then, a transparent conductive film (ITO) to be the lower conductive layer 512 is deposited to a thickness of about 150 nm by a sputtering method, as illustrated in FIG. 73B, followed by deposition of a metal film made of Al, Mo, Ta, or the like. In this example, Ta is used. These metal layers are patterned to provide the source signal line 543, the source electrode 552 and the drain electrode 553. Then, the transparent conductive film is patterned so as to provide the lower conductive layer 512. Then, the electrode contact layer 551 is patterned by a dry etching method to provide a channel portion of a thin film transistor (TFT).

Figure 73C:
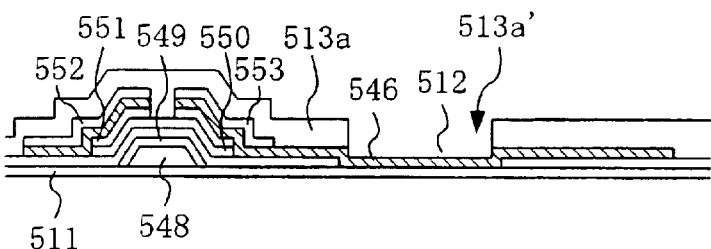

Then, an insulative layer made of SiNx, or the like, is deposited to a thickness of about 600 nm by a CVD method, and then patterned to provide the first dielectric layer (protection layer) 513a, as illustrated in FIG. 73C. In the patterning step, the first openings 513a' are provided at positions respectively opposing the openings 546a of the gate insulating layer 546. By providing both of the openings 546a of the gate insulating layer 546 and the first openings 513a', the depth of the depressed portion 513r can be further increased. At the same time, the contact holes 545 for electrically connecting the lower conductive layer 512 to the upper conductive layer 514 are provided above the storage capacitance line 542.

Figure 73D:
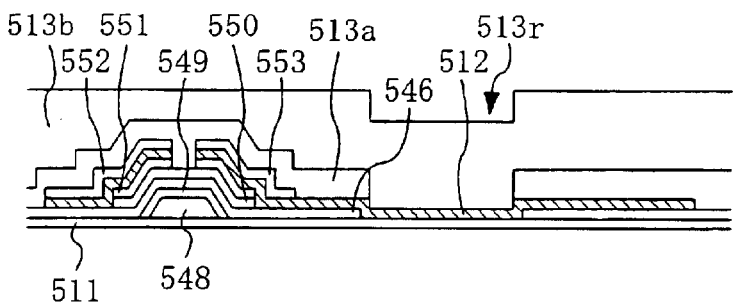
Figure 73E:
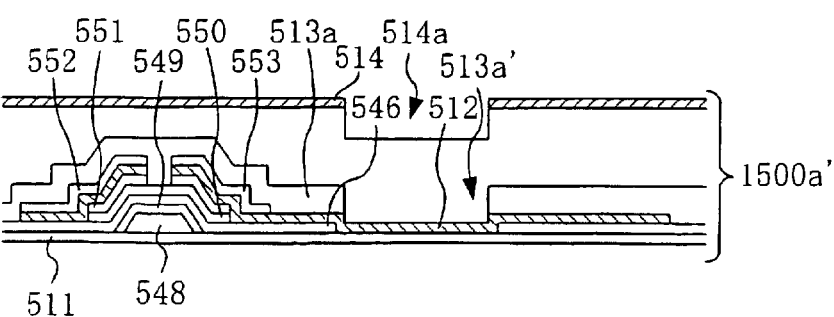

The subsequent steps are performed as illustrated in FIG. 73D and FIG. 73E as described above with reference to FIG. 72D and FIG. 72E, thereby producing the TFT substrate 1500a'.

Next, a method for producing the liquid crystal display device 1500" illustrated in FIG. 71 will be described. Other than the TFT substrate 1500a", the structure of the liquid crystal display device 1500" is the same as that of the liquid crystal display device 1500 illustrated in FIG. 69, and thus the production method will not be described below except for the method for producing the TFT substrate 1500a".

FIG. 74A to FIG. 74E are cross-sectional view schematically illustrating the production process of the TFT substrate 1500a" of the liquid crystal display device 1500".

Figure 74A:
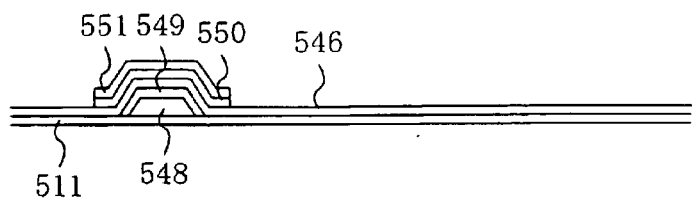
Figure 74B:
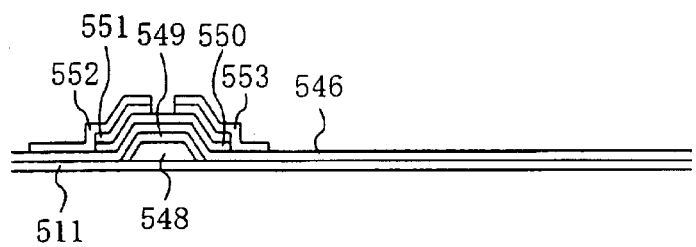

As illustrated in FIG. 74A, the gate electrode 548, the storage capacitance line 542, the gate insulating layer 546, the channel layer 550 and the electrode contact layer 551 are provided by a method as described above with reference to FIG. 72A.

Then, a metal film made of Al, Mo, Ta, or the like, is deposited. In this example, Ta is used. These metal layers are patterned to provide the source signal line 543, the source electrode 552 and the drain electrode 553. Then, the electrode contact layer 551 is patterned by a dry etching method to provide a channel portion of a thin film transistor (TFT).

Figure 74C:
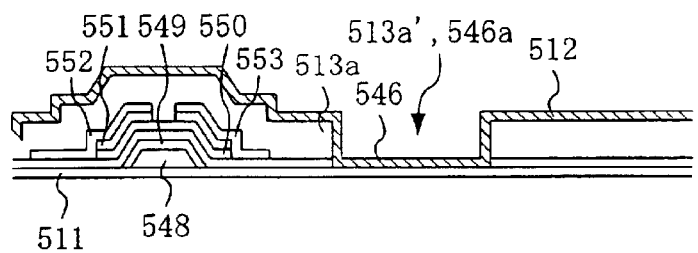

Then, an insulative layer made of SiNx, or the like, is deposited to a thickness of about 600 nm by a CVD method, and then the first dielectric layer 513a and the gate insulating layer 546 are patterned at the same time, thereby providing the openings 513a' and the openings 546a, as illustrated in FIG. 74C. With such a structure, there is further provided an advantage that the photolithography step can be eliminated as compared to the production method described above with reference to FIG. 73A to FIG. 73E.

Then, a transparent conductive film (ITO) to be the lower conductive layer 512 is deposited to a thickness of about 150 nm by a sputtering method. Then, the transparent conductive film is patterned to provide the lower conductive layer 512.

Figure 74D:
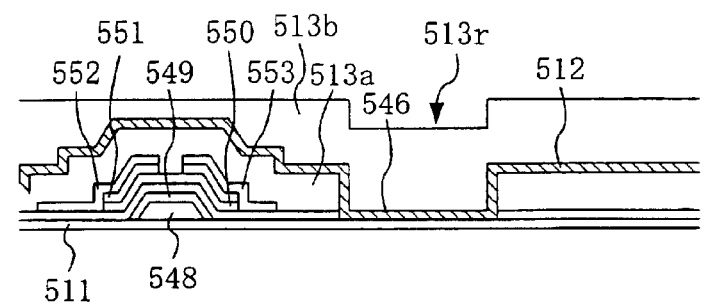
Figure 74E:
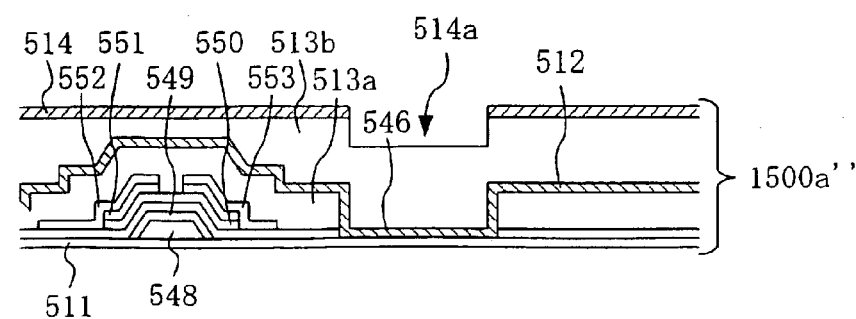

The subsequent steps are performed as illustrated in FIG. 74D and FIG. 74E as described above with reference to FIG. 72D and FIG. 72E, thereby producing the TFT substrate 1500a".

As described above, the dielectric layer 513 of the liquid crystal display device of this example has a layered structure including the first dielectric layer 513a and the second dielectric layer 513b. The second dielectric layer 513b is provided on the dielectric layer 513 having the openings 513a' so as to cover the openings 513a', thereby obtaining a surface configuration which reflects the steps in the surface provided by the openings 513a', i.e., the depressed portion 513r. Therefore, it is not necessary to separately perform the photolithography step with an adjustment of the exposure for the dielectric layer 513 provided by using a photosensitive resin, whereby the production step can be simplified and it is possible to avoid the possible decrease in the positional precision due to the alignment of the photomask. Moreover, the precision of the depth of the depressed portion 513r is increased.

Moreover, for the dielectric layer 513 in which the openings 513a' are provided, a film which is provided as a protection film in a common TFT substrate can be used, and the opening 513a' can be provided only by changing the pattern of the mask used in the step of patterning the protection layer. Thus, no additional step is required. Furthermore, no additional step is required to provide the openings 546a in the gate insulating layer 546. Of course, another dielectric layer having similar openings may be added to adjust the depth of the depressed portion. Particularly, when producing a transmission-reflection type liquid crystal display device with the upper conductive layer 514 being used as a reflection electrode, it is preferred that the thickness (corresponding to d1 in FIG. 34A) of the liquid crystal layer in the reflection region (a region which is defined by the upper conductive layer 514 and which produces a display in the reflection mode) is about ½ of the thickness (corresponding to d2 in FIG. 34A) of the liquid crystal layer in the transmission region (a region which is defined by the openings 514a of the upper conductive layer 514 and which produces a display in the transmission mode). In such a case, it is preferred to further provide an additional dielectric layer.

As described above, according to this example, a liquid crystal display device with a desirable display quality which has a high productivity and which can be produced with a good reproducibility, and a method for producing the same are provided.

Example 9

In the liquid crystal display device of Example 8, the dielectric layer 513 including the depressed portion 513r is provided by providing the second dielectric layer 513b on the first dielectric layer 513a including the openings 513a'. In contrast, in a liquid crystal display device 1600 of this example, a dielectric layer 513' including the depressed portion 513r is provided without providing a layered structure including the first dielectric layer with openings, as illustrated in FIG. 75.

A method for producing a TFT substrate 1600a of the liquid crystal display device 1600 including the dielectric layer 513' with the depressed portion 513r will be described with reference to FIG. 76A to FIG. 76E.

Figure 76A:
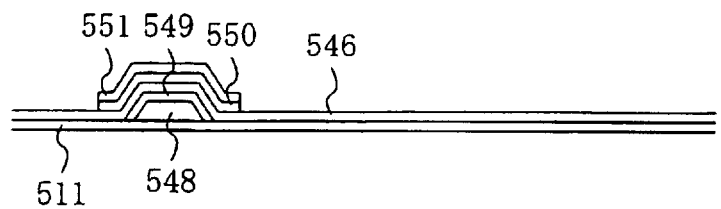
Figure 76B:
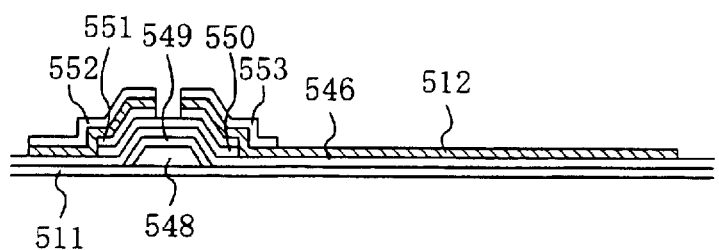

As illustrated in FIG. 76A and FIG. 76B, the gate electrode 548, the storage capacitance line 542, the gate insulating layer 546, the channel layer 550, the electrode contact layer 551, the source line 543, the source electrode 552, the drain electrode 553 and the lower conductive layer 512 are provided by a method as described above in Example 8 with reference to FIG. 72A and FIG. 72B.

Figure 76C:
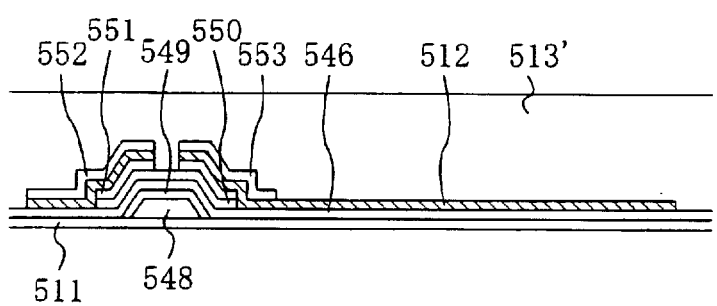

Then, a photosensitive resin to be the dielectric layer 513' is provided on substantially the entire surface of the substrate, as illustrated in FIG. 76C. The contact holes 545 for electrically connecting the upper conductive layer 514 to the lower conductive layer 512 are provided in the photosensitive resin layer. The photosensitive resin layer is provided to have a thickness of about 1.5 μm by using, for example, a positive type photosensitive resin (an acrylic resin manufactured by JSR Corporation, relative dielectric constant: 3.7). Alternatively, the dielectric layer 513' may be provided by using a resin with no photosensitivity, separately performing a photolithography step using a photoresist.

Figure 76D:
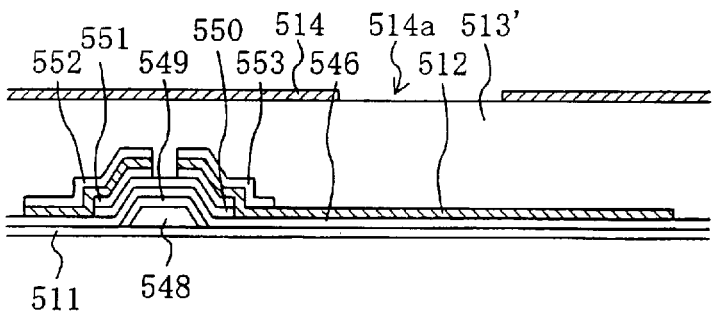

Then, the transparent conductive layer (ITO) to be the upper conductive layer 514 is deposited to a thickness of about 100 nm by a sputtering method, as illustrated in FIG. 76D. Then, the transparent conductive film is patterned according to a common method, thereby providing the upper conductive layer 514 including the openings 514a.

Figure 76E:
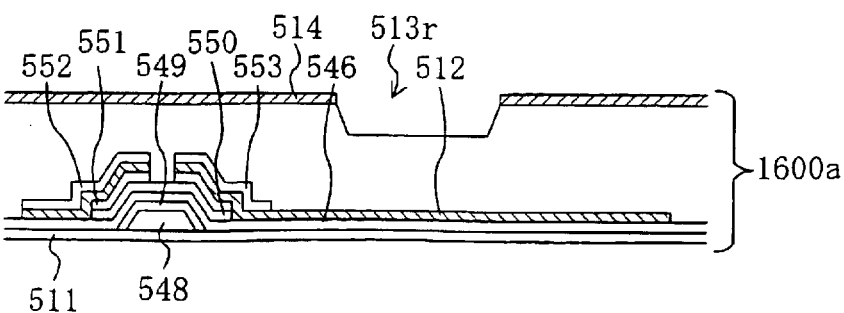

Then, as illustrated in FIG. 76E, the dielectric layer 513' in the opening 514a of the upper conductive layer 514 is removed partially (in the thickness direction) through, for example, a dry etching process using a gas of $CF_4+O_2$ with the upper conductive layer 514 as a mask, thereby providing the depressed portion 513r. The depth of the depressed portion 513r can be controlled by adjusting the etching conditions (e.g., the time).

As described above, the depressed portion 513r of the dielectric layer 513' in the liquid crystal display device of this example is provided by partially removing the dielectric layer 513' with the upper conductive layer 514 as a mask. Therefore, it is not necessary to separately perform the photolithography step with an adjustment of the exposure for the dielectric layer 513 provided by using a photosensitive resin, whereby the production step can be simplified and it is possible to avoid the possible decrease in the positional precision due to the alignment of the photomask. Moreover, the precision of the depth of the depressed portion 513r is increased.

Moreover, there is also an advantage that the process margin is increased in view of the chemical resistance of the dielectric layer. When the step of providing the upper conductive layer 514 and the openings 514a is performed after depressed portions are provided in the dielectric layer 513, as in the prior art, it is necessary to control the process conditions in the step of removing the resist used for patterning the upper conductive layer 514 so that lift or delamination does not occur in the depressed portion 513r, because an acrylic resin, or the like, used for providing the dielectric layer 513 has a poor resistance against the resist removing solution (particularly, an aminic removing solution). In contrast, in the production method of this example, the depressed portions 513r are provided in the dielectric layer 513 after patterning the upper conductive layer 514 to provide the openings 514a. Therefore, in the step of removing the resist used for patterning the upper conductive layer 514, the depressed portions 513r are not yet provided in the dielectric layer 513. Therefore, a damage from a resist removing solution is less likely to occur. Thus, the process margin is increased.

The method for producing the depressed portion 513r of this example may be used in combination with that of Example 8. Such a combination is particularly effective when producing a transmission-reflection type liquid crystal display device with the upper conductive layer 514 being used as a reflection electrode, where it is required to provide deep depressed portion 513r in order to adjust the thickness of the liquid crystal layer in the reflection region and that in the transmission region. Also when the reflection electrode (the upper conductive layer 514) is provided by using Al, the dielectric layer 513' in the opening 514a of the upper conductive layer 514 can be partially removed through a dry etching process using a $CF_4+O_2$ gas, for example. Moreover, the step of removing the dielectric layer 513 can be carried out by using, for example, an $O_2$ ashing method as well as a dry etching method.

In the liquid crystal display devices of Examples 8 and 9, the dielectric layer includes a depressed portion (a region where the height of the dielectric layer is small) in a region corresponding to the upper conductive layer. Therefore, the relationship between the applied voltage and the retardation can be uniform in any location within a picture element region, thereby providing a liquid crystal display device capable of displaying an image with a high quality. Particularly, in comparison to a transmission type display device having a flat-surface dielectric layer, there is an advantage that it is possible to suppress the decrease in the transmittance (the decrease in the light efficiency) due to the decrease in the voltage applied across the liquid crystal layer in a region corresponding to an opening of the upper conductive layer.

Moreover, according to this example, the depressed portion of the dielectric layer can be produced by a convenient production process with a good reproducibility. Thus, a liquid crystal display device as described above having a desirable display quality can be produced with a high productivity.

According to the present invention, a two-layer electrode including an upper conductive layer having an opening, a dielectric layer, and a lower conductive layer is employed so as to produce an inclined electric field at the edge portion of the opening of the upper conductive layer, thereby orienting the liquid crystal molecules of the vertical alignment liquid crystal layer into a radially-inclined orientation by the inclined electric field. Thus, it is possible to realize a radially-inclined orientation stably and with a good reproducibility. Therefore, the present invention provides a liquid crystal display device having a high display quality.

Particularly, with a structure where the upper conductive layer includes a plurality of openings, there is provided a liquid crystal display device which is capable of obtaining a stable radially-inclined orientation across the entire picture element region and in which the decrease in the response speed is suppressed.

Moreover, with a structure where a second orientation-regulating structure is provided on a substrate which opposes, via the liquid crystal layer, another substrate having the two-layer electrode (the first orientation-regulating structure), there is provided a liquid crystal display device in which the radially-inclined orientation is further stabilized. The effect of stabilizing the orientation can also be obtained by employing a structure where a protrusion is provided in the opening of the upper conductive layer of the two-layer electrode.

Moreover, when a depressed portion or an opening is provided in the dielectric layer in a region corresponding to the opening in the upper conductive layer, wherein the upper conductive layer is a reflection electrode and the lower conductive layer is a transparent electrode, it is possible to provide a transmission-reflection type liquid crystal display device in which the transmission mode characteristics and the reflection mode characteristics are both optimized.

What is claimed is:

1. A liquid crystal display device, comprising:
a first substrate, a second substrate, and a liquid crystal layer provided between the first substrate and the second substrate;
a plurality of picture element regions each comprising a first electrode provided on one side of the first substrate which is closer to the liquid crystal layer and a second electrode provided on the second substrate so as to oppose the first electrode via the liquid crystal layer;
wherein the liquid crystal layer in each of the plurality of picture element regions takes a substantially vertical alignment in the absence of an applied voltage between the first electrode and the second electrode, and changes its orientation according to a voltage applied between the first electrode and the second electrode;
wherein the first electrode includes a lower conductive layer, a dielectric layer covering at least a portion of the lower conductive layer, and an upper conductive layer provided on one side of the dielectric layer which is closer to the liquid crystal layer;
wherein the upper conductive layer includes at least one first opening, and the lower conductive layer is provided so as to oppose at least a portion of the at least one first opening via the dielectric layer; and
in the liquid crystal layer an electric field, with a strength that decreases in a region corresponding to the at least one first opening, is produced in response to a voltage applied between the first electrode and the second electrode so that the liquid crystal layer in the region corresponding to the at least one first opening exhibits a radially-inclined orientation.

2. The liquid crystal display device of claim 1, wherein the lower conductive layer is provided in a region including a region opposing the at least one first opening via the dielectric layer.

3. The liquid crystal display device of claim 1, wherein the at least one first opening has a square shape.

4. The liquid crystal display device of claim 1, wherein the at least one first opening has a circular shape.

5. The liquid crystal display device of claim 1, wherein the at least one first opening of the upper conductive layer includes a plurality of first openings.

6. The liquid crystal display device of claim 5, wherein the plurality of first openings of the upper conductive layer are regularly arranged.

7. The liquid crystal display device of claim 1, wherein the dielectric layer includes a depressed portion or an opening in the at least one first opening.

8. The liquid crystal display device of claim 1, wherein the lower conductive layer includes a second opening in a region opposing the first opening.

9. The liquid crystal display device of claim 1, wherein one of the upper conductive layer and the lower conductive layer is a transparent conductive layer, and the other one of the upper conductive layer and the lower conductive layer is a reflective conductive layer.

10. The liquid crystal display device of claim 1, wherein: the at least one first opening of the upper conductive layer includes a plurality of first opening; and a plurality of liquid crystal domains are formed in response to a voltage applied between the first electrode and the second electrode, each of the plurality of liquid crystal domains being formed in the liquid crystal layer corresponding to respective one of the first openings provided in the first electrode, and having a radially-inclined orientation.

11. The liquid crystal display device of claim 10, wherein the second substrate further includes an orientation-regulating structure in a region corresponding to at least one of the plurality of liquid crystal domains, the orientation-regulating structure exerting an orientation-regulating force for orienting liquid crystal molecules in the at least one liquid crystal domain into a radially-inclined orientation at least in the presence of an applied voltage.

12. The liquid crystal display device of claim 11, wherein the orientation-regulating structure is provided in a region corresponding to a region in the vicinity of a center of the at least one liquid crystal domain.

13. The liquid crystal display device of claim 11, wherein in the at least one liquid crystal domain, a direction of orientation regulation by the orientation-regulating structure coincides with a direction of the radially-inclined orientation.

14. The liquid crystal display device of claim 11, wherein the orientation-regulating structure exerts an orientation-regulating force for orienting the liquid crystal molecules into a radially-inclined orientation even in the absence of an applied voltage.

15. The liquid crystal display device of claim 14, wherein the orientation-regulating structure is a protrusion protruding from the second substrate into the liquid crystal layer.

16. The liquid crystal display device of claim 14, wherein the orientation-regulating structure includes a surface having a horizontal alignment power provided on one side of the second substrate which is closer to the liquid crystal layer.

17. The liquid crystal display device of claim 11, wherein the orientation-regulating structure exerts an orientation-regulating force for orienting the liquid crystal molecules into a radially-inclined orientation only in the presence of an applied voltage.

18. The liquid crystal display device of claim 17, wherein the orientation-regulating structure includes an opening provided in the second electrode.

19. The liquid crystal display device of claim 1, further comprising a pair of polarizing plates provided so as to oppose each other via the liquid crystal layer, wherein the pair of polarizing plates are arranged in a crossed-Nicols state.

20. The liquid crystal display device of claim 19, further comprising a pair of quarter-wave plates provided so as to oppose each other via the liquid crystal layer, wherein each of the pair of quarter-wave plates is provided between the liquid crystal layer and a respective one of the pair of polarizing plates.

21. The liquid crystal display device of claim 20, further comprising a pair of half-wave plates provided so as to oppose each other via the liquid crystal layer, wherein each of the pair of half-wave plates is provided between a respective one of the pair of polarizing plates and a respective one of the pair of quarter-wave plates.

22. The liquid crystal display device of claim 20, wherein slow axes of the pair of quarter-wave plates are arranged so as to be perpendicular to each other.

23. The liquid crystal display device of claim 21, wherein slow axes of the pair of half-wave plates are arranged so as to be perpendicular to each other.

24. The liquid crystal display device of claim 20, wherein the liquid crystal layer in each of the plurality of picture element regions takes a spiral orientation in response to a voltage applied between the first electrode and the second electrode.

25. The liquid crystal display device of claim 24, wherein the liquid crystal layer in each of the plurality of picture element regions includes a minute region which takes a twist orientation along the liquid crystal layer in response to the voltage applied between the first electrode and the second electrode.

26. The liquid crystal display device of claim 1, wherein: the first substrate further includes an active element for each of the plurality of picture element regions; and the first electrode is a picture element electrode which is provided for each of the plurality of picture element regions and is switched by the active element, and the second electrode is at least one counter electrode opposing the plurality of picture element regions.

27. A liquid crystal display device, comprising:
   a first substrate, a second substrate, and a liquid crystal layer provided between the first substrate and the second substrate;
   a plurality of picture element regions each comprising a first electrode provided on one side of the first substrate which is closer to the liquid crystal layer and a second electrode provided on the second substrate so as to oppose the first electrode via the liquid crystal layer;
   wherein the liquid crystal layer in each of the plurality of picture element regions takes a substantially vertical alignment in the absence of an applied voltage between the first electrode and the second electrode, and changes its orientation according to a voltage applied between the first electrode and the second electrode;
   wherein the first electrode includes a lower conductive layer, a dielectric layer covering at least a portion of the lower conductive layer, and an upper conductive layer provided on one side of the dielectric layer which is closer to the liquid crystal layer; and the upper conductive layer includes at least one first opening, and the lower conductive layer is provided so as to oppose at least a portion of the at least one first opening via the dielectric layer;
   a pair of quarter-wave plates provided so as to oppose each other via the liquid crystal layer, wherein each of the pair of quarter-wave plates is provided between the liquid crystal layer and a respective one of the pair of polarizing plates; and
   a pair of half-wave plates provided so as to oppose each other via the liquid crystal layer, wherein each of the pair of half-wave plates is provided between a respective one of the pair of polarizing plates and a respective one of the pair of quarter-wave plates.

28. The liquid crystal display device of claim 27, wherein slow axes of the pair of half-wave plates are arranged so as to be perpendicular to each other.

29. The liquid crystal display device of claim 27, wherein each of the upper and lower conductive layers of the first electrode is transparent and conductive.

30. The liquid crystal display device of claim 1, wherein each of the upper and lower conductive layers of the first electrode is transparent and conductive.

31. The liquid crystal display device of claim 1, wherein the upper and lower conductive layers work together to form multiple liquid crystal domains in the liquid crystal layer when a substantial voltage is applied across the liquid crystal layer.

32. A liquid crystal display device, comprising:
   a first substrate, a second substrate, and a liquid crystal layer provided between the first substrate and the second substrate;
   a plurality of picture element regions each comprising a first electrode provided on one side of the first substrate which is closer to the liquid crystal layer and a second electrode provided on the second substrate so as to oppose the first electrode via the liquid crystal layer;
   wherein the liquid crystal layer in a plurality of picture element regions takes a substantially vertical alignment in the absence of an applied voltage between the first electrode and the second electrode, and changes its orientation according to a voltage applied between the first electrode and the second electrode;
   wherein the first electrode includes a lower conductive layer, a dielectric layer covering at least a portion of the lower conductive layer, and an upper conductive layer provided on a side of the dielectric layer which is closer to the liquid crystal layer;
   wherein the upper conductive layer includes at least one opening defined therein, and the lower conductive layer is provided so as to oppose at least a portion of the opening via the dielectric layer; and
   in the liquid crystal layer an electric field, with a strength that decreases in a region corresponding to the at least one opening, is produced in response to a voltage applied between the first electrode and second electrode so that the liquid crystal layer in the region corresponding to the at least one opening exhibits a liquid crystal domain including liquid crystal molecules inclined in different directions away from an axis located in the opening.

33. The liquid crystal display device of claim 32, wherein each of the upper and lower conductive layers of the first electrode is transparent and conductive.

* * * * *

UNITED STATES PATENT AND TRADEMARK OFFICE
CERTIFICATE OF CORRECTION

PATENT NO. : 6,924,876 B2
DATED : August 2, 2005
INVENTOR(S) : Kubo et al.

It is certified that error appears in the above-identified patent and that said Letters Patent is hereby corrected as shown below:

Title page,
Item [75], Inventors, second inventor's city should read -- Yamatokooriyama --.

Signed and Sealed this

Twenty-ninth Day of November, 2005

JON W. DUDAS
*Director of the United States Patent and Trademark Office*